United States Patent [19]
Kohno et al.

[11] Patent Number: 5,283,693
[45] Date of Patent: Feb. 1, 1994

[54] COMPACT ZOOM LENS SYSTEM

[75] Inventors: Tetsuo Kohno, Toyonaka; Takashi Okada, Osaka; Mitsuko Date, Sakai; Hiroyuki Matsumoto, Wakayama, all of Japan

[73] Assignee: Minolta Camera Kabushiki Kaisha, Japan

[21] Appl. No.: 714,266

[22] Filed: Jun. 12, 1991

[30] Foreign Application Priority Data

| Jun. 13, 1990 | [JP] | Japan | 2-156421 |
| Jun. 13, 1990 | [JP] | Japan | 2-156422 |
| Jun. 14, 1990 | [JP] | Japan | 2-156233 |
| Jun. 22, 1990 | [JP] | Japan | 2-164854 |
| Jul. 6, 1990 | [JP] | Japan | 2-180353 |
| Jul. 6, 1990 | [JP] | Japan | 2-180354 |
| Oct. 29, 1990 | [JP] | Japan | 2-291493 |

[51] Int. Cl.$^5$ ............................................. G02B 15/14
[52] U.S. Cl. ............................... 359/691; 359/708; 359/715
[58] Field of Search ............... 359/691, 708, 717, 715, 359/680, 683, 676

[56] References Cited
U.S. PATENT DOCUMENTS

| 3,958,864 | 5/1976 | Glatzel | 359/708 |
| 4,153,339 | 5/1979 | Tajima | 350/184 |
| 4,195,912 | 4/1980 | Doi | 350/184 |
| 4,304,466 | 12/1981 | Betensky | 350/426 |
| 4,509,833 | 4/1985 | Ikemori | 350/427 |
| 4,647,160 | 3/1987 | Ikemori | 350/426 |
| 4,652,091 | 3/1987 | Oizumi et al. . | |
| 4,659,186 | 4/1987 | Sato et al. . | |
| 4,682,860 | 7/1987 | Tanaka et al. . | |
| 4,726,665 | 2/1988 | Itoh | 350/426 |
| 4,726,666 | 2/1988 | Ota | 350/426 |
| 4,772,106 | 9/1988 | Ogata et al. . | |
| 4,787,718 | 11/1988 | Cho . | |
| 4,810,072 | 3/1989 | Takahashi | 350/427 |
| 4,815,830 | 3/1989 | Sato et al. . | |
| 4,830,476 | 5/1989 | Aoki . | |
| 4,838,669 | 6/1989 | Ogata et al. . | |
| 4,844,599 | 4/1989 | Ito | 350/426 |
| 4,906,077 | 3/1990 | Ito | |
| 4,911,539 | 3/1990 | Tsunashima et al. . | |
| 4,936,661 | 6/1990 | Betensky et al. . | |
| 4,953,957 | 9/1990 | Kobayashi | 350/423 |
| 4,999,007 | 3/1991 | Aoki | 350/426 |
| 5,005,955 | 4/1991 | Ohshita | 359/691 |
| 5,054,897 | 10/1991 | Ozawa | 359/691 |

FOREIGN PATENT DOCUMENTS

| 54-78150 | 6/1979 | Japan . |
| 56-128911 | 10/1981 | Japan . |
| 58-60717 | 4/1983 | Japan . |
| 58-137813 | 8/1983 | Japan . |
| 58-184916 | 10/1983 | Japan . |
| 58-215620 | 12/1983 | Japan . |
| 60-48009 | 3/1985 | Japan . |
| 60-191216 | 9/1985 | Japan . |
| 60-263113 | 12/1985 | Japan . |
| 61-67016 | 4/1986 | Japan . |
| 61-69015 | 4/1986 | Japan . |
| 61-69017 | 4/1986 | Japan . |

(List continued on next page.)

*Primary Examiner*—Scott J. Sugarman
*Assistant Examiner*—Hung Xuan Dang
*Attorney, Agent, or Firm*—Price, Gess & Ubell

[57] ABSTRACT

A compact zoom lens system comprises a front negative lens component and a rear positive lens component with a variable air space between the front and the rear lens components. The front negative lens component consists of two lens elements and the rear lens component consists of two or three lens elements. A plurality of aspherical surfaces are employed for the compact zoom lens system. Furthermore, some zoom lens system includes an additional negative lens component having a weak refractive power behind the rear lens component.

15 Claims, 48 Drawing Sheets

FOREIGN PATENT DOCUMENTS

| | | |
|---|---|---|
| 61-87119 | 5/1986 | Japan . |
| 61-87120 | 5/1986 | Japan . |
| 61-183613 | 8/1986 | Japan . |
| 62-78522 | 4/1987 | Japan . |
| 62-235916 | 10/1987 | Japan . |
| 62-251710 | 11/1987 | Japan . |
| 63-25613 | 2/1988 | Japan . |
| 63-32513 | 2/1988 | Japan . |
| 63-139314 | 6/1988 | Japan . |
| 63-148223 | 6/1988 | Japan . |
| 63-266413 | 11/1988 | Japan . |
| 63-276013 | 11/1988 | Japan . |
| 63-311224 | 12/1988 | Japan . |
| 64-42618 | 2/1989 | Japan . |
| 64-52111 | 2/1989 | Japan . |
| 1-189622 | 7/1989 | Japan . |
| 1-191114 | 8/1989 | Japan . |
| 1-193807 | 8/1989 | Japan . |
| 1-193808 | 8/1989 | Japan . |
| 1-243011 | 9/1989 | Japan . |
| 1-307714 | 12/1989 | Japan . |
| 2-6917 | 1/1990 | Japan . |
| 2-10307 | 1/1990 | Japan . |
| 2-18511 | 1/1990 | Japan . |
| 62-56917 | 1/1990 | Japan . |
| 2-35406 | 2/1990 | Japan . |
| 2-51116 | 2/1990 | Japan . |
| 2-52308 | 2/1990 | Japan . |

OTHER PUBLICATIONS

"Study on the Optical Design of a Zoom Lens," by Keizo Yamaji, Cannon Research Report No. 3, 1965.

(S)

(L)

(S)

(L)

(S)

(L)

(S)

(L)

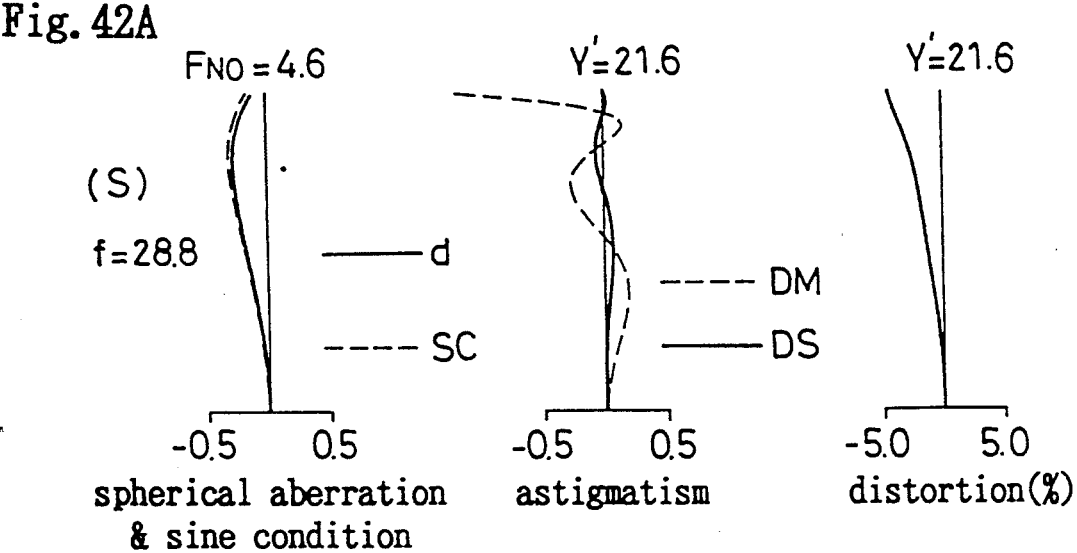
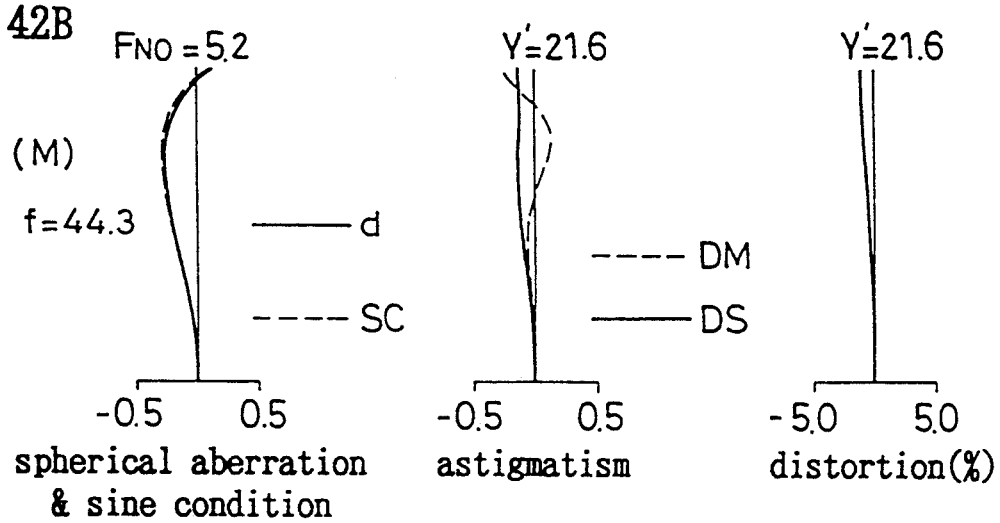
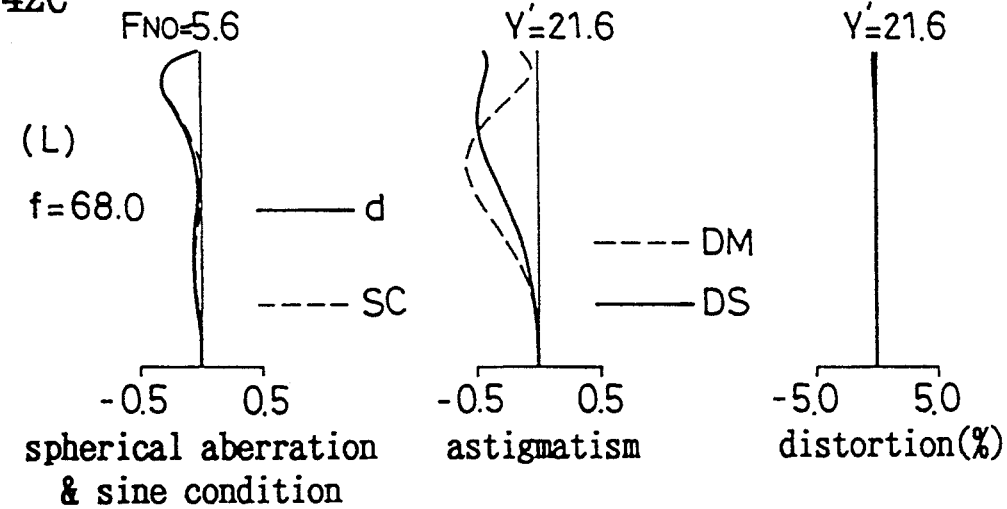

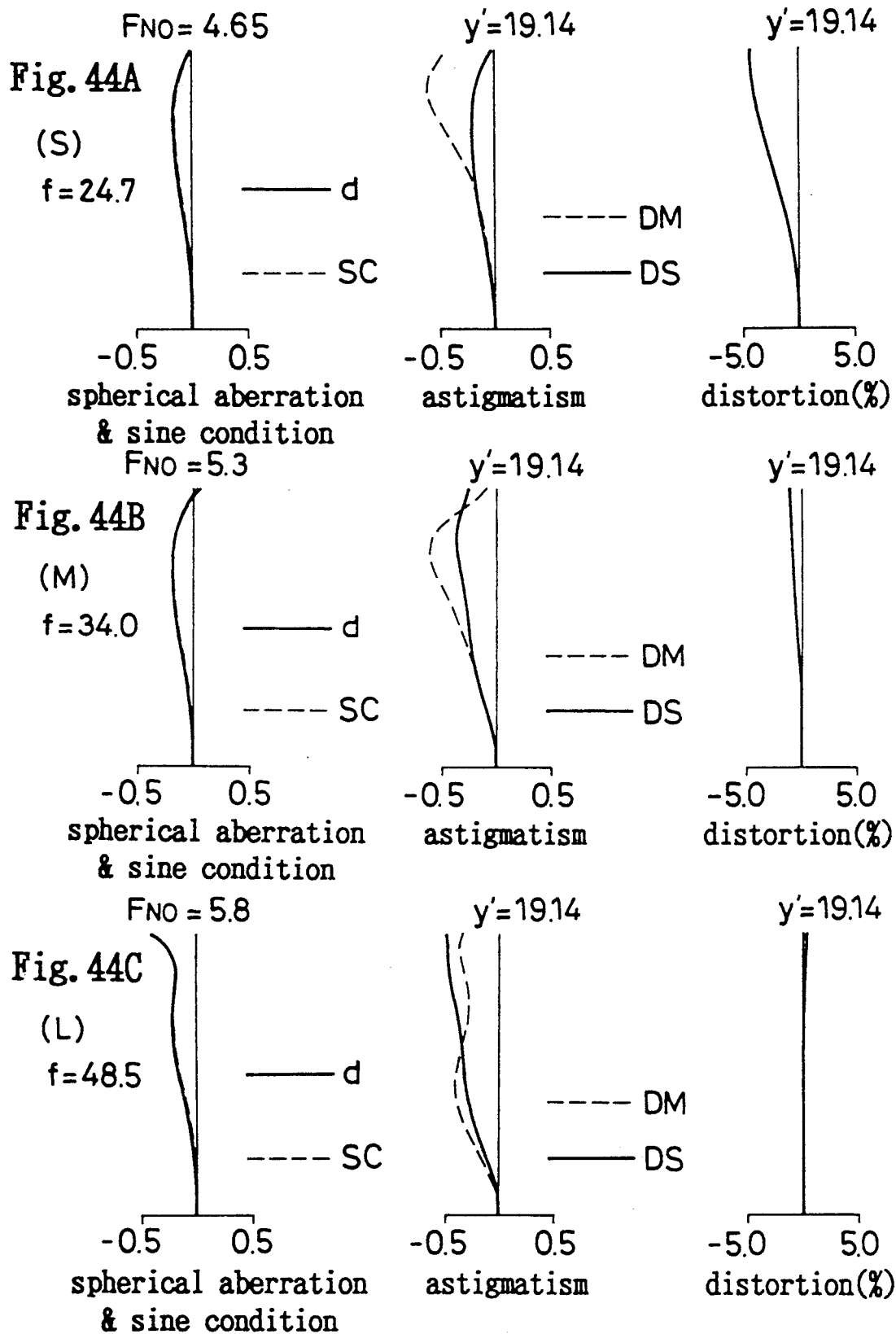

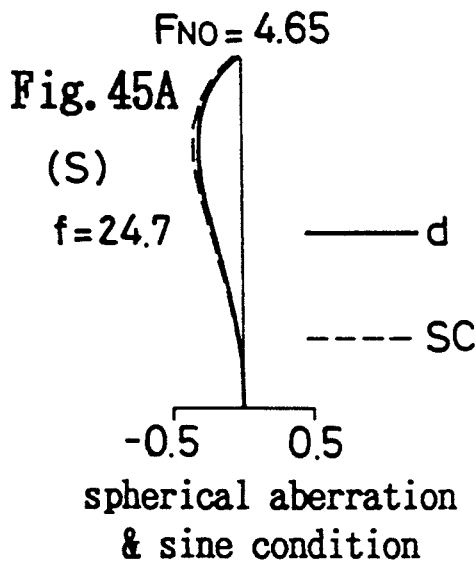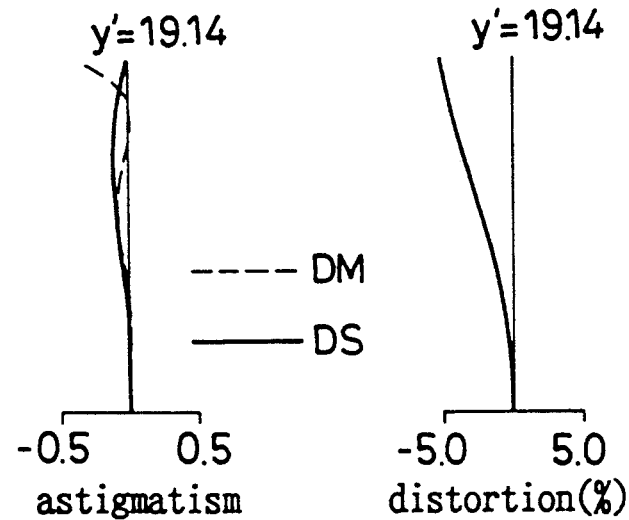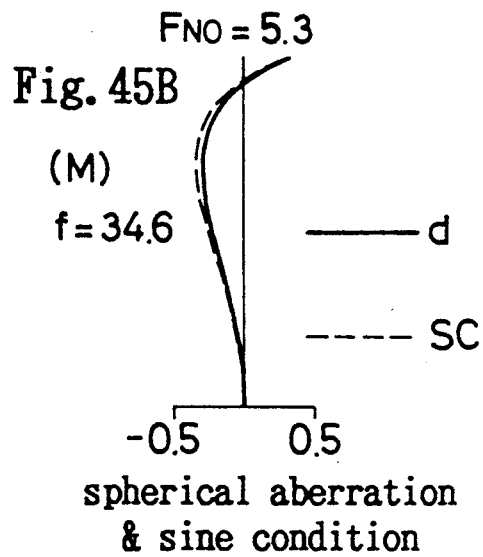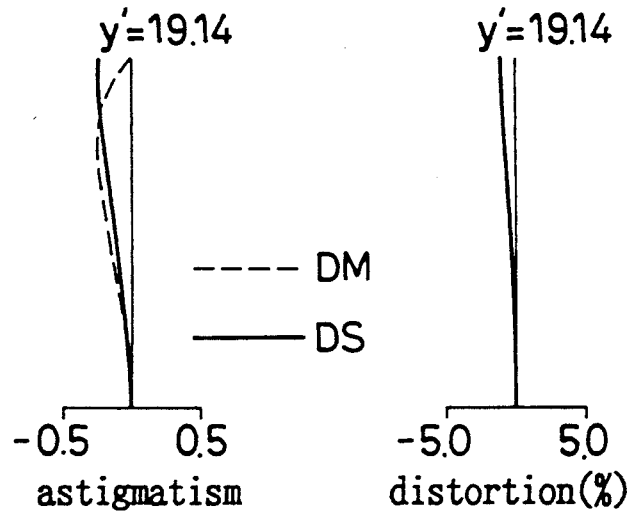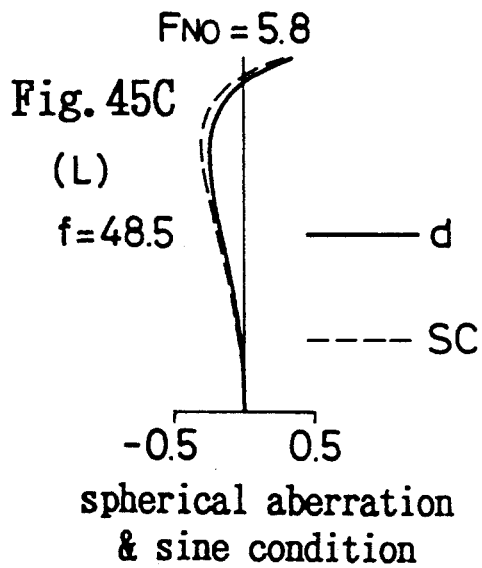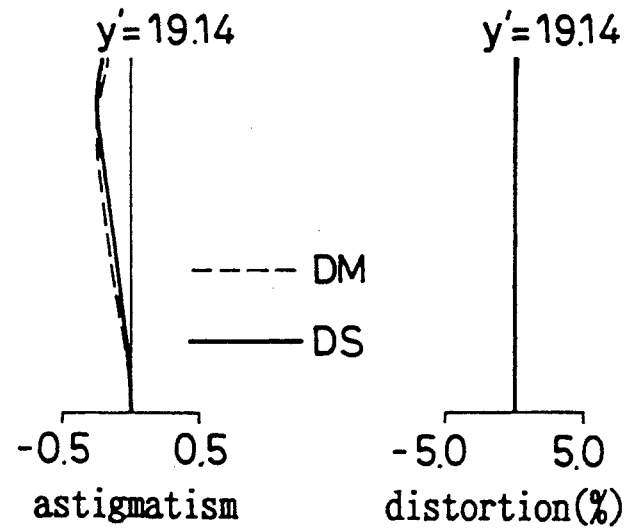

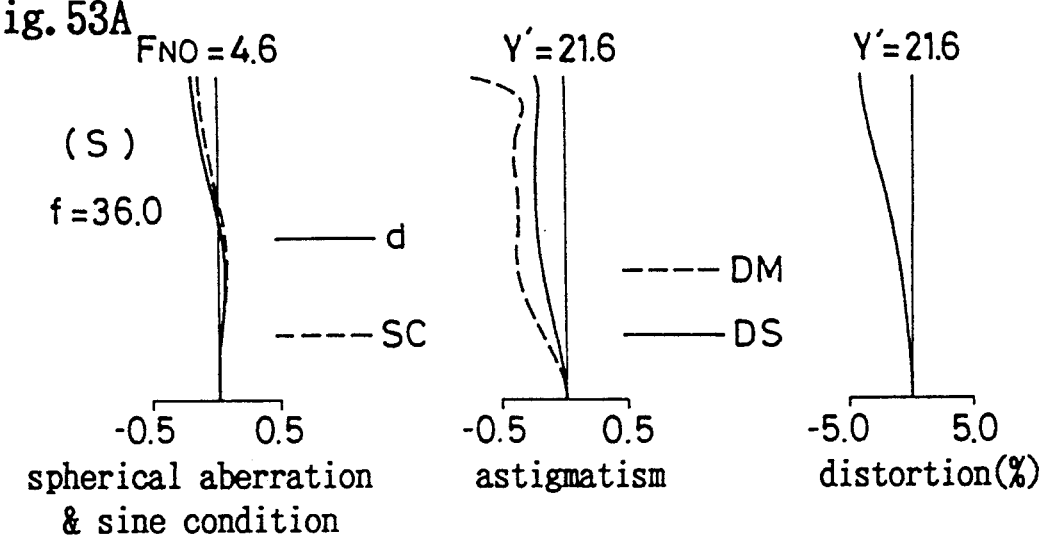
Fig. 53A (S) f=36.0
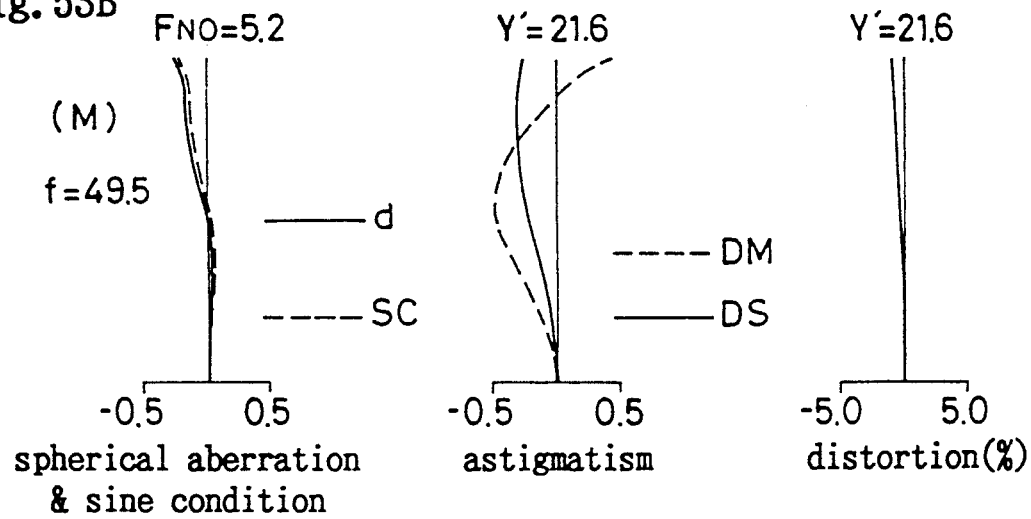
Fig. 53B (M) f=49.5
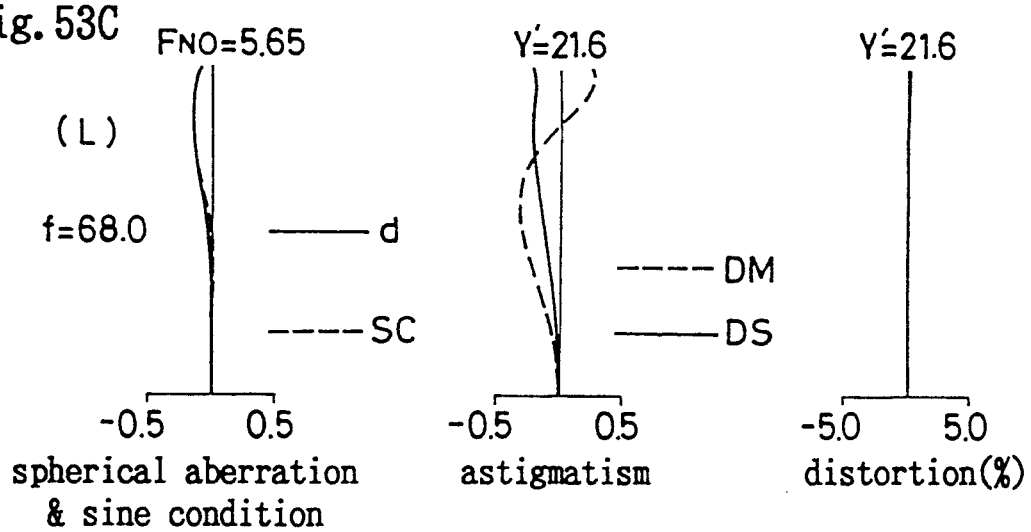
Fig. 53C (L) f=68.0

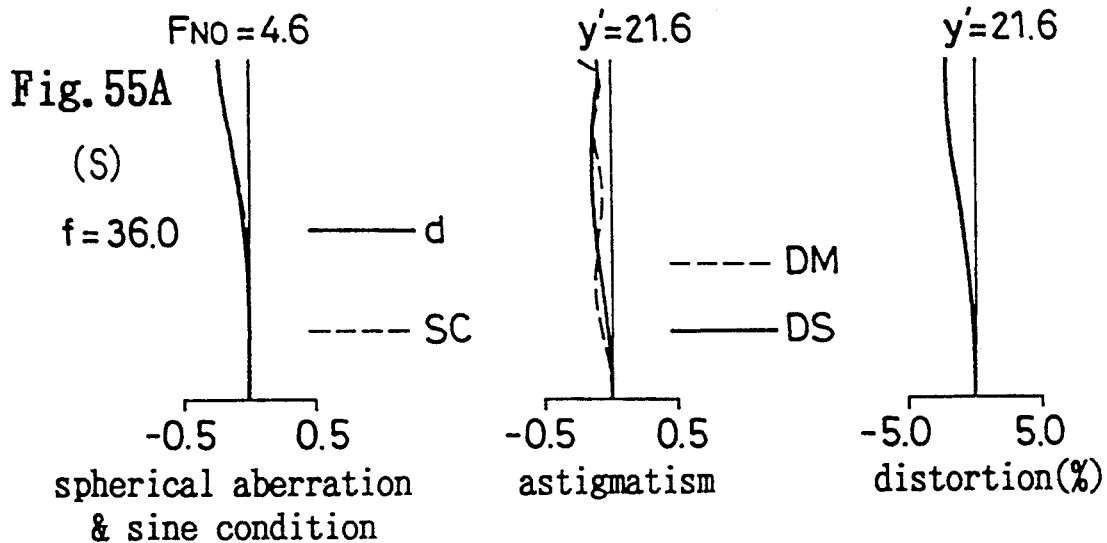
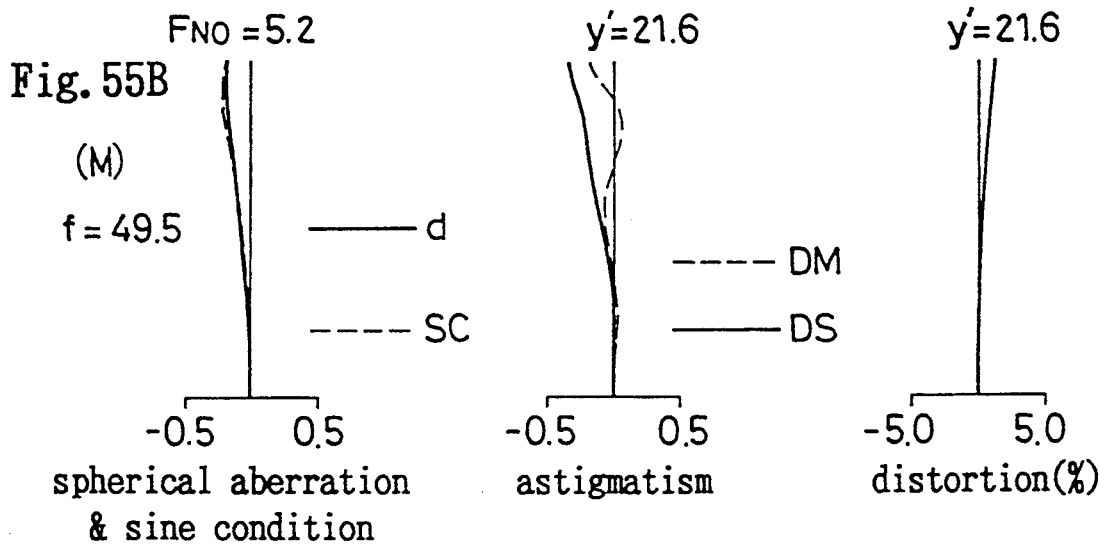
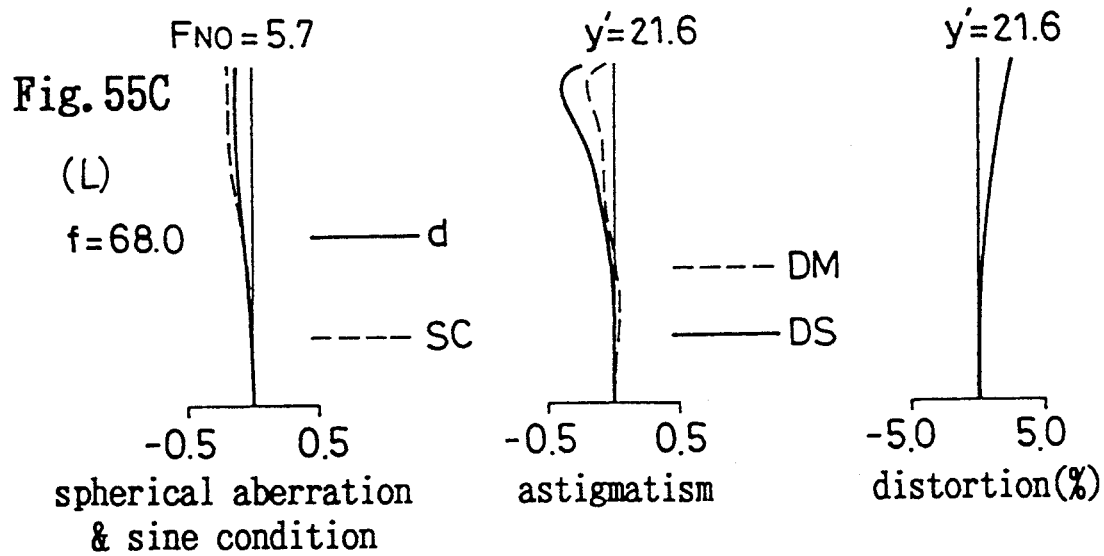

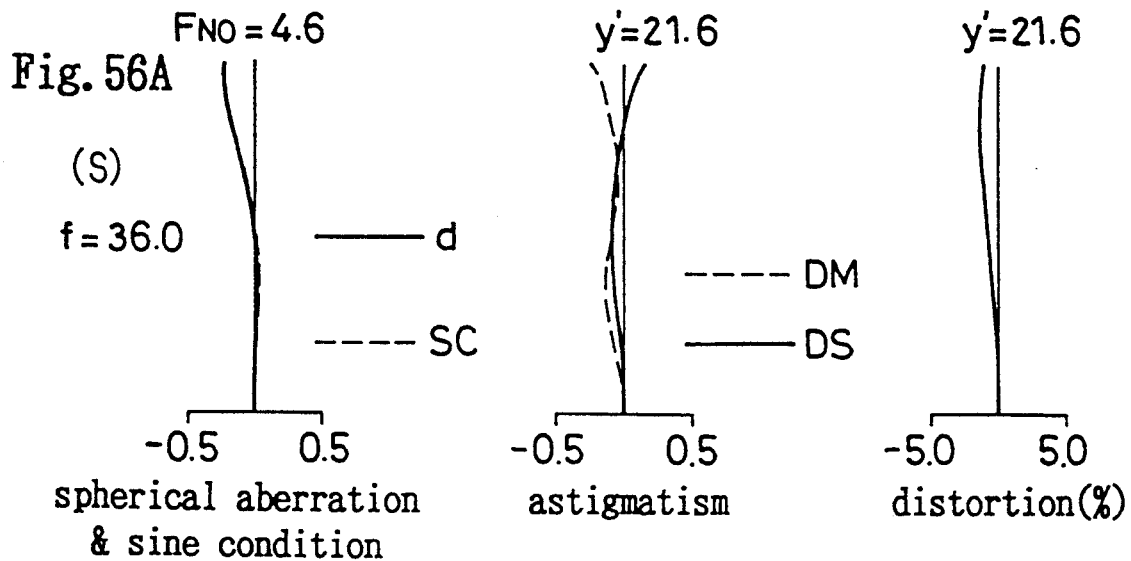
Fig. 56A (S) f = 36.0
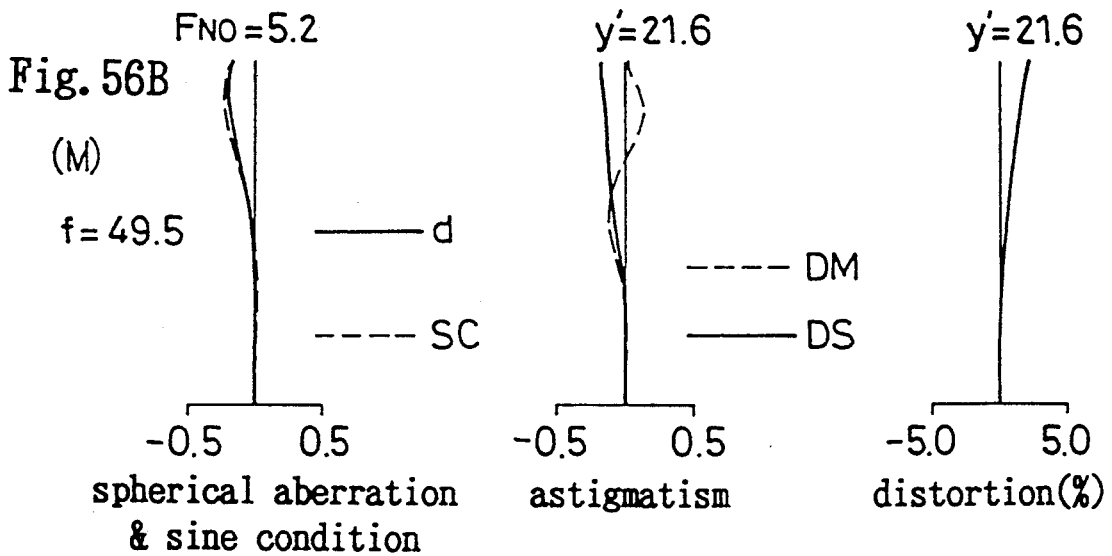
Fig. 56B (M) f = 49.5
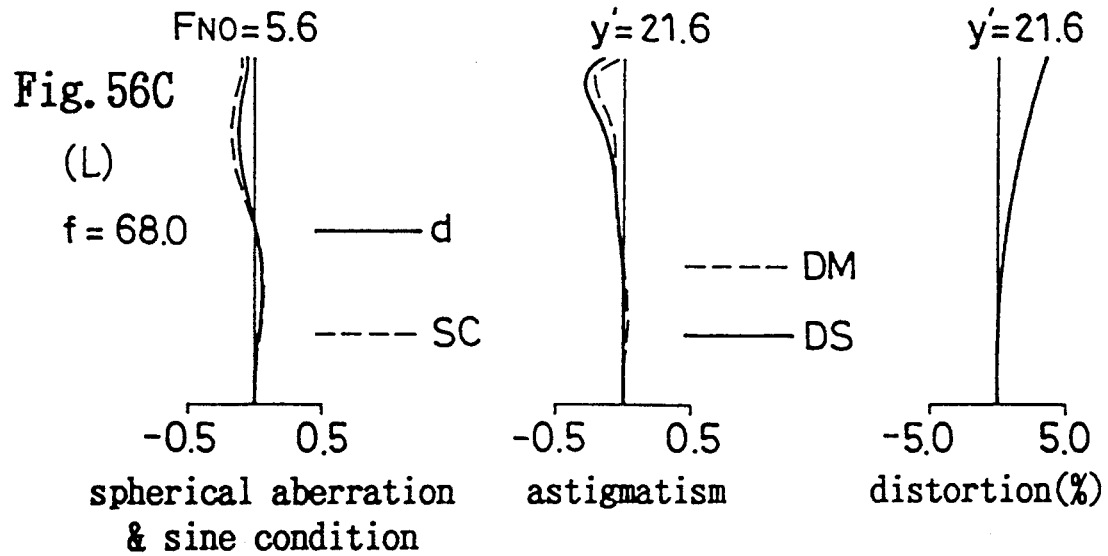
Fig. 56C (L) f = 68.0

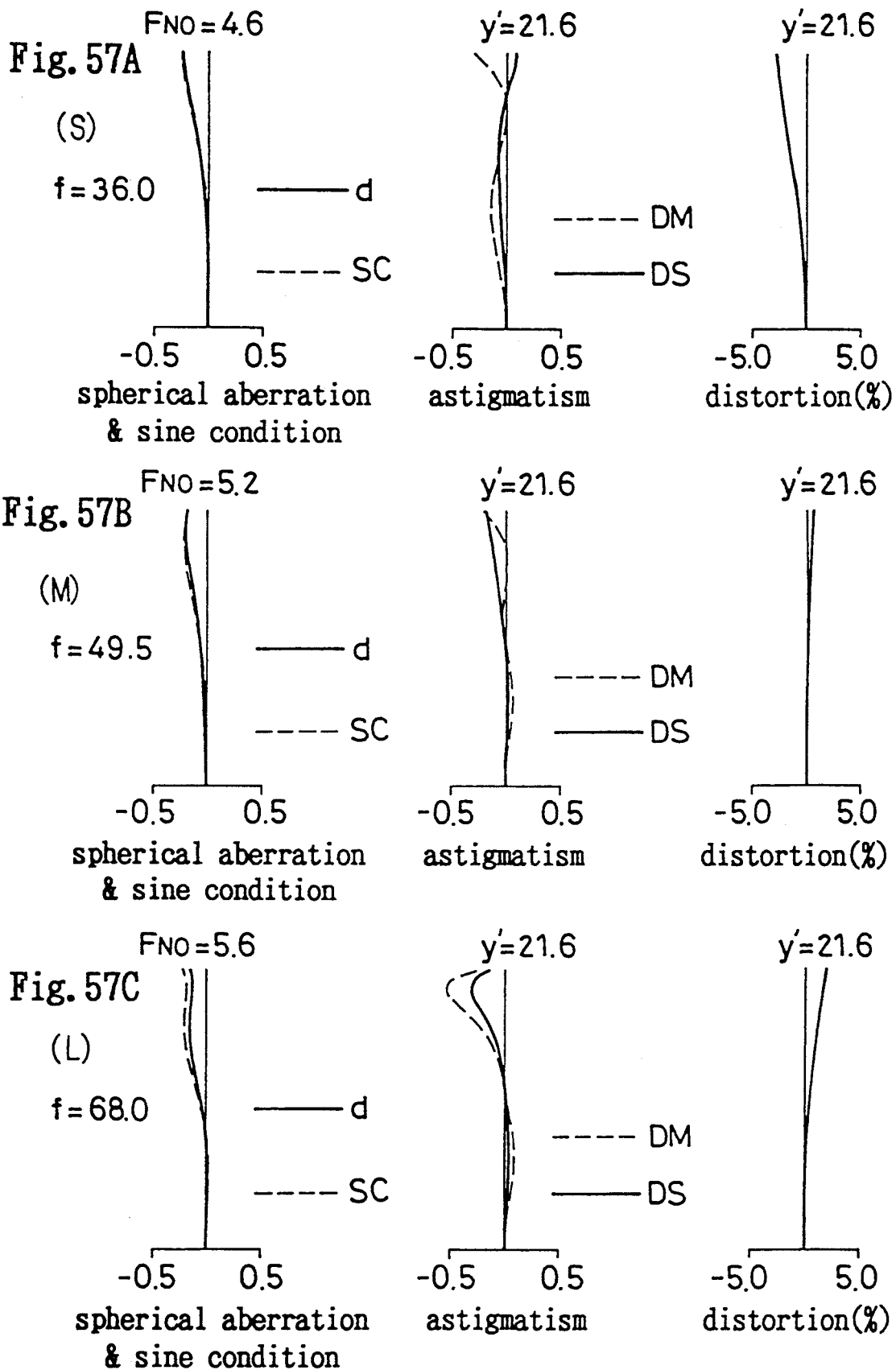

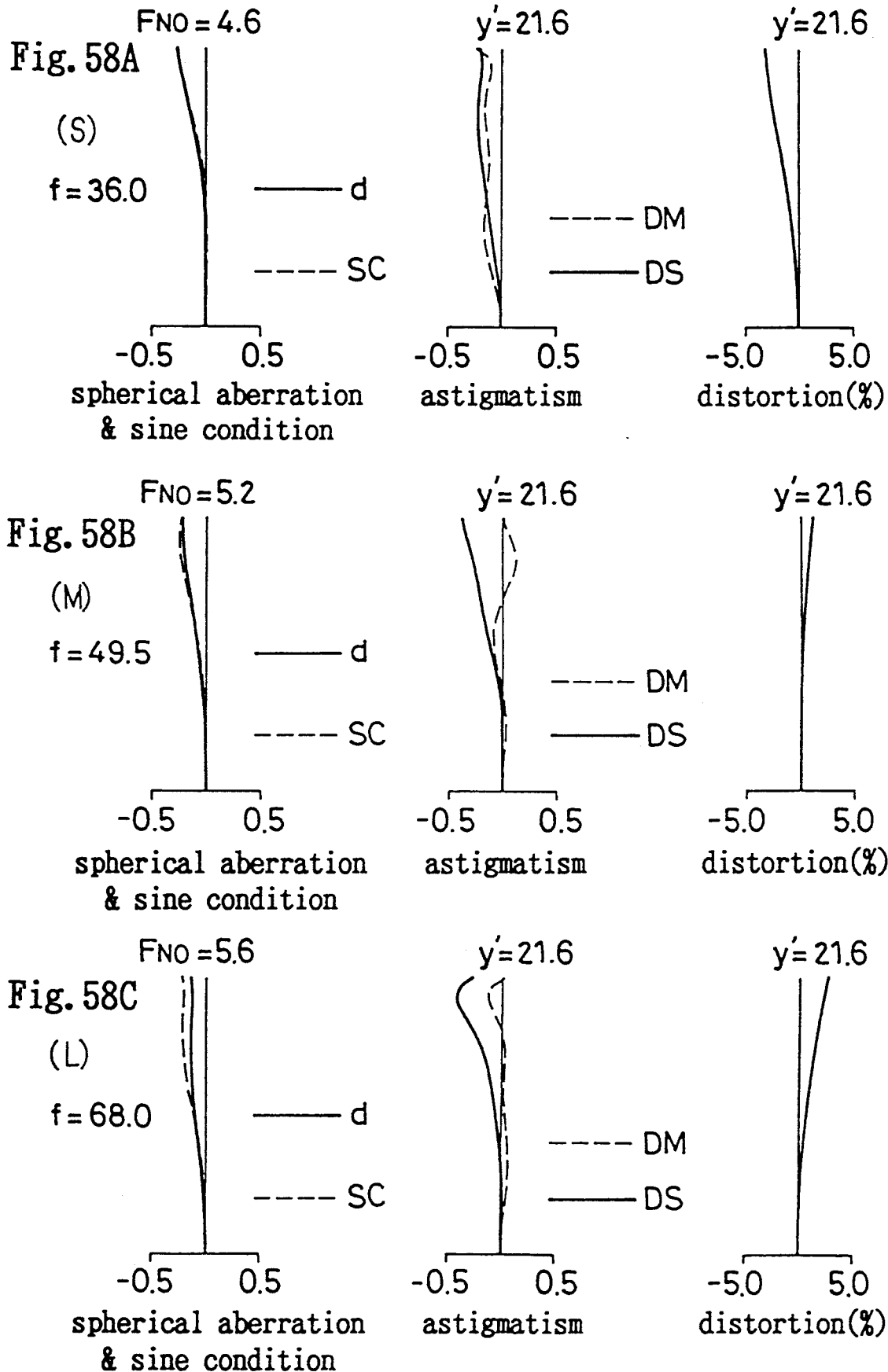

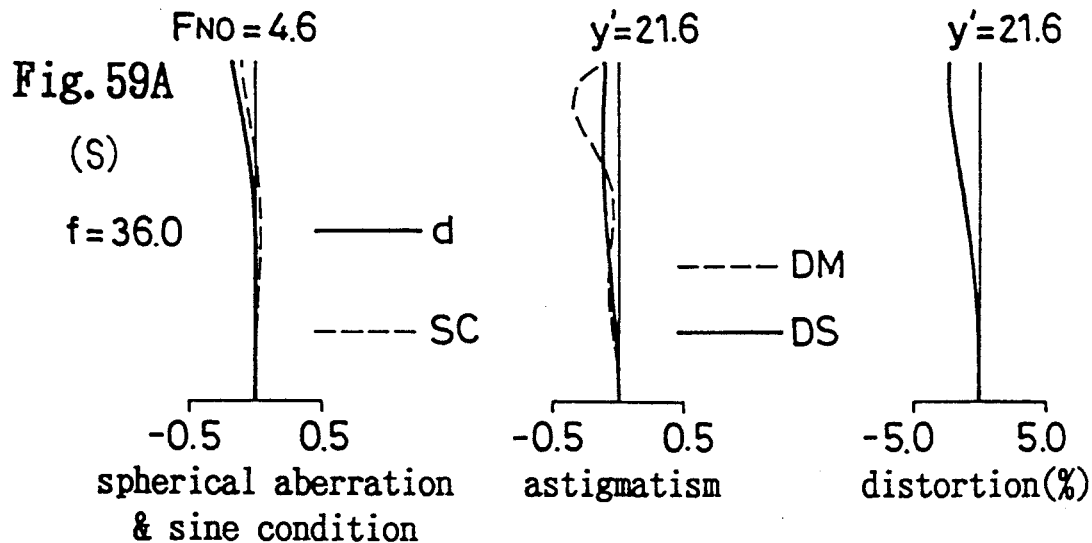
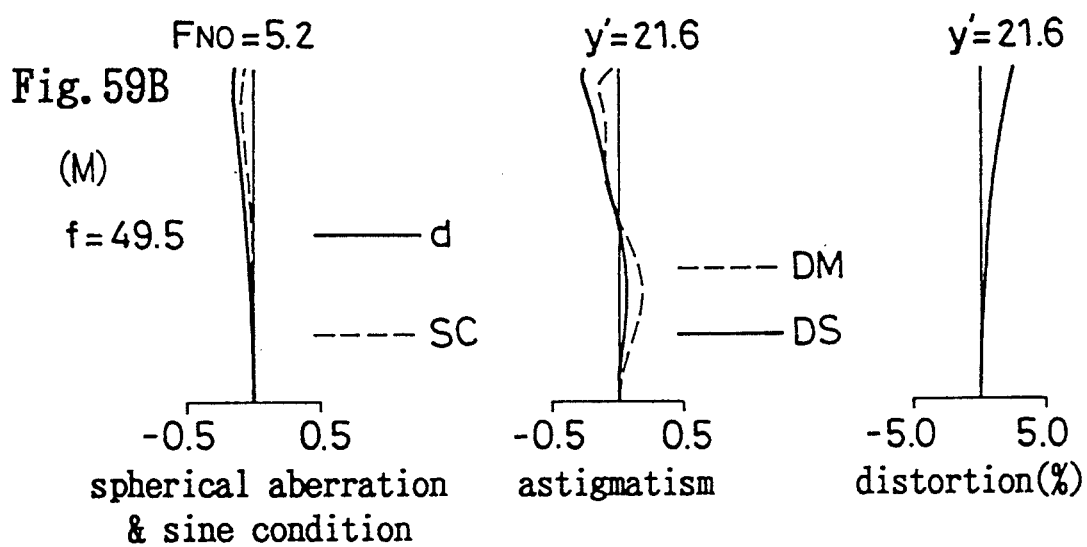
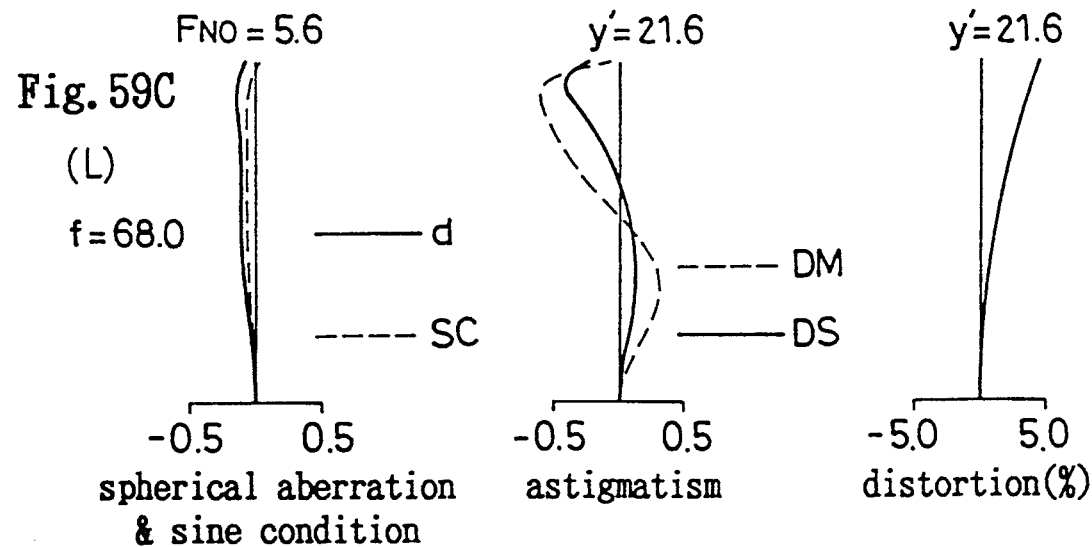

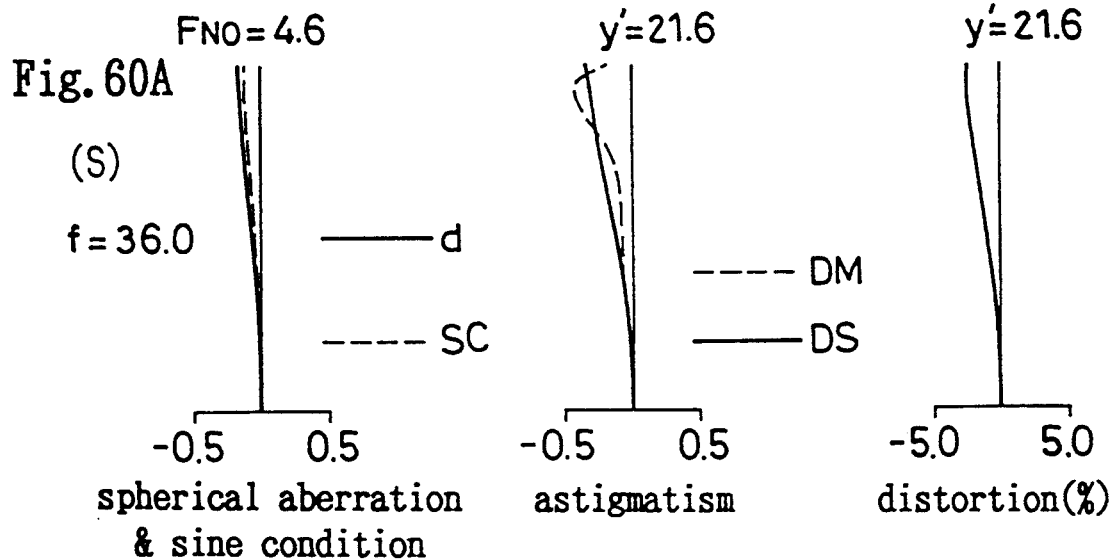
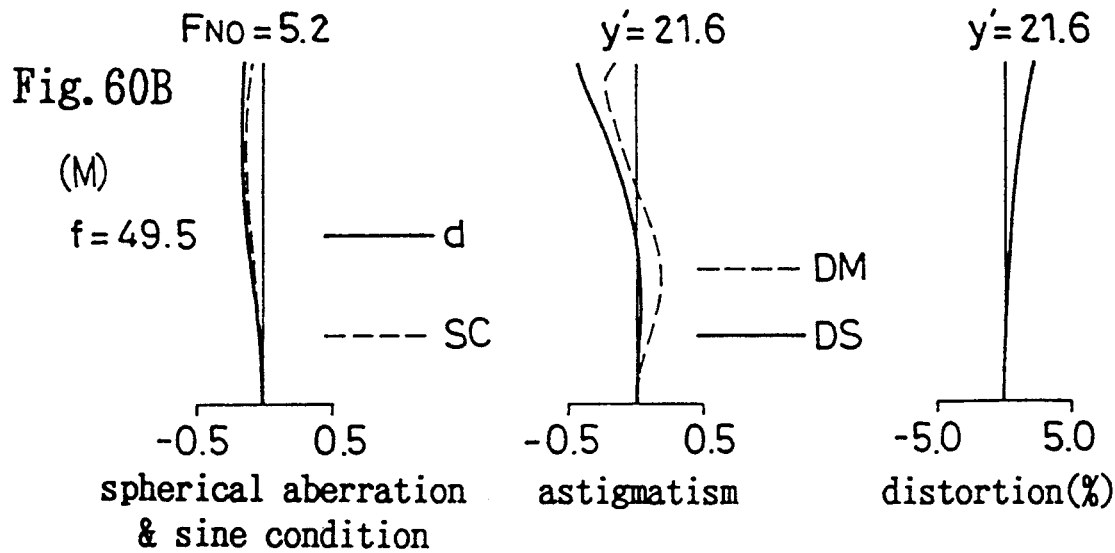
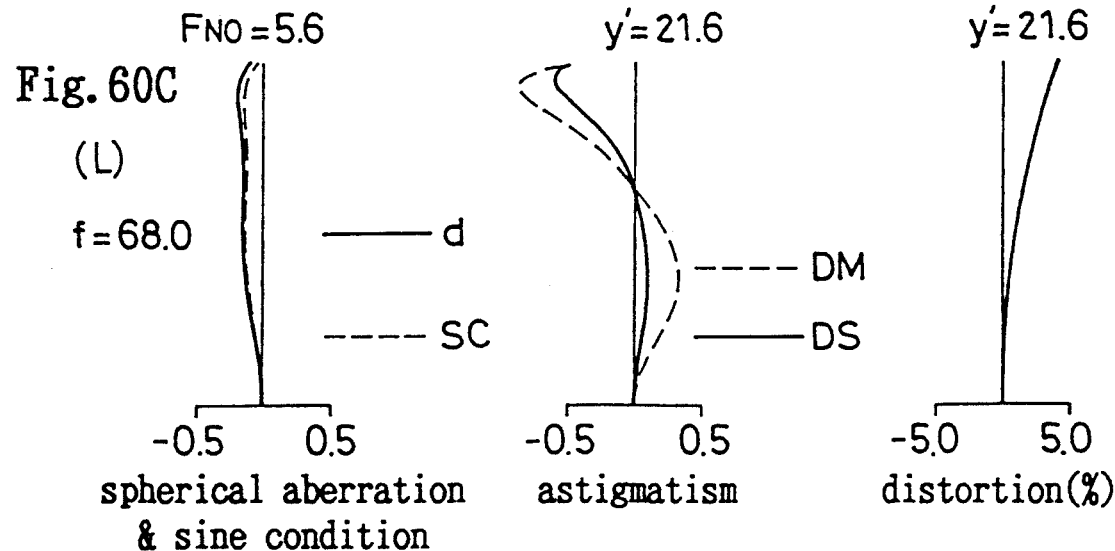

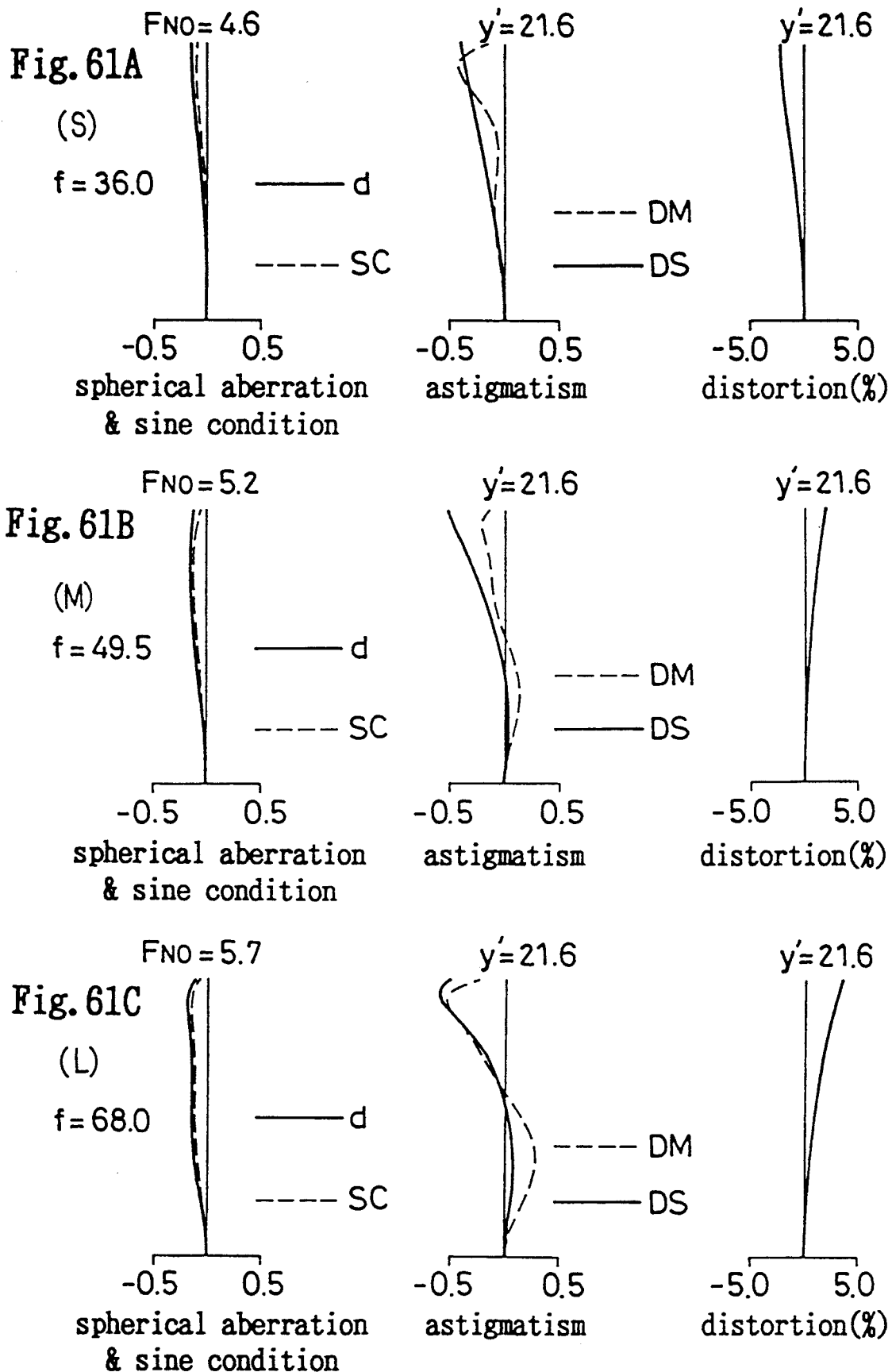

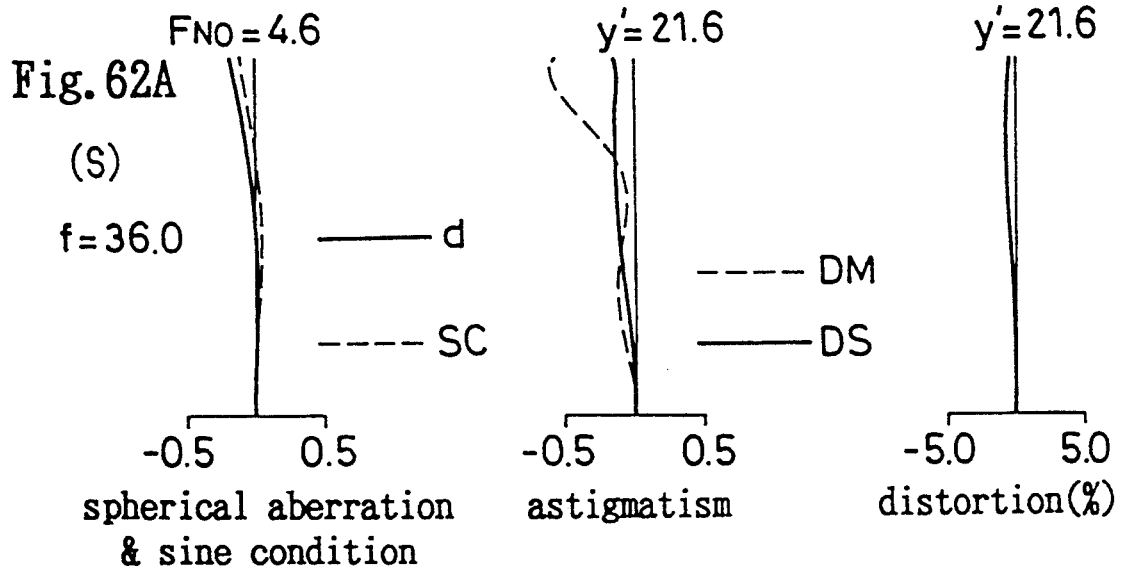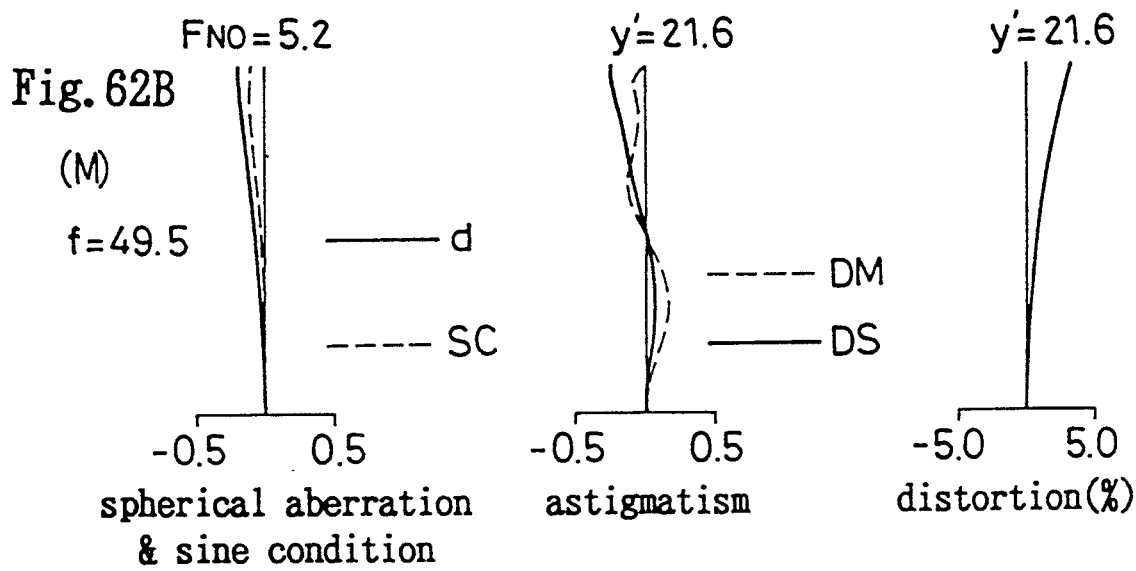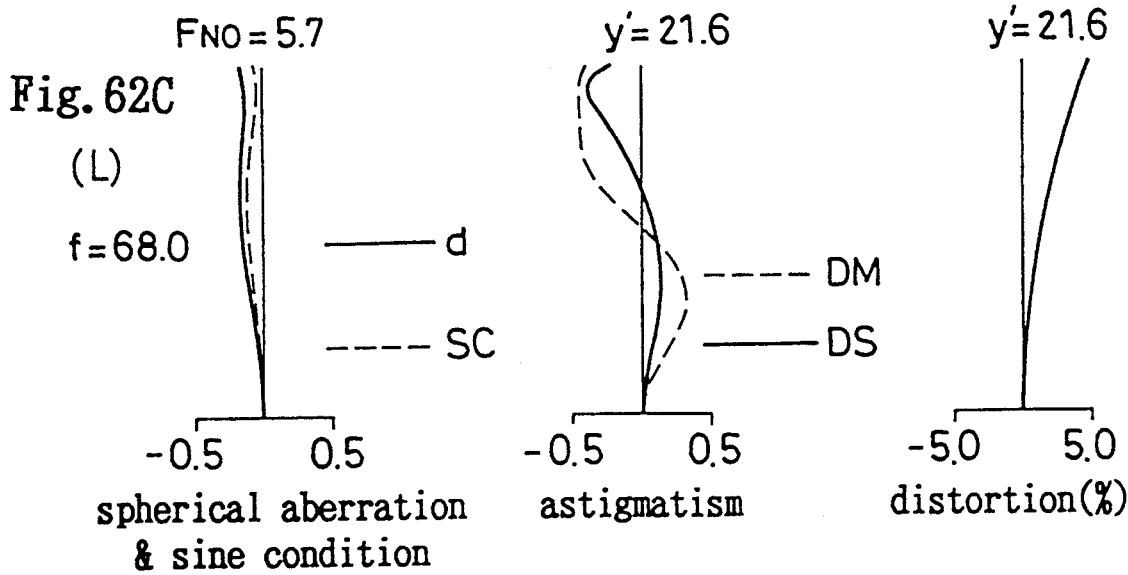

COMPACT ZOOM LENS SYSTEM

BACKGROUND OF THE INVENTION

1. Field of the Invention

The present invention relates to a compact zoom lens system, and more particularly, to a compact zoom lens system where the number of the lens elements is reduced by employing aspherical surfaces.

2. Description of the Prior Art

As a zoom lens system having a zoom ratio of approximately 2× for a single-lens reflex camera and the like, a zoom lens system having, from the object side, a negative and a positive lens components has been drawing attention. Recently, such two-component zoom lens system has been required to be a further compactness and lower cost. In order to make a zoom lens system compact including a movement amount of a lens component of the zoom lens system in a zooming operation, it is required to increase a refractive power of each lens component. However, to increase the refractive power without deteriorating the performance of the zoom lens system, more lens elements are required, which makes it difficult to reduce a cost. As described above, a realization of a compactness and that of a low cost conflict with each other.

Further, a three-component zoom lens system is also known where, to increase its optical performance, a lens component having a relatively weak refractive power is provided on the image side of the above-described two-component zoom lens system. However, even with respect to the three-component zoom lens system, a compactness and low cost are not satisfactorily realized.

SUMMARY OF THE INVENTION

A first object of the present invention is to provide a two-component zoom lens system where a satisfactory compactness and a lower cost are realized, without deteriorating the performance, by reducing the number of lens elements by effectively employing aspherical surfaces.

A second object of the present invention is to provide a two-component zoom lens system having a lens arrangement which enables a realization of a low-cost, satisfactorily compact zoom lens system.

A third object of the present invention is to provide a three-component zoom lens system where, to increase its optical performance, a lens component having a relatively weak refractive power is provided on the image side of the two-component zoom lens system, and a low cost and a compactness are satisfactorily realized by effectively employing aspherical surfaces.

In order to achieve the first object, a compact zoom lens system comprises a front negative lens component and a rear positive lens component with a variable air space between the front and the rear lens components, wherein a plurality of aspherical lens elements some of which have aspherical surfaces on its both sides.

In order to achieve the second object, a compact zoom lens system comprises a front negative lens component, which consists of from the object side to the image side a negative lens element and a positive meniscus lens element whose image side surface is convex to the image side, and a rear positive lens component with a variable air space between the front and the rear lens components.

In order to achieve the third object, a compact zoom lens system comprises a first negative lens component, a second positive lens component with a variable air space between the first and the second lens components, and a third negative lens component with a variable air space between the second and the third lens components, wherein a plurality of aspherical lens elements some of which have aspherical surfaces on its both sides.

BRIEF DESCRIPTION OF THE DRAWINGS

These and other objects and features of this invention will become clear from the following description taken in conjunction with the preferred embodiments with reference to the accompanied drawings in which:

FIGS. 33A, 33B and 33C to 62A, 62B and 62C show the aberrations, at the shortest, middle and longest focal length conditions, of the above-mentioned first to thirtieth embodiments, respectively.

DETAILED DESCRIPTION OF THE PREFERRED EMBODIMENTS

Figure 1:
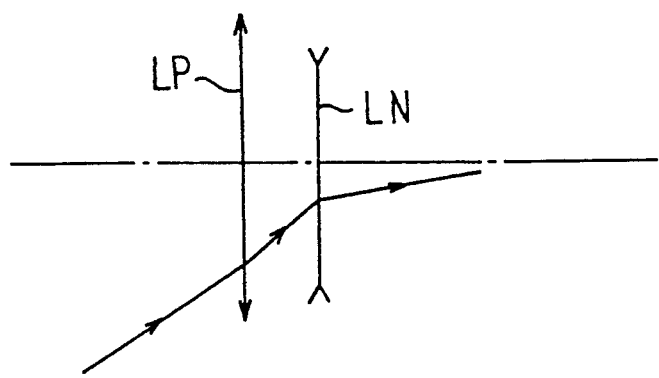
FIGS. 1 and 2 are diagrams, with respect to a sixth implementation according to the present invention, for explaining advantages and disadvantages of arrangements of a positive and negative lens elements in a front lens component having a positive and negative lens elements.

Implementations of the present invention will hereinafter be described.

A first implementation of the present invention comprises, from the object side, a front lens component having a negative refractive power and a rear lens component having a positive refractive power, wherein the focal length of the whole zoom lens system is changed by changing the air space between the front and rear lens components, the front and rear lens components have two lens elements, respectively, and two or more aspherical surfaces are employed for the whole zoom lens system.

As described above, in order to realize a compact zoom lens system, generally, it is required to decrease the total length of the zoom lens system and a movement amount of each lens component. To decrease the total length and the movement amount while maintaining a sufficient back focal length, the refractive power of each lens component should be increased. This remarkably tends to deteriorate aberrations.

For the first implementation of the present invention, two or more aspherical surfaces are employed to decrease aberrations (that is, to increase the performance) while aiming at a compact zoom lens system.

By effectively arranging a plurality of aspherical surfaces for a two-component zoom lens system having a negative and a positive lens components, the number of lens elements can largely be reduced, so that a zoom lens system having a zoom ratio of more than 1.8× is realized with two lens components having two lens elements, respectively. For example, if a plurality of aspherical surfaces are employed for a zoom lens system, in the 35 mm to 70 mm-focal-length class, conventionally including seven or eight lens elements, the number of lens elements can be reduced to four while maintaining a required performance like the embodiments to be described later. In addition, it is possible to decrease the total length, at the time of being retracted in a camera body, of the zoom lens system by 2 mm to 10 mm compared with conventional zoom lens systems.

A second implementation of the present invention comprises, from the object side, a front lens component having a negative refractive power and a rear lens component having a positive refractive power, wherein the focal length of the whole zoom lens system is changed by changing the air space between the front and rear lens components, and three or more aspherical surfaces are employed for the whole zoom lens system.

In the second implementation of the present invention, by employing three or more aspherical surfaces, a required performance is maintained while realizing a compact, low-cost zoom lens system.

It is possible to arrange the above front lens component with two lens elements and the above rear lens component with three lens elements. It is also possible to arrange both the front and rear lens components with two lens elements.

A third implementation of the present invention comprises, from the object side, a front lens component having a negative refractive power and a rear lens component having a positive refractive power, wherein the focal length of the whole zoom lens system is changed by changing the air space between the front and rear lens components, two or more aspherical surfaces are employed for the whole zoom lens system, and the following condition (1) is fulfilled:

$$0.65 < |\phi_1/\phi_w| < 2.0 \qquad (1)$$

wherein:

$\phi_1$ represents a refractive power of a front lens component; and $\phi_w$ represents a refractive power of a whole zoom lens system at the shortest focal length condition.

As described above, in order to decrease a cost (to reduce the number of lens elements) and to realize a compactness (to decrease a lens movement amount and the total length of a zoom lens system) with respect to a zoom lens system, it is effective to increase a refractive power of each component and each lens element. With respect to a two-component zoom lens system comprising, from the object side, a negative and a positive lens components, if the refractive power fulfills the above condition (1), the total length of a zoom lens system in the 35 mm to 70 mm-focal-length class can be reduced by 2 mm to 10 mm. However, this deteriorates aberrations, so that it becomes difficult to maintain a required performance if only spherical surfaces are employed.

To overcome such problem, in the third implementation of the present invention, not only a refractive power is increased and the total length is decreased but also a deterioration of aberrations caused by that is prevented by employing a plurality of aspherical surfaces, so that an excellent performance is obtained. That is, at least two aspherical surfaces are employed to correct aberrations (to increase the performance) while a satisfactory compactness of a zoom lens system is realized. The meaning of the condition (1) will be described later.

A fourth implementation of the present invention comprises, from the object side, a front lens component having a negative refractive power and a rear lens component having a positive refractive power, wherein the focal length of the whole zoom lens system is changed by changing the air space between the front and rear lens components, a lens element having aspherical surfaces on both sides (hereinafter, referred to as bi-aspherical lens element) is included, and three or more aspherical surfaces are employed for the whole zoom lens system.

In the fourth implementation of the present invention, by employing three or more aspherical surfaces as described above, a required performance is maintained while a compactness and a lower cost are realized.

Especially, by use of a bi-aspherical lens element, the performance is excellently increased. With the bi-aspherical lens element, both on-axial and off-axial aberrations are sufficiently corrected.

For example, when the bi-aspherical lens element is employed for a front lens component, distortion can effectively be corrected by one aspherical surface, and field curvature, by the other. When the bi-aspherical lens element is employed for a rear lens component, coma and spherical aberration on the periphery of an image plane are effectively corrected. The bi-aspherical lens element is preferably arranged at a position far away from an aperture. By arranging as such, the above-described effect increases. As described above, in the fourth implementation of the present invention, by employing three or more aspherical surfaces including a bi-aspherical lens element, a refractive power of each lens component and each lens element is increased while a required performance is maintained. Consequently, the number of lens elements can be reduced, and the total length and a lens movement amount can be decreased.

It is possible to arrange the above front lens component with two lens elements and the above rear lens element with three lens elements. It is also possible to arrange both of the above front and rear lens elements with two lens elements.

A fifth implementation of the present invention comprises, from the object side, a front lens component having a negative refractive power and a rear lens component having a positive refractive power, wherein the focal length of the whole zoom lens system is changed by changing the air space between the front and rear lens components, the above front lens component has a negative and a positive lens elements, and the object side surface of the above positive lens element is aspherical.

For example, it is possible to arrange the above front lens component with, from the object side, a negative and a positive lens elements, and it is possible to arrange the above rear lens component with two lens elements, that is, with a bi-convex lens element or a positive meniscus lens element whose object side surface is convex and a negative lens element.

In the fifth implementation of the present invention, by arranging the front lens component as described above, the deteriorated aberrations can be corrected. Especially, coma can effectively be corrected by employing an aspherical surface for the object side surface of the positive lens element of the front lens component. With respect to the off-axial luminous flux, especially the luminous flux which passes peripheral area, a large amount of coma is produced by a strong positive refractive power of the rear lens component when the incident angle to the rear lens component is large. By employing aspherical surfaces for the rear lens component, the coma can be reduced to some extent; however, it is not sufficiently reduced. The coma can most effectively be corrected by decreasing the incident angle to the rear lens component. In the fifth implementation of the present invention, the above-mentioned incident angle can be decreased by employing, for the object side surface of the positive lens element of the above front lens component, aspherical surfaces where a negative refractive power is stronger on the periphery or a positive refractive power is weaker on the periphery.

Therefore, by employing the aspherical surfaces as described above, a zoom lens system can be realized which comprises a front lens component having two lens elements and a rear lens component having two lens elements, and where a high optical performance is realized from in the center to on the periphery of an image plane.

A sixth implementation of the present invention comprises, from the object side, a front lens component having a negative refractive power and a rear lens component having a positive refractive power, wherein the focal length of the whole zoom lens system is changed by changing the air space between the front and rear lens components, and the above front lens component have, from the object side, a negative lens element and a positive meniscus lens element whose image side surface is convex.

It is possible to arrange the above rear lens component with a positive and a negative lens elements.

Now, a case will be described where the front lens component is arranged with a positive and a negative lens elements. In this case, the two lens elements can be arranged in the order of, from the object side, a positive lens element LP and a negative lens element LN as shown in FIG. 1, or in the order of, from the object side, a negative lens element LN and a positive lens element LP as shown in FIG. 2 (this is the arrangement of the front lens component of the present invention).

Figure 2:
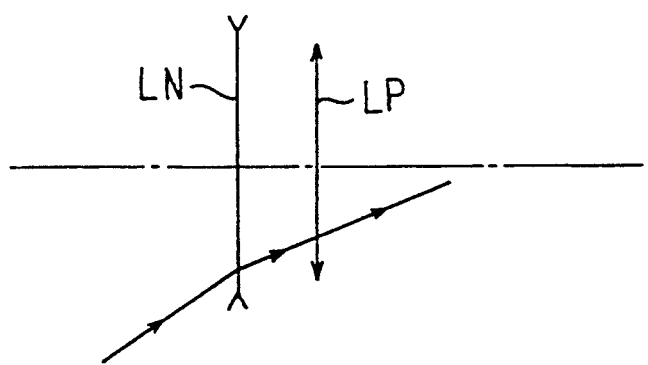

In the former arrangement, as clearly understood from the optical path shown in FIG. 1, an off-axial light having passed through the positive lens element enters the negative lens element with an incident angle larger than that to the positive lens element, which is disadvantageous in correcting aberrations. In addition, the negative refractive power increases since the incident height of the negative lens element decreases, which makes an aberration correction more difficult.

On the contrary, in the latter arrangement, the light having passed through the negative lens element enters the positive lens element with an incident angle smaller than that to the negative lens element, which is advantageous in correcting aberrations. In addition, the negative refractive power can be reduced since the incident height of the positive lens element increases, which makes an aberration correction easier.

Therefore, according to the lens arrangement of the front lens component of the sixth implementation of the present invention, aberrations can easily and effectively be corrected.

Also, by employing, as the positive lens element of the front lens component, a positive convex meniscus lens element whose image side surface is convex, aberrations can be corrected in a well-balanced condition.

Especially, the positive convex meniscus lens element, of the front lens component, whose image side surface is convex preferably fulfills the following condition (2):

$$0.1 < (r_F - r_B)/(r_F + r_B) < 0.7 \tag{2}$$

wherein:

$r_F$ represents a radius of curvature of the object side surface of the positive meniscus lens element, of the front lens component, whose image side surface is convex; and $r_B$ represents a radius of curvature of the image side surface of the positive meniscus lens element, of the front lens component, whose image side surface is convex.

The condition (2) stipulates the positive lens element as a meniscus lens element whose image side surface is convex. It also stipulates a desired configuration of the meniscus lens element.

When the lower limit of the condition (2) is exceeded, the positive refractive power becomes relatively weak, which makes it difficult to correct lateral chromatic aberration. When the upper limit of the condition (2) is exceeded, the positive refractive power becomes relatively strong, so that spherical aberration cannot fully be corrected.

By employing a meniscus lens element whose image side surface is convex as the positive lent element of the front lens component, aberrations are effectively corrected, and furthermore, a compact zoom lens system can be realized as hereinafter described.

In a zoom lens system according to the sixth implementation of the present invention, the distance between the front and rear lens components is minimum at the longest focal length condition. To realize a compactness, it is preferable to reduce the distance as much as possible. On the other hand, considering position where an off-axial light crosses the optical axis, an aperture sometimes has to be provided between the front and rear lens components. In such case, since a space for providing an aperture is required between the front and rear lens components also at the longest focal length condition, it is difficult to decrease the distance between the front and rear lens components.

However, by employing a meniscus lens element whose image side surface is convex as the positive lens element of the front lens component, the possibility that the positive lens touches the aperture when it approaches the aperture largely decreases, and therefore, a sufficient space for providing an aperture can be secured even when the distance is small between the image-side positive lens element of the front lens component and the object-side positive lens element of the rear lens component. Thus, the total length of a zoom lens system can be reduced, so that a compact zoom lens system is realized.

Next, conditions (3) to (12) preferably fulfilled by zoom lens systems according to the above-described first to fifth implementations will be described.

All the aspherical surface of the above-described front lens components preferably fulfill the following condition (3):

$$-0.05 < \phi_1 \cdot (N' - N) \cdot d/dy \cdot \{X(y) - X_0(y)\} < 0.02 \tag{3}$$

wherein:

an arbitrary height y in a direction perpendicular to the optical axis is defined as $0 < y < 0.8 \, Y_{max}$ where $Y_{max}$ represents a maximum effective aperture of an aspherical surface;

$\phi_1$ represents a refractive power of a front lens component;

N represents a refractive index of an object side medium of an aspherical surface;

N' represents a refractive index of an image side medium of an aspherical surface;

X(y) represents a surface configuration of an aspherical surface; and $X_o(y)$ represents a reference surface configuration of an aspherical surface.

X(y) and $X_o(y)$ are defined as follows:

$$X(y) = y^2/r \cdot \{1 - (1 - \epsilon \cdot y^2/r^2)^{\frac{1}{2}}\} + \sum_{i \geq 2} A_i y^i; \text{ and}$$

$$X_o(y) = {}^*r \cdot \{1 - (1 - y^2/{}^*r^2)^{\frac{1}{2}}\},$$

wherein:
r represents a reference radius of curvature of an aspherical surface;
$\epsilon$ represents a conic constant;
$A_i$ represents an aspherical coefficient; and
*r represents a paraxial radius of curvature of an aspherical surface ($1/{}^*r = 1/r + 2A_2$).

When the upper limit of the condition (3) is exceeded, positive distortion and a positive change tendency of field curvature increases in the range between the shortest and the middle focal length conditions. When the lower limit of the condition (3) is exceeded, negative distortion increases in the range between the middle and the longest focal length conditions. In addition, a negative change tendency of field curvature remarkably increases in the entire zoom range.

When a lens element both of whose surfaces are aspherical is used for a front lens component, one surface preferably fulfills the following condition (4), and the other surface preferably fulfills the following condition (5):

$$-0.10 < \phi_1 \cdot (N'-N) \cdot d/dy \cdot \{X(y) - X_o(y)\} < 0 \quad (4)$$

wherein an arbitrary height y in a direction perpendicular to the optical axis is defined as $0.8Y_{max} < y < Y_{max}$; and $$-0.02 < \phi_1 \cdot (N'-N) \cdot d/dy \cdot \{X(y) - X_o(y)\} < 0.10 \quad (5)$$

wherein an arbitrary height y in a direction perpendicular to the optical axis is defined as $0.8Y_{max} < y < Y_{max}$.

The above condition (4) indicates that on aspherical surfaces, of the front lens component, fulfilling the condition (4), the negative refractive power is weaker on the periphery (that is, the positive refractive power is stronger). By this, distortion in the vicinity of the shortest focal length condition is corrected. Moreover, by further employing an aspherical surface fulfilling the condition (5), field of curvature is excellently corrected.

All the aspherical surfaces of the above-described rear lens component preferably fulfills the following condition (6):

$$-0.03 < \phi_2 \cdot (N'-N) \cdot d/dy \cdot \{X(y) - X_o(y)\} < 0.01 \quad (6)$$

wherein an arbitrary height y in a direction perpendicular to the optical axis is defined as $0 < y < 0.7Y_{max}$; and $\phi_2$ represents a refractive power of a rear lens component.

When the upper limit of the condition (6) is exceeded, zonal aberration has a high negative value, which causes a shift of a focusing position due to a closing of the aperture. When the lower limit of the condition (6) is exceeded, the effect of correcting spherical aberration to a zonal luminous flux becomes excessive, which makes it difficult to evenly correct spherical aberration and other aberrations. In such case, spherical aberration is apt to form a wavy pattern.

When a lens element both of whose surfaces are aspherical is used for a rear lens component, one surface preferably fulfills the following condition (7), and the other surface preferably fulfills the following condition (8):

$$-0.04 < \phi_2 \cdot (N'-N) \cdot d/dy \cdot \{X(y) - X_o(y)\} < 0 \quad (7)$$

wherein an arbitrary height y in a direction perpendicular to the optical axis is defined as $0.7Y_{max} < y < Y_{max}$, and $$0 < \phi_2 \cdot (N'-N) \cdot d/dy \cdot \{X(y) - X_o(y)\} < 0.04 \quad (8)$$

wherein an arbitrary height y in a direction perpendicular to the optical axis is defined as $0.7Y_{max} < y < Y_{max}$.

The above condition (7) indicates that on aspherical surfaces, of the rear lens component, fulfilling the condition (7), the positive refractive power is weaker on the periphery (that is, the negative refractive power is stronger). Also, the condition (7) is a condition required for correcting an inclination, toward the under side, of spherical aberration into the inclination toward the over side in a third-order aberration range. At this time, an light passing far away from the optical axis of a lens system sometimes inclines toward the over side since spherical aberrations are excessively corrected. Therefore, in order to return the off-axial light toward the under side, an aspherical surface fulfilling the condition (8) where the positive refractive power is stronger on the periphery (the negative refractive power is weaker) is employed for the other surface.

Furthermore, a deviation, from a reference surface, of the aspherical surface fulfilling the condition (7) is preferably larger than that of the aspherical surface fulfilling the condition (8).

The front and rear lens components are preferably arranged to fulfill the following conditions (9) and (10):

$$0.2 < |(\phi_w \cdot \phi_T)^{\frac{1}{2}}/(\beta \cdot \phi_1)| < 0.7 \quad (9)$$

$$0.2 < |(\phi_w \cdot \phi_T)^{\frac{1}{2}}/(\beta \cdot \phi_2)| < 0.5 \quad (10)$$

wherein:
$\phi_w$ represents a refractive power of the whole zoom lens system at the shortest focal length condition;
$\phi_T$ represents a refractive power of the whole zoom lens system at the longest focal length condition; and
$\beta$ represents a zoom ratio,
where $\phi_1 < 0$ and $\beta = \phi_w/\phi_T$.

The conditions (9) and (10) are the conditions required for maintaining an excellent balance of the total length of a zoom lens system, a movement amount for zooming, a back focal length, and a condition of correction of aberrations.

When the lower limit of the condition (9) is exceeded, the Petzval sum takes a high negative value, so that an image plane remarkably inclines toward the positive side as well as distortion takes a high positive value at the shortest focal length condition. When the upper limit of the condition (9) is exceeded, a change amount, in a zooming operation, of a distance between the front and rear lens components is required to be large. Consequently, the distance between the front and rear lens component becomes large at the shortest focal length condition, which increases the total length of the zoom lens system.

When the lower limit of the condition (10) is exceeded, it becomes difficult to maintain an appropriate back focal length (1.1 times or more the focal length at the shortest focal condition) at the shortest focal length condition, which makes it difficult to secure a space for arranging a mirror. When the upper limit of the condition (10) is exceeded, a movement amount of the front and rear lens components in a zooming operation becomes excessive, which is disadvantageous in arranging a lens barrel.

It is also effective for maintaining an excellent balance of the total length of a zoom lens system, a movement amount for zooming, a back focal length and a condition of correction of aberrations to fulfill the following conditions (11) and (12):

$$0.65 < |\phi_1/\phi_w| < 2 \quad (11)$$

$$1.0 < \phi_2/\phi_w < 1.5 \quad (12)$$

where $\phi_1 < 0$.

The condition (11) stipulates a ratio of a refractive power of a front lens component to that of the whole zoom lens system at the shortest focal length condition. When the upper limit of the condition (11) is exceeded, the refractive power of a front lens component excessively increases. Consequently, it becomes difficult to correct the aberrations, especially field curvature and distortion, produced in the front lens component even if aspherical surfaces are used for the front lens component. When the lower limit of the condition (11) is exceeded, inward coma is remarkably produced on the periphery of an image plane and it becomes difficult to secure a sufficient back focal length.

The condition (12) stipulates a ratio of a refractive power of a rear lens component to that of the whole zoom lens system at the shortest focal length condition. When the upper limit of the condition (12) is exceeded, the refractive power of the rear lens component remarkably increases. Consequently, it becomes difficult to correct the aberration, especially spherical aberration, produced in the rear lens component even if aspherical surfaces are used for the rear lens component. When the lower limit of the condition (12) is exceeded, inward coma is remarkably produced on the periphery of an image plane.

A zoom lens system according to the above-described fourth implementation of the present invention is preferably arranged as follows:

$$N1 > 1.77, N2 > 1.77 \quad (13)$$

wherein:
N1 represents a refractive index with respect to the d-line of a negative lens elements of a front lens component; and
N2 represents a refractive index with respect to the d-line of a positive lens element of a front lens component.

Concerning the condition (13), when N1, or N2, exceeds the lower limit, a radius of curvature of the image side surface of a first negative lens element decreases, which makes it difficult to grind a lens. In addition, in correcting aberrations, it becomes difficult to correct, especially, spherical aberration at the longest focal length condition and field curvature at the shortest focal length condition.

Further, an aperture is preferably arranged behind a first positive lens element of a rear lens component. This is because, if an aperture is arranged between the front and rear lens components, a sufficient air space is required at the longest focal length condition, which makes it difficult to realize a satisfactory compactness. Therefore, in order to realize a satisfactory compactness, an aperture is arranged behind the first positive lens element of the rear lens component to decrease the air space between the front and rear lens components at the longest focal length condition.

Furthermore, it is preferable that a zoom lens system according to the fourth implementation of the present invention has a movable light restricting plate between the front and rear lens components, and that the movable light restricting plate moves at the same rate as the rate at which the rear lens component moves and fulfills the following condition (14):

$$0.4 < ds/df2 < 0.8 \quad (14)$$

wherein:
ds represents a movement amount of a movable light restricting plate in a zooming operation; and
df2 represents a movement amount of a rear lens component in a zooming operation.

When the lower limit of the condition (14) is exceeded, an off-axial luminous flux furthest from the optical axis is excessively restricted to decrease the quantity of peripheral light. When the upper limit of the condition (14) is exceeded, a harmful light cannot effectively be corrected.

A zoom lens system according to the above-mentioned sixth implementation of the present invention preferably fulfills the following conditions (15) and (16) in addition to the above-described conditions (6) to (12).

It is preferable to employ for the object side surface of the positive lens element of the front lens component of the sixth implementation an aspherical surface which fulfills the following condition (15):

$$-0.01 < \phi_1 \cdot (N'-N) \cdot d/dy \cdot \{X(y) - X_o(y)\} < 0.03 \quad (15)$$

wherein an arbitrary height y in a direction perpendicular to the optical axis is defined as $0.3Y_{max} < y < Y_{max}$.

When the lower limit of the condition (15) is exceeded, a reduction of a dispersion on the periphery increases an angle of incidence, of a peripheral luminous flux, to the rear lens component, which makes it difficult to correct coma. When the upper limit of the condition (15) is exceeded, a dispersion excessively increases, which makes it difficult to correct field of curvature and distortion.

Further, it is preferable to employ for the image side surface of the positive lens element of the front lens component of the sixth implementation an aspherical surface which fulfills the following condition (16):

$$-0.02 < \phi_1 \cdot (N'-N) \cdot d/dy \cdot \{X(y) - X_o(y)\} < 0.01 \quad (16)$$

wherein an arbitrary height y in a direction perpendicular to the optical axis is defined as $0 < y < 0.7Y_{max}$.

When the lower limit of the condition (16) is exceeded, a convergence excessively increases, so that the excessive convergence in corporation with a strong positive refractive power of the rear lens component makes spherical aberration incline toward the under side. When the upper limit of the condition (16) is exceeded, although coma and spherical aberration are effectively corrected, it becomes difficult to correct distortion.

Next, a three-component zoom lens system will be examined where a low cost and compactness are sufficiently realized by effectively employing aspherical surfaces.

A three-component zoom lens system according to the present invention comprises, from the object side, a first lens component having a negative refractive power, a second lens component having a positive refractive power, and a third lens component having a negative refractive power, wherein the focal length of the whole zoom lens system is changed by changing the air spaces between the first and second, and the second and third lens components, at least two aspherical surfaces are employed for the whole zoom lens system, and the following conditions (17) and (18) are fulfilled:

$$0.6 < |\phi_1|/\phi_w < 1.5 \quad (17)$$

$$0.1 < |\phi_3|/\phi_w < 0.2 \quad (18)$$

wherein:

$\phi_1$ represents a refractive power of a first lens component;

$\phi_3$ represents a refractive power of a third lens component; and $\phi_w$ represents a refractive power of the whole zoom lens system at the shortest focal length condition.

Also, it is possible that a three-component zoom lens system according to the present invention comprises, from the object side, a first lens component having a negative refractive power, a second lens component having a positive refractive power, and a third lens component having a negative refractive power, wherein the focal length of the whole zoom lens system is changed by changing the air spaces between the first and second, and the second and third lens components, and at least one bi-aspherical surface is employed for the first, the second or the third lens component.

Furthermore, it is also possible that a three-component zoom lens system according to the present invention comprises, from the object side, a first lens component having a negative refractive power, a second lens component having a positive refractive power, and a third lens component having a negative refractive power, wherein the focal length of the whole zoom lens system is changed by changing the air spaces between the first and second, and the second and third lens components, at least two aspherical surfaces are employed for the whole zoom lens system, and the first and second lens components have two lens elements, respectively.

In the three-component zoom lens system, according to the present invention, having a negative, a positive and a negative lens components, since two or more aspherical surfaces are employed for the whole zoom lens system, a zoom lens system having a higher performance is realized with fewer lens elements as well as a deterioration of aberrations is restricted. That is, by employing a plurality of aspherical surfaces, it becomes possible to arrange a first lens component with two lens elements, and a second lens component with three or less lens elements as well as a deterioration of aberrations is restricted.

Especially when at least one bi-aspherical surface is employed, a high-performance zoom lens system can be realized with fewer lens elements.

For example, it is effective for preventing a generation of coma on the periphery of an image plane to employ an aspherical surface for the object side surface of a positive lens element of the first lens component; it is effective for correcting spherical aberration to employ an aspherical surface for the image side surface of a positive lens element of the first lens component.

When an aspherical surface is employed for the second lens component, spherical aberration can effectively be corrected, and a higher-order coma which cannot completely be corrected by the first lens component can be corrected.

When an aspherical surface is employed for the third lens component, off-axial aberrations can effectively be corrected. For example, it is effective for correcting distortion to employ an aspherical surface on the object side of the third lens component; it is effective for correcting field of curvature to employ it on the image side.

By employing at least two aspherical surfaces as described above, it becomes possible to reduce the number of lens element, while maintaining a required performance, to realize a compactness. However, in order to achieve an object of the present invention, it is further required that the above-described conditions (17) and (18) are fulfilled.

The above condition (17) stipulates a ratio of a refractive power of the first lens component to that of the whole zoom lens system at the shortest focal length condition. When the upper limit of the condition (17) is exceeded, a refractive power of the first lens component becomes excessive, so that even if an aspherical surface is employed for the first lens component, it becomes difficult to correct aberrations produced therein, especially distortion and field of curvature. When the lower limit of the condition (17) is exceeded, it becomes difficult to correct coma on the periphery of an image plane.

The condition (18) stipulates a ratio of a refractive power of the third lens component and that of the whole zoom lens system at the shortest focal length condition. When the upper limit of the condition (18) is exceeded, a refractive power of the third lens component becomes excessive, so that even if an aspherical surface is employed for the third lens component, it becomes difficult to correct aberrations produced therein, especially spherical aberration. When the lower limit of the condition (18) is exceeded, more coma is produced on the periphery of an image plane. As described above, in the three-component zoom lens system according to the present invention, a compactness is realized by adding the third lens component having a weak negative refractive power to the two lens components having a positive and a negative refractive powers, respectively.

By arranging a three-component zoom lens system so that it fulfills the above conditions (17) and (18), a compactness can be realized while maintaining a required performance. According to the present invention, however, by arranging a three-component zoom lens system so that it further fulfills the following conditions, a zoom lens system having a higher performance can be realized.

When a first lens component includes an aspherical surface, the aspherical surface preferably fulfills the following condition (19):

$$-0.1 < \phi_1 \cdot (N'-N) \cdot d/dy \cdot \{X(y) - X_0(y)\} < 0.03 \qquad (19)$$

wherein an arbitrary height y in a direction perpendicular to the optical axis is defined as $0 < y < 0.7Y_{max}$.

When the upper limit of the condition (19) is exceeded, positive distortion and a positive change tendency of field curvature increases in the range between the shortest and the middle focal length conditions. When the lower limit of the condition (19) is exceeded, negative distortion increases in the range between the middle and the longest focal length conditions. In addition, a negative change tendency of field curvature remarkably increases in the entire focal length range.

When a bi-aspherical lens element is used for the front lens component, one surface preferably fulfills the following condition (20), and the other surface preferably fulfills the following condition (21):

$$-0.13 < \phi_1 \cdot (N'-N) \cdot d/dy \cdot \{X(y) - X_0(y)\} < 0 \qquad (20)$$

wherein an arbitrary height y in a direction perpendicular to the optical axis is defined as $0.8Y_{max} < y < Y_{max}$; and $$0 < \phi_1 \cdot (N'-N) \cdot d/dy \cdot \{X(y) - X_0(y)\} < 0.05 \qquad (21)$$

wherein an arbitrary height y in a direction perpendicular to the optical axis is defined as $0.8Y_{max} < y < Y_{max}$.

The above condition (20) indicates that on aspherical surfaces, of the first lens component, fulfilling the condition (20), the negative refractive power is weaker on the periphery (the positive refractive power is stronger). By this, distortion in the vicinity of the shortest focal length condition is corrected. Moreover, by employing an aspherical surface further fulfilling the condition (21), field of curvature is excellently corrected.

When the second lens component includes an aspherical surface, the aspherical surface preferably fulfills the following condition (22):

$$-0.01 < \phi_2 \cdot (N'-N) \cdot d/dy \cdot \{X(y) - X_0(y)\} < 0.03 \qquad (22)$$

wherein an arbitrary height in a direction perpendicular to the optical axis is defined as $0 < y < 0.7Y_{max}$, and $\phi_2$ represents a refractive power of a second lens component.

When the upper limit of the condition (22) is exceeded, zonal aberration has a high negative value, which causes a shift of a focusing position due to a closing of the aperture. When the lower limit of the condition (22) is exceeded, the effect of correcting spherical aberration to a zonal luminous flux becomes excessive, which makes it difficult to evenly correct spherical aberration and other aberrations. In this case, spherical aberration is apt to form a wavy pattern.

When a bi-aspherical lens element is employed for the second lens component, one surface preferably fulfills the following condition (23), and the other surface preferably fulfills the following condition (24):

$$-0.03 < \phi_2 \cdot (N'-N) \cdot d/dy \cdot \{X(y) - X_0(y)\} < 0 \qquad (23)$$

wherein an arbitrary height in a direction perpendicular to the optical axis is defined as $0.7Y_{max} < y < Y_{max}$, and $$0 < \phi_2 \cdot (N'-N) \cdot d/dy \cdot \{X(y) - X_0(y)\} < 0.05 \qquad (24)$$

wherein an arbitrary height along the optical axis y is defined as $0.7Y_{max} < y < Y_{max}$.

The condition (23) indicates that on aspherical surfaces, of the second lens component, fulfilling the condition (23), the positive refractive power is weaker on the periphery (the negative refractive power is stronger). Also, the condition (23) is a condition required for correcting an inclination, toward the under side, of spherical aberration into the inclination toward the over side in a third-order aberration range. At this time, an light passing far away from the optical axis of a lens system sometimes inclines toward the over side since spherical aberrations are excessively corrected. Therefore, in order to return the axial light toward the under side, an aspherical surface, fulfilling the condition (24), where the negative refractive power is weaker on the periphery (the positive refractive power is stronger) is employed for the other surface.

Also, the aspherical surfaces prevent a generation of a higher-order coma which cannot completely be restricted in the first lens component. For example, when the lower limit of the condition (23) is exceeded, off-axial peripheral and zonal comas increase, so that lateral aberration is apt to form a wavy pattern.

When the third lens component includes an aspherical surface, the aspherical surface preferably fulfills the following condition (25):

$$-0.01 < \phi_3 \cdot (N'-N) \cdot d/dy \cdot \{X(y) - X_0(y)\} < 0.01 \qquad (25)$$

wherein an arbitrary height y in a direction perpendicular to the optical axis is defined as $0 < y < 0.7Y_{max}$.

When the upper limit of the condition (25) is exceeded, positive distortion and a positive change tendency of field curvature increases in the range between the shortest and the middle focal length conditions. When the lower limit of the condition (25) is exceeded, negative distortion increases in the range between the middle and the longest focal length conditions. In addition, a negative change tendency of field curvature remarkably increases in the entire focal length range.

When a bi-aspherical lens element is employed for the second lens component, one surface preferably fulfills the following condition (26), and the other surface preferably fulfills the following condition (27):

$$-0.01 < \phi_3 \cdot (N'-N) \cdot d/dy \cdot \{X(y) - X_0(y)\} < 0 \qquad (26)$$

wherein an arbitrary height y in a direction perpendicular to the optical axis is defined as $0.7Y_{max} < y < Y_{max}$, and $$0 < \phi_3 \cdot (N'-N) \cdot d/dy \cdot \{X(y) - X_0(y)\} < 0.03 \qquad (27)$$

wherein an arbitrary height y in a direction perpendicular to the optical axis is defined as $0.7Y_{max} < y < Y_{max}$.

The above condition (26) indicates that on aspherical surfaces, of the third lens component, fulfilling the condition (26), the negative refractive power is weaker on the periphery (the positive refractive power is stronger), which prevents distortion from increasing adjacent to the shortest focal length condition. In addition, by employing an aspherical surface fulfilling the condition (27) for the other surface, field of curvature which cannot completely be restricted by only one aspherical surface is effectively corrected.

FIGS. 3 to 32 are cross-sectional views of optical systems of the first to thirtieth embodiments according to the present invention. In the figures, the arrows show a movement of the above-described front and rear lens components in FIGS. 3 to 14 and 16 to 24, and the above-described first, second and third lens components in FIGS. 15 and 25 to 32 from the shortest focal length condition (S) to the longest focal length condition (L).

Figure 3:
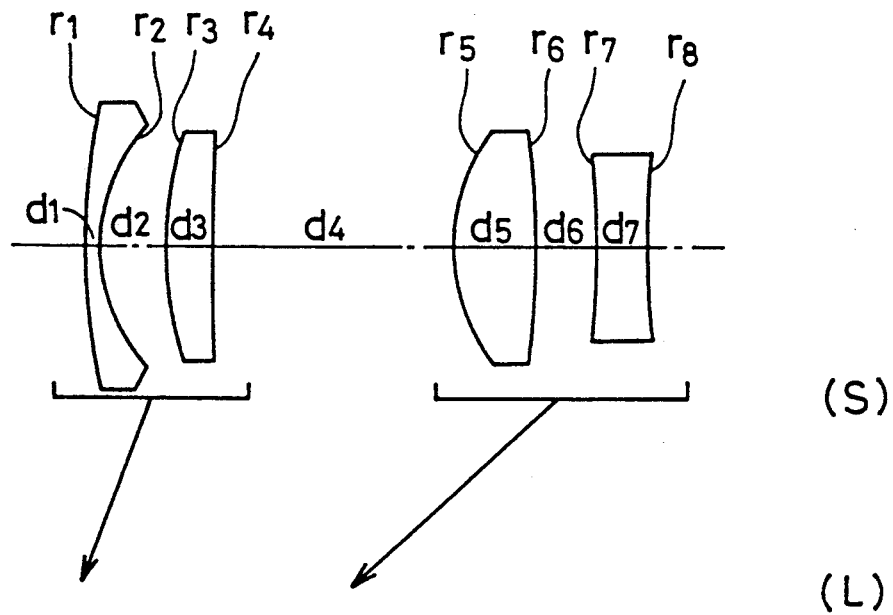
FIGS. 3 to 32 are cross-sectional views of optical systems of the first to thirtieth embodiments according to the present invention, respectively.
Figure 4:
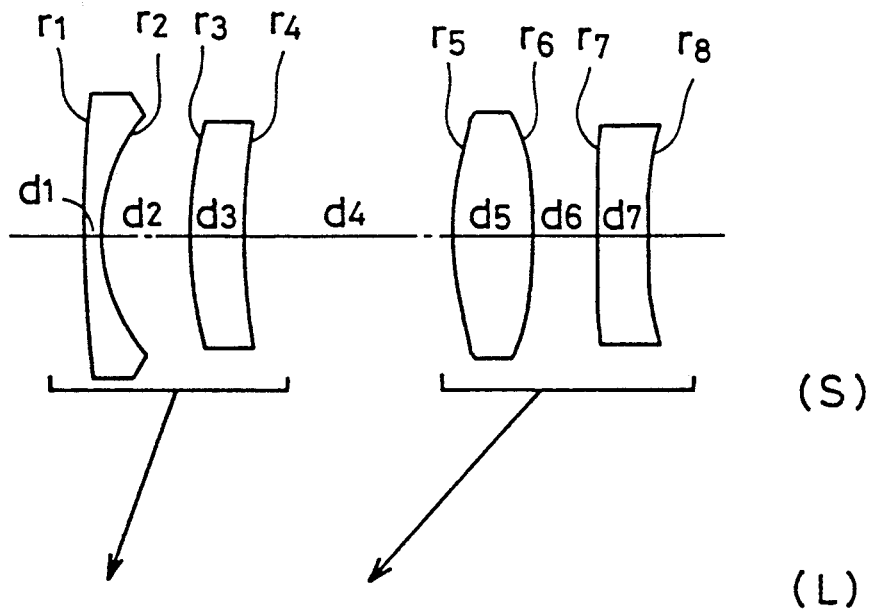
Figure 6:
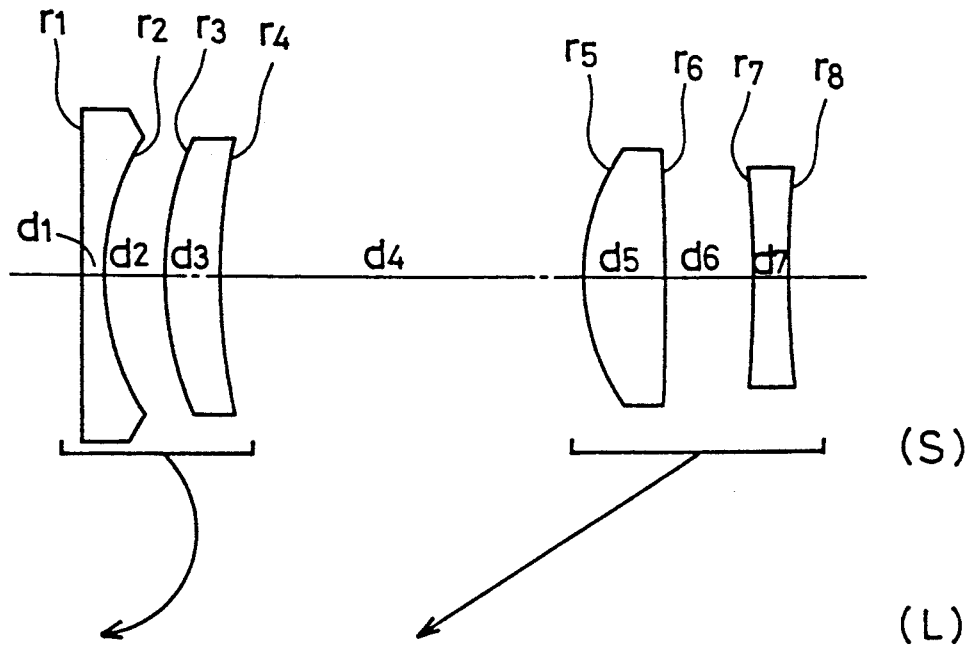

The first, second and fourth embodiments, shown in FIGS. 3, 4 and 6, respectively, comprise, from the object side: a front lens component having a first lens element consisting of a negative meniscus lens element whose image side surface is concave and a second lens element consisting of a positive meniscus lens element whose object side surface is convex; and a rear lens component having a positive third lens element consisting of a bi-convex lens element and a negative fourth lens element consisting of a bi-concave lens element. In the first embodiment, the image side surface of the second lens element, the object side surface of the third lens element, and both of the surfaces of the fourth lens element are aspherical. In the second embodiment, the image side surface of the second lens element and both of the surfaces of the third and fourth lens elements are aspherical. In the fourth embodiment, the image side surface of the first lens element, the object side surface of the third lens element, and both of the surfaces of the fourth lens element are aspherical.

Figure 5:
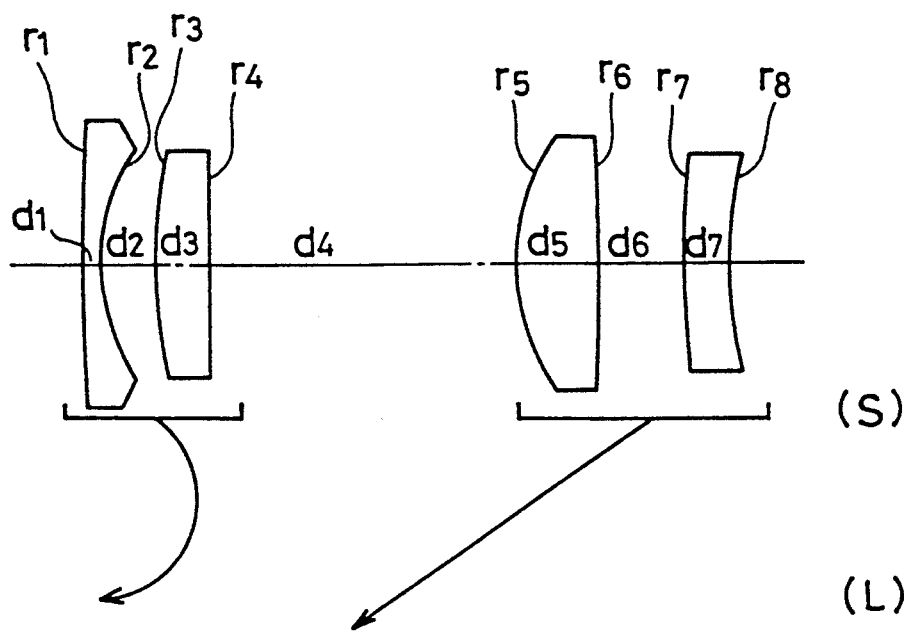

The third embodiment, shown in FIG. 5, comprises, from the object side: a front lens component having a first lens element consisting of a negative meniscus lens element whose image side surface is concave and a second lens element consisting of a positive meniscus lens element whose object side surface is convex; and a rear lens component having a positive third lens element consisting of a bi-convex lens element and a fourth lens element consisting of a negative meniscus lens element whose image side surface is concave. In the third embodiment, the image side surfaces of the first and second lens elements, the object side surface of the third lens element, and both of the surfaces of the fourth lens element are aspherical.

Figure 7:
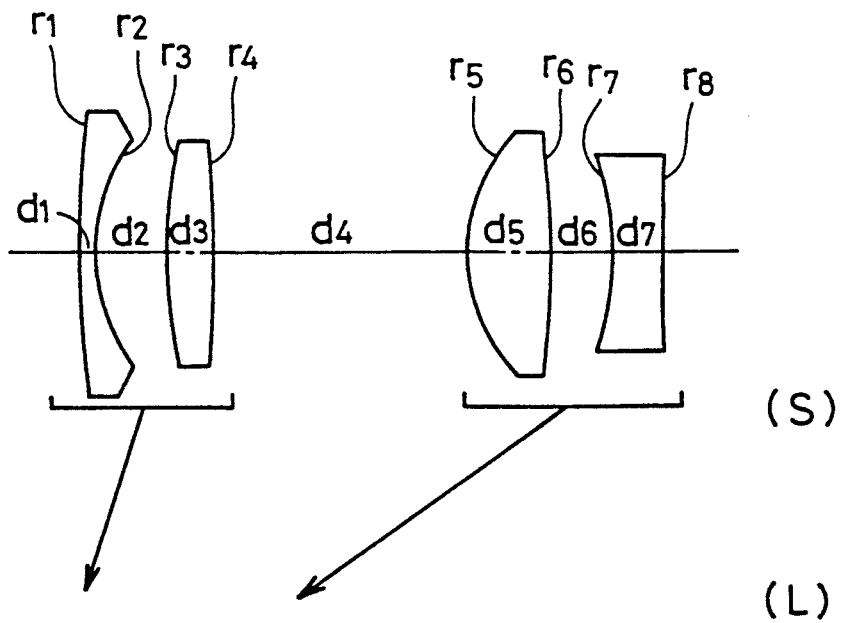

The fifth embodiment, shown in FIG. 7, comprises, from the object side: a front lens component having a first lens element consisting of a negative meniscus lens element whose image side surface is concave and a positive second lens element consisting of a bi-convex lens element; and a rear lens component having a positive third lens element consisting of a bi-convex lens element and a fourth lens element consisting of a negative meniscus lens element whose object side surface is concave. In the fifth embodiment, both surfaces of all the lens elements are aspherical.

Figure 8:
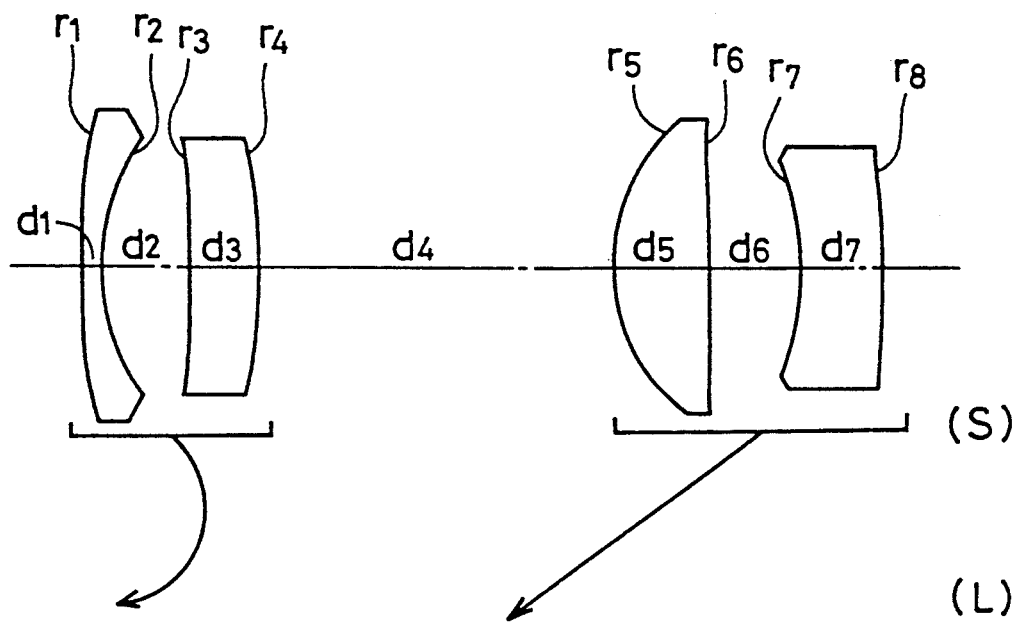

The sixth embodiment, shown in FIG. 8, comprises, from the object side: a front lens component having a first lens element consisting of a negative meniscus lens element whose image side surface is concave and a second lens element consisting of a positive meniscus lens element whose image side surface is convex; and a rear lens component having a positive third lens element consisting of a bi-convex lens element and a fourth lens element consisting of a negative meniscus lens element whose object side surface is concave. In the fifth embodiment, both surfaces of all the lens elements are aspherical.

Figure 9:
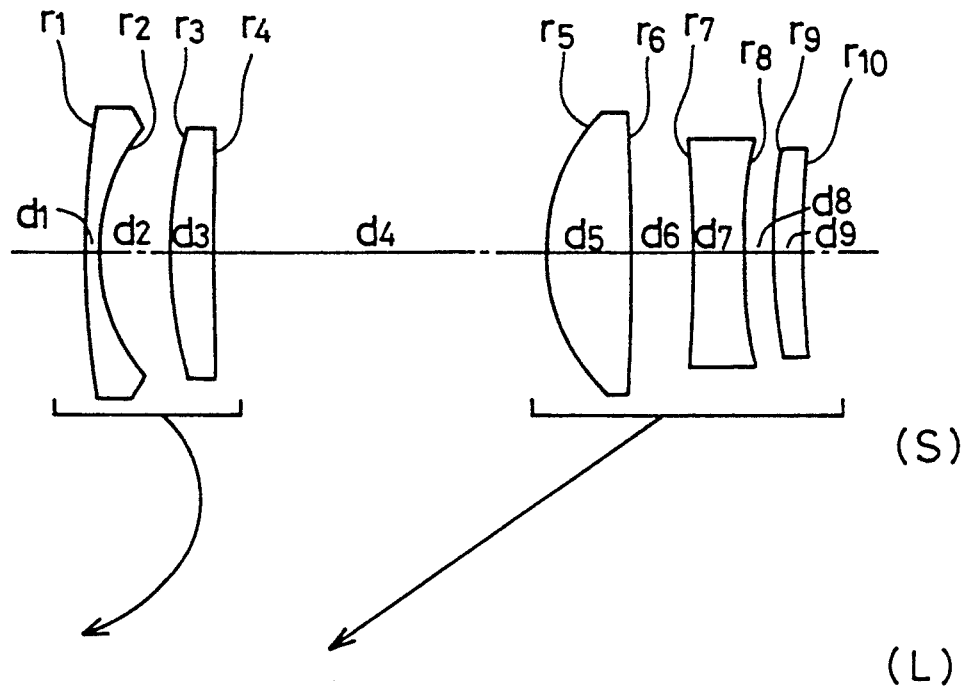

The seventh embodiment, shown in FIG. 9, comprises, from the object side: a front lens component having a first lens element consisting of a negative meniscus lens element whose image side surface is concave and a second lens element consisting of a positive meniscus lens element whose object side surface is convex; and a rear lens component having a positive third lens element consisting of a bi-convex lens element, a negative fourth lens element consisting of a bi-concave lens element and a fifth lens element consisting of a positive meniscus lens element whose object side surface is convex. In the seventh embodiment, the image side surface of the second lens element, the object side surface of the third lens element, and both of the surfaces of the fourth lens element are aspherical.

Figure 10:
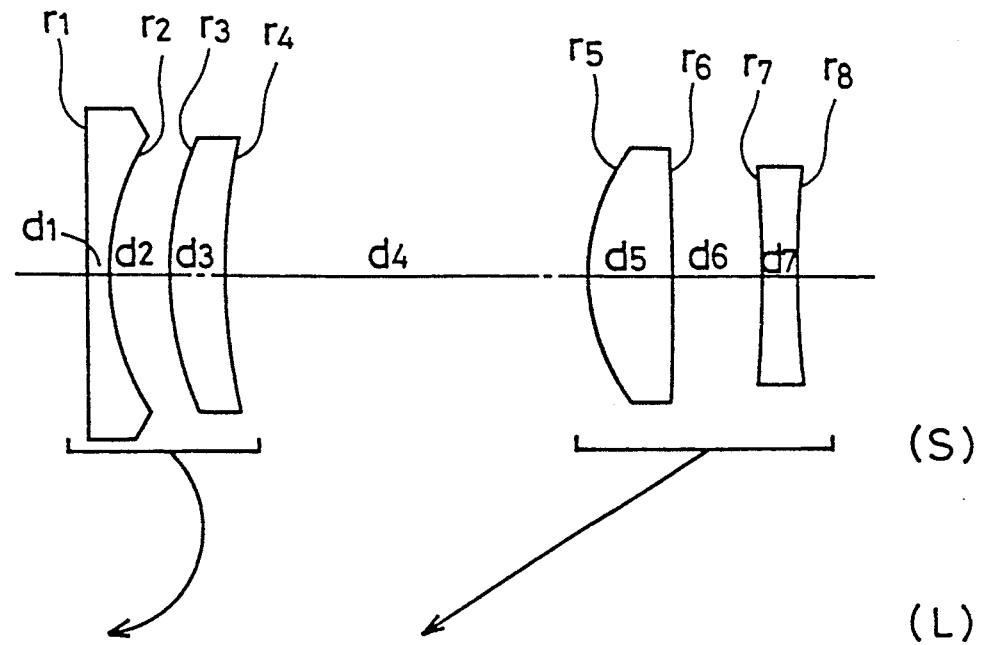

The eighth embodiment, shown in FIG. 10, comprises, from the object side: a front lens component having a first lens element consisting of a negative meniscus lens element whose image side surface is concave and a second lens element consisting of a positive meniscus lens element whose object side surface is convex; and a rear lens component having a positive third lens element consisting of a bi-convex lens element and a negative fourth lens element consisting of a bi-concave lens element. In the eighth embodiment, the image side surface of the first lens element, the object side surface of the third lens element, and both of the surfaces of the fourth lens element are aspherical.

Figure 11:
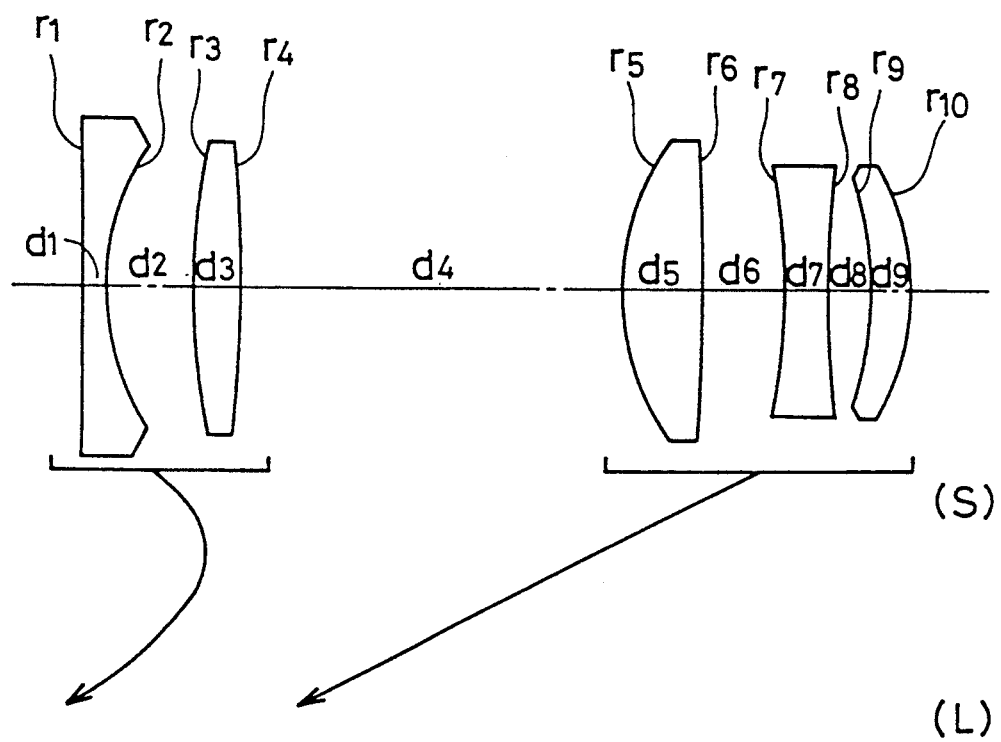

The ninth embodiment, shown in FIG. 11, comprises, from the object side: a front lens component having a negative first lens element consisting of a bi-concave lens element and a positive second lens element consisting of a bi-convex lens element; and a rear lens component having a positive third lens element consisting of a bi-convex lens element and a negative fourth lens element consisting of a bi-concave lens element and a fifth lens element consisting of a positive meniscus lens element whose image side surface is convex. In the ninth embodiment, the image side surface of the first lens element, the image side surface of the second lens element, the object side surface of the third lens element, and both of the surfaces of the fourth lens elements and the object side surface of the fifth lens element are aspherical.

Figure 12:
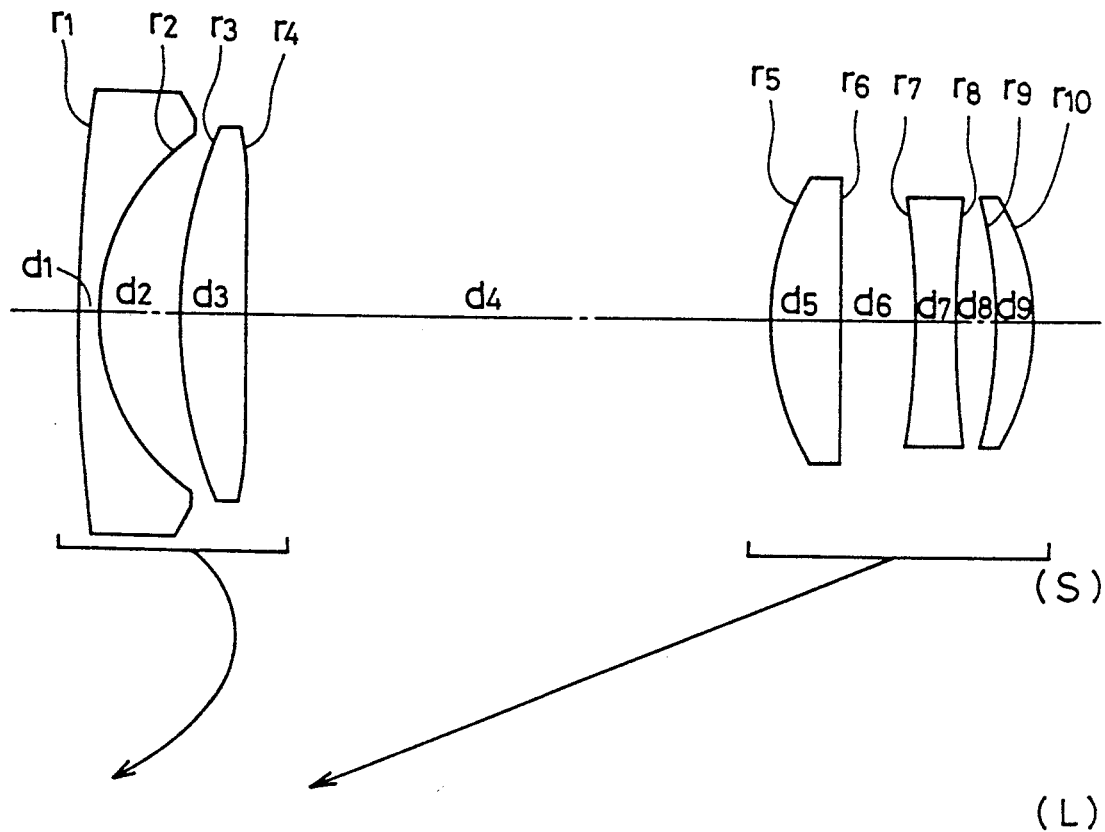

The tenth embodiment, shown in FIG. 12, comprises, from the object side: a front lens component having a first lens element consisting of a negative meniscus lens element whose image side surface is concave and a second lens element consisting of a positive meniscus lens element whose object side surface is convex; and a rear lens component having a positive third lens element consisting of a bi-convex lens element, a negative fourth lens element consisting of a bi-concave lens element, and a fifth lens element consisting of a positive meniscus lens element whose image side surface is convex. In the tenth embodiment, both of the surfaces of the first lens element, the image side surface of the second lens element, the object side surface of the third lens element, both of the surfaces of the fourth lens element and the object side surface of the fifth lens element are aspherical.

Figure 13:
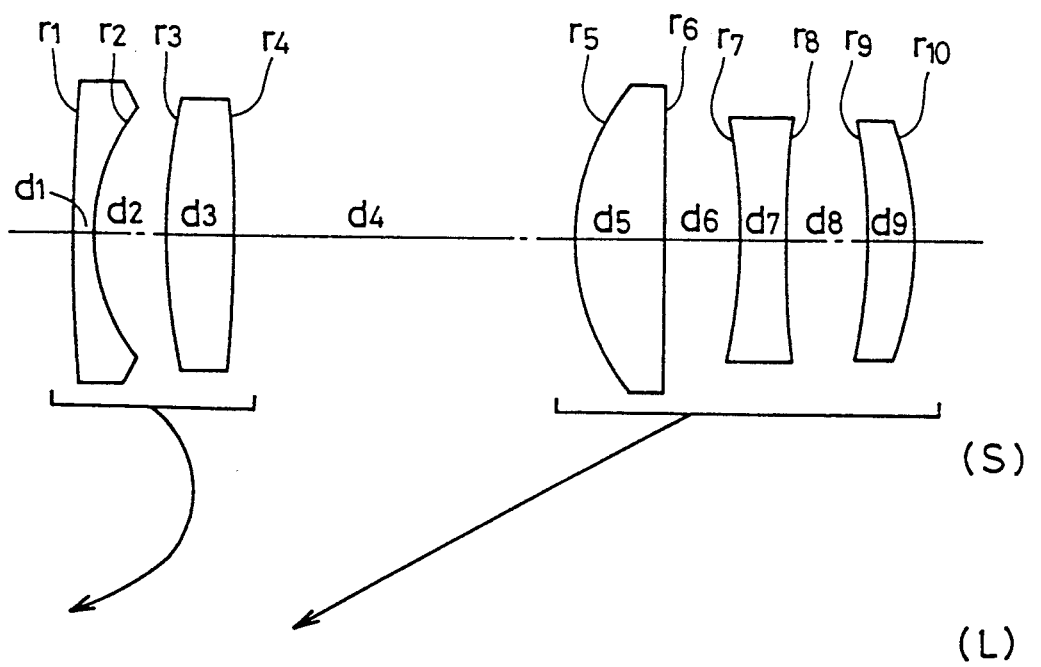

The eleventh embodiment, shown in FIG. 13, comprises, from the object side: a front lens component having a first lens element consisting of a negative meniscus lens element whose image side surface is concave and a positive second lens element consisting of a bi-convex lens element; and a rear lens component having a positive third lens element consisting of a bi-convex lens element, a negative fourth lens element consisting of a bi-concave lens element and a fifth lens element consisting of a positive meniscus lens element whose image side surface is convex. In the eleventh embodiment, both of the surfaces of the first lens element, the image side surface of the second lens element, the object side surface of the third lens element, both of the surfaces of the fourth lens element and the object side surface of the fifth lens element are aspherical.

Figure 14:
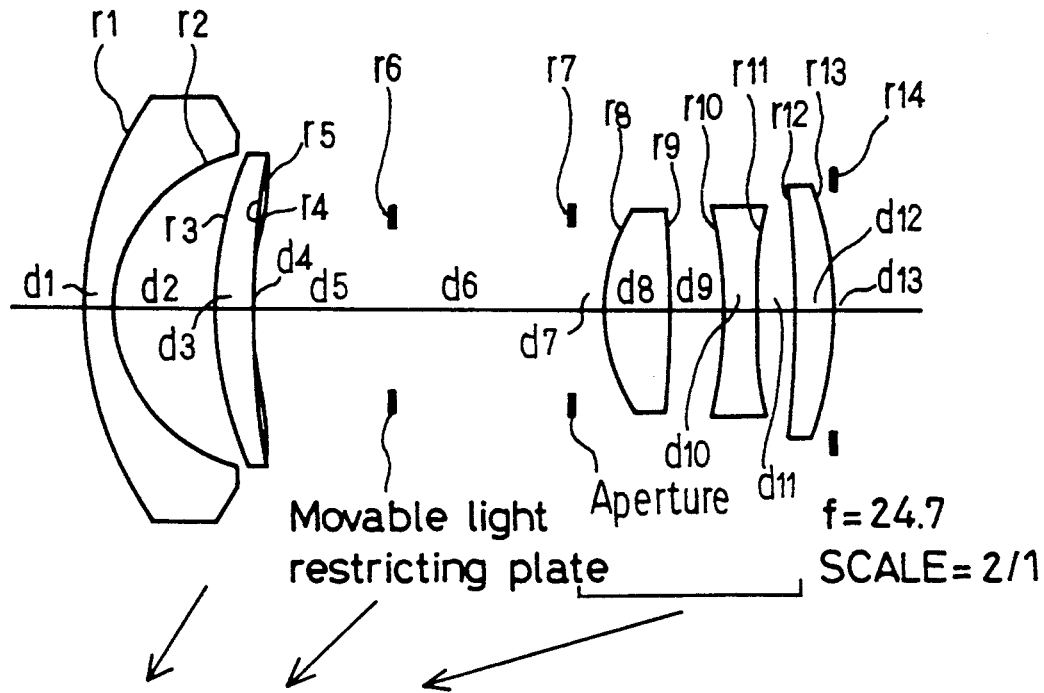

The twelfth embodiment, shown in FIG. 14, comprises, from the object side: a front lens component having a first lens element consisting of a negative meniscus lens element whose image side surface is concave and a second lens element consisting of a compound lens element of a positive meniscus lens portion whose object side surface is convex and a negative meniscus lens portion whose image side surface is concave; a movable light restricting plate P; an aperture A; and a rear lens component having a positive third lens element consisting of a bi-convex lens element, a negative fourth lens element consisting of a bi-concave lens element, and a fifth lens element consisting of a positive meniscus lens element whose image side surface is convex. In the twelfth embodiment, the image side surface of the second lens element and both of the surfaces of the fourth lens element are aspherical.

Figure 15:
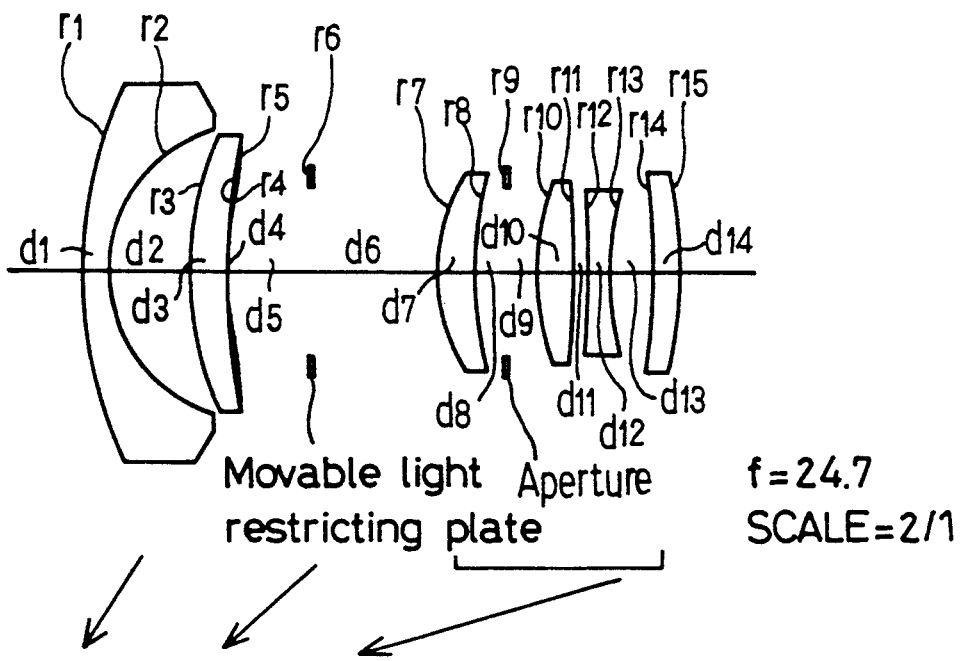

The thirteenth embodiment, shown in FIG. 15, comprises, from the object side: a first lens component having a first lens element consisting of a negative meniscus lens element whose image side surface is concave and a second lens element consisting of a compound lens element of a positive meniscus lens portion whose object side surface is convex and a negative meniscus lens portion whose image side surface is concave; a movable light restricting plate P; a second lens component having a third lens element consisting of a positive meniscus lens element whose object side surface is convex; an aperture A; and a third lens component having a positive fourth lens element consisting of a bi-convex lens element, a negative fifth lens element consisting of a bi-concave lens element, and a sixth lens element consisting of a positive meniscus lens element whose image side surface is convex. In the thirteenth embodiment, the image side surface of the second lens element, and both of the surfaces of the fifth lens element are aspherical.

Figure 16:
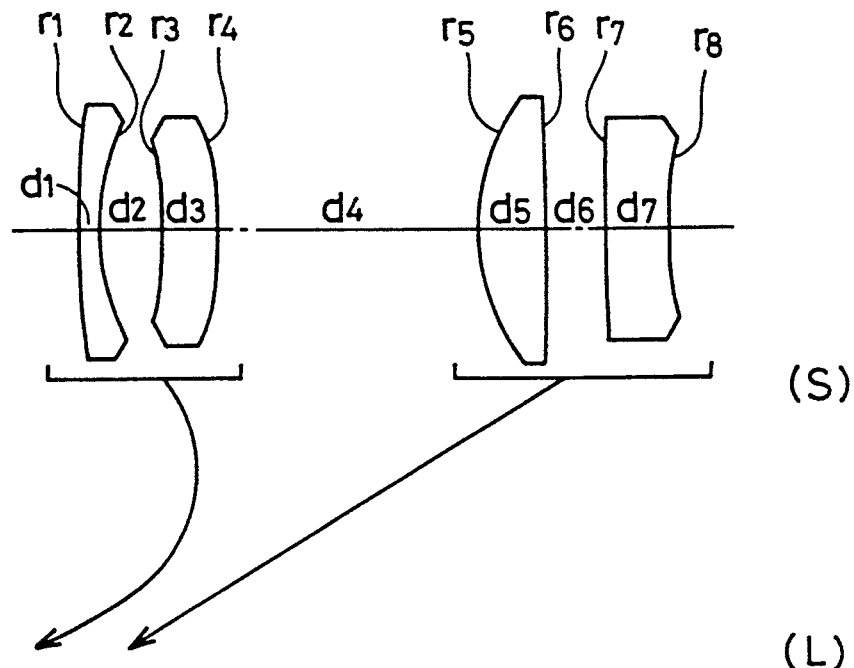

The fourteenth embodiment, shown in FIG. 16, comprises, from the object side: a front lens component having a first lens element consisting of a negative meniscus lens element whose image side surface is concave and a second lens element consisting of a positive meniscus lens element whose image side surface is convex; and a rear lens component having a positive third lens element consisting of a bi-convex lens element and a fourth lens element consisting of a negative meniscus lens element whose image side surface is concave. In the fourteenth embodiment, the object side surface of the first lens element, both of the surfaces of the second lens element, the object side surface of the third lens element and both of the surfaces of the fourth lens element are aspherical.

Figure 17:
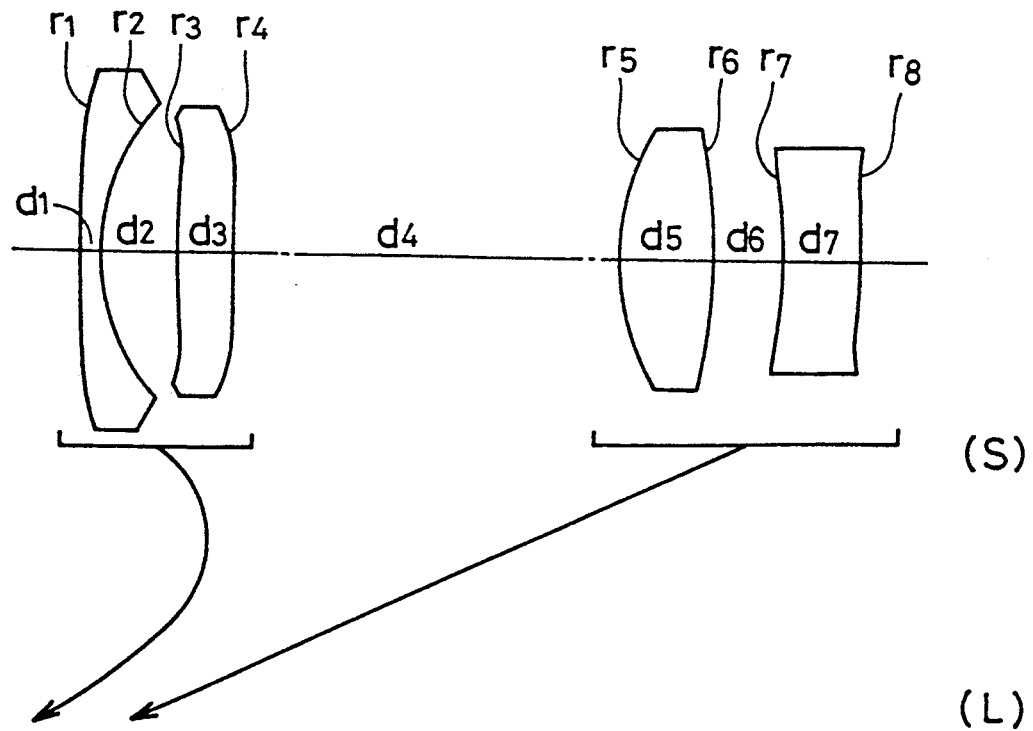

The fifteenth embodiment, shown in FIG. 17, comprises, from the object side: a front lens component having a first lens element consisting of a negative meniscus lens element whose image side surface is concave and a second lens element consisting of a positive meniscus lens element whose object side surface is convex; and a rear lens component having a positive third lens element consisting of a bi-convex lens element and a fourth lens element consisting of a negative meniscus lens element whose object side surface is concave. In the fifteenth embodiment, the object side surface of the first lens element, both of the surfaces of the second lens element, the object side surface of the third lens element and both of the surfaces of the fourth lens element are aspherical.

Figure 18:
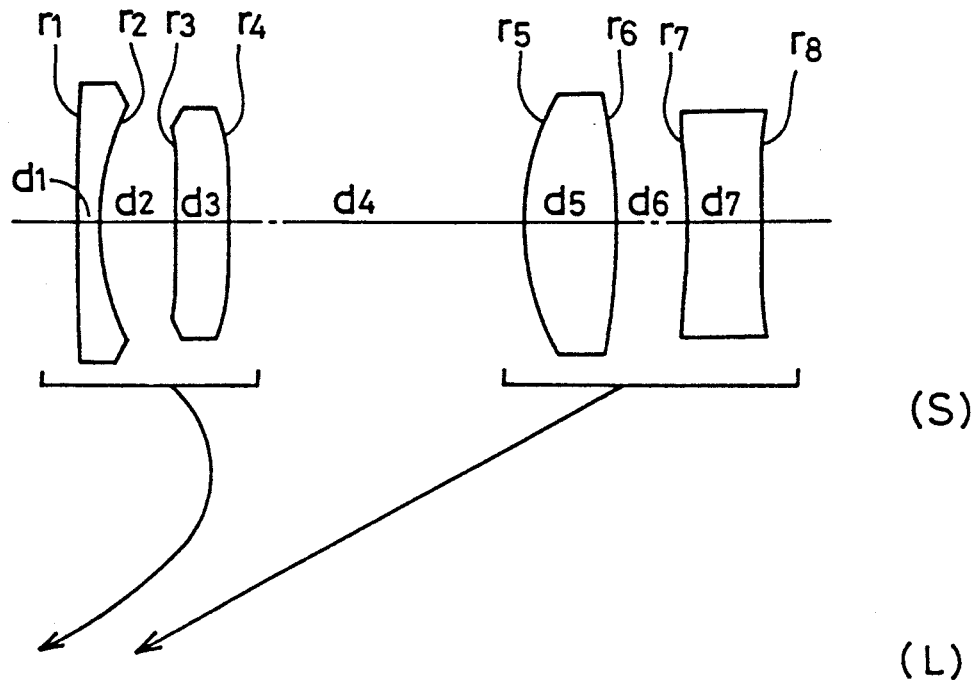

The sixteenth embodiment, shown in FIG. 18, comprises, from the object side: a front lens component having a negative first lens element consisting a bi-concave lens element and a positive second lens element consisting of a bi-convex lens element; and a rear lens component having a positive third lens element consisting of a bi-convex lens element and a fourth lens element consisting of a negative meniscus lens element whose object side surface is concave. In the sixteenth embodiment, the object side surface of the first lens element, both of the surfaces of the second lens element, the object side surface of the third lens element and both of the surfaces of the fourth lens element are aspherical.

Figure 19:
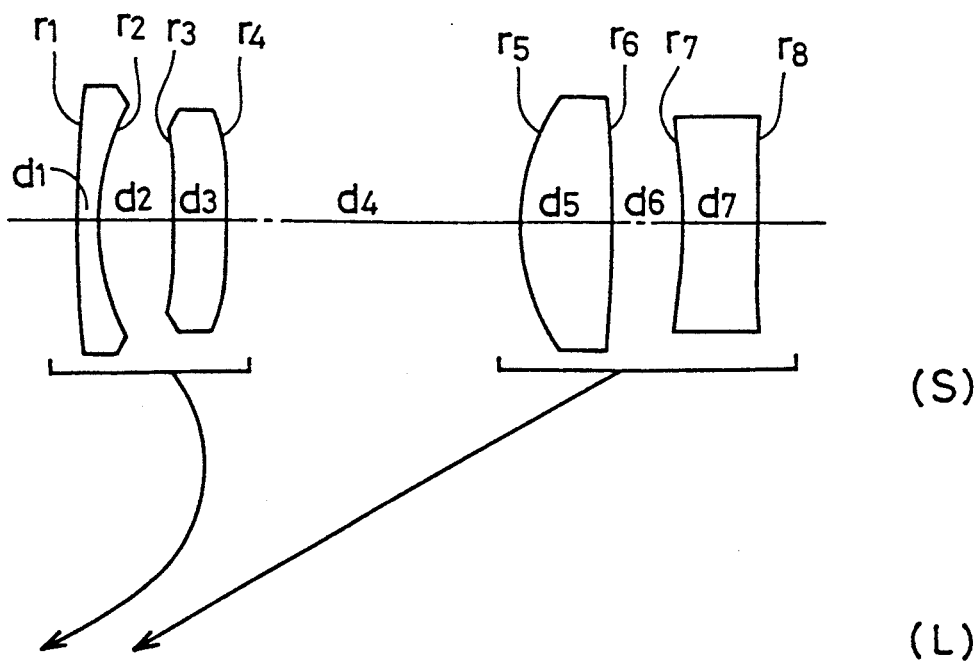

The seventeenth embodiment, shown in FIG. 19, comprises, from the object side: a front lens component having a first lens element consisting of a negative meniscus lens element whose image side surface is concave and a positive second lens element consisting of a bi-convex lens element; and a rear lens component having a positive third lens element consisting of a bi-convex lens element and a fourth lens element consisting of a negative meniscus lens element whose object side surface is concave. In the seventeenth embodiment, the object side surface of the first lens element, both of the surfaces of the second lens element, the image side surface of the third lens element and both of the surfaces of the fourth lens element are aspherical.

Figure 20:
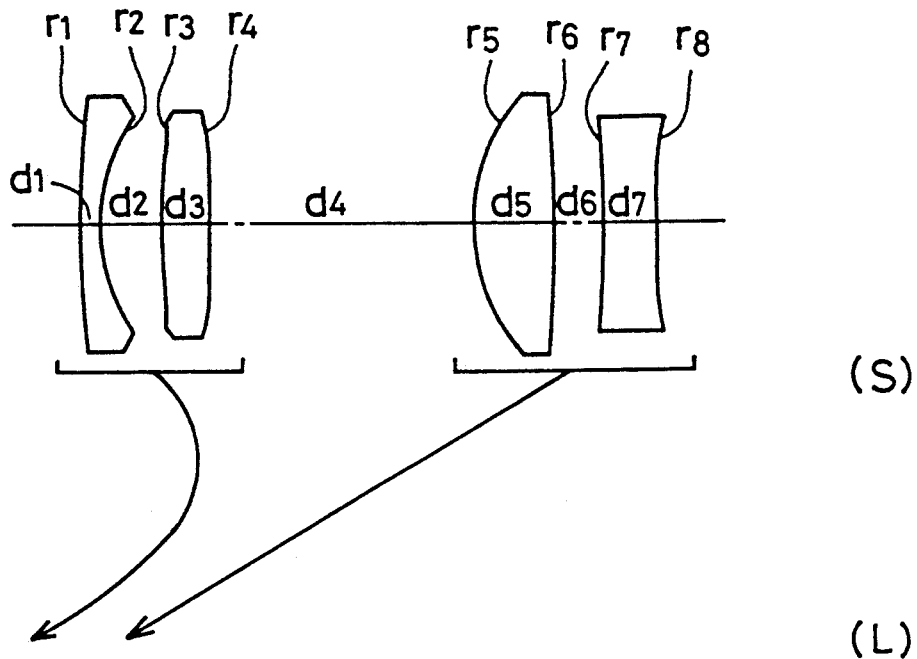
Figure 21:
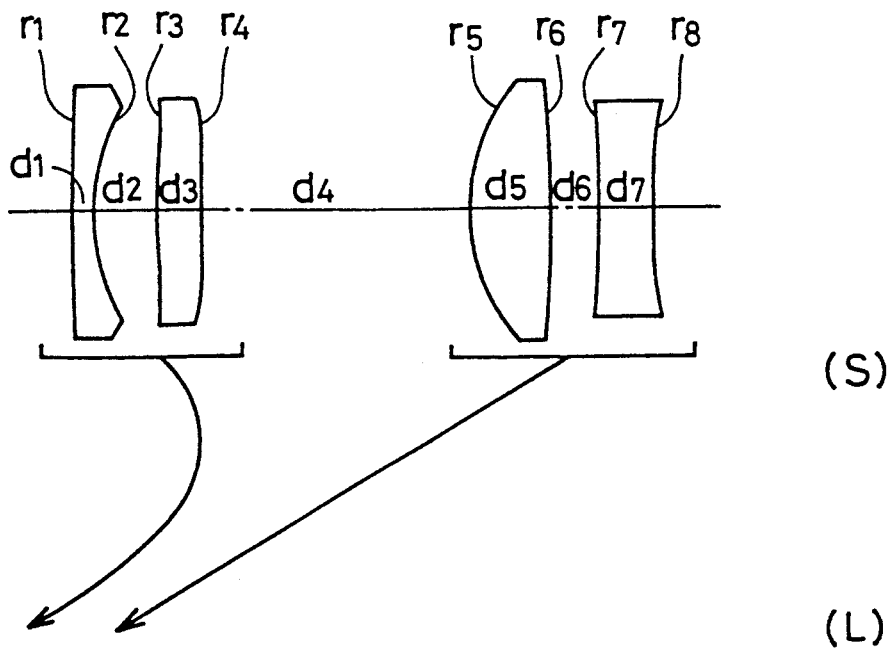

The eighteenth and nineteenth embodiments, shown in FIGS. 20 and 21, comprise, from the object side: a front lens component having a first lens element consisting of a negative meniscus lens element whose image side surface is concave and a positive lens element consisting of a bi-convex lens element; and a rear lens component having a positive third lens element consisting of a bi-convex lens element and a negative fourth lens element consisting of a bi-concave lens element. In the eighteenth embodiment, both of the surfaces of the second lens element, the object side surface of the third lens element and both of the surfaces of the fourth lens element are aspherical. In the nineteenth embodiment, the object side surface of the first lens element, both of the surfaces of the second lens element, the object side surface of the third lens element and both of the surfaces of the fourth lens element are aspherical.

Figure 22:
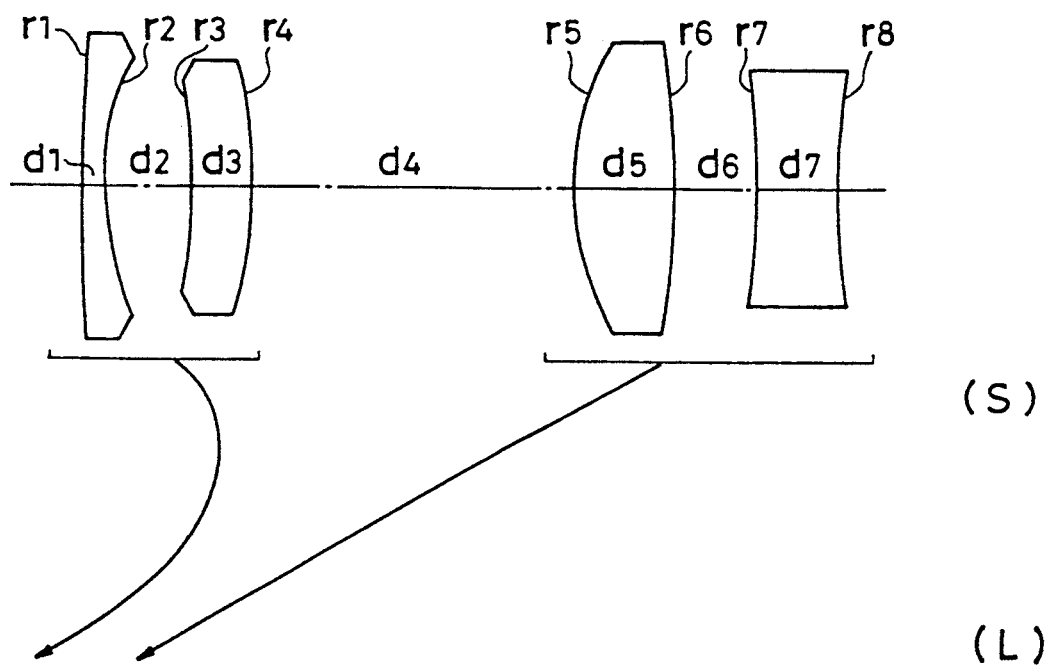

The twentieth embodiment, shown in FIG. 22, comprises, from the object side: a front lens component having a negative first lens component consisting of a bi-concave lens element and a second lens element consisting of a positive meniscus lens element whose image side surface is convex; and a rear lens component having a positive third lens element consisting of a bi-convex lens element and a negative fourth lens element consisting of a bi-concave lens element. In the twentieth embodiment, the object side surface of the first lens element, both of the surfaces of the second lens element, both of the surfaces of the third lens element and the image side surface of the fourth lens element are aspherical.

Figure 23:
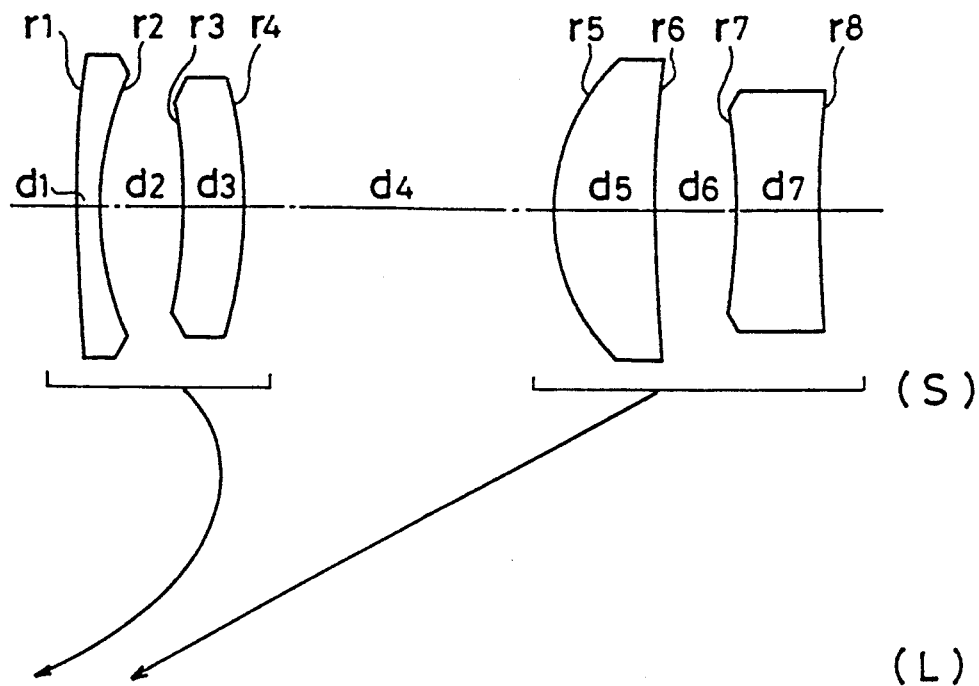

The twenty-first embodiment, shown in FIG. 23, comprises, from the object side: a front lens component having a first lens component consisting of a negative meniscus lens element whose image side surface is concave and a second lens element consisting of a positive meniscus lens element whose image side surface is convex; and a rear lens component having a third lens element consisting of a positive meniscus lens element whose object side surface is convex and a negative fourth lens element consisting of a bi-concave lens element. In the twenty-first embodiment, the object side surface of the first lens element, both of the surfaces of the second lens element, both of the surfaces of the third lens element and the object side surface of the fourth lens element are aspherical.

Figure 24:
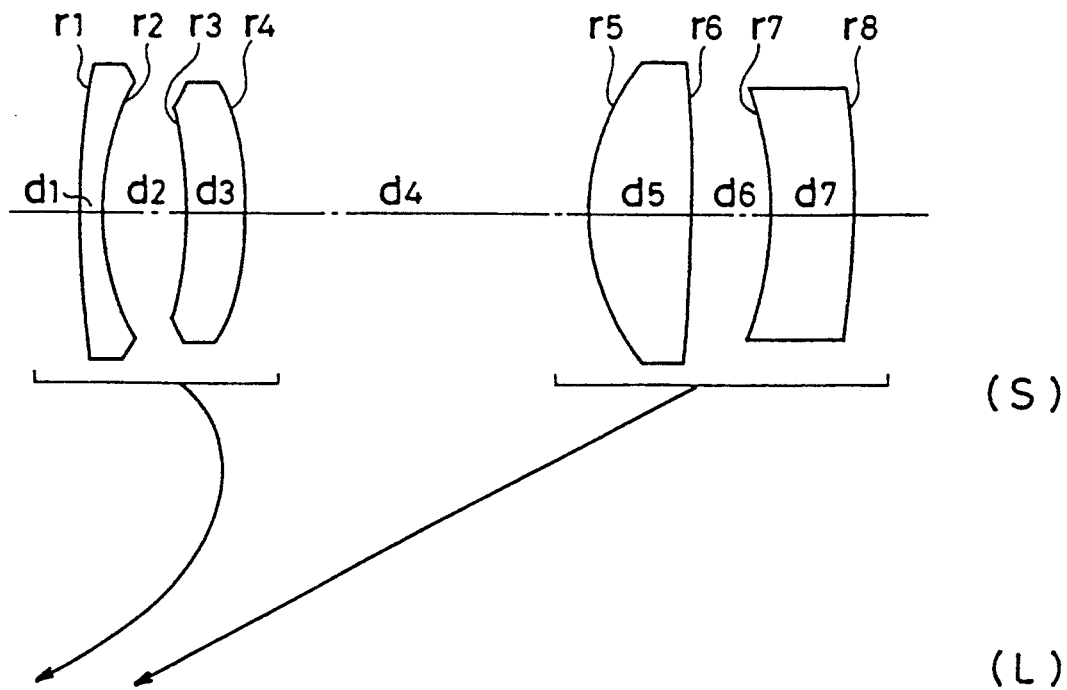
Figure 25:
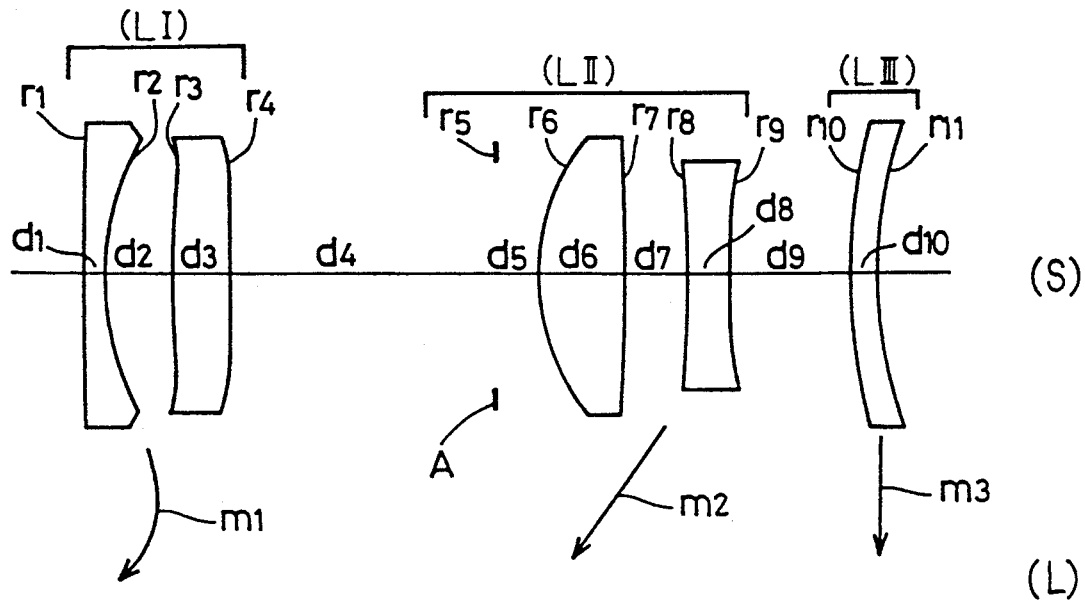
Figure 26:
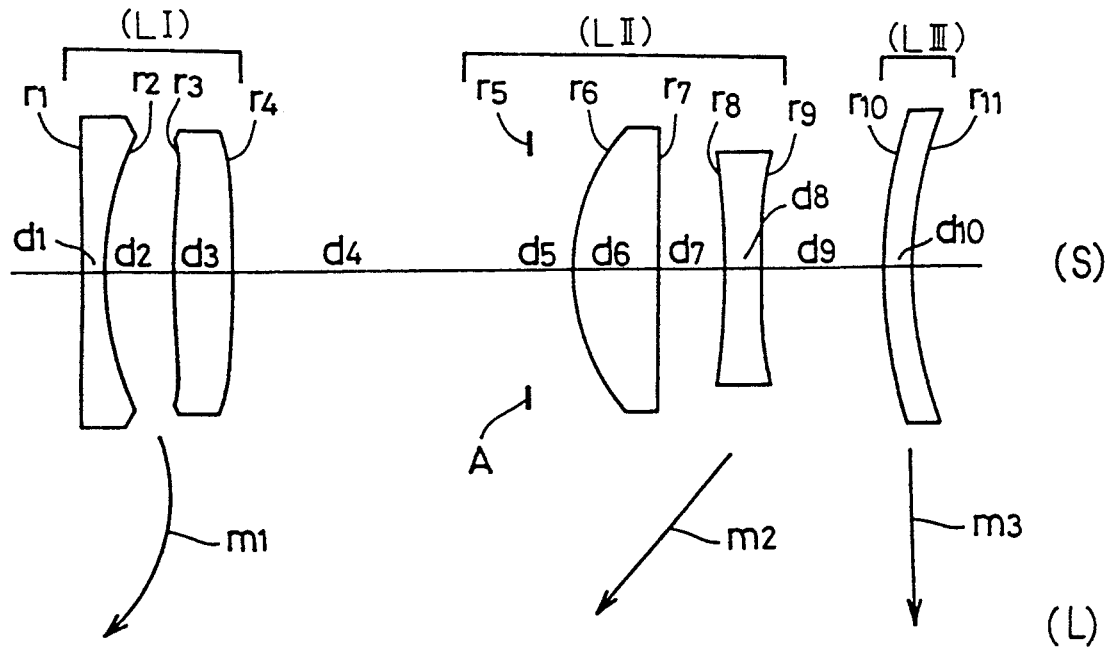
Figure 27:
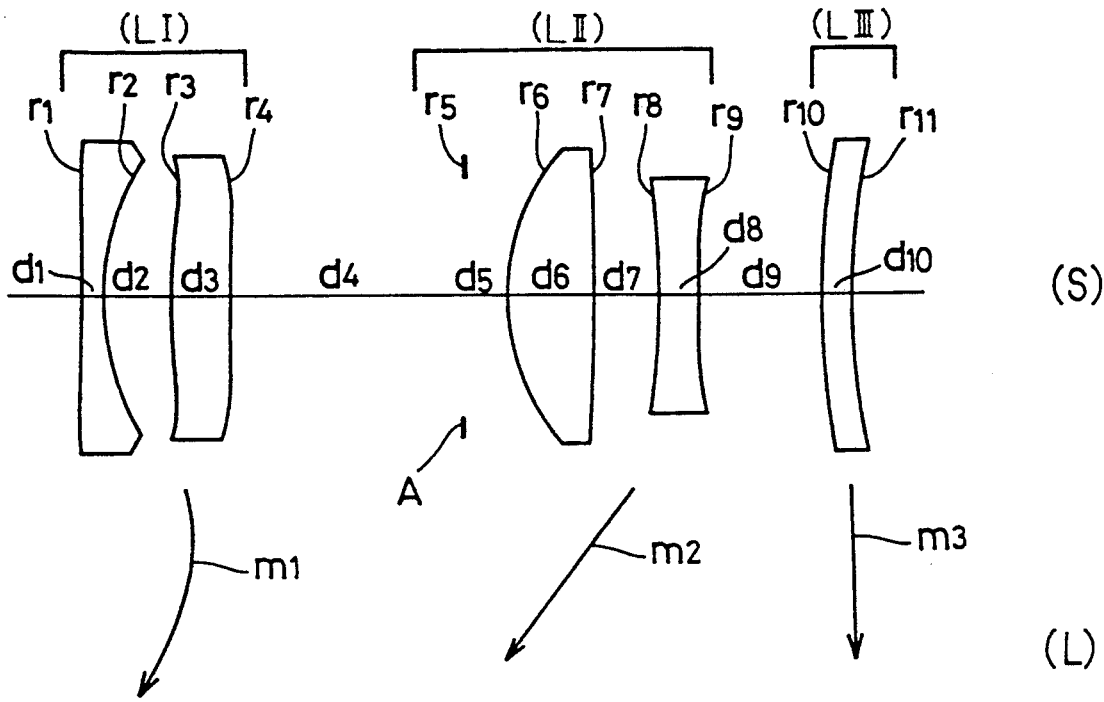
Figure 28:
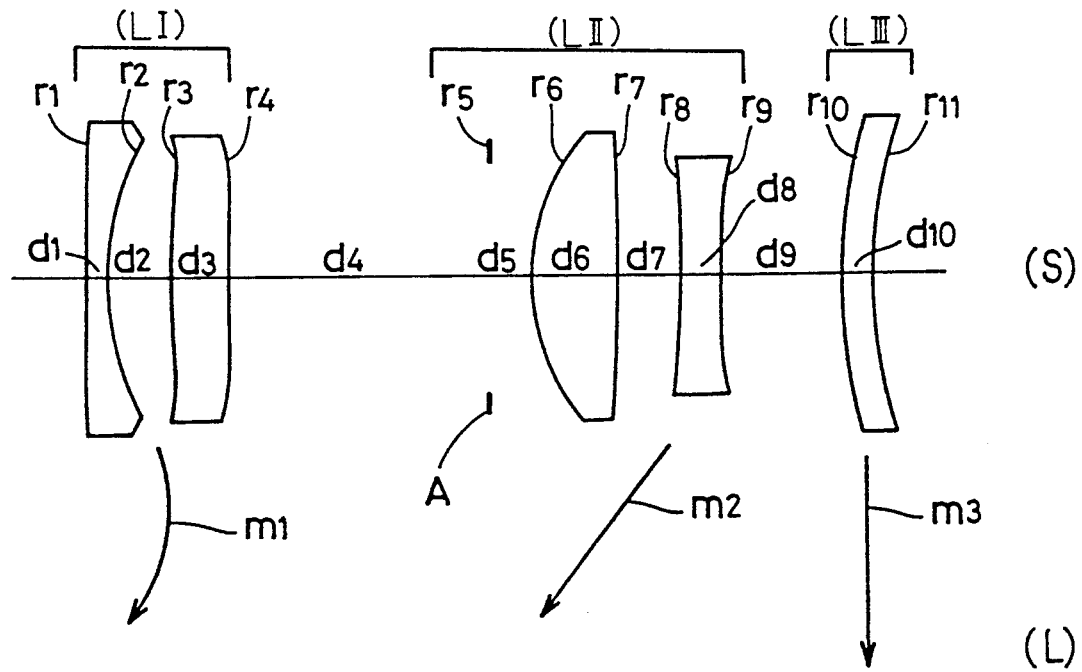
Figure 29:
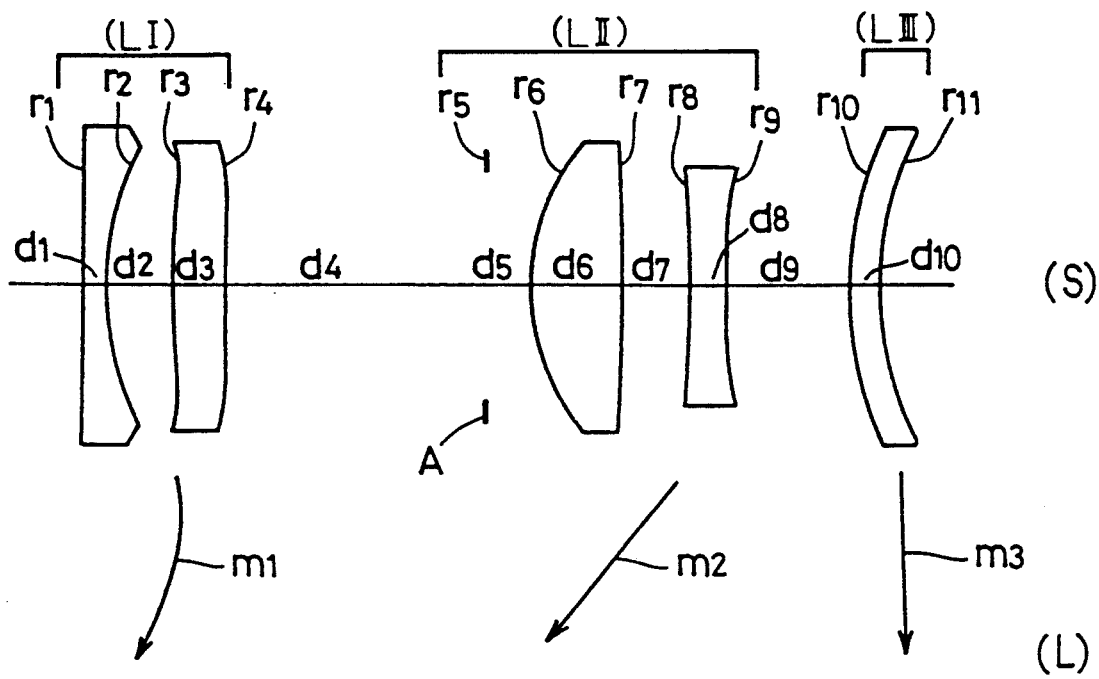

The twenty-second embodiment, shown in FIG. 24, comprises, from the object side: a front lens component having a first lens component consisting of a negative meniscus lens element whose image side surface is concave and a second lens element consisting of a positive meniscus lens element whose image side surface is convex; and a rear lens component having a positive third lens element consisting of a bi-convex lens element and a fourth lens element consisting of a negative meniscus lens element whose object side surface is concave. In the twenty-second embodiment, the object side surface of the first lens element, both of the surfaces of the second lens element, and both of the surfaces of the fourth lens element are aspherical.

The twenty-third to twenty seventh embodiments, shown in FIGS. 25 to 29, comprise, from the object side: a first lens component LI having a negative first lens element consisting of a bi-concave lens element and a second lens element consisting of a positive meniscus lens element whose object side surface is convex; an aperture A; a second lens component LII having a positive third lens element consisting of a bi-convex lens element and a negative fourth lens element consisting of a bi-concave lens element; and a third lens component LIII having a fifth lens element consisting of a negative meniscus lens element whose image side surface is concave. In the twenty-third to twenty sixth embodiments, the object side surface of the first lens element, both of the surfaces of the second lens element, the object side surface of the third lens element and both of the surfaces of the fourth lens element are aspherical. In the twenty-seventh embodiment, the object side surface of the first lens element, both of the surfaces of the second lens element, the object side surface of the third lens element, both of the surfaces of the fourth lens element and the object side surface of the fifth lens element are aspherical.

Figure 30:
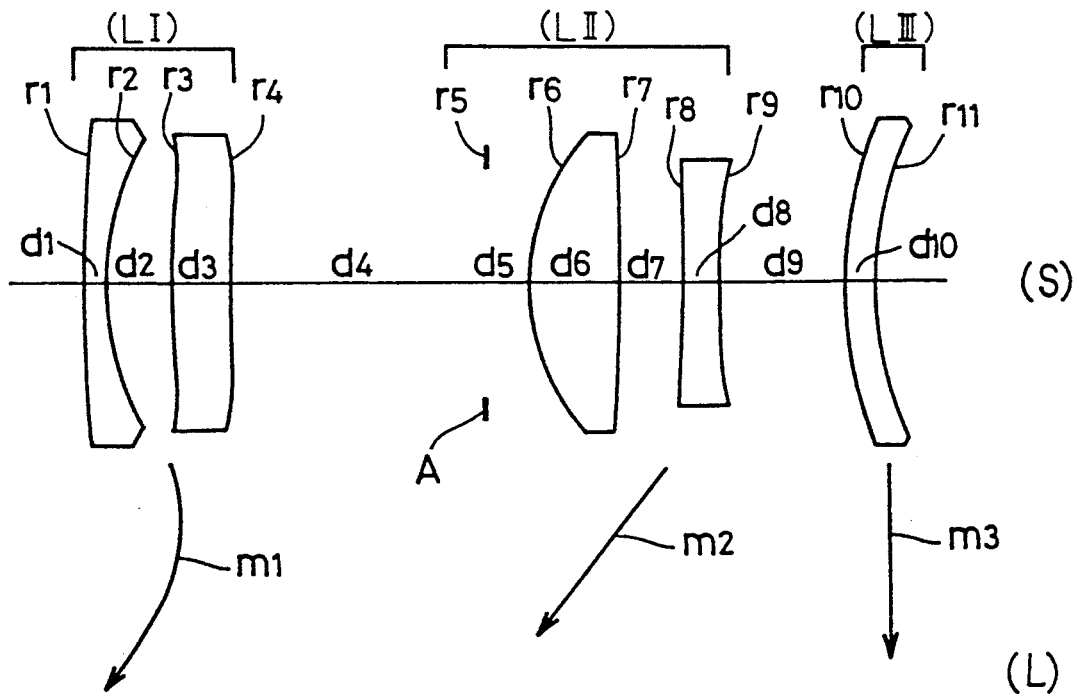
Figure 31:
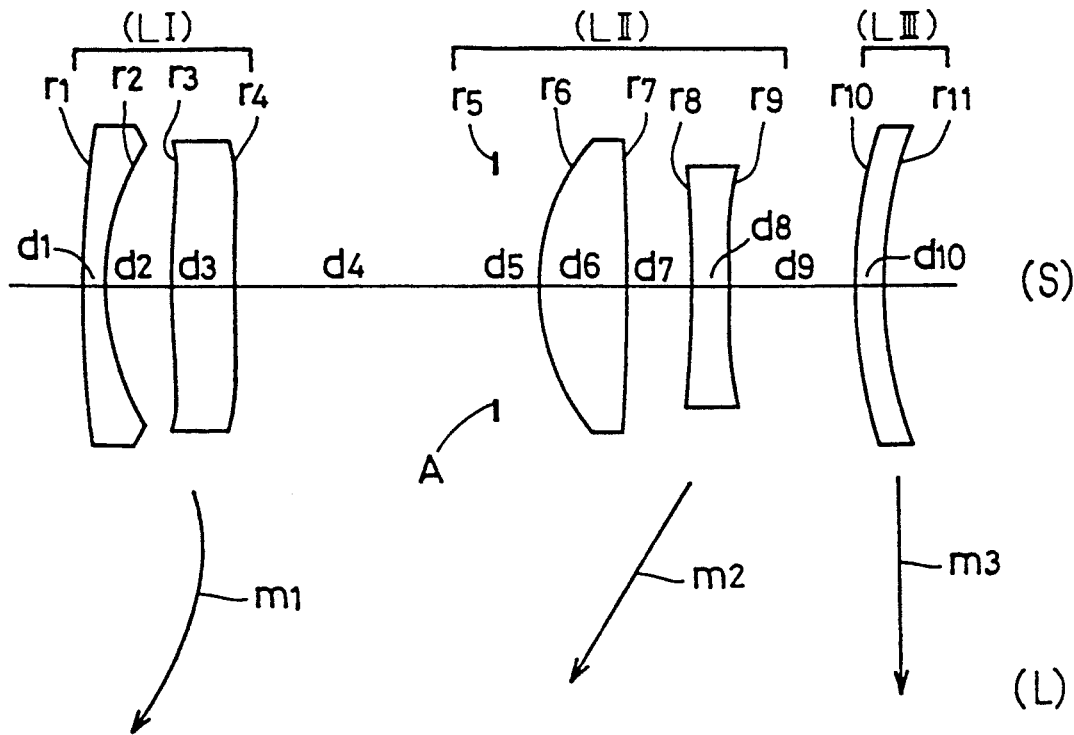
Figure 32:
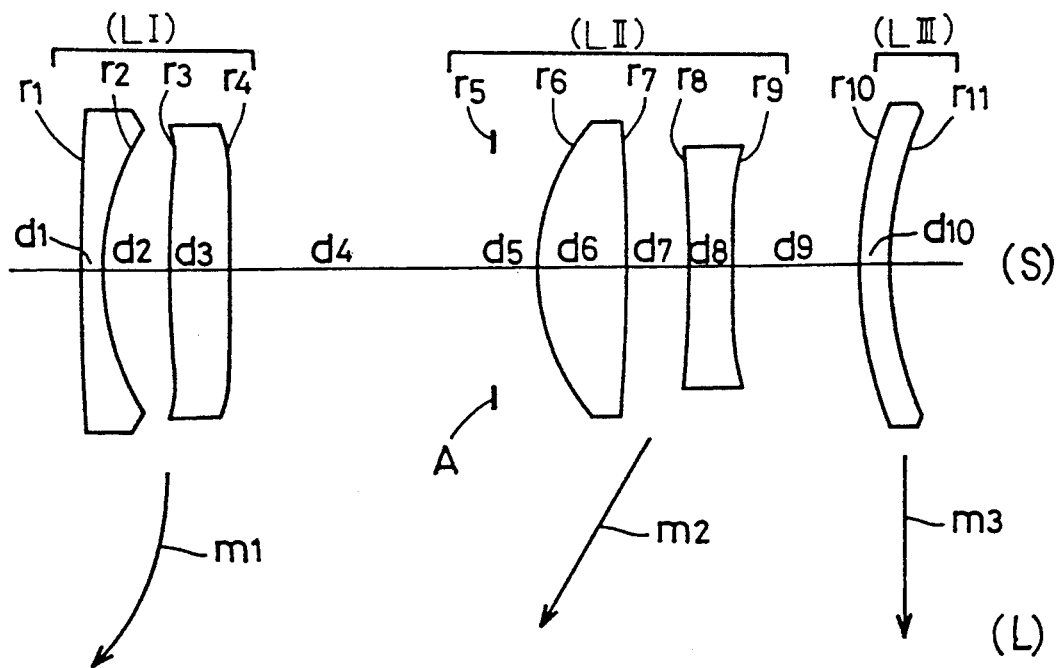
Figure 33A:
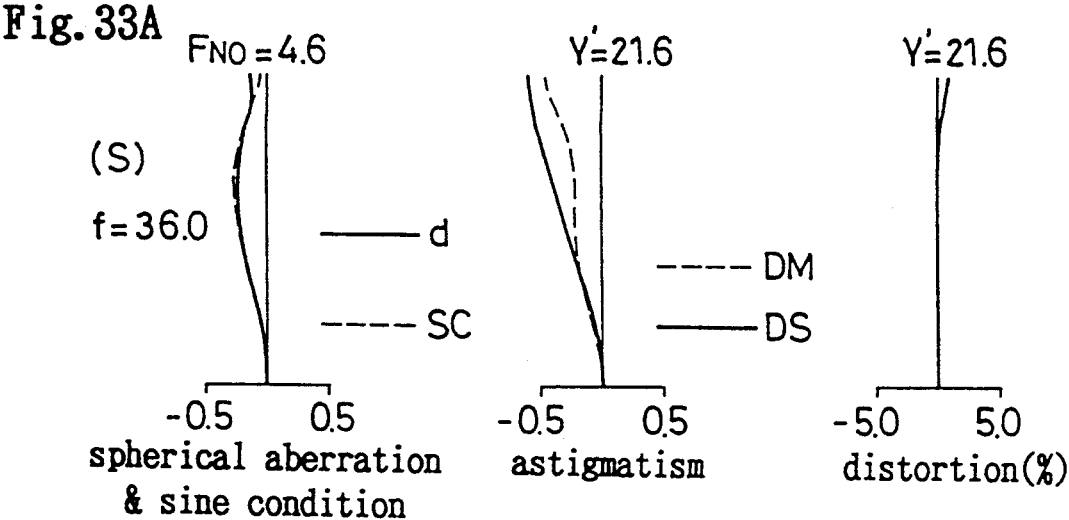
Figure 33B:
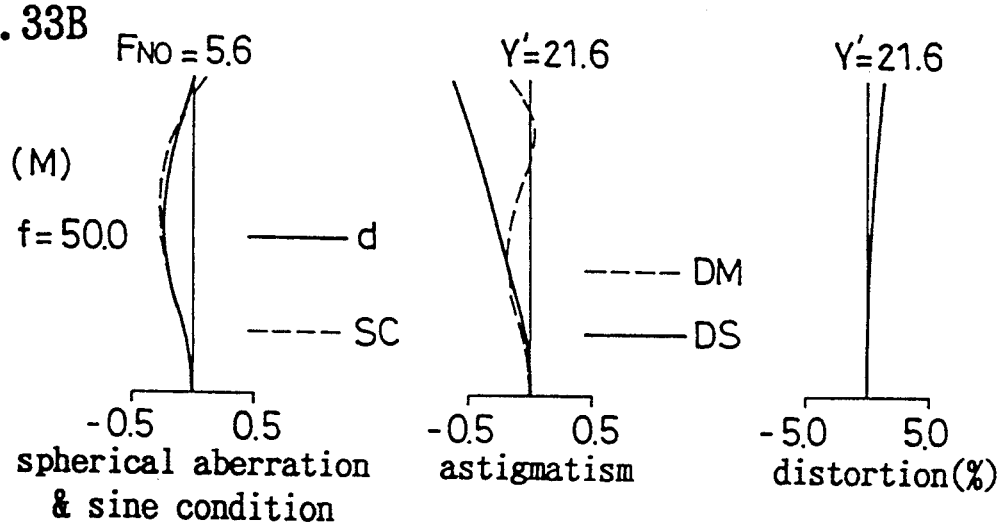
Figure 33C:
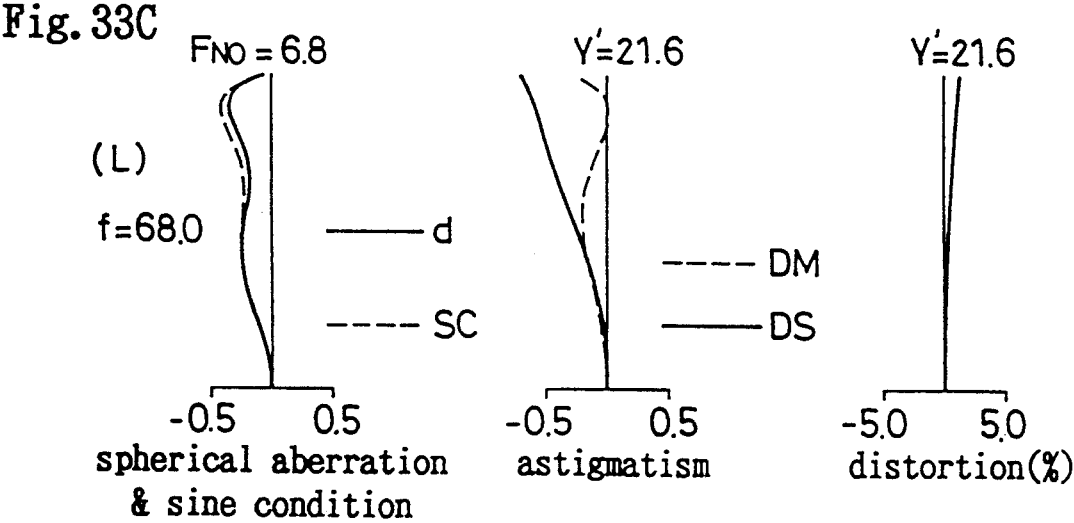
Figure 34A:
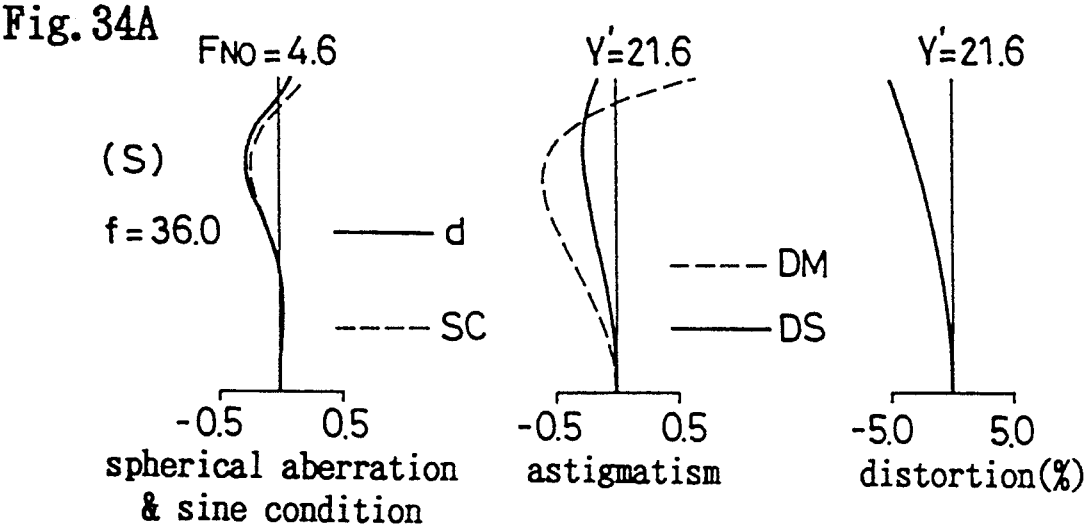
Figure 34B:
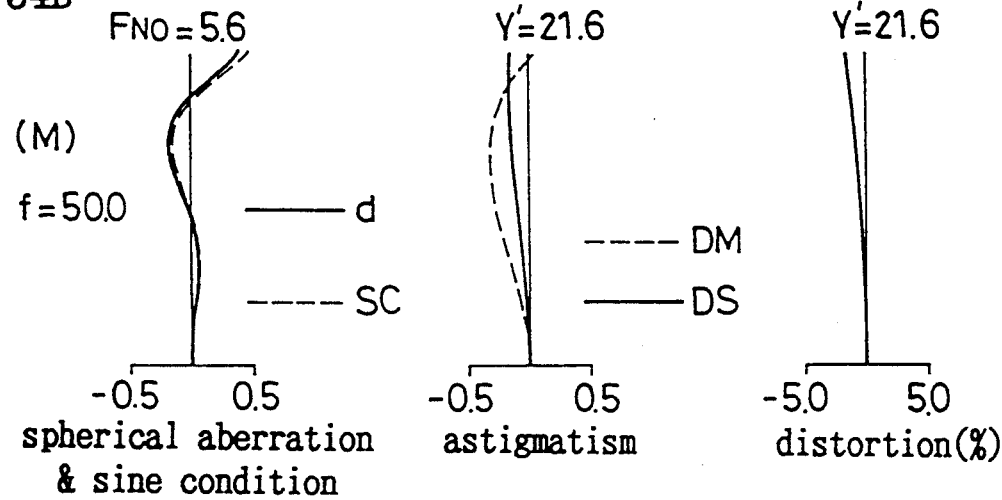
Figure 34C:
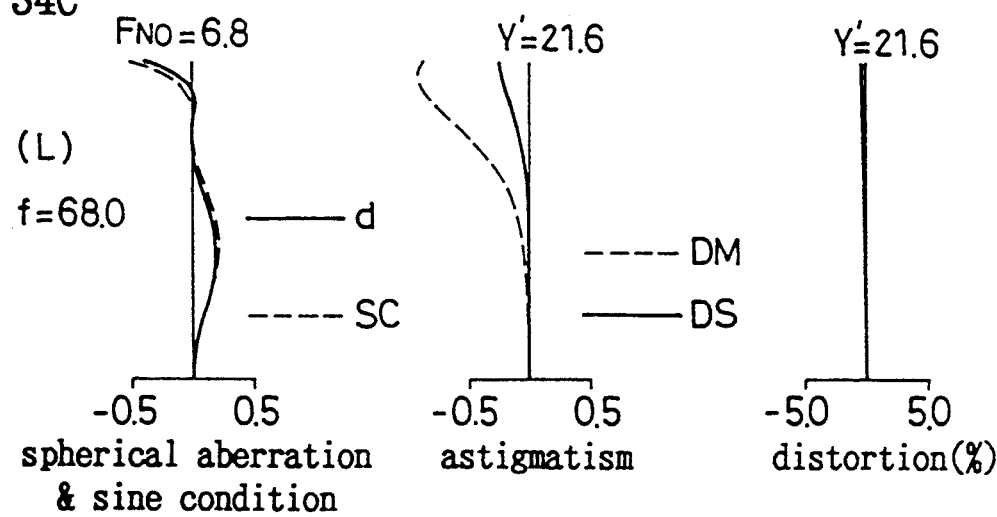
Figure 35A:
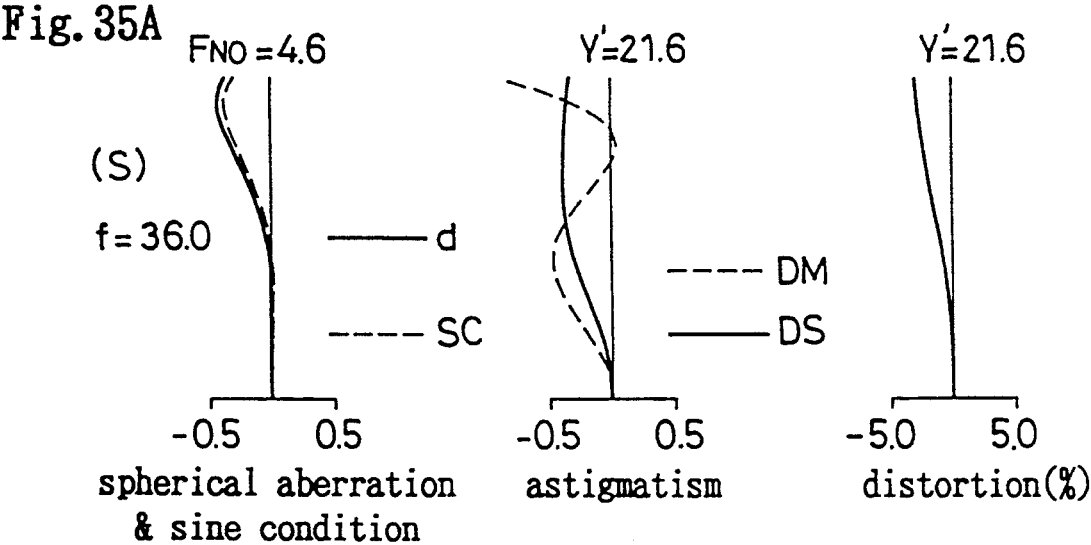
Figure 35B:
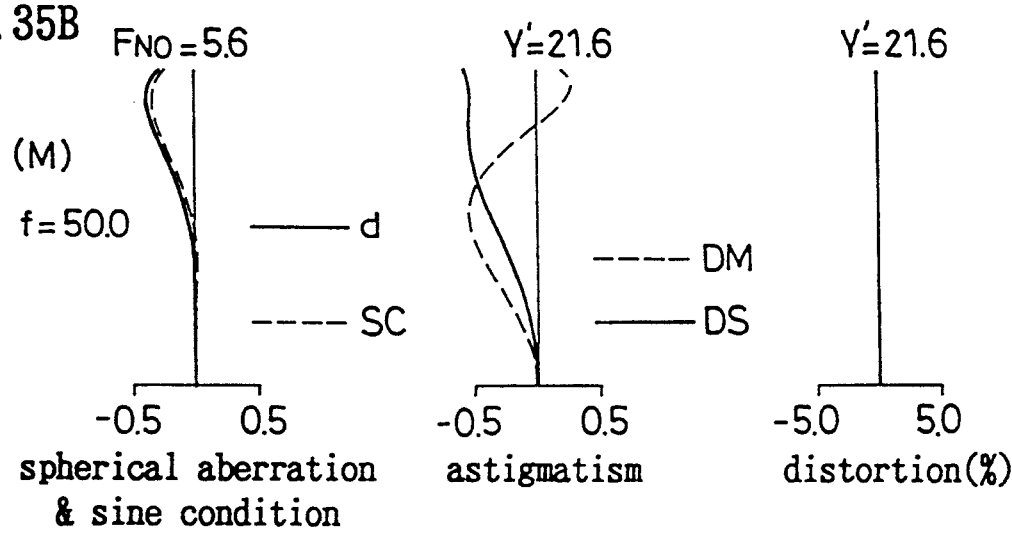
Figure 35C:
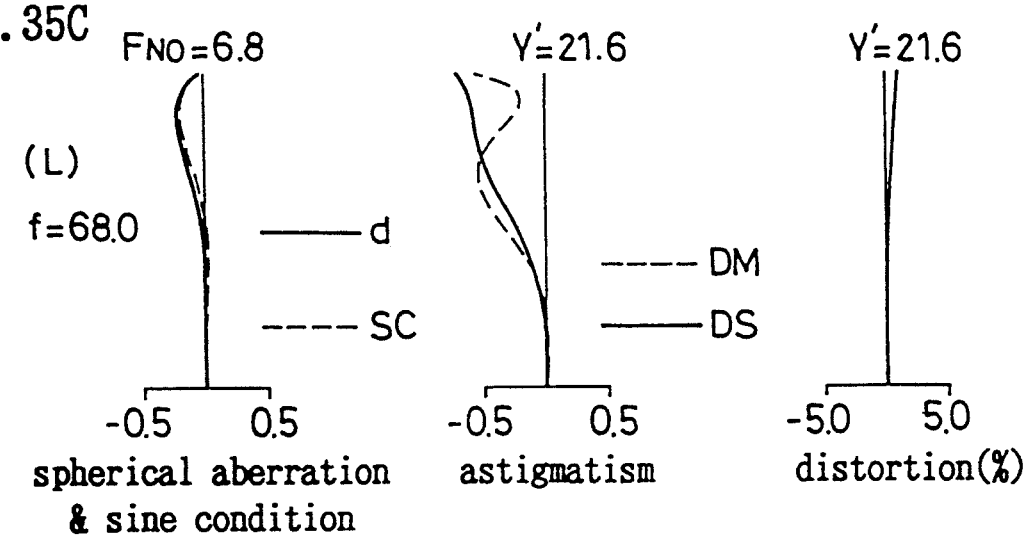
Figure 36A:
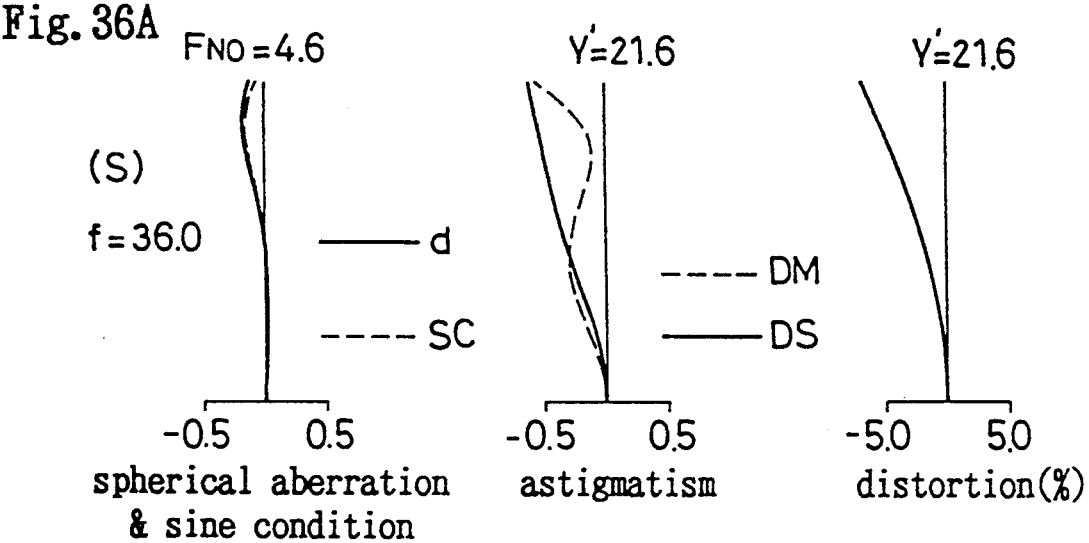
Figure 36B:
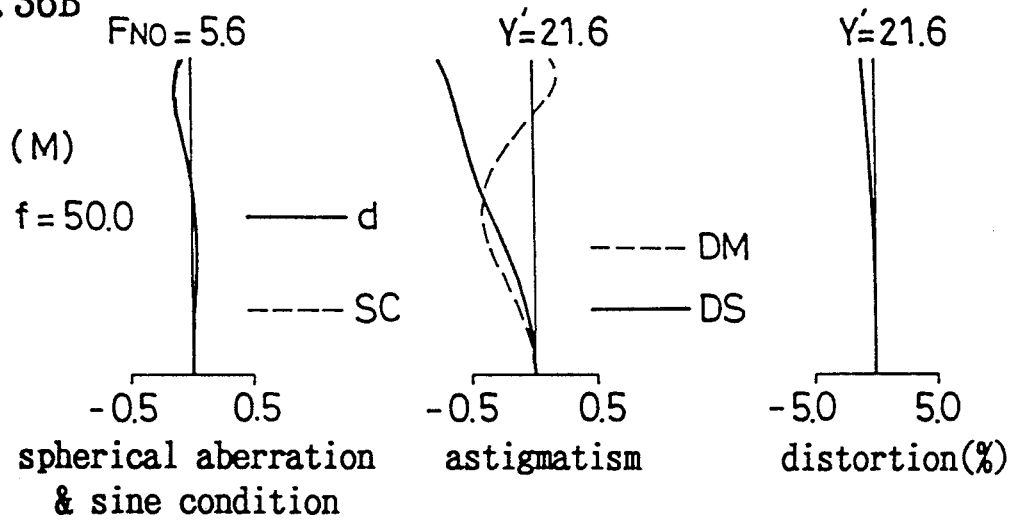
Figure 36C:
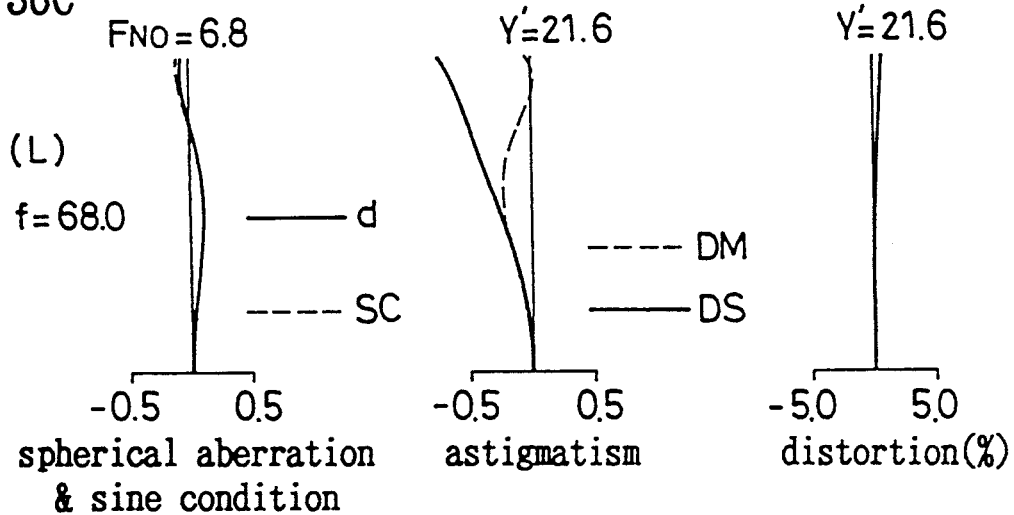
Figure 37A:
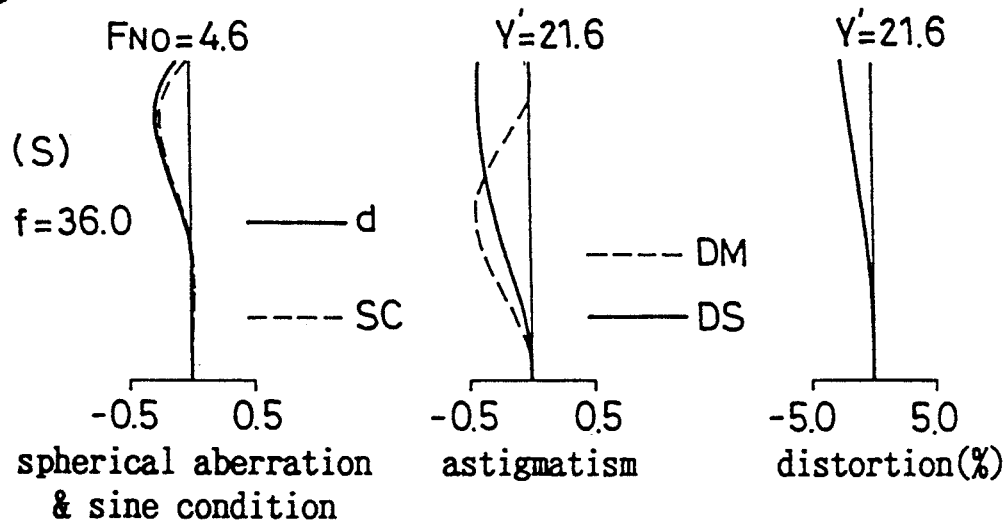
Figure 37B:
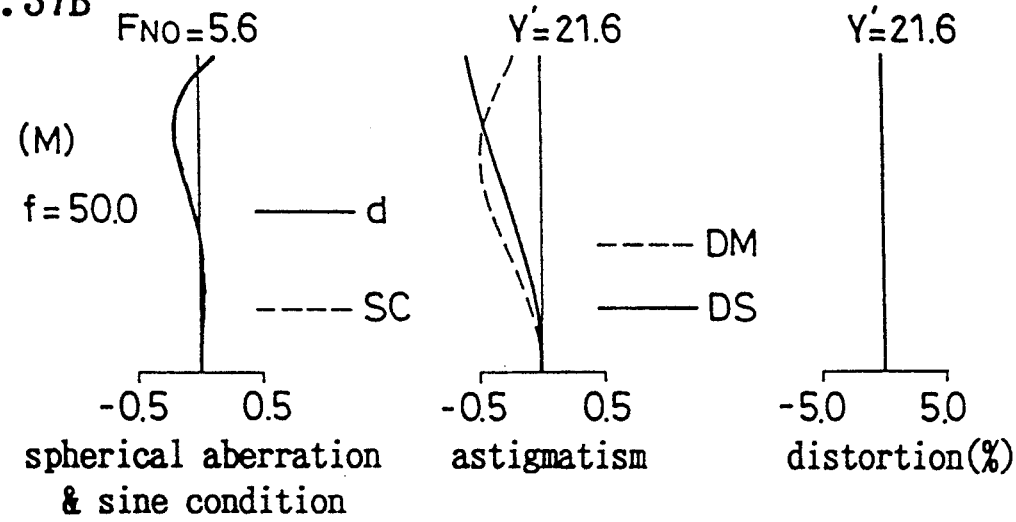
Figure 37C:
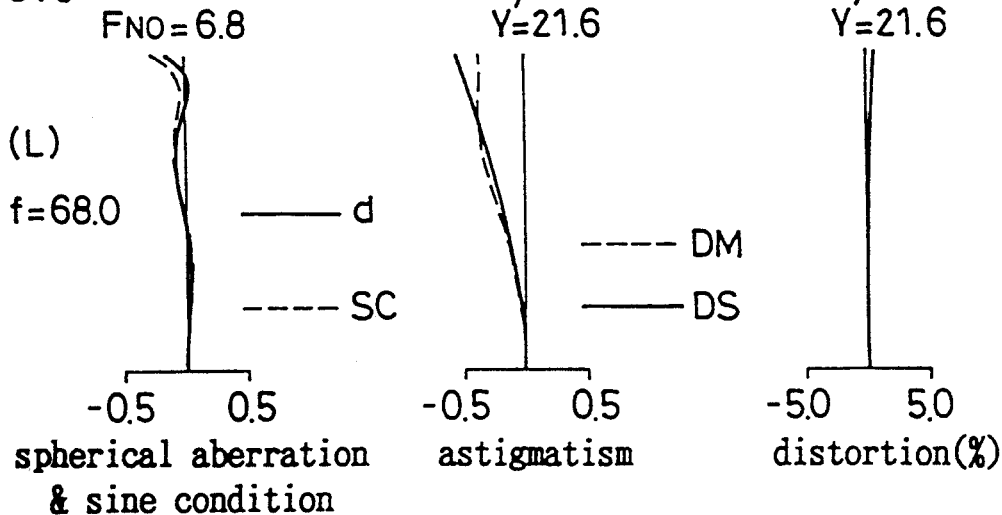
Figure 38A:
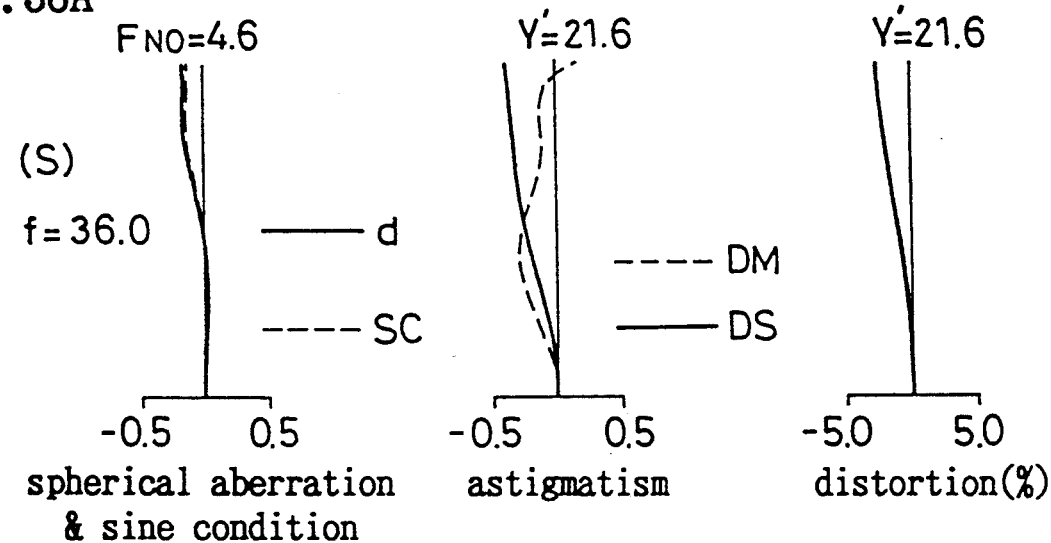
Figure 38B:
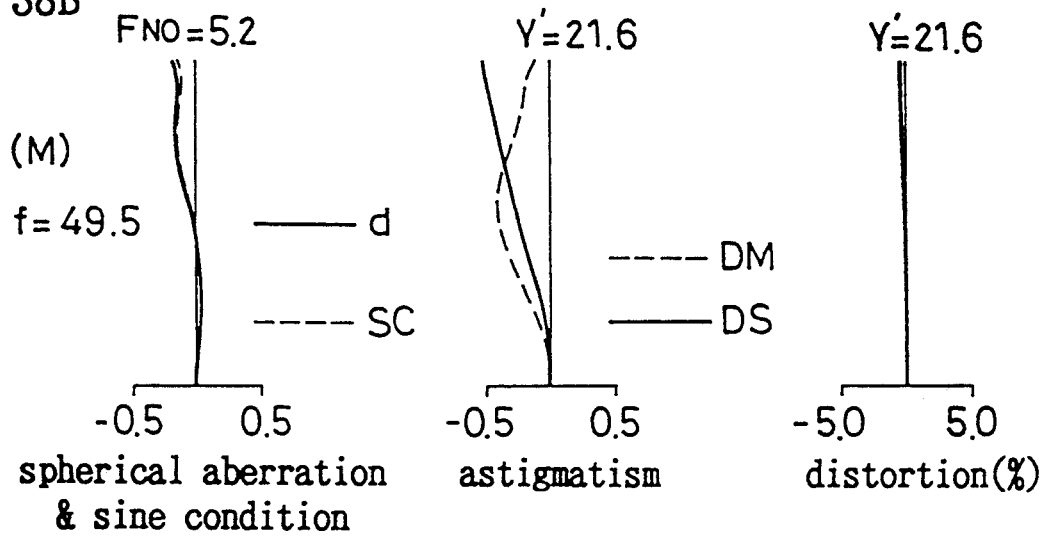
Figure 38C:
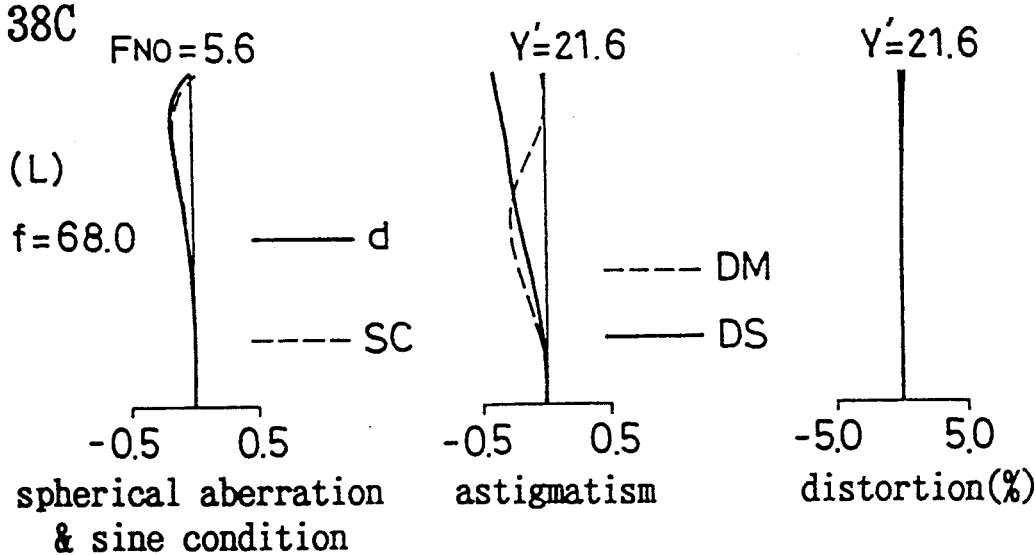
Figure 39A:
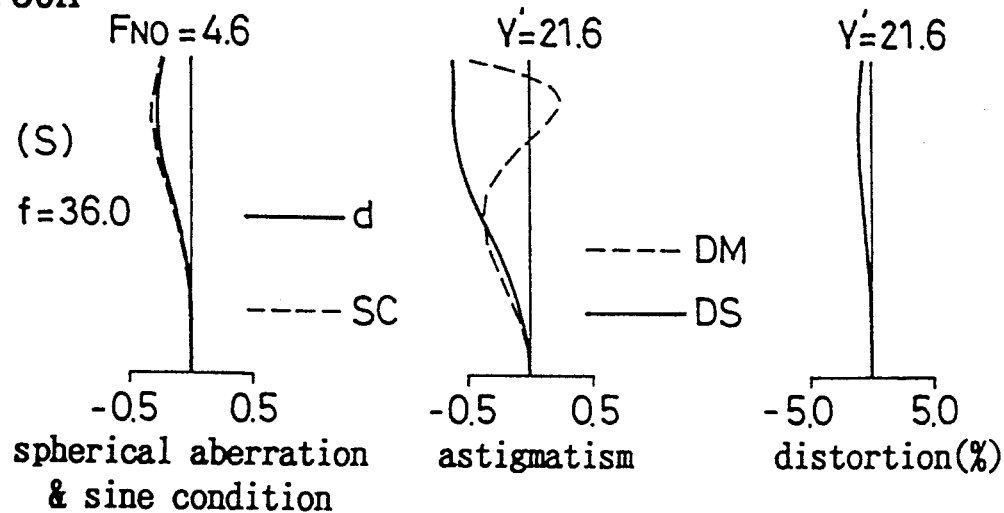
Figure 39B:
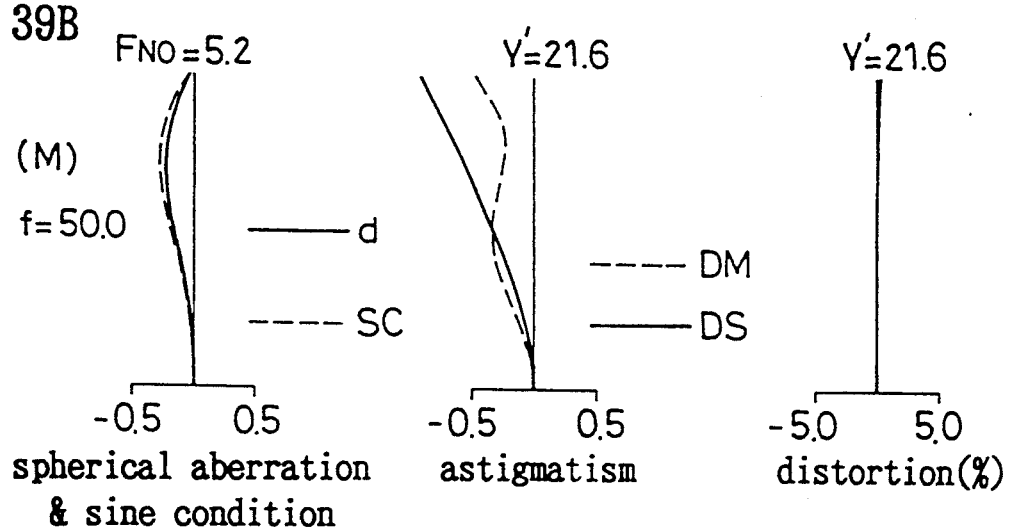
Figure 39C:
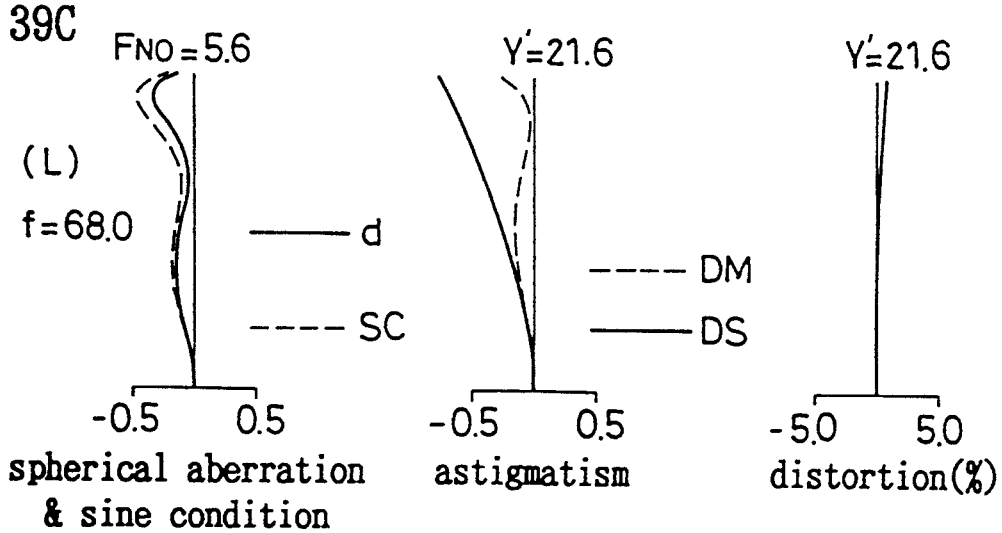
Figure 40A:
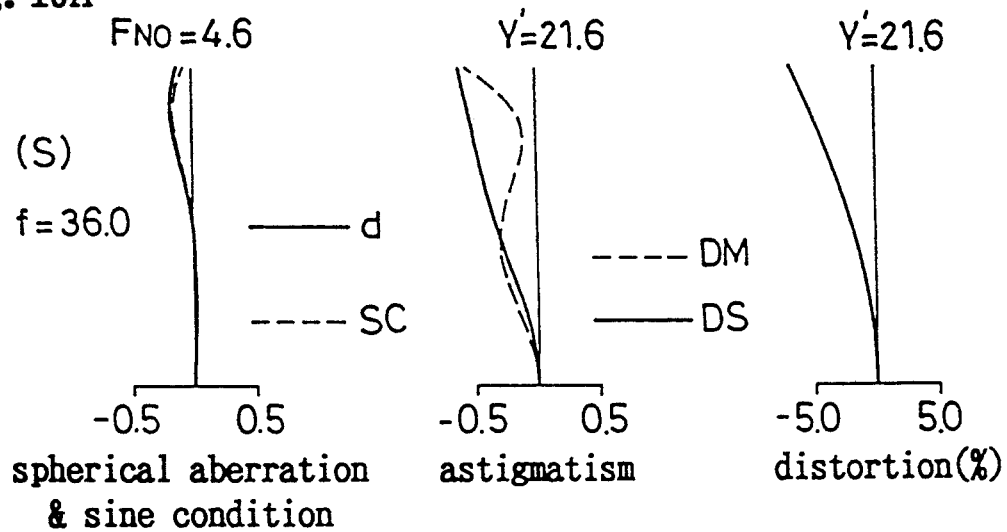
Figure 40B:
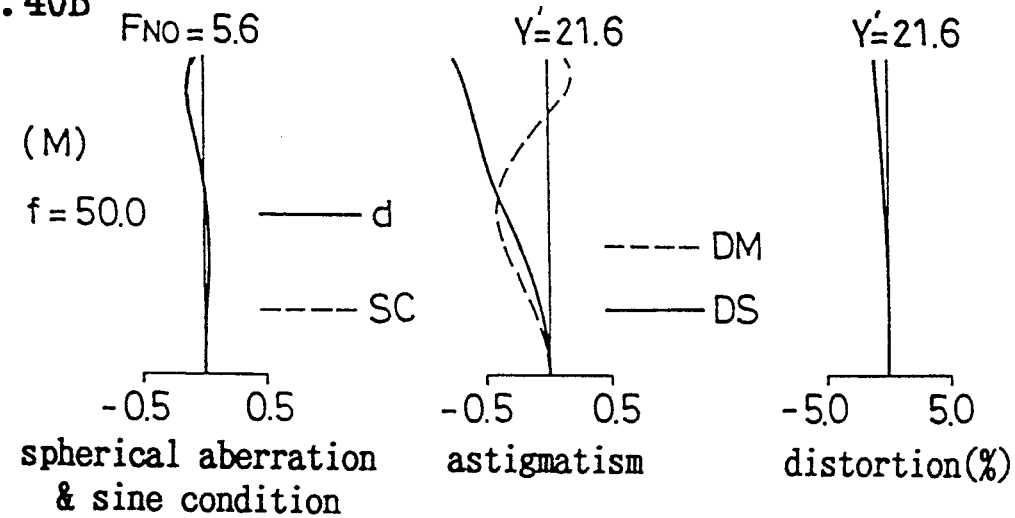
Figure 40C:
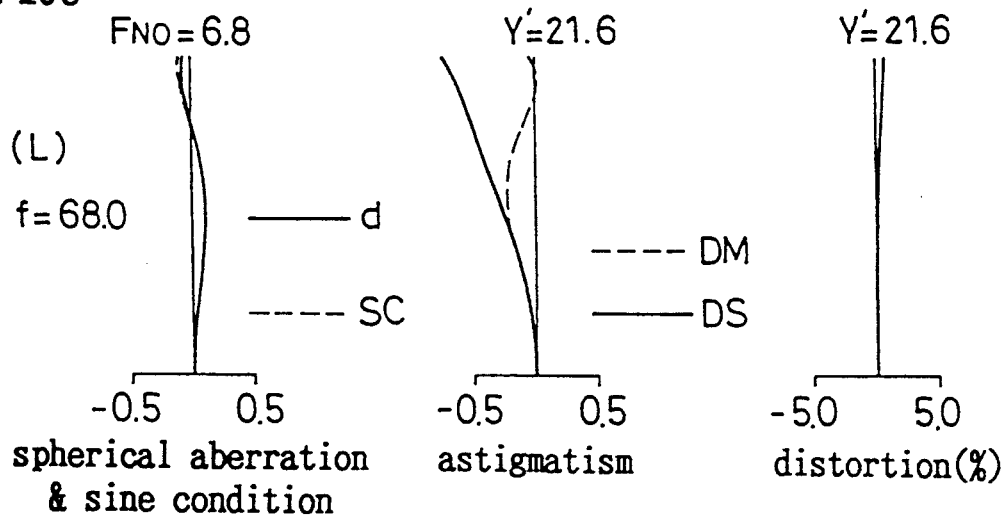
Figure 41A:
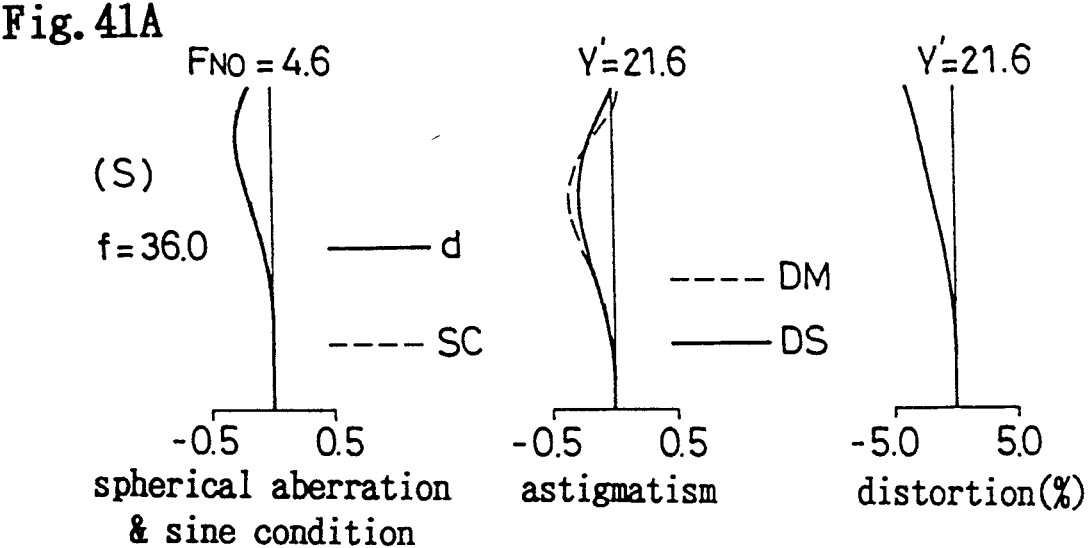
Figure 41B:
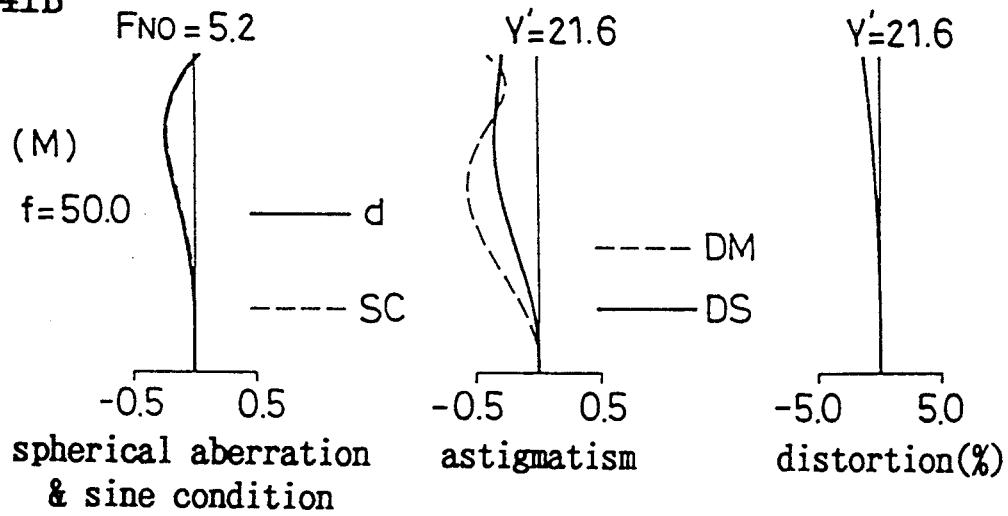
Figure 41C:
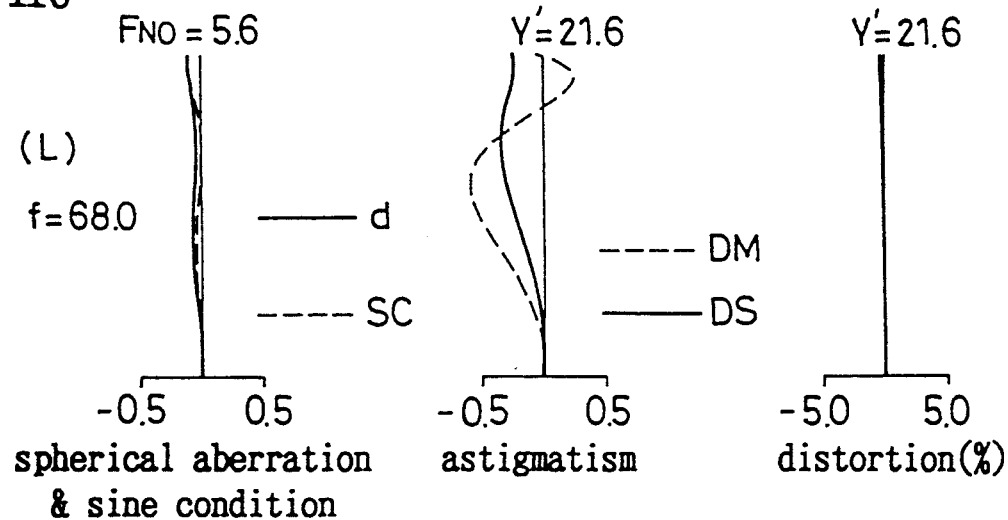
Figure 43A:
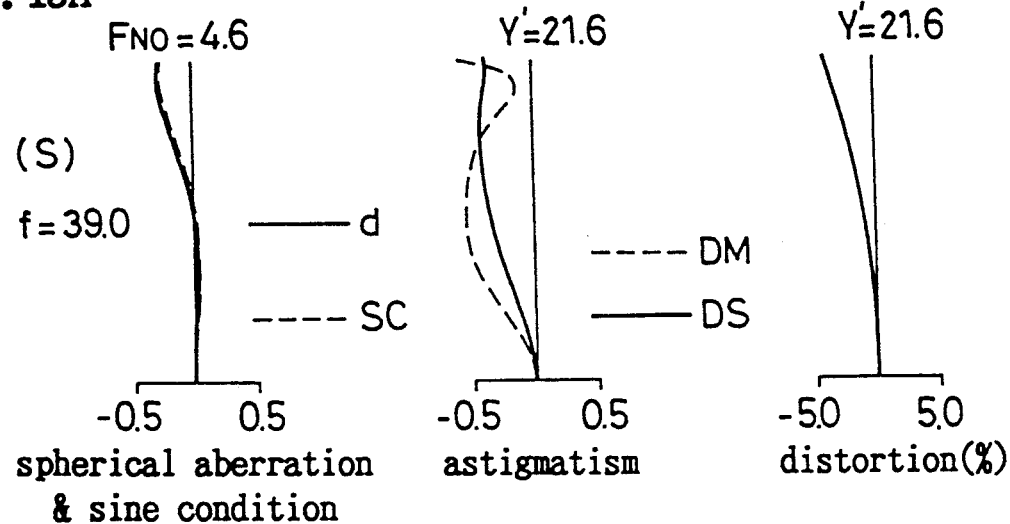
Figure 43B:
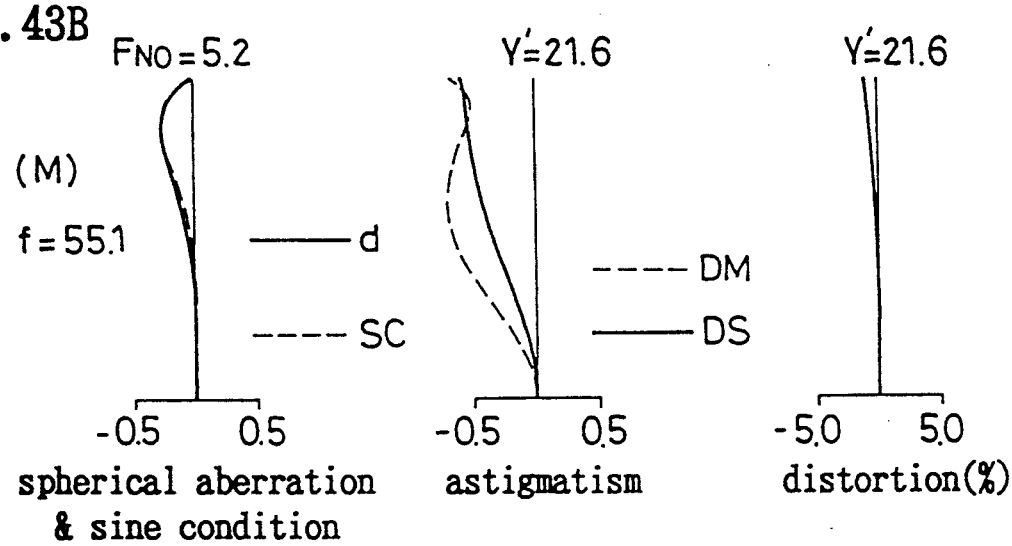
Figure 43C:
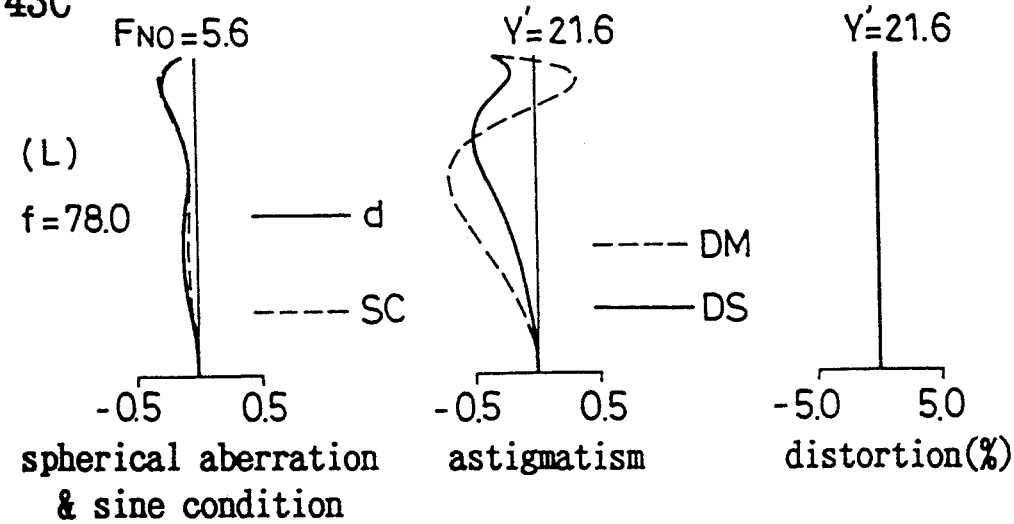
Figure 46A:
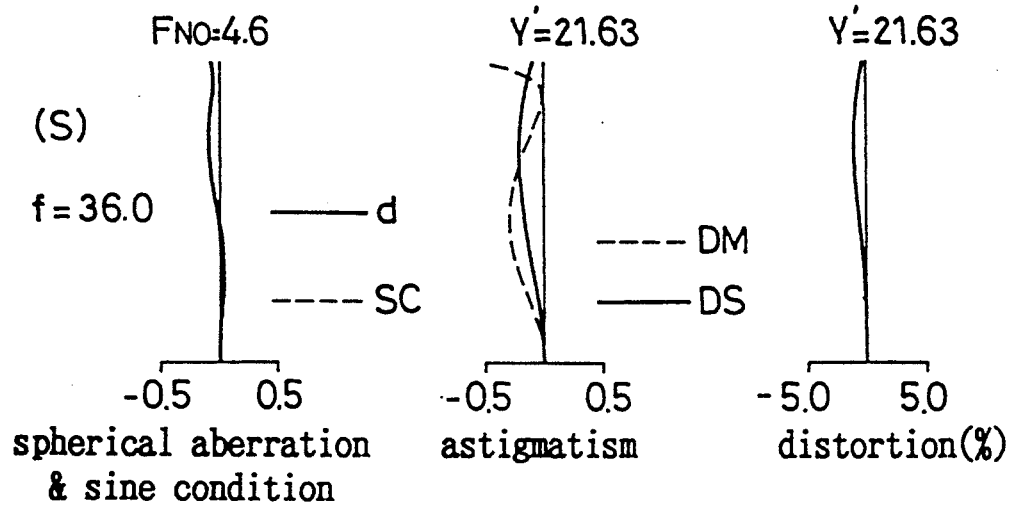
Figure 46B:
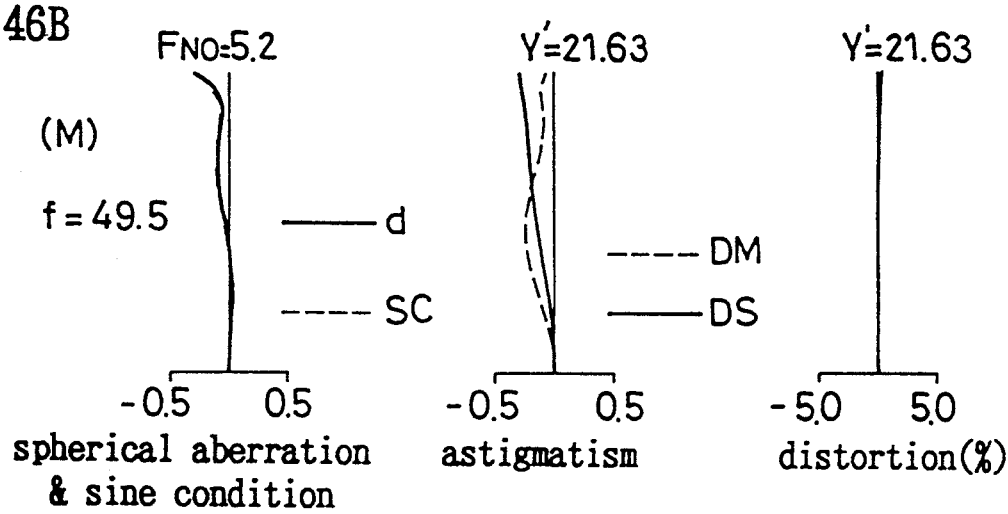
Figure 46C:
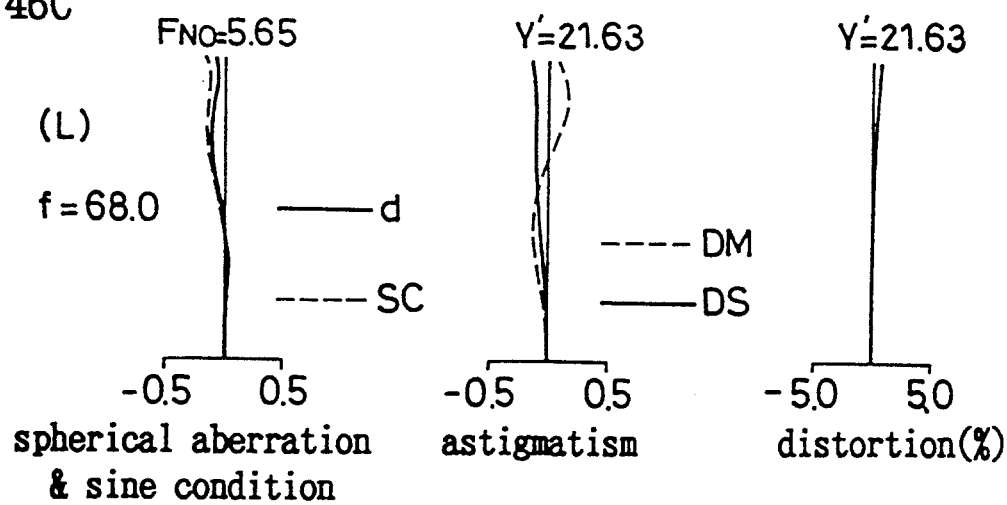
Figure 47A:
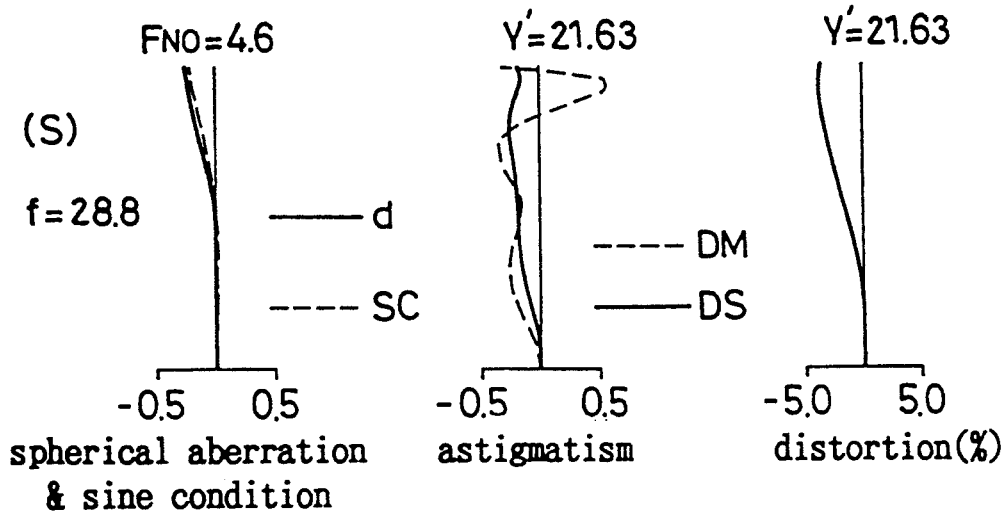
Figure 47B:
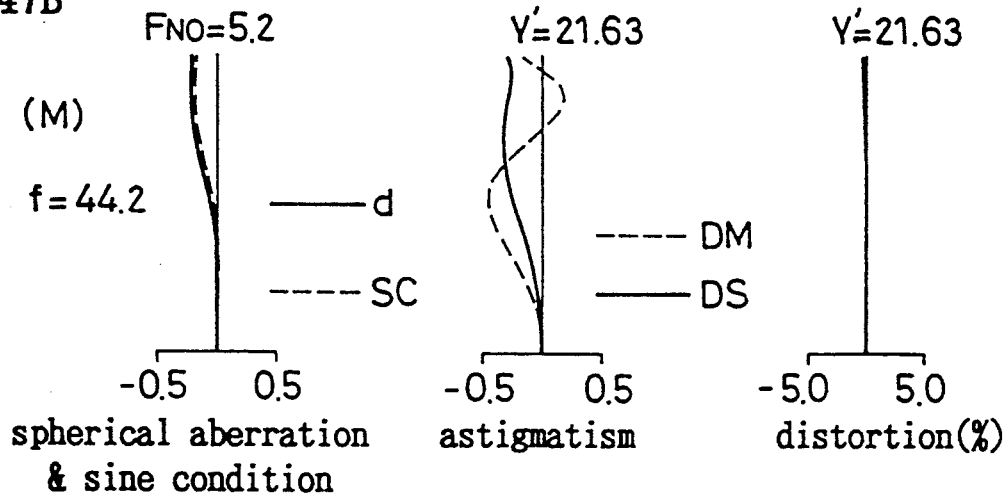
Figure 47C:
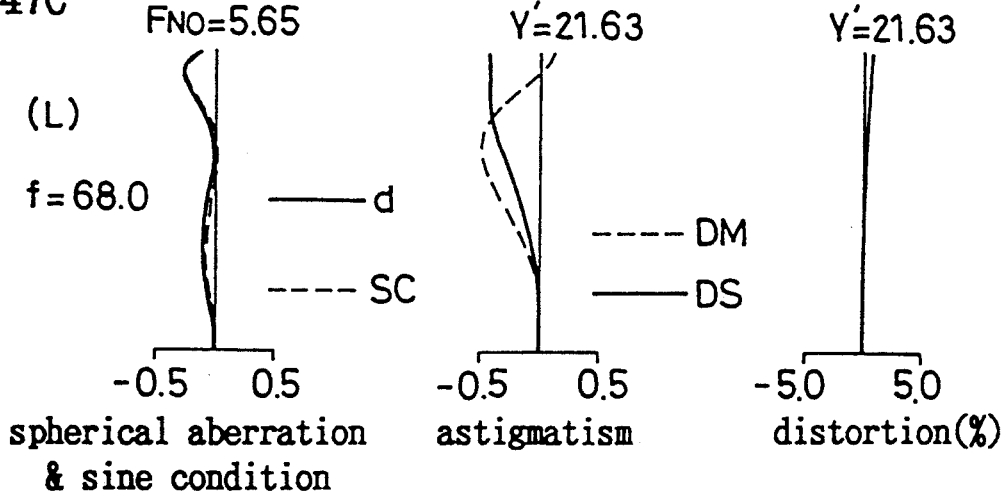
Figure 48A:
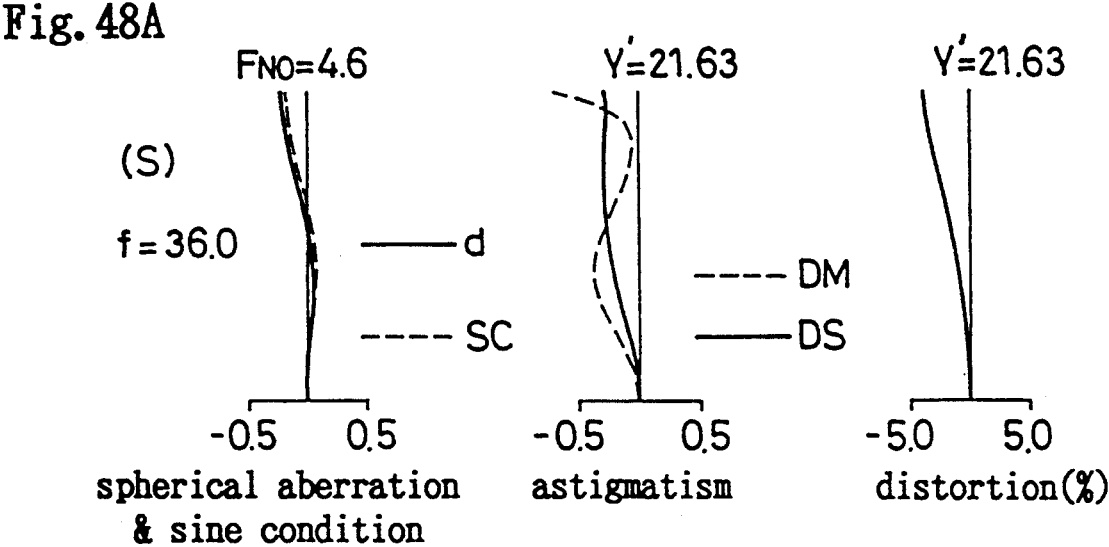
Figure 48B:
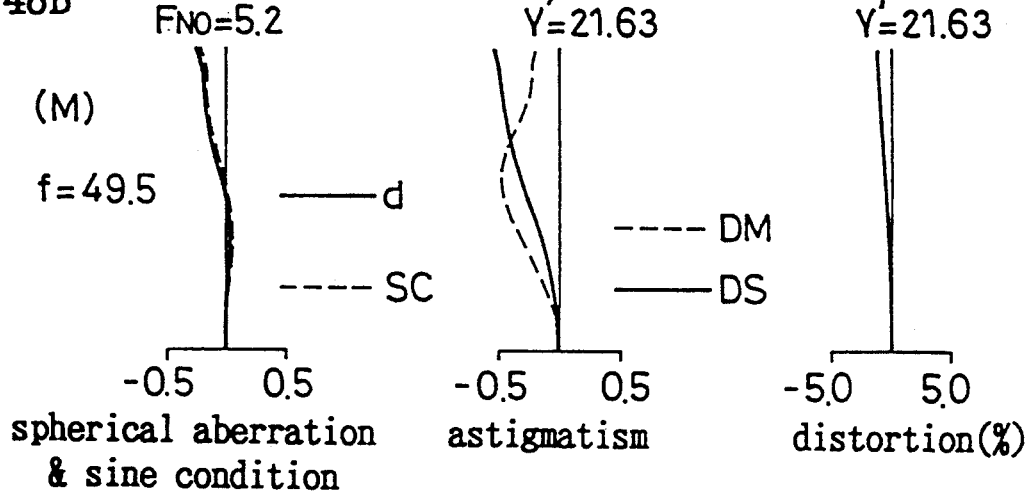
Figure 48C:
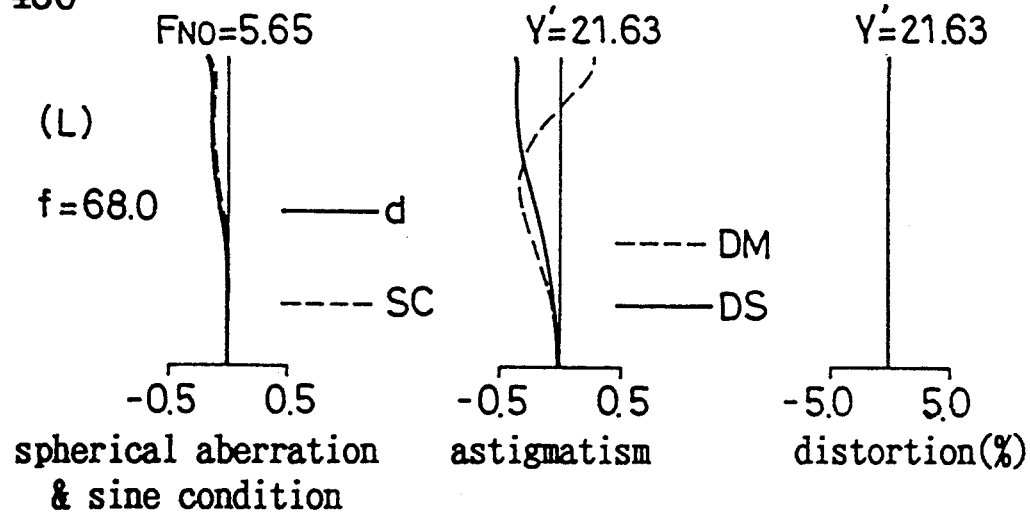
Figure 49A:
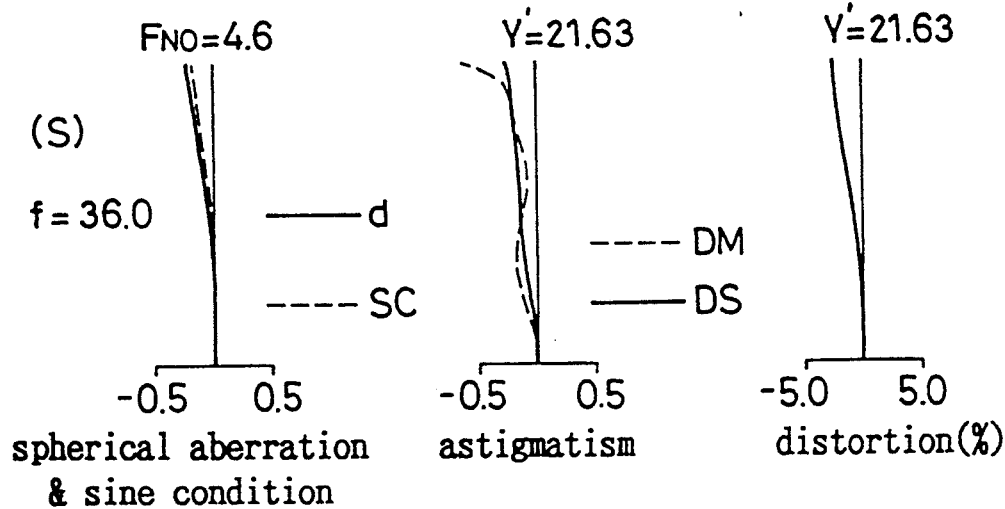
Figure 49B:
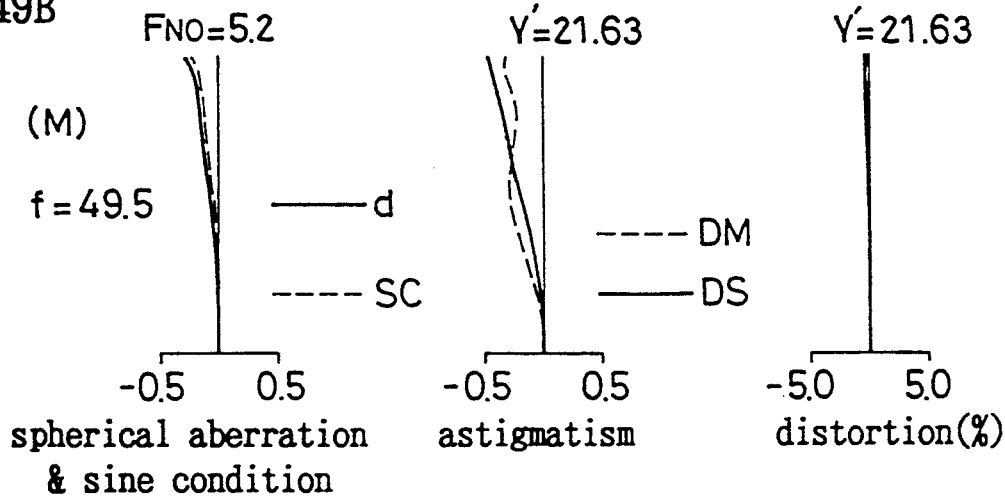
Figure 49C:
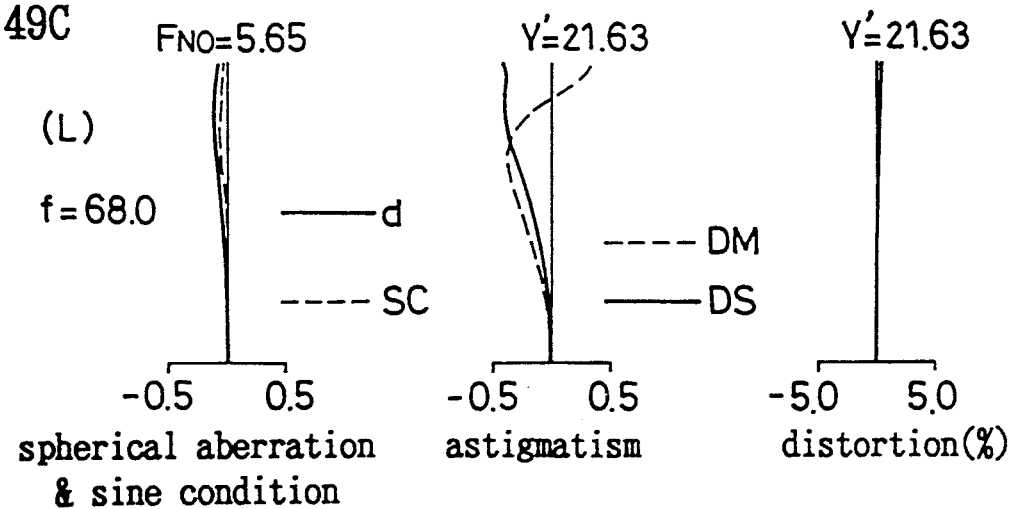
Figure 50A:
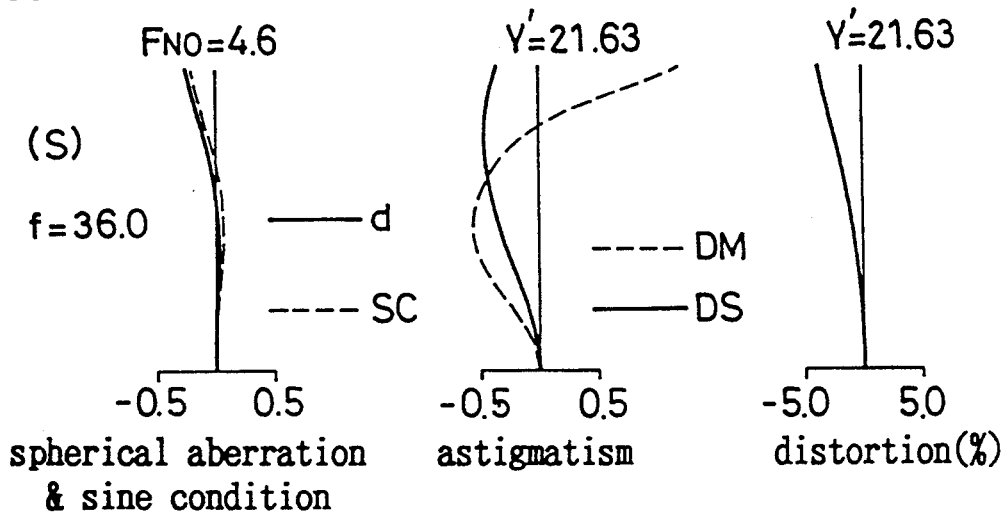
Figure 50B:
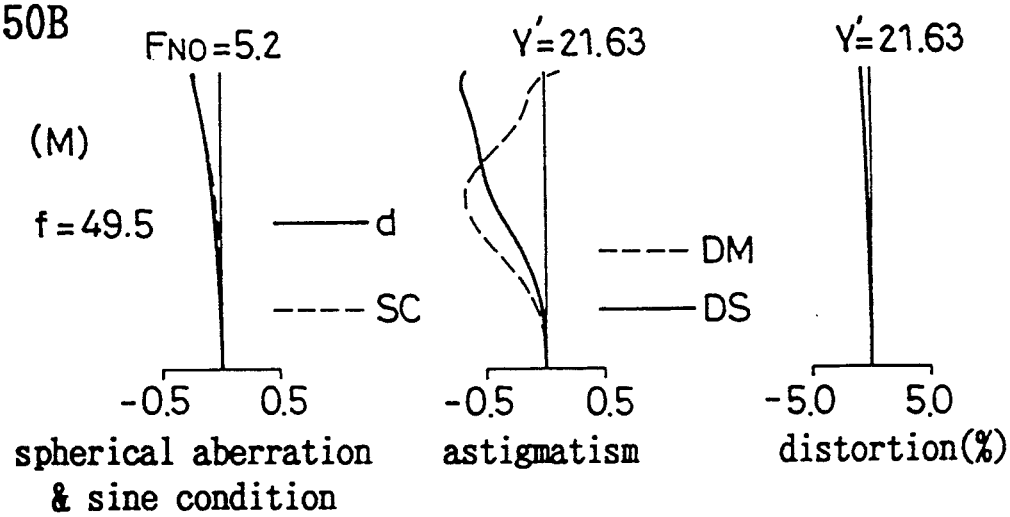
Figure 50C:
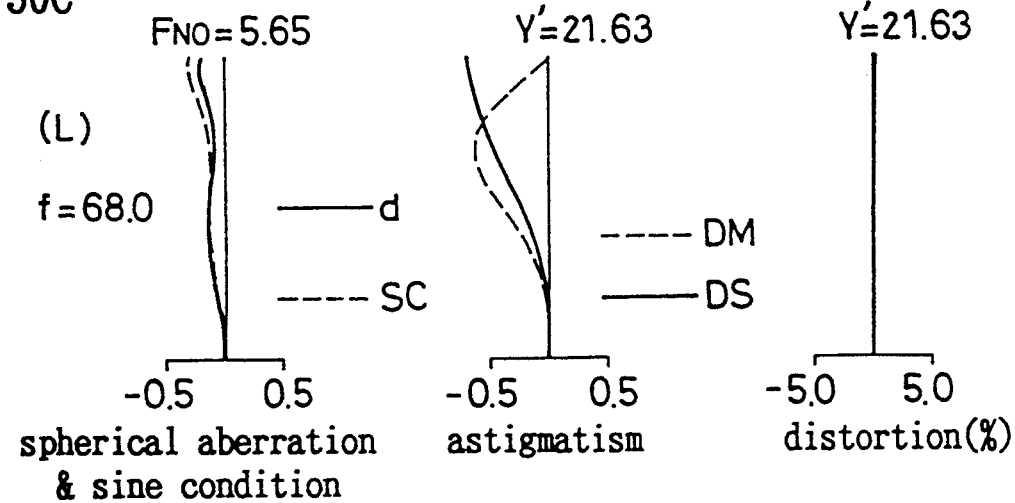
Figure 51A:
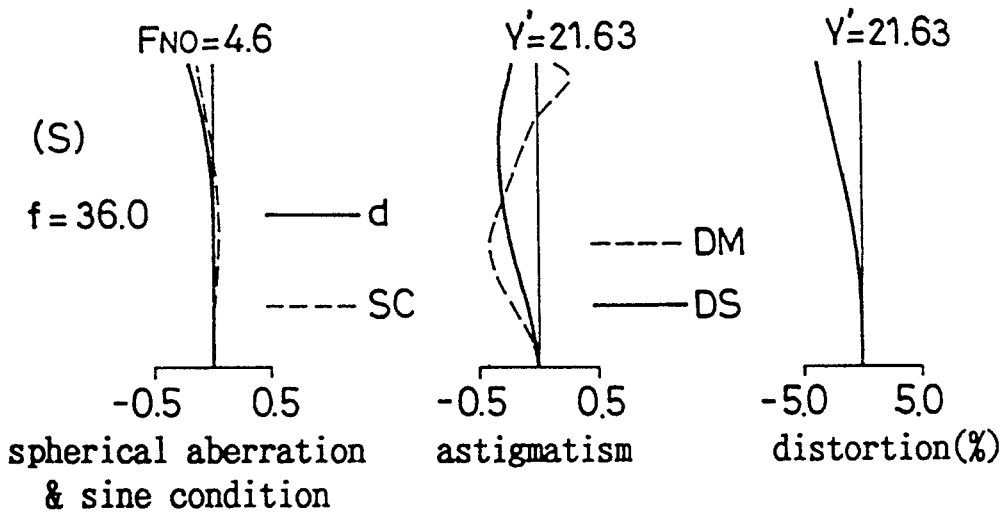
Figure 51B:
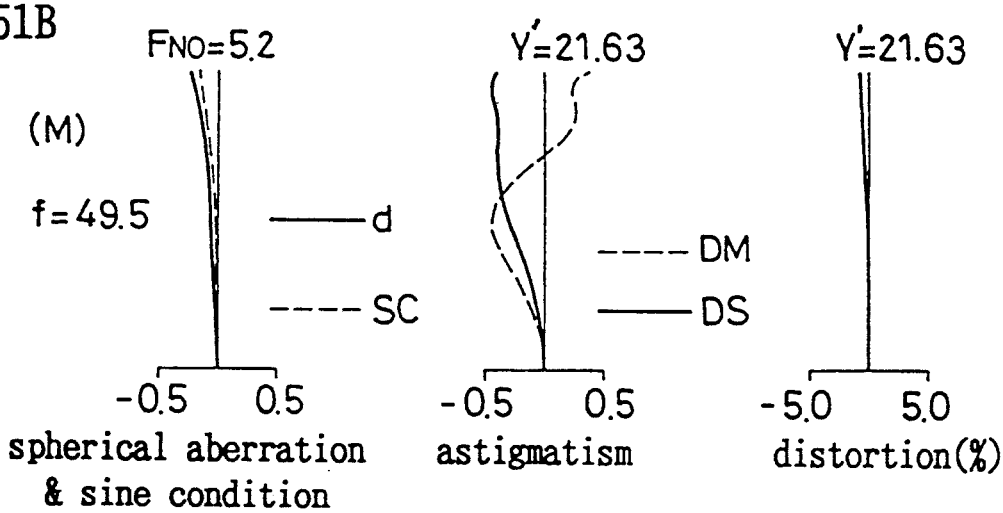
Figure 51C:
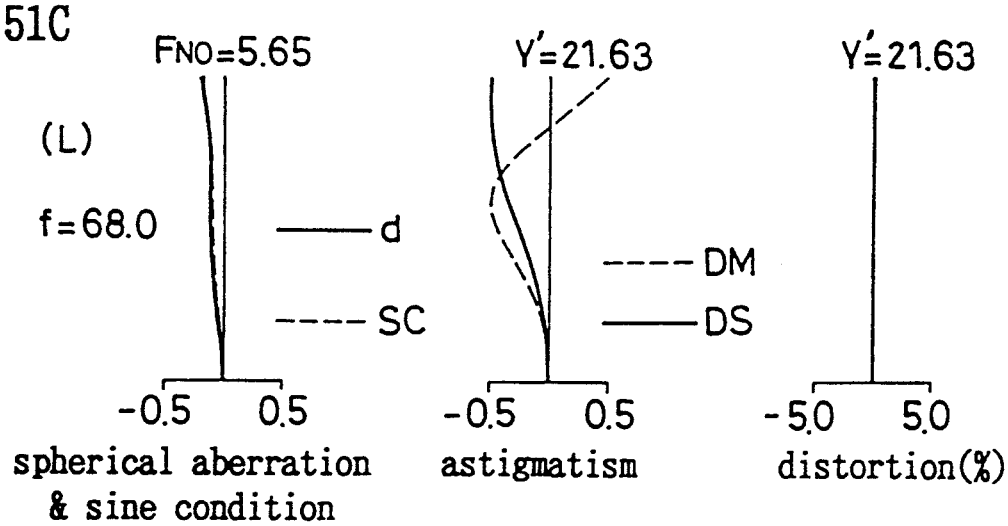
Figure 52A:
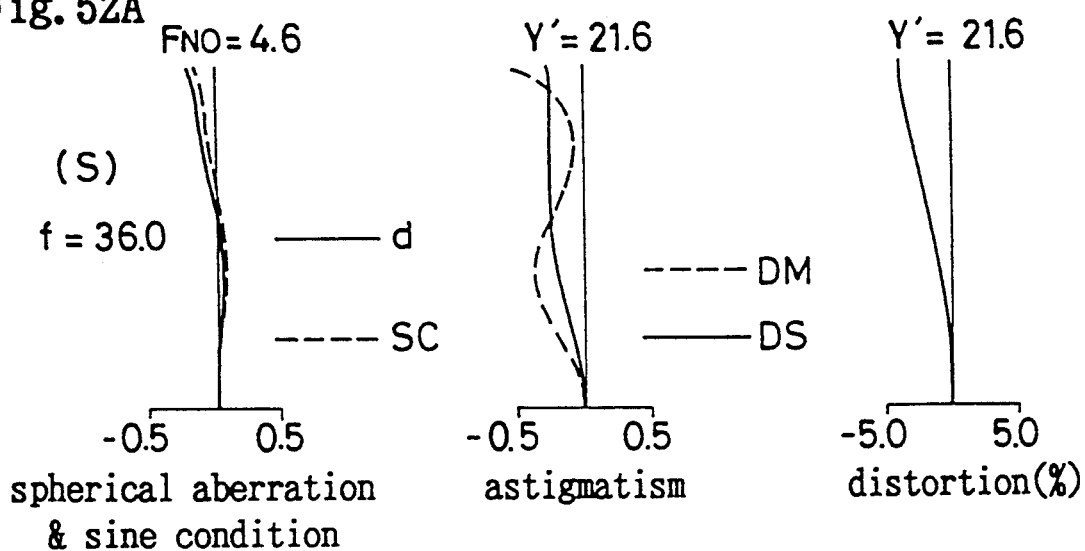
Figure 52B:
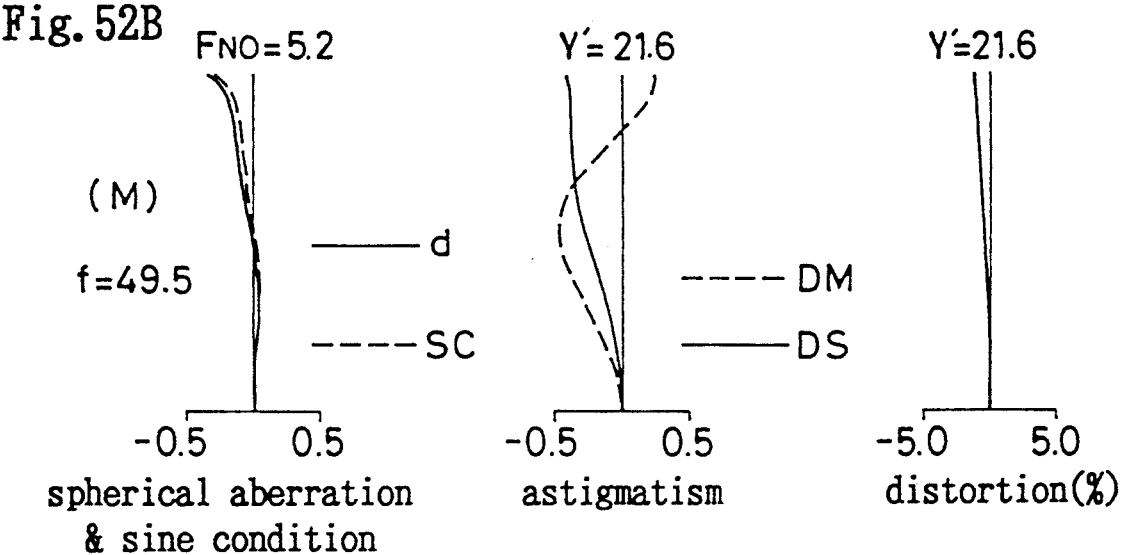
Figure 52C:
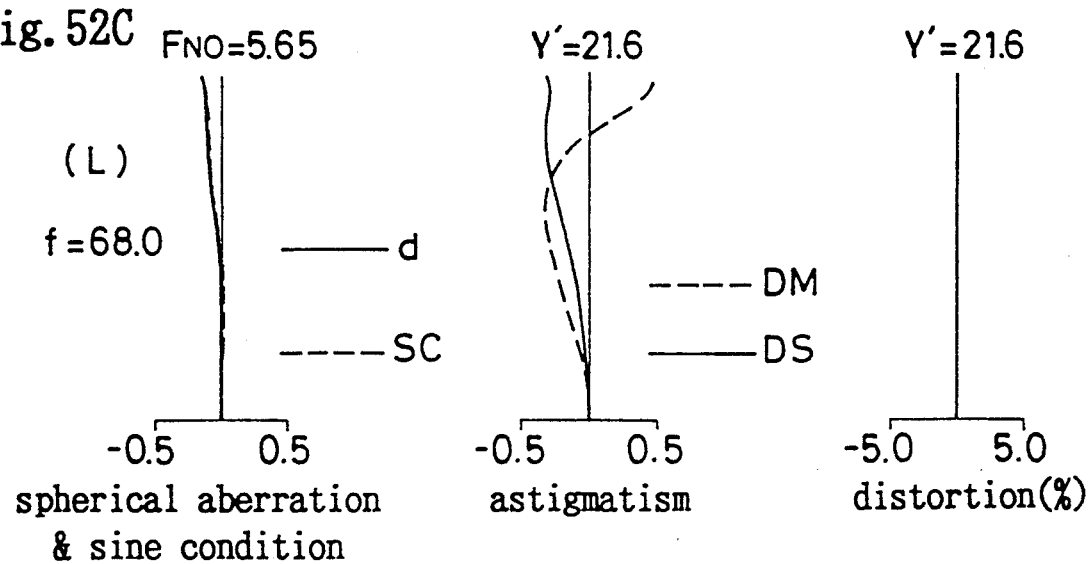
Figure 54A:
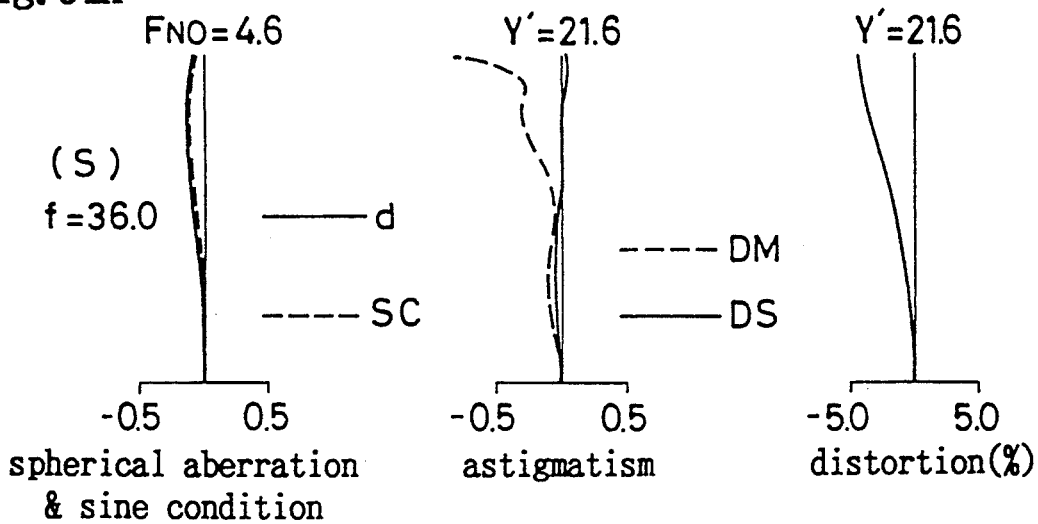
Figure 54B:
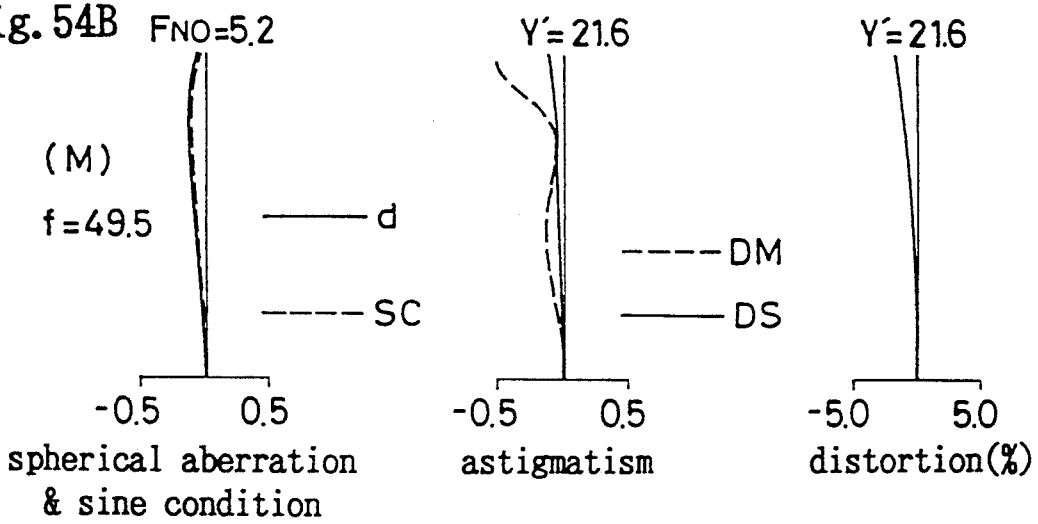
Figure 54C:
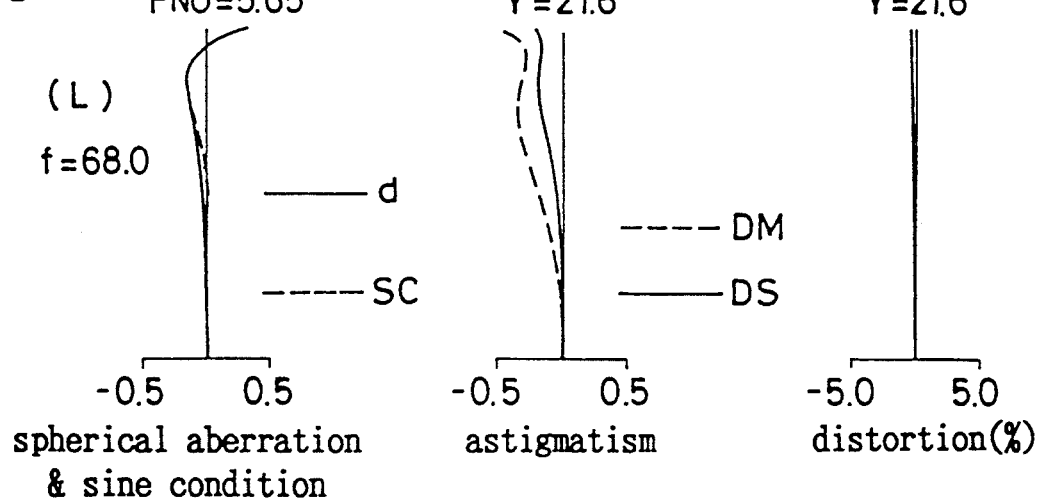

The twenty-eighth to thirtieth embodiments, shown in FIGS. 30 to 32, comprise, from the object side: a first lens component LI having a first lens element consisting of a negative meniscus lens element whose image side surface is concave and a second lens element consisting of a positive meniscus lens element whose object side surface is convex; an aperture A; a second lens component LII having a positive third lens element consisting of a bi-convex lens element and a negative fourth lens element consisting of a bi-concave lens element; and a third lens component LIII having a fifth lens element consisting of a negative meniscus lens element whose image side surface is concave. In the twenty-eighth embodiment, the object side surface of the first lens element, both of the surfaces of the second lens element, the object side surface of the third lens element, both of the surfaces of the fourth lens element and the image side surface of the fifth lens element are aspherical. In the twenty-ninth and thirtieth embodiments, the object side surface of the first lens element, both of the surfaces of the second lens element, the object side surface of the third lens element, both of the surfaces of the fourth lens element and both of the surfaces of the fifth lens element are aspherical.

FIGS. 33 to 62 show the aberrations of the above-described first to thirtieth embodiments, respectively. In each figure, (S) shows the aberrations at the shortest focal length condition; (M), those at the middle focal length condition; and (L), those at the longest focal length condition. A solid line d shows aberration to the d-line. A dotted line SC shows a sine condition. Dotted lines DM and DS show astigmatism on a meridional and a sagittal image planes, respectively.

Next, data of compact zoom lens systems of first to thirtieth embodiments according to the present invention will be shown in Tables 1 to 30.

In each Table, $r_i$ represents a radius of curvature of an ith lens surface counted from the object side;

$d_i$ represents an axial distance of an ith lens surface counted from the object side;

$N_i$ and $\nu_i$ represent a refractive index and an Abbe number to the d-line of an ith lens surface, respectively;

f represents a focal length of the whole zoom lens system; and $F_{NO}$ represents an F-number.

Moreover, in each Table, a * mark in the radius of curvature column indicates that the surface is aspherical and is defined by the above-described equation which represents a configuration X(y) of an aspherical surface.

Table 31 shows the values of $(\phi_W \cdot \phi_T)^{\frac{1}{2}}/(\beta \cdot \phi_1)$ in the condition (9) and those of $(\phi_W \cdot \phi_T)^{\frac{1}{2}}/(\beta \cdot \phi_2)$ in the condition (10) with respect to the above-described first to sixth embodiments.

Table 32 shows the values of $\phi_1/\phi_W$ in the condition (11) and those of $\phi_2/\phi_W$ in the condition (12) with respect to the above-described first to sixth embodiments.

In Tables 33 to 38, with respect to the aspherical surfaces of the above-described first to sixth embodiments, (I) shows the values of $$\phi_1 \cdot (N'-N) \cdot d/dy \cdot \{X(y) - X_o(y)\}$$

in the conditions (3), (4) and (5), and (II) shows the values of $$\phi_2 \cdot (N'-N) \cdot d/dy \cdot \{X(y) - X_o(y)\}$$

in the conditions (6), (7) and (8).

Table 39 shows the values of $(\phi_W \cdot \phi_T)^{\frac{1}{2}}/(\beta \cdot \phi_1)$ in the condition (9) and those of $(\phi_W \cdot \phi_T)^{\frac{1}{2}}/(\beta \cdot \phi_2)$ in the condition (10) with respect to the above-described seventh to eleventh embodiments.

Table 40 shows the values of $\phi_1/\phi_W$ in the condition (11) and those of $\phi_2/\phi_W$ in the condition (12) with respect to the above-described seventh to eleventh embodiments.

In Tables 41 to 45, with respect to the aspherical surfaces of the above-described seventh to eleventh embodiments, (I) shows the values of $$\phi_1 \cdot (N'-N) \cdot d/dy \cdot \{X(y) - X_o(y)\}$$

in the conditions (3), (4) and (5), and (II) shows the values of $$\phi_2 \cdot (N'-N) \cdot d/dy \cdot \{X(y) - X_o(y)\}$$

in the conditions (6), (7) and (8).

Table 46 shows the values of $|(\phi_W \cdot \phi_T)^{\frac{1}{2}}/(\beta \cdot \phi_1)|$ in the condition (9) and those of $(\phi_W \cdot \phi_T)^{\frac{1}{2}}/(\beta \cdot \phi_2)$ in the condition (10) with respect to the above-described fourteenth to nineteenth embodiments.

Table 47 shows the values of $|\phi_1/\phi_W|$ in the condition (11) and those of $\phi_2/\phi_W$ in the condition (12) with respect to the above-described fourteenth to nineteenth embodiments.

In Tables 48 to 53, with respect to the aspherical surfaces of the above-described fourteenth to nineteenth embodiments, (I) shows the values of $$\phi_1 \cdot (N'-N) \cdot d/dy \cdot \{X(y) - X_o(y)\}$$

in the conditions (16) and (21), and (II) shows the values of $$\phi_2 \cdot (N'-N) \cdot d/dy \cdot \{X(y) - X_o(y)\}$$

in the conditions (6), (7) and (8).

Table 54 shows the values of $|(\phi_W \cdot \phi_T)^{\frac{1}{2}}/(\beta \cdot \phi_1)|$ in the condition (9) and those of $(\phi_W \cdot \phi_T)^{\frac{1}{2}}/(\beta \cdot \phi_2)$ in the condition (10) with respect to the above-described twentieth to twenty-second embodiments.

Table 55 shows the values of $|\phi_1/\phi_W|$ in the condition (11), those of $\phi_2/\phi_W$ in the condition (12), and those of $(r_F - r_B)/r_F + r_B)$ in the condition (2) with respect to the above-described twentieth to twenty-second embodiments.

In Tables 56 to 58, with respect to the aspherical surfaces of the above-described twentieth to twenty-second embodiments, (I) shows the values of $$\phi_1 \cdot (N'-N) \cdot d/dy \cdot \{X(y) - X_o(y)\}$$

in the conditions (15) and (16), and (II) shows the values of $$\phi_2 \cdot (N'-N) \cdot d/dy \cdot \{X(y) - X_o(y)\}$$

in the conditions (6), (7) and (8).

Table 59 shows the values of $|\phi_1|/\phi_W$ in the condition (17) and those of $|\phi_3|/\phi_W$ in the condition (18) with respect to the above-described twenty-third to thirtieth embodiments.

In Tables 60 to 67, with respect to the above-described twenty-third to thirtieth embodiments, (I) shows the values of $$\phi_1 \cdot (N'-N) \cdot d/dy \cdot \{X(y) - X_o(y)\}$$

in the conditions (19), (20) and (21), (II) shows those of $$\phi_2 \cdot (N'-N) \cdot d/dy \cdot \{X(y) - X_o(y)\}$$

in the conditions (22), (23) and (24), and (III) shows those of $$\phi_3 \cdot (N'-N) \cdot d/dy \cdot \{X(y) - X_o(y)\}$$

in the conditions (25), (26) and (27).

Obviously, many modifications and variations of the present invention are possible in light of the above teachings. It is therefore to be understood that within the scope of the appended claims, the invention may be practiced other than as specifically described.

TABLE 1

<Embodiment 1>
$f = 36.0 \sim 50.0 \sim 68.0$     $F_{NO} = 4.6 \sim 5.6 \sim 6.8$

| Radius of Curvature | Axial Distance | Refractive Index | Abbe Number |
|---|---|---|---|

TABLE 1-continued

| Curvature | Distance | Index | Number |
|---|---|---|---|
| $r_1$ 44.396 | | | |
| | $d_1$ 0.955 | $N_1$ 1.74400 | $\nu_1$ 44.93 |
| $r_2$ 11.653 | | | |
| | $d_2$ 4.801 | | |
| $r_3$ 25.750 | | | |
| | $d_3$ 3.110 | $N_2$ 1.58340 | $\nu_2$ 30.23 |
| $r_4^*$ 83.136 | | | |
| | $d_4$ 16.763~8.711~3.230 | | |
| $r_5^*$ 12.431 | | | |
| | $d_5$ 5.638 | $N_3$ 1.51680 | $\nu_3$ 64.20 |
| $r_6$ −61.232 | | | |
| | $d_6$ 4.299 | | |
| $r_7^*$ −43.590 | | | |
| | $d_7$ 3.459 | $N_4$ 1.84666 | $\nu_4$ 23.82 |
| $r_8^*$ 304.102 | | | |

| Aspherical coefficient | |
|---|---|
| $r_4$: | $\epsilon = 0.97677$ |
| | $A_4 = -0.46960 \times 10^{-4}$ |
| | $A_6 = 0.18970 \times 10^{-6}$ |
| | $A_8 = -0.10218 \times 10^{-7}$ |
| | $A_{10} = 0.92120 \times 10^{-10}$ |
| | $A_{12} = 0.98648 \times 10^{-13}$ |
| $r_5$: | $\epsilon = 0.13064 \times 10$ |
| | $A_4 = -0.44294 \times 10^{-4}$ |
| | $A_6 = -0.32517 \times 10^{-6}$ |
| | $A_8 = -0.63065 \times 10^{-9}$ |
| | $A_{10} = -0.74042 \times 10^{-11}$ |
| | $A_{12} = -0.17854 \times 10^{-13}$ |
| $r_7$: | $\epsilon = 0.10010 \times 10$ |
| | $A_4 = 0.90729 \times 10^{-4}$ |
| | $A_6 = -0.14917 \times 10^{-6}$ |
| | $A_8 = -0.96660 \times 10^{-8}$ |
| | $A_{10} = -0.61239 \times 10^{-10}$ |
| | $A_{12} = -0.25320 \times 10^{-12}$ |
| $r_8$: | $\epsilon = 0.93899$ |
| | $A_4 = 0.17872 \times 10^{-3}$ |
| | $A_6 = 0.41747 \times 10^{-6}$ |
| | $A_8 = 0.82935 \times 10^{-8}$ |
| | $A_{10} = -0.55230 \times 10^{-9}$ |
| | $A_{12} = 0.96840 \times 10^{-11}$ |

TABLE 2

<Embodiment 2>
$f = 36.0 \sim 50.0 \sim 68.0$     $F_{NO} = 4.6 \sim 5.6 \sim 6.8$

| Radius of Curvature | Axial Distance | Refractive Index | Abbe Number |
|---|---|---|---|
| $r_1$ 79.193 | | | |
| | $d_1$ 1.200 | $N_1$ 1.67000 | $\nu_1$ 57.07 |
| $r_2$ 12.302 | | | |
| | $d_2$ 6.200 | | |
| $r_3$ 28.408 | | | |
| | $d_3$ 3.800 | $N_2$ 1.83400 | $\nu_2$ 37.05 |
| $r_4^*$ 43.479 | | | |
| | $d_4$ 14.397~7.753~3.230 | | |
| $r_5^*$ 19.096 | | | |
| | $d_5$ 5.500 | $N_3$ 1.58170 | $\nu_3$ 69.75 |
| $r_6^*$ −43.042 | | | |
| | $d_6$ 4.500 | | |
| $r_7^*$ −1174.453 | | | |
| | $d_7$ 3.500 | $N_4$ 1.83350 | $\nu_4$ 21.00 |
| $r_8^*$ 78.899 | | | |

| Aspherical coefficient | |
|---|---|
| $r_4$: | $\epsilon = 0.10000 \times 10$ |
| | $A_4 = -0.24751 \times 10^{-4}$ |
| | $A_6 = 0.71600 \times 10^{-8}$ |
| | $A_8 = -0.84637 \times 10^{-9}$ |
| $r_5$: | $\epsilon = 0.10000 \times 10$ |
| | $A_4 = -0.63349 \times 10^{-4}$ |
| | $A_6 = -0.32364 \times 10^{-6}$ |
| | $A_8 = -0.11035 \times 10^{-7}$ |
| $r_6$: | $\epsilon = 0.10000 \times 10$ |
| | $A_4 = -0.67323 \times 10^{-4}$ |
| | $A_6 = -0.76224 \times 10^{-6}$ |
| | $A_8 = -0.18025 \times 10^{-8}$ |
| $r_7$: | $\epsilon = 0.10000 \times 10$ |
| | $A_4 = 0.74134 \times 10^{-4}$ |

TABLE 2-continued $$A_6 = -0.80597 \times 10^{-6}$$
$$A_8 = 0.94950 \times 10^{-8}$$
$r_8$:
$$\epsilon = 0.10000 \times 10$$
$$A_4 = 0.13887 \times 10^{-3}$$
$$A_6 = -0.21954 \times 10^{-6}$$
$$A_8 = 0.55614 \times 10^{-8}$$

TABLE 3

<Embodiment 3>
$f = 36.0 \sim 50.0 \sim 68.0$   $F_{NO} = 4.6 \sim 5.6 \sim 6.8$

| Radius of Curvature | | Axial Distance | | Refractive Index | | Abbe Number |
|---|---|---|---|---|---|---|
| $r_1$ | 233.081 | | | | | |
| | | $d_1$ | 1.200 | $N_1$ 1.67790 | $\nu_1$ | 53.38 |
| $r_2^*$ | 14.060 | | | | | |
| | | $d_2$ | 3.800 | | | |
| $r_3$ | 34.217 | | | | | |
| | | $d_3$ | 3.800 | $N_2$ 1.76500 | $\nu_2$ | 46.25 |
| $r_4^*$ | 234.668 | | | | | |
| | | $d_4$ | 21.313~10.618~3.330 | | | |
| $r_5^*$ | 14.891 | | | | | |
| | | $d_5$ | 5.600 | $N_3$ 1.52550 | $\nu_3$ | 71.59 |
| $r_6$ | −219.341 | | | | | |
| | | $d_6$ | 6.000 | | | |
| $r_7^*$ | 87.599 | | | | | |
| | | $d_7$ | 3.000 | $N_4$ 1.83350 | $\nu_4$ | 21.00 |
| $r_8^*$ | 40.213 | | | | | |

Aspherical coefficient $r_2$:
$$\epsilon = 0.15867 \times 10$$
$$A_4 = -0.21535 \times 10^{-4}$$
$$A_6 = 0.11377 \times 10^{-6}$$
$$A_8 = -0.32504 \times 10^{-8}$$

$r_4$:
$$\epsilon = 0.13302 \times 10$$
$$A_4 = -0.29830 \times 10^{-4}$$
$$A_6 = -0.73532 \times 10^{-7}$$
$$A_8 = -0.66240 \times 10^{-9}$$

$r_5$:
$$\epsilon = 0.12008 \times 10$$
$$A_4 = -0.21137 \times 10^{-4}$$
$$A_6 = 0.10029 \times 10^{-6}$$
$$A_8 = -0.15924 \times 10^{-8}$$

$r_7$:
$$\epsilon = 0.98193$$
$$A_4 = 0.12837 \times 10^{-4}$$
$$A_6 = -0.44904 \times 10^{-6}$$
$$A_8 = -0.26534 \times 10^{-8}$$

$r_8$:
$$\epsilon = 0.10358 \times 10$$
$$A_4 = 0.74414 \times 10^{-4}$$
$$A_6 = -0.12907 \times 10^{-6}$$
$$A_8 = -0.20313 \times 10^{-8}$$

TABLE 4

<Embodiment 4>
$f = 36.0 \sim 50.0 \sim 68.0$   $F_{NO} = 4.6 \sim 5.6 \sim 6.8$

| Radius of Curvature | | Axial Distance | | Refractive Index | | Abbe Number |
|---|---|---|---|---|---|---|
| $r_1$ | −4926.347 | | | | | |
| | | $d_1$ | 1.540 | $N_1$ 1.67790 | $\nu_1$ | 53.38 |
| $r_2^*$ | 16.984 | | | | | |
| | | $d_2$ | 4.143 | | | |
| $r_3$ | 22.506 | | | | | |
| | | $d_3$ | 3.955 | $N_2$ 1.76500 | $\nu_2$ | 46.25 |
| $r_4$ | 45.596 | | | | | |
| | | $d_4$ | 25.194~12.185~3.330 | | | |
| $r_5^*$ | 14.789 | | | | | |
| | | $d_5$ | 5.598 | $N_3$ 1.50728 | $\nu_3$ | 69.43 |
| $r_6$ | −248.290 | | | | | |
| | | $d_6$ | 6.038 | | | |
| $r_7^*$ | −173.893 | | | | | |
| | | $d_7$ | 2.520 | $N_4$ 1.83350 | $\nu_4$ | 21.00 |
| $r_8^*$ | 132.522 | | | | | |

Aspherical coefficient $r_2$:
$$\epsilon = 0.14772 \times 10$$
$$A_4 = -0.19835 \times 10^{-4}$$
$$A_6 = -0.66077 \times 10^{-8}$$
$$A_8 = -0.91491 \times 10^{-9}$$

$r_5$:
$$\epsilon = 0.12911 \times 10$$

TABLE 4-continued $$A_4 = -0.19849 \times 10^{-4}$$
$$A_6 = 0.59001 \times 10^{-7}$$
$$A_8 = -0.14707 \times 10^{-8}$$

$r_7$:
$$\epsilon = 0.10000 \times 10$$
$$A_4 = 0.98005 \times 10^{-5}$$
$$A_6 = -0.37611 \times 10^{-6}$$
$$A_8 = -0.19401 \times 10^{-8}$$

$r_8$:
$$\epsilon = 0.10000 \times 10$$
$$A_4 = 0.66420 \times 10^{-4}$$
$$A_6 = -0.35319 \times 10^{-7}$$
$$A_8 = -0.11571 \times 10^{-8}$$

TABLE 5

<Embodiment 5>
$f = 36.0 \sim 50.0 \sim 68.0$   $F_{NO} = 4.6 \sim 5.6 \sim 6.8$

| Radius of Curvature | | Axial Distance | | Refractive Index | | Abbe Number |
|---|---|---|---|---|---|---|
| $r_1^*$ | 75.735 | | | | | |
| | | $d_1$ | 1.053 | $N_1$ 1.78560 | $\nu_1$ | 42.81 |
| $r_2^*$ | 12.961 | | | | | |
| | | $d_2$ | 4.981 | | | |
| $r_3^*$ | 34.298 | | | | | |
| | | $d_3$ | 3.212 | $N_2$ 1.58340 | $\nu_2$ | 30.23 |
| $r_4^*$ | −789.341 | | | | | |
| | | $d_4$ | 17.516~9.117~3.401 | | | |
| $r_5^*$ | 11.984 | | | | | |
| | | $d_5$ | 5.740 | $N_3$ 1.51728 | $\nu_3$ | 69.43 |
| $r_6^*$ | −62.338 | | | | | |
| | | $d_6$ | 4.287 | | | |
| $r_7^*$ | −20.125 | | | | | |
| | | $d_7$ | 3.539 | $N_4$ 1.75570 | $\nu_4$ | 27.21 |
| $r_8^*$ | −65.187 | | | | | |

Aspherical coefficient $r_1$:
$$\epsilon = 0.92540$$
$$A_4 = -0.12025 \times 10^{-4}$$
$$A_6 = 0.52533 \times 10^{-7}$$
$$A_8 = -0.32581 \times 10^{-10}$$

$r_2$:
$$\epsilon = 0.10000 \times 10$$
$$A_4 = -0.14468 \times 10^{-4}$$
$$A_6 = 0.87723 \times 10^{-7}$$
$$A_8 = 0.78426 \times 10^{-9}$$

$r_3$:
$$\epsilon = 0.33160$$
$$A_4 = -0.11960 \times 10^{-4}$$
$$A_6 = 0.14748 \times 10^{-6}$$
$$A_8 = 0.60246 \times 10^{-9}$$

$r_4$:
$$\epsilon = 0.95585$$
$$A_4 = -0.51352 \times 10^{-4}$$
$$A_6 = 0.13347 \times 10^{-6}$$
$$A_8 = -0.13437 \times 10^{-8}$$

$r_5$:
$$\epsilon = 0.12368 \times 10$$
$$A_4 = -0.22771 \times 10^{-4}$$
$$A_6 = 0.36746 \times 10^{-7}$$
$$A_8 = -0.12825 \times 10^{-8}$$

$r_6$:
$$\epsilon = -0.13009 \times 10$$
$$A_4 = 0.30913 \times 10^{-4}$$
$$A_6 = 0.45464 \times 10^{-7}$$
$$A_8 = -0.68843 \times 10^{-9}$$

$r_7$:
$$\epsilon = 0.26965 \times 10$$
$$A_4 = 0.15665 \times 10^{-3}$$
$$A_6 = -0.54318 \times 10^{-6}$$
$$A_8 = -0.17532 \times 10^{-7}$$

$r_8$:
$$\epsilon = -0.21970$$
$$A_4 = 0.19799 \times 10^{-3}$$
$$A_6 = 0.32779 \times 10^{-6}$$
$$A_8 = -0.57687 \times 10^{-8}$$

TABLE 6

<Embodiment 6>
$f = 36.0 \sim 49.5 \sim 68.0$   $F_{NO} = 4.6 \sim 5.2 \sim 5.6$

| Radius of Curvature | | Axial Distance | | Refractive Index | | Abbe Number |
|---|---|---|---|---|---|---|
| $r_1^*$ | 102.412 | | | | | |
| | | $d_1$ | 1.500 | $N_1$ 1.78831 | $\nu_1$ | 47.32 |
| $r_2^*$ | 17.385 | | | | | |
| | | $d_2$ | 6.000 | | | |
| $r_3^*$ | −398.031 | | | | | |

TABLE 6-continued

| Radius of Curvature | Axial Distance | | Refractive Index | Abbe Number |
|---|---|---|---|---|
| | $d_3$ | 4.800 | $N_2$ 1.75000 | $\nu_2$ 25.14 |
| $r_4^*$ −61.602 | | | | |
| | $d_4$ | 24.338~12.853~4.500 | | |
| $r_5^*$ 13.648 | | | | |
| | $d_5$ | 6.700 | $N_3$ 1.48749 | $\nu_3$ 70.44 |
| $r_6^*$ −103.927 | | | | |
| | $d_6$ | 6.200 | | |
| $r_7^*$ −22.503 | | | | |
| | $d_7$ | 5.800 | $N_4$ 1.83350 | $\nu_4$ 21.00 |
| $r_8^*$ −43.231 | | | | |

Aspherical coefficient

$r_1$: $\epsilon = 0.10000 \times 10$
$A_4 = 0.20109 \times 10^{-4}$
$A_6 = 0.13635 \times 10^{-6}$
$A_8 = 0.11051 \times 10^{-8}$
$A_{10} = 0.43942 \times 10^{-13}$
$A_{12} = -0.51481 \times 10^{-13}$ $r_2$: $\epsilon = 0.10000 \times 10$
$A_4 = 0.83021 \times 10^{-5}$
$A_6 = 0.33585 \times 10^{-6}$
$A_8 = 0.29980 \times 10^{-8}$
$A_{10} = 0.26751 \times 10^{-10}$
$A_{12} = 0.23205 \times 10^{-12}$ $r_3$: $\epsilon = 0.10000 \times 10$
$A_4 = -0.68916 \times 10^{-4}$
$A_6 = -0.12267 \times 10^{-6}$
$A_8 = 0.16135 \times 10^{-8}$
$A_{10} = 0.12568 \times 10^{-10}$
$A_{12} = 0.72978 \times 10^{-13}$ $r_4$: $\epsilon = 0.10000 \times 10$
$A_4 = -0.63114 \times 10^{-4}$
$A_6 = -0.87244 \times 10^{-7}$
$A_8 = 0.14728 \times 10^{-9}$
$A_{10} = 0.20899 \times 10^{-11}$
$A_{12} = -0.17228 \times 10^{-13}$ $r_5$: $\epsilon = 0.10000 \times 10$
$A_4 = -0.16890 \times 10^{-5}$
$A_6 = 0.19098 \times 10^{-6}$
$A_8 = -0.11329 \times 10^{-8}$
$A_{10} = 0.93460 \times 10^{-11}$
$A_{12} = 0.41743 \times 10^{-13}$ $r_6$: $\epsilon = 0.10000 \times 10$
$A_4 = 0.24647 \times 10^{-4}$
$A_6 = 0.12879 \times 10^{-6}$
$A_8 = 0.45128 \times 10^{-9}$
$A_{10} = -0.11513 \times 10^{-10}$
$A_{12} = 0.56075 \times 10^{-13}$ $r_7$: $\epsilon = 0.10000 \times 10$
$A_4 = 0.16088 \times 10^{-4}$
$A_6 = -0.13611 \times 10^{-6}$
$A_8 = -0.23345 \times 10^{-8}$
$A_{10} = -0.26920 \times 10^{-10}$
$A_{12} = -0.29101 \times 10^{-12}$ $r_8$: $\epsilon = 0.10000 \times 10$
$A_4 = 0.52549 \times 10^{-4}$
$A_6 = 0.19383 \times 10^{-6}$
$A_8 = -0.91899 \times 10^{-9}$
$A_{10} = -0.43772 \times 10^{-11}$
$A_{12} = 0.10395 \times 10^{-12}$

TABLE 7

<Embodiment 7>
$f = 36.0 \sim 50.0 \sim 68.0$   $F_{NO} = 4.6 \sim 5.2 \sim 5.6$

| Radius of Curvature | Axial Distance | | Refractive Index | Abbe Number |
|---|---|---|---|---|
| $r_1$ 64.581 | | | | |
| | $d_1$ | 0.955 | $N_1$ 1.74400 | $\nu_1$ 44.93 |
| $r_2$ 13.551 | | | | |
| | $d_2$ | 4.900 | | |
| $r_3$ 28.369 | | | | |
| | $d_3$ | 3.110 | $N_2$ 1.58340 | $\nu_2$ 30.23 |
| $r_4^*$ 138.287 | | | | |
| | $d_4$ | 22.944~12.029~4.600 | | |
| $r_5^*$ 13.535 | | | | |
| | $d_5$ | 5.900 | $N_3$ 1.51680 | $\nu_3$ 64.20 |
| $r_6$ −164.533 | | | | |
| | $d_6$ | 4.400 | | |
| $r_7^*$ −51.978 | | | | |
| | $d_7$ | 3.459 | $N_4$ 1.84666 | $\nu_4$ 23.82 |

TABLE 7-continued

| | | | | |
|---|---|---|---|---|
| $r_8^*$ 202.885 | | | | |
| | $d_8$ | 2.000 | | |
| $r_9$ 43.901 | | | | |
| | $d_9$ | 2.000 | $N_5$ 1.51680 | $\nu_5$ 64.20 |
| $r_{10}^*$ 73.585 | | | | |

Aspherical coefficient

$r_4$: $\epsilon = 0.97677$
$A_4 = -0.31833 \times 10^{-4}$
$A_6 = 0.11552 \times 10^{-6}$
$A_8 = -0.38664 \times 10^{-8}$
$A_{10} = 0.23753 \times 10^{-10}$ $r_5$: $\epsilon = 0.11687 \times 10$
$A_4 = -0.26050 \times 10^{-4}$
$A_6 = -0.73075 \times 10^{-8}$
$A_8 = -0.21403 \times 10^{-8}$
$A_{10} = 0.11257 \times 10^{-10}$ $r_7$: $\epsilon = 0.10098 \times 10$
$A_4 = 0.95703 \times 10^{-4}$
$A_6 = 0.11262 \times 10^{-6}$
$A_8 = -0.82765 \times 10^{-8}$
$A_{10} = -0.31146 \times 10^{-10}$
$A_{12} = -0.21000 \times 10^{-13}$ $r_8$: $\epsilon = 0.94743$
$A_4 = 0.15530 \times 10^{-3}$
$A_6 = 0.51579 \times 10^{-6}$
$A_8 = 0.10239 \times 10^{-7}$
$A_{10} = -0.55151 \times 10^{-9}$
$A_{12} = 0.50000 \times 10^{-11}$

TABLE 8

<Embodiment 8>
$f = 36.0 \sim 50.0 \sim 68.0$   $F_{NO} = 4.6 \sim 5.6 \sim 6.8$

| Radius of Curvature | Axial Distance | | Refractive Index | Abbe Number |
|---|---|---|---|---|
| $r_1$ −4926.347 | | | | |
| | $d_1$ | 1.540 | $N_1$ 1.67790 | $\nu_1$ 53.38 |
| $r_2^*$ 16.984 | | | | |
| | $d_2$ | 4.143 | | |
| $r_3$ 22.506 | | | | |
| | $d_3$ | 3.955 | $N_2$ 1.76500 | $\nu_2$ 46.25 |
| $r_4$ 45.596 | | | | |
| | $d_4$ | 25.194~12.185~3.330 | | |
| $r_5^*$ 14.789 | | | | |
| | $d_5$ | 5.598 | $N_3$ 1.51728 | $\nu_3$ 69.43 |
| $r_6$ −248.290 | | | | |
| | $d_6$ | 6.038 | | |
| $r_7^*$ −173.893 | | | | |
| | $d_7$ | 2.520 | $N_4$ 1.83350 | $\nu_4$ 21.00 |
| $r_8^*$ 132.522 | | | | |

Aspherical coefficient

$r_2$: $\epsilon = 0.14772 \times 10$
$A_4 = -0.19835 \times 10^{-4}$
$A_6 = -0.66077 \times 10^{-8}$
$A_8 = -0.91491 \times 10^{-9}$ $r_5$: $\epsilon = 0.12911 \times 10$
$A_4 = -0.19849 \times 10^{-4}$
$A_6 = 0.59001 \times 10^{-7}$
$A_8 = -0.14707 \times 10^{-8}$ $r_7$: $\epsilon = 0.10000 \times 10$
$A_4 = 0.98005 \times 10^{-5}$
$A_6 = -0.37611 \times 10^{-6}$
$A_8 = -0.19401 \times 10^{-8}$ $r_8$: $\epsilon = 0.10000 \times 10$
$A_4 = 0.66420 \times 10^{-4}$
$A_6 = -0.35319 \times 10^{17}$
$A_8 = -0.11571 \times 10^{-8}$

TABLE 9

<Embodiment 9>
$f = 36.0 \sim 50.0 \sim 68.0$   $F_{NO} = 4.6 \sim 5.2 \sim 5.6$

| Radius of Curvature | Axial Distance | | Refractive Index | Abbe Number |
|---|---|---|---|---|
| $r_1$ −380.567 | | | | |
| | $d_1$ | 1.459 | $N_1$ 1.78560 | $\nu_1$ 42.81 |
| $r_2^*$ 16.256 | | | | |

TABLE 9-continued

| | | | | | | |
|---|---|---|---|---|---|---|
| $r_3$ | 45.168 | | | | | |
| | | $d_2$ | 6.026 | | | |
| | | $d_3$ | 3.215 | $N_2$ 1.70055 | $\nu_2$ | 30.11 |
| $r_4^*$ | −123.671 | | | | | |
| | | $d_4$ | 26.505~12.817~3.500 | | | |
| $r_5^*$ | 18.125 | | | | | |
| | | $d_5$ | 5.359 | $N_3$ 1.58913 | $\nu_3$ | 61.11 |
| $r_6$ | −207.705 | | | | | |
| | | $d_6$ | 5.668 | | | |
| $r_7^*$ | −56.432 | | | | | |
| | | $d_7$ | 3.056 | $N_4$ 1.84666 | $\nu_4$ | 23.82 |
| $r_8^*$ | 88.570 | | | | | |
| | | $d_8$ | 3.000 | | | |
| $r_9^*$ | −26.323 | | | | | |
| | | $d_9$ | 2.781 | $N_5$ 1.51680 | $\nu_5$ | 64.20 |
| $r_{10}$ | −16.275 | | | | | |

Aspherical coefficient $r_2$:
- $\epsilon = 0.10000 \times 10$
- $A_4 = -0.15505 \times 10^{-4}$
- $A_6 = 0.83879 \times 10^{-7}$
- $A_8 = -0.24127 \times 10^{-8}$
- $A_{10} = 0.23757 \times 10^{-10}$
- $A_{12} = -0.80847 \times 10^{-13}$ $r_4$:
- $\epsilon = 0.10000 \times 10$
- $A_4 = -0.11854 \times 10^{-4}$
- $A_6 = 0.53054 \times 10^{-7}$
- $A_8 = -0.14796 \times 10^{-8}$
- $A_{10} = 0.12514 \times 10^{-10}$
- $A_{12} = -0.51061 \times 10^{-13}$ $r_5$:
- $\epsilon = 0.10000 \times 10$
- $A_4 = -0.11644 \times 10^{-5}$
- $A_6 = 0.82535 \times 10^{-7}$
- $A_8 = -0.16456 \times 10^{-8}$
- $A_{10} = 0.15146 \times 10^{-10}$
- $A_{12} = -0.61958 \times 10^{-13}$ $r_7$:
- $\epsilon = 0.10000 \times 10$
- $A_4 = -0.22564 \times 10^{-4}$
- $A_6 = 0.28631 \times 10^{-7}$
- $A_8 = 0.40710 \times 10^{-9}$
- $A_{10} = 0.94855 \times 10^{-11}$
- $A_{12} = 0.43296 \times 10^{-13}$ $r_8$:
- $\epsilon = 0.10000 \times 10$
- $A_4 = 0.18334 \times 10^{-4}$
- $A_6 = -0.55751 \times 10^{-7}$
- $A_8 = 0.18495 \times 10^{-9}$
- $A_{10} = 0.20056 \times 10^{-10}$
- $A_{12} = 0.25087 \times 10^{-13}$ $r_9$:
- $\epsilon = 0.10000 \times 10$
- $A_4 = -0.13083 \times 10^{-4}$
- $A_6 = -0.31645 \times 10^{-6}$
- $A_8 = 0.63373 \times 10^{-9}$
- $A_{10} = -0.10362 \times 10^{-11}$
- $A_{12} = -0.26952 \times 10^{-13}$

TABLE 10

<Embodiment 10>
$f = 28.8 \sim 44.3 \sim 68.0 \quad F_{NO} = 4.6 \sim 5.2 \sim 5.6$

| Radius of Curvature | | Axial Distance | | Refractive Index | Abbe Number | |
|---|---|---|---|---|---|---|
| $r_1^*$ | 158.476 | | | | | |
| | | $d_1$ | 1.459 | $N_1$ 1.78850 | $\nu_1$ | 45.68 |
| $r_2^*$ | 15.259 | | | | | |
| | | $d_2$ | 6.074 | | | |
| $r_3$ | 34.345 | | | | | |
| | | $d_3$ | 4.906 | $N_2$ 1.70055 | $\nu_2$ | 30.11 |
| $r_4^*$ | 428.888 | | | | | |
| | | $d_4$ | 39.550~17.688~3.500 | | | |
| $r_5^*$ | 20.364 | | | | | |
| | | $d_5$ | 5.353 | $N_3$ 1.58913 | $\nu_3$ | 61.11 |
| $r_6$ | −4030.470 | | | | | |
| | | $d_6$ | 5.668 | | | |
| $r_7^*$ | −65.568 | | | | | |
| | | $d_7$ | 3.056 | $N_4$ 1.84666 | $\nu_4$ | 23.82 |
| $r_8^*$ | 113.811 | | | | | |
| | | $d_8$ | 3.017 | | | |
| $r_9^*$ | −37.508 | | | | | |
| | | $d_9$ | 2.812 | $N_5$ 1.51680 | $\nu_5$ | 64.20 |
| $r_{10}$ | −17.384 | | | | | |

Aspherical coefficient $r_1$:
- $\epsilon = 0.10000 \times 10$
- $A_4 = 0.58892 \times 10^{-5}$
- $A_6 = 0.48505 \times 10^{-7}$
- $A_8 = -0.38701 \times 10^{-9}$
- $A_{10} = 0.65002 \times 10^{-12}$
- $A_{12} = -0.22233 \times 10^{-15}$ $r_2$:
- $\epsilon = 0.10000 \times 10$
- $A_4 = -0.94516 \times 10^{-5}$
- $A_6 = 0.39665 \times 10^{-7}$
- $A_8 = -0.21510 \times 10^{-10}$
- $A_{10} = -0.12936 \times 10^{-11}$
- $A_{12} = -0.13875 \times 10^{-13}$ $r_4$:
- $\epsilon = 0.10000 \times 10$
- $A_4 = -0.78692 \times 10^{-5}$
- $A_6 = -0.22629 \times 10^{-8}$
- $A_8 = -0.77105 \times 10^{-9}$
- $A_{10} = 0.41977 \times 10^{-11}$
- $A_{12} = -0.84804 \times 10^{-14}$ $r_5$:
- $\epsilon = 0.10000 \times 10$
- $A_4 = -0.21705 \times 10^{-6}$
- $A_6 = -0.83224 \times 10^{-8}$
- $A_8 = -0.11419 \times 10^{-9}$
- $A_{10} = -0.56839 \times 10^{-12}$
- $A_{12} = 0.66732 \times 10^{-14}$ $r_7$:
- $\epsilon = 0.10000 \times 10$
- $A_4 = -0.97076 \times 10^{-5}$
- $A_6 = -0.46160 \times 10^{-7}$
- $A_8 = 0.26689 \times 10^{-9}$
- $A_{10} = -0.15883 \times 10^{-11}$
- $A_{12} = 0.35263 \times 10^{-14}$ $r_8$:
- $\epsilon = 0.10000 \times 10$
- $A_4 = 0.19211 \times 10^{-4}$
- $A_6 = -0.35547 \times 10^{-7}$
- $A_8 = -0.75079 \times 10^{-9}$
- $A_{10} = -0.23221 \times 10^{-11}$
- $A_{12} = 0.60653 \times 10^{-13}$ $r_9$:
- $\epsilon = 0.10000 \times 10$
- $A_4 = -0.81788 \times 10^{-5}$
- $A_6 = -0.67632 \times 10^{-7}$
- $A_8 = -0.10159 \times 10^{-8}$
- $A_{10} = 0.42857 \times 10^{-12}$
- $A_{12} = 0.23794 \times 10^{-14}$

TABLE 11

<Embodiment 11>
$f = 39.0 \sim 55.1 \sim 78.0 \quad F_{NO} = 4.6 \sim 5.2 \sim 5.6$

| Radius of Curvature | | Axial Distance | | Refractive Index | Abbe Number | |
|---|---|---|---|---|---|---|
| $r_1^*$ | 88.798 | | | | | |
| | | $d_1$ | 1.500 | $N_1$ 1.74400 | $\nu_1$ | 44.93 |
| $r_2^*$ | 14.122 | | | | | |
| | | $d_2$ | 5.500 | | | |
| $r_3$ | 52.871 | | | | | |
| | | $d_3$ | 5.000 | $N_2$ 1.70055 | $\nu_2$ | 30.11 |
| $r_4^*$ | −201.597 | | | | | |
| | | $d_4$ | 25.768~12.726~3.500 | | | |
| $r_5^*$ | 17.271 | | | | | |
| | | $d_5$ | 6.800 | $N_3$ 1.58913 | $\nu_3$ | 61.11 |
| $r_6$ | −843.732 | | | | | |
| | | $d_6$ | 5.670 | | | |
| $r_7^*$ | −45.779 | | | | | |
| | | $d_7$ | 3.500 | $N_4$ 1.84666 | $\nu_4$ | 23.82 |
| $r_8^*$ | 400.336 | | | | | |
| | | $d_8$ | 6.000 | | | |
| $r_9^*$ | −51.732 | | | | | |
| | | $d_9$ | 3.600 | $N_5$ 1.51680 | $\nu_5$ | 64.20 |
| $r_{10}$ | −26.792 | | | | | |

Aspherical coefficient $r_1$:
- $\epsilon = 0.10000 \times 10$
- $A_4 = -0.17314 \times 10^{-4}$
- $A_6 = -0.11099 \times 10^{-6}$
- $A_8 = 0.12451 \times 10^{-8}$
- $A_{10} = -0.72864 \times 10^{-11}$
- $A_{12} = 0.26533 \times 10^{-13}$ $r_2$:
- $\epsilon = 0.10000 \times 10$
- $A_4 = -0.23680 \times 10^{-4}$
- $A_6 = -0.15564 \times 10^{-6}$

TABLE 11-continued

|  |  |
|---|---|
| | $A_8 = -0.11770 \times 10^{-8}$ |
| | $A_{10} = 0.69290 \times 10^{-11}$ |
| | $A_{12} = 0.34891 \times 10^{-13}$ |
| $r_4$: | $\epsilon = 0.10000 \times 10$ |
| | $A_4 = -0.25119 \times 10^{-4}$ |
| | $A_6 = 0.34222 \times 10^{-7}$ |
| | $A_8 = -0.67319 \times 10^{-9}$ |
| | $A_{10} = 0.37125 \times 10^{-11}$ |
| | $A_{12} = -0.20868 \times 10^{-13}$ |
| $r_5$: | $\epsilon = 0.10000 \times 10$ |
| | $A_4 = 0.20886 \times 10^{-5}$ |
| | $A_6 = 0.65790 \times 10^{-7}$ |
| | $A_8 = -0.64905 \times 10^{-9}$ |
| | $A_{10} = 0.65032 \times 10^{-11}$ |
| | $A_{12} = -0.26549 \times 10^{-13}$ |
| $r_7$: | $\epsilon = 0.10000 \times 10$ |
| | $A_4 = -0.22551 \times 10^{-4}$ |
| | $A_6 = 0.22428 \times 10^{-7}$ |
| | $A_8 = 0.46396 \times 10^{-9}$ |
| | $A_{10} = 0.61312 \times 10^{-11}$ |
| | $A_{12} = 0.56137 \times 10^{-13}$ |
| $r_8$: | $\epsilon = 0.10000 \times 10$ |
| | $A_4 = 0.24322 \times 10^{-4}$ |
| | $A_6 = 0.10926 \times 10^{-6}$ |
| | $A_8 = 0.11323 \times 10^{-8}$ |
| | $A_{10} = 0.15914 \times 10^{-10}$ |
| | $A_{12} = 0.14505 \times 10^{-12}$ |
| $r_9$: | $\epsilon = 0.10000 \times 10$ |
| | $A_4 = -0.31514 \times 10^{-5}$ |
| | $A_6 = -0.79866 \times 10^{-7}$ |
| | $A_8 = 0.86102 \times 10^{-9}$ |
| | $A_{10} = 0.29418 \times 10^{-11}$ |
| | $A_{12} = 0.70709 \times 10^{-14}$ |

TABLE 12

<Embodiment 12>
$f = 24.7 \sim 34.0 \sim 48.5$   $F_{NO} = 4.65 \sim 5.3 \sim 5.8$

| Radius of Curvature | Axial Distance | Refractive Index | Abbe Number |
|---|---|---|---|
| $r_1$ 24.349 | | | |
| | $d_1$ 2.059 | $N_1$ 1.78831 | $\nu_1$ 47.32 |
| $r_2$ 10.769 | | | |
| | $d_2$ 6.775 | | |
| $r_3$ 26.280 | | | |
| | $d_3$ 2.612 | $N_2$ 1.80518 | $\nu_2$ 25.43 |
| $r_4$ 51.745 | | | |
| | $d_4$ 0.035 | $N_3$ 1.51790 | $\nu_3$ 52.31 |
| $r_5$* 28.097 | | | |
| | $d_5$ 9.525~3.516~2.000 | | |
| $r_6$ ∞ (movable light restricting plate) | | | |
| | $d_6$ 12.285~8.009~1.300 | | |
| $r_7$ ∞ (aperture) | | | |
| | $d_7$ 2.200 | | |
| $r_8$ 12.937 | | | |
| | $d_8$ 4.404 | $N_4$ 1.60311 | $\nu_4$ 60.74 |
| $r_9$ −91.204 | | | |
| | $d_9$ 3.712 | | |
| $r_{10}$* −21.470 | | | |
| | $d_{10}$ 2.110 | $N_5$ 1.84666 | $\nu_5$ 23.82 |
| $r_{11}$* 858.222 | | | |
| | $d_{11}$ 2.563 | | |
| $r_{12}$ −68.446 | | | |
| | $d_{12}$ 2.548 | $N_6$ 1.77551 | $\nu_6$ 37.90 |
| $r_{13}$ −24.982 | | | |
| | $d_{13}$ 0.0~5.442~13.980 | | |
| $r_{14}$ ∞ | | | |

Aspherical coefficient

| | |
|---|---|
| $r_5$: | $\epsilon = 0.10000 \times 10$ |
| | $A_3 = -0.10620 \times 10^{-3}$ |
| | $A_4 = 0.66908 \times 10^{-5}$ |
| | $A_5 = -0.15344 \times 10^{-4}$ |
| | $A_6 = 0.12536 \times 10^{-6}$ |
| | $A_7 = 0.45048 \times 10^{-6}$ |
| | $A_8 = -0.58343 \times 10^{-7}$ |
| | $A_9 = -0.75656 \times 10^{-9}$ |
| | $A_{10} = 0.13705 \times 10^{-9}$ |
| | $A_{11} = 0.45626 \times 10^{-10}$ |
| | $A_{12} = -0.34805 \times 10^{-11}$ |

TABLE 12-continued

| | |
|---|---|
| $r_{10}$: | $\epsilon = 0.10000 \times 10$ |
| | $A_4 = 0.19377 \times 10^{-3}$ |
| | $A_6 = -0.14866 \times 10^{-5}$ |
| | $A_8 = -0.32963 \times 10^{-7}$ |
| | $A_{10} = 0.10987 \times 10^{-8}$ |
| | $A_{12} = -0.91364 \times 10^{-11}$ |
| $r_{11}$: | $\epsilon = 0.10000 \times 10$ |
| | $A_4 = 0.27738 \times 10^{-3}$ |
| | $A_6 = -0.14210 \times 10^{-5}$ |
| | $A_8 = 0.25060 \times 10^{-7}$ |
| | $A_{10} = -0.52535 \times 10^{-9}$ |
| | $A_{12} = 0.69918 \times 10^{-11}$ |

TABLE 13

<Embodiment 13>
$f = 24.7 \sim 34.6 \sim 48.5$   $F_{NO} = 4.65 \sim 5.3 \sim 5.8$

| Radius of Curvature | Axial Distance | Refractive Index | Abbe Number |
|---|---|---|---|
| $r_1$ 28.179 | | | |
| | $d_1$ 1.838 | $N_1$ 1.80500 | $\nu_1$ 40.97 |
| $r_2$ 9.862 | | | |
| | $d_2$ 5.500 | | |
| $r_3$ 22.194 | | | |
| | $d_3$ 2.683 | $N_2$ 1.80518 | $\nu_2$ 25.43 |
| $r_4$ 47.568 | | | |
| | $d_4$ 0.035 | $N_3$ 1.51790 | $\nu_3$ 52.31 |
| $r_5$* 26.527 | | | |
| | $d_5$ 5.453~1.780~1.500 | | |
| $r_6$ ∞ (movable light restricting plate) | | | |
| | $d_6$ 8.688~5.277~0.500 | | |
| $r_7$ 12.678 | | | |
| | $d_7$ 2.601 | $N_4$ 1.67000 | $\nu_4$ 57.07 |
| $r_8$ 28.414 | | | |
| | $d_8$ 2.028 | | |
| $r_9$ ∞ (aperture) | | | |
| | $d_9$ 2.200 | | |
| $r_{10}$ 18.167 | | | |
| | $d_{10}$ 2.385 | $N_5$ 1.67000 | $\nu_5$ 57.07 |
| $r_{11}$ −121.037 | | | |
| | $d_{11}$ 0.998 | | |
| $r_{12}$* −367.482 | | | |
| | $d_{12}$ 1.556 | $N_6$ 1.84506 | $\nu_6$ 23.66 |
| $r_{13}$* 22.731 | | | |
| | $d_{13}$ 2.923 | | |
| $r_{14}$ −47.557 | | | |
| | $d_{14}$ 1.761 | $N_7$ 1.65446 | $\nu_7$ 33.86 |
| $r_{15}$ −30.983 | | | |

Aspherical coefficient

| | |
|---|---|
| $r_5$: | $\epsilon = 0.10000 \times 10$ |
| | $A_3 = -0.16151 \times 10^{-4}$ |
| | $A_4 = -0.54579 \times 10^{-4}$ |
| | $A_5 = -0.41140 \times 10^{-5}$ |
| | $A_6 = -0.23332 \times 10^{-7}$ |
| | $A_7 = -0.82596 \times 10^{-8}$ |
| | $A_8 = -0.18919 \times 10^{-8}$ |
| | $A_9 = -0.19337 \times 10^{-9}$ |
| | $A_{10} = -0.10578 \times 10^{-10}$ |
| | $A_{11} = -0.23857 \times 10^{-12}$ |
| | $A_{12} = -0.25381 \times 10^{-13}$ |
| $r_{12}$: | $\epsilon = 0.10000 \times 10$ |
| | $A_4 = -0.25333 \times 10^{-4}$ |
| | $A_6 = -0.26488 \times 10^{-5}$ |
| | $A_8 = -0.41290 \times 10^{-8}$ |
| | $A_{10} = -0.26212 \times 10^{-10}$ |
| | $A_{12} = -0.13348 \times 10^{-12}$ |
| $r_{13}$: | $\epsilon = 0.10000 \times 10$ |
| | $A_4 = 0.10046 \times 10^{-3}$ |
| | $A_6 = -0.16270 \times 10^{-5}$ |
| | $A_8 = -0.14839 \times 10^{-7}$ |
| | $A_{10} = 0.16979 \times 10^{-9}$ |
| | $A_{12} = 0.16046 \times 10^{-11}$ |

TABLE 14

<Embodiment 14>
$f = 36.0 \sim 49.5 \sim 68.0$   $F_{NO} = 4.6 \sim 5.2 \sim 5.65$

| Radius of | Axial | Refractive | Abbe |

TABLE 14-continued

| Curvature | | Distance | Index | | Number | |
|---|---|---|---|---|---|---|
| $r_1^*$ 333.414 | | | | | | |
| | $d_1$ | 1.500 | $N_1$ 1.75450 | $\nu_1$ | 51.57 | |
| $r_2$ 17.948 | | | | | | |
| | $d_2$ | 4.796 | | | | |
| $r_3^*$ −231.693 | | | | | | |
| | $d_3$ | 4.244 | $N_2$ 1.75000 | $\nu_2$ | 25.14 | |
| $r_4^*$ −56.618 | | | | | | |
| | $d_4$ | 19.988~11.022~4.500 | | | | |
| $r_5^*$ 15.212 | | | | | | |
| | $d_5$ | 5.100 | $N_3$ 1.58170 | $\nu_3$ | 69.75 | |
| $r_6$ −195.704 | | | | | | |
| | $d_6$ | 4.554 | | | | |
| $r_7^*$ 676.004 | | | | | | |
| | $d_7$ | 4.843 | $N_4$ 1.83350 | $\nu_4$ | 21.00 | |
| $r_8^*$ 49.752 | | | | | | |

Aspherical coefficient $r_1$: $\epsilon = 0.10000 \times 10$
$A_4 = 0.48761 \times 10^{-4}$
$A_6 = -0.15305 \times 10^{-6}$
$A_8 = 0.45908 \times 10^{-8}$
$A_{10} = -0.34295 \times 10^{-10}$
$A_{12} = 0.21624 \times 10^{-12}$ $r_3$: $\epsilon = 0.10000 \times 10$
$A_4 = -0.17569 \times 10^{-3}$
$A_6 = -0.59719 \times 10^{-6}$
$A_8 = -0.79896 \times 10^{-8}$
$A_{10} = -0.96881 \times 10^{-10}$
$A_{12} = -0.53336 \times 10^{-12}$ $r_4$: $\epsilon = 0.10000 \times 10$
$A_4 = -0.12910 \times 10^{-3}$
$A_6 = -0.13775 \times 10^{-6}$
$A_8 = -0.58539 \times 10^{-8}$
$A_{10} = 0.10359 \times 10^{-10}$
$A_{12} = 0.10473 \times 10^{-12}$ $r_5$: $\epsilon = 0.10000 \times 10$
$A_4 = -0.15664 \times 10^{-4}$
$A_6 = 0.10003 \times 10^{-6}$
$A_8 = -0.33605 \times 10^{-8}$
$A_{10} = 0.29786 \times 10^{-10}$
$A_{12} = -0.83124 \times 10^{-13}$ $r_7$: $\epsilon = 0.10000 \times 10$
$A_4 = 0.44362 \times 10^{-4}$
$A_6 = -0.13619 \times 10^{-6}$
$A_8 = 0.69744 \times 10^{-9}$
$A_{10} = 0.36316 \times 10^{-11}$
$A_{12} = -0.25001 \times 10^{-13}$ $r_8$: $\epsilon = 0.10000 \times 10$
$A_4 = 0.11504 \times 10^{-3}$
$A_6 = 0.24271 \times 10^{-6}$
$A_8 = 0.25414 \times 10^{-8}$
$A_{10} = -0.81397 \times 10^{-13}$
$A_{12} = -0.10403 \times 10^{-12}$

TABLE 15

<Embodiment 15>
$f = 28.8 \sim 44.2 \sim 68.0 \quad F_{NO} = 4.6 \sim 5.2 \sim 5.65$

| Radius of Curvature | | Axial Distance | Refractive Index | | Abbe Number |
|---|---|---|---|---|---|
| $r_1^*$ 194.901 | | | | | |
| | $d_1$ | 1.518 | $N_1$ 1.74250 | $\nu_1$ | 52.47 |
| $r_2$ 15.946 | | | | | |
| | $d_2$ | 5.827 | | | |
| $r_3^*$ 46.922 | | | | | |
| | $d_3$ | 4.212 | $N_2$ 1.75000 | $\nu_2$ | 25.14 |
| $r_4^*$ 249.931 | | | | | |
| | $d_4$ | 29.539~14.374~4.500 | | | |
| $r_5^*$ 18.821 | | | | | |
| | $d_5$ | 6.974 | $N_3$ 1.58170 | $\nu_3$ | 69.75 |
| $r_6$ −48.147 | | | | | |
| | $d_6$ | 5.456 | | | |
| $r_7^*$ −28.380 | | | | | |
| | $d_7$ | 5.821 | $N_4$ 1.83350 | $\nu_4$ | 21.00 |
| $r_8^*$ −63.341 | | | | | |

Aspherical coefficient $r_1$: $\epsilon = 0.10000 \times 10$
$A_4 = 0.33276 \times 10^{-4}$
$A_6 = -0.19694 \times 10^{-6}$
$A_8 = 0.15260 \times 10^{-8}$
$A_{10} = -0.58766 \times 10^{-11}$
$A_{12} = 0.12668 \times 10^{-12}$ $r_3$: $\epsilon = 0.10000 \times 10$
$A_4 = -0.84991 \times 10^{-4}$
$A_6 = -0.53150 \times 10^{-7}$
$A_8 = -0.13513 \times 10^{-8}$
$A_{10} = -0.16397 \times 10^{-10}$
$A_{12} = -0.41724 \times 10^{-13}$ $r_4$: $\epsilon = 0.10000 \times 10$
$A_4 = -0.80574 \times 10^{-4}$
$A_6 = 0.67922 \times 10^{-7}$
$A_8 = -0.33160 \times 10^{-8}$
$A_{10} = 0.46362 \times 10^{-11}$
$A_{12} = 0.19192 \times 10^{-13}$ $r_5$: $\epsilon = 0.10000 \times 10$
$A_4 = -0.19862 \times 10^{-4}$
$A_6 = 0.16795 \times 10^{-7}$
$A_8 = -0.17729 \times 10^{-8}$
$A_{10} = 0.13814 \times 10^{-10}$
$A_{12} = -0.43712 \times 10^{-13}$ $r_7$: $\epsilon = 0.10000 \times 10$
$A_4 = 0.93072 \times 10^{-4}$
$A_6 = 0.13889 \times 10^{-6}$
$A_8 = -0.71039 \times 10^{-9}$
$A_{10} = 0.12866 \times 10^{-11}$
$A_{12} = -0.59931 \times 10^{-13}$ $r_8$: $\epsilon = 0.10000 \times 10$
$A_4 = 0.10078 \times 10^{-3}$
$A_6 = 0.22393 \times 10^{-6}$
$A_8 = 0.14510 \times 10^{-8}$
$A_{10} = -0.30917 \times 10^{-11}$
$A_{12} = -0.92735 \times 10^{-13}$

TABLE 16

<Embodiment 16>
$f = 36.0 \sim 49.5 \sim 68.0 \quad F_{NO} = 4.6 \sim 5.2 \sim 5.65$

| Radius of Curvature | | Axial Distance | Refractive Index | | Abbe Number |
|---|---|---|---|---|---|
| $r_1^*$ −186.052 | | | | | |
| | $d_1$ | 1.500 | $N_1$ 1.74250 | $\nu_1$ | 52.47 |
| $r_2$ 21.088 | | | | | |
| | $d_2$ | 5.796 | | | |
| $r_3^*$ 171.033 | | | | | |
| | $d_3$ | 4.189 | $N_2$ 1.75000 | $\nu_2$ | 25.14 |
| $r_4^*$ −109.118 | | | | | |
| | $d_4$ | 22.594~12.119~4.500 | | | |
| $r_5^*$ 19.888 | | | | | |
| | $d_5$ | 6.964 | $N_3$ 1.58170 | $\nu_3$ | 69.75 |
| $r_6$ −52.105 | | | | | |
| | $d_6$ | 5.450 | | | |
| $r_7^*$ −41.818 | | | | | |
| | $d_7$ | 5.800 | $N_4$ 1.83350 | $\nu_4$ | 21.00 |
| $r_8^*$ −151.715 | | | | | |

Aspherical coefficient $r_1$: $\epsilon = 0.10000 \times 10$
$A_4 = 0.38718 \times 10^{-4}$
$A_6 = -0.21571 \times 10^{-6}$
$A_8 = 0.32300 \times 10^{-8}$
$A_{10} = -0.24342 \times 10^{-10}$
$A_{12} = 0.91443 \times 10^{-13}$ $r_3$: $\epsilon = 0.10000 \times 10$
$A_4 = -0.11608 \times 10^{-3}$
$A_6 = -0.22060 \times 10^{-6}$
$A_8 = -0.28709 \times 10^{-8}$
$A_{10} = -0.26145 \times 10^{-10}$

TABLE 16-continued

| | | |
|---|---|---|
| | $A_{12} =$ | $0.27273 \times 10^{-13}$ |
| $r_4$: | $\epsilon =$ | $0.10000 \times 10$ |
| | $A_4 =$ | $-0.91880 \times 10^{-4}$ |
| | $A_6 =$ | $-0.44775 \times 10^{-7}$ |
| | $A_8 =$ | $-0.27018 \times 10^{-8}$ |
| | $A_{10} =$ | $-0.25778 \times 10^{-11}$ |
| | $A_{12} =$ | $0.98691 \times 10^{-13}$ |
| $r_5$: | $\epsilon =$ | $0.10000 \times 10$ |
| | $A_4 =$ | $-0.20259 \times 10^{-4}$ |
| | $A_6 =$ | $0.40394 \times 10^{-7}$ |
| | $A_8 =$ | $-0.18199 \times 10^{-8}$ |
| | $A_{10} =$ | $0.13093 \times 10^{-10}$ |
| | $A_{12} =$ | $-0.29344 \times 10^{-13}$ |
| $r_7$: | $\epsilon =$ | $0.10000 \times 10$ |
| | $A_4 =$ | $0.77628 \times 10^{-4}$ |
| | $A_6 =$ | $0.13437 \times 10^{-6}$ |
| | $A_8 =$ | $-0.11352 \times 10^{-8}$ |
| | $A_{10} =$ | $-0.81338 \times 10^{-12}$ |
| | $A_{12} =$ | $0.28776 \times 10^{-13}$ |
| $r_8$: | $\epsilon =$ | $0.10000 \times 10$ |
| | $A_4 =$ | $0.91946 \times 10^{-4}$ |
| | $A_6 =$ | $0.24172 \times 10^{-6}$ |
| | $A_8 =$ | $0.21566 \times 10^{-9}$ |
| | $A_{10} =$ | $-0.42081 \times 10^{-11}$ |
| | $A_{12} =$ | $0.27705 \times 10^{-14}$ |

TABLE 17

<Embodiment 17>
$f = 36.0 \sim 49.5 \sim 68.0 \quad F_{NO} = 4.6 \sim 5.2 \sim 5.65$

| Radius of Curvature | Axial Distance | Refractive Index | Abbe Number |
|---|---|---|---|
| $r_1^*$ 451.321 | | | |
| | $d_1$ 1.500 | $N_1$ 1.74250 | $\nu_1$ 52.47 |
| $r_2$ 18.646 | | | |
| | $d_2$ 5.796 | | |
| $r_3^*$ 700.982 | | | |
| | $d_3$ 4.189 | $N_2$ 1.75000 | $\nu_2$ 25.14 |
| $r_4^*$ −82.317 | | | |
| | $d_4$ 22.386~12.032~4.500 | | |
| $r_5$ 17.447 | | | |
| | $d_5$ 6.964 | $N_3$ 1.58170 | $\nu_3$ 69.75 |
| $r_6^*$ −83.164 | | | |
| | $d_6$ 5.450 | | |
| $r_7^*$ −37.619 | | | |
| | $d_7$ 5.800 | $N_4$ 1.83350 | $\nu_4$ 21.00 |
| $r_8^*$ −111.015 | | | |

| Aspherical coefficient | | |
|---|---|---|
| $r_1$: | $\epsilon =$ | $0.10000 \times 10$ |
| | $A_4 =$ | $0.34031 \times 10^{-4}$ |
| | $A_6 =$ | $-0.17182 \times 10^{-6}$ |
| | $A_8 =$ | $0.30987 \times 10^{-8}$ |
| | $A_{10} =$ | $-0.24871 \times 10^{-10}$ |
| | $A_{12} =$ | $0.10178 \times 10^{-12}$ |
| $r_3$: | $\epsilon =$ | $0.10000 \times 10$ |
| | $A_4 =$ | $-0.12202 \times 10^{-3}$ |
| | $A_6 =$ | $-0.31271 \times 10^{-6}$ |
| | $A_8 =$ | $-0.31490 \times 10^{-8}$ |
| | $A_{10} =$ | $-0.29994 \times 10^{-10}$ |
| | $A_{12} =$ | $-0.16632 \times 10^{-13}$ |
| $r_4$: | $\epsilon =$ | $0.10000 \times 10$ |
| | $A_4 =$ | $-0.98484 \times 10^{-4}$ |
| | $A_6 =$ | $-0.95738 \times 10^{-7}$ |
| | $A_8 =$ | $-0.28269 \times 10^{-8}$ |
| | $A_{10} =$ | $0.35579 \times 10^{-12}$ |
| | $A_{12} =$ | $0.88664 \times 10^{-13}$ |
| $r_6$: | $\epsilon =$ | $0.10000 \times 10$ |
| | $A_4 =$ | $0.29648 \times 10^{-4}$ |
| | $A_6 =$ | $-0.87000 \times 10^{-7}$ |
| | $A_8 =$ | $0.63475 \times 10^{-9}$ |
| | $A_{10} =$ | $-0.89505 \times 10^{-11}$ |
| | $A_{12} =$ | $0.16923 \times 10^{-13}$ |
| $r_7$: | $\epsilon =$ | $0.10000 \times 10$ |
| | $A_4 =$ | $0.79437 \times 10^{-4}$ |
| | $A_6 =$ | $-0.16094 \times 10^{-6}$ |
| | $A_8 =$ | $-0.19660 \times 10^{-8}$ |
| | $A_{10} =$ | $0.80089 \times 10^{-12}$ |
| | $A_{12} =$ | $0.14915 \times 10^{-13}$ |
| $r_8$: | $\epsilon =$ | $0.10000 \times 10$ |
| | $A_4 =$ | $0.93842 \times 10^{-4}$ |

TABLE 17-continued

| | | |
|---|---|---|
| | $A_6 =$ | $0.88525 \times 10^{-7}$ |
| | $A_8 =$ | $0.11130 \times 10^{-9}$ |
| | $A_{10} =$ | $-0.54513 \times 10^{-11}$ |
| | $A_{12} =$ | $-0.77578 \times 10^{-14}$ |

TABLE 18

<Embodiment 18>
$f = 36.0 \sim 49.5 \sim 68.0 \quad F_{NO} = 4.6 \sim 5.2 \sim 5.65$

| Radius of Curvature | Axial Distance | Refractive Index | Abbe Number |
|---|---|---|---|
| $r_1$ 80.991 | | | |
| | $d_1$ 1.500 | $N_1$ 1.76500 | $\nu_1$ 46.25 |
| $r_2$ 14.444 | | | |
| | $d_2$ 4.825 | | |
| $r_3^*$ 55.705 | | | |
| | $d_3$ 3.500 | $N_2$ 1.75520 | $\nu_2$ 27.51 |
| $r_4^*$ −1144.125 | | | |
| | $d_4$ 20.252~11.133~4.500 | | |
| $r_5^*$ 14.411 | | | |
| | $d_5$ 6.000 | $N_3$ 1.58170 | $\nu_3$ 69.75 |
| $r_6$ −170.676 | | | |
| | $d_6$ 3.875 | | |
| $r_7^*$ −52.669 | | | |
| | $d_7$ 4.100 | $N_4$ 1.84666 | $\nu_4$ 23.82 |
| $r_8^*$ 1243.441 | | | |

| Aspherical coefficient | | |
|---|---|---|
| $r_3$: | $\epsilon =$ | $0.10000 \times 10$ |
| | $A_4 =$ | $-0.42871 \times 10^{-4}$ |
| | $A_6 =$ | $-0.28012 \times 10^{-6}$ |
| | $A_8 =$ | $0.91560 \times 10^{-9}$ |
| | $A_{10} =$ | $-0.32570 \times 10^{-10}$ |
| | $A_{12} =$ | $-0.58439 \times 10^{-13}$ |
| $r_4$: | $\epsilon =$ | $0.10000 \times 10$ |
| | $A_4 =$ | $-0.70652 \times 10^{-4}$ |
| | $A_6 =$ | $0.93125 \times 10^{-7}$ |
| | $A_8 =$ | $-0.78474 \times 10^{-8}$ |
| | $A_{10} =$ | $0.59428 \times 10^{-10}$ |
| | $A_{12} =$ | $-0.26648 \times 10^{-12}$ |
| $r_5$: | $\epsilon =$ | $0.10000 \times 10$ |
| | $A_4 =$ | $-0.11756 \times 10^{-4}$ |
| | $A_6 =$ | $0.60328 \times 10^{-7}$ |
| | $A_8 =$ | $-0.55423 \times 10^{-9}$ |
| | $A_{10} =$ | $-0.20385 \times 10^{-11}$ |
| | $A_{12} =$ | $0.80285 \times 10^{-13}$ |
| $r_7$: | $\epsilon =$ | $0.10000 \times 10$ |
| | $A_4 =$ | $0.59648 \times 10^{-4}$ |
| | $A_6 =$ | $-0.15359 \times 10^{-7}$ |
| | $A_8 =$ | $-0.32229 \times 10^{-8}$ |
| | $A_{10} =$ | $-0.87921 \times 10^{-11}$ |
| | $A_{12} =$ | $-0.32969 \times 10^{-12}$ |
| $r_8$: | $\epsilon =$ | $0.10000 \times 10$ |
| | $A_4 =$ | $0.12623 \times 10^{-3}$ |
| | $A_6 =$ | $0.32165 \times 10^{-6}$ |
| | $A_8 =$ | $0.16974 \times 10^{-8}$ |
| | $A_{10} =$ | $-0.18043 \times 10^{-10}$ |
| | $A_{12} =$ | $-0.40599 \times 10^{-12}$ |

TABLE 19

<Embodiment 19>
$f = 36.0 \sim 49.5 \sim 68.0 \quad F_{NO} = 4.6 \sim 5.2 \sim 5.65$

| Radius of Curvature | Axial Distance | Refractive Index | Abbe Number |
|---|---|---|---|
| $r_1^*$ 374.883 | | | |
| | $d_1$ 1.500 | $N_1$ 1.76500 | $\nu_1$ 46.25 |
| $r_2$ 15.931 | | | |
| | $d_2$ 4.820 | | |
| $r_3^*$ 49.274 | | | |
| | $d_3$ 3.500 | $N_2$ 1.75520 | $\nu_2$ 27.51 |
| $r_4^*$ −797.518 | | | |
| | $d_4$ 20.444~11.213~4.500 | | |
| $r_5^*$ 14.464 | | | |
| | $d_5$ 6.000 | $N_3$ 1.58170 | $\nu_3$ 69.75 |
| $r_6$ −154.229 | | | |
| | $d_6$ 3.875 | | |
| $r_7^*$ −50.223 | | | |
| | $d_7$ 4.100 | $N_4$ 1.84666 | $\nu_4$ 23.82 |

TABLE 19-continued

| | | |
|---|---|---|
| $r_8^*$ | 1197.246 | |

| Aspherical coefficient | | |
|---|---|---|
| $r_1$: | $\epsilon =$ | $0.10000 \times 10$ |
| | $A_4 =$ | $0.23135 \times 10^{-4}$ |
| | $A_6 =$ | $-0.31649 \times 10^{-6}$ |
| | $A_8 =$ | $0.46995 \times 10^{-8}$ |
| | $A_{10} =$ | $-0.40440 \times 10^{-10}$ |
| | $A_{12} =$ | $0.16837 \times 10^{-12}$ |
| $r_3$: | $\epsilon =$ | $0.10000 \times 10$ |
| | $A_4 =$ | $-0.76344 \times 10^{-4}$ |
| | $A_6 =$ | $-0.74743 \times 10^{-8}$ |
| | $A_8 =$ | $-0.18663 \times 10^{-8}$ |
| | $A_{10} =$ | $-0.44834 \times 10^{-10}$ |
| | $A_{12} =$ | $-0.21649 \times 10^{-13}$ |
| $r_4$: | $\epsilon =$ | $0.10000 \times 10$ |
| | $A_4 =$ | $-0.81669 \times 10^{-4}$ |
| | $A_6 =$ | $0.15968 \times 10^{-6}$ |
| | $A_8 =$ | $-0.80019 \times 10^{-8}$ |
| | $A_{10} =$ | $0.52770 \times 10^{-10}$ |
| | $A_{12} =$ | $-0.31965 \times 10^{-12}$ |
| $r_5$: | $\epsilon =$ | $0.10000 \times 10$ |
| | $A_4 =$ | $-0.13350 \times 10^{-4}$ |
| | $A_6 =$ | $0.15695 \times 10^{-7}$ |
| | $A_8 =$ | $-0.40814 \times 10^{-9}$ |
| | $A_{10} =$ | $-0.65147 \times 10^{-12}$ |
| | $A_{12} =$ | $0.42739 \times 10^{-13}$ |
| $r_7$: | $\epsilon =$ | $0.10000 \times 10$ |
| | $A_4 =$ | $0.78622 \times 10^{-4}$ |
| | $A_6 =$ | $-0.64899 \times 10^{-7}$ |
| | $A_8 =$ | $-0.29624 \times 10^{-8}$ |
| | $A_{10} =$ | $0.27108 \times 10^{-11}$ |
| | $A_{12} =$ | $-0.28266 \times 10^{-12}$ |
| $r_8$: | $\epsilon =$ | $0.10000 \times 10$ |
| | $A_4 =$ | $0.14210 \times 10^{-3}$ |
| | $A_6 =$ | $0.28449 \times 10^{-6}$ |
| | $A_8 =$ | $0.24053 \times 10^{-8}$ |
| | $A_{10} =$ | $-0.14097 \times 10^{-10}$ |
| | $A_{12} =$ | $-0.37986 \times 10^{-12}$ |

TABLE 20

<Embodiment 20>
$f = 36.0 \sim 49.5 \sim 68.0$  $F_{NO} = 4.6 \sim 5.2 \sim 5.65$

| Radius of Curvature | | Axial Distance | Refractive Index | Abbe Number |
|---|---|---|---|---|
| $r_1^*$ | $-311.598$ | | | |
| | | $d_1$ 1.500 | $N_1$ 1.74250 | $\nu_1$ 52.47 |
| $r_2$ | 21.373 | | | |
| | | $d_2$ 5.796 | | |
| $r_3^*$ | $-252.776$ | | | |
| | | $d_3$ 4.189 | $N_2$ 1.75000 | $\nu_2$ 25.14 |
| $r_4^*$ | $-62.013$ | | | |
| | | $d_4$ 22.031~11.882~4.500 | | |
| $r_5^*$ | 17.652 | | | |
| | | $d_5$ 6.964 | $N_3$ 1.58170 | $\nu_3$ 69.75 |
| $r_6^*$ | $-93.631$ | | | |
| | | $d_6$ 5.450 | | |
| $r_7$ | $-104.206$ | | | |
| | | $d_7$ 5.800 | $N_4$ 1.83350 | $\nu_4$ 21.00 |
| $r_8^*$ | 143.361 | | | |

| Aspherical coefficient | | |
|---|---|---|
| $r_1$: | $\epsilon =$ | $0.10000 \times 10$ |
| | $A_4 =$ | $0.32261 \times 10^{-4}$ |
| | $A_6 =$ | $-0.17384 \times 10^{-6}$ |
| | $A_8 =$ | $0.34093 \times 10^{-8}$ |
| | $A_{10} =$ | $-0.25439 \times 10^{-10}$ |
| | $A_{12} =$ | $0.95957 \times 10^{-13}$ |
| $r_3$: | $\epsilon =$ | $0.10000 \times 10$ |
| | $A_4 =$ | $-0.19918 \times 10^{-3}$ |
| | $A_6 =$ | $-0.30837 \times 10^{-6}$ |
| | $A_8 =$ | $-0.36626 \times 10^{-8}$ |
| | $A_{10} =$ | $-0.32097 \times 10^{-10}$ |
| | $A_{12} =$ | $-0.15496 \times 10^{-13}$ |
| $r_4$: | $\epsilon =$ | $0.10000 \times 10$ |
| | $A_4 =$ | $-0.92420 \times 10^{-4}$ |
| | $A_6 =$ | $-0.63550 \times 10^{-7}$ |
| | $A_8 =$ | $-0.31442 \times 10^{-8}$ |
| | $A_{10} =$ | $-0.28788 \times 10^{-11}$ |
| | $A_{12} =$ | $0.14181 \times 10^{-12}$ |

TABLE 20-continued

| | | |
|---|---|---|
| $r_5$: | $\epsilon =$ | $0.10000 \times 10$ |
| | $A_4 =$ | $-0.20468 \times 10^{-4}$ |
| | $A_6 =$ | $0.31399 \times 10^{-7}$ |
| | $A_8 =$ | $-0.22270 \times 10^{-8}$ |
| | $A_{10} =$ | $0.90776 \times 10^{-11}$ |
| | $A_{12} =$ | $-0.35883 \times 10^{-13}$ |
| $r_6$: | $\epsilon =$ | $0.10000 \times 10$ |
| | $A_4 =$ | $-0.21932 \times 10^{-4}$ |
| | $A_6 =$ | $-0.72202 \times 10^{-7}$ |
| | $A_8 =$ | $0.54981 \times 10^{-10}$ |
| | $A_{10} =$ | $-0.11269 \times 10^{-10}$ |
| | $A_{12} =$ | $0.48293 \times 10^{-13}$ |
| $r_8$: | $\epsilon =$ | $0.10000 \times 10$ |
| | $A_4 =$ | $0.54424 \times 10^{-4}$ |
| | $A_6 =$ | $0.17441 \times 10^{-6}$ |
| | $A_8 =$ | $0.35623 \times 10^{-9}$ |
| | $A_{10} =$ | $-0.84395 \times 10^{-12}$ |
| | $A_{12} =$ | $0.38732 \times 10^{-13}$ |

TABLE 21

<Embodiment 21>
$f = 36.0 \sim 49.5 \sim 68.0$  $F_{NO} = 4.6 \sim 5.2 \sim 5.65$

| Radius of Curvature | | Axial Distance | Refractive Index | Abbe Number |
|---|---|---|---|---|
| $r_1^*$ | 487.322 | | | |
| | | $d_1$ 1.500 | $N_1$ 1.74250 | $\nu_1$ 52.47 |
| $r_2$ | 20.782 | | | |
| | | $d_2$ 5.796 | | |
| $r_3^*$ | $-84.428$ | | | |
| | | $d_3$ 4.189 | $N_2$ 1.75000 | $\nu_2$ 25.14 |
| $r_4^*$ | $-49.169$ | | | |
| | | $d_4$ 21.216~11.539~4.500 | | |
| $r_5^*$ | 13.581 | | | |
| | | $d_5$ 6.964 | $N_3$ 1.58170 | $\nu_3$ 69.75 |
| $r_6^*$ | 123.215 | | | |
| | | $d_6$ 5.450 | | |
| $r_7^*$ | $-157.005$ | | | |
| | | $d_7$ 5.800 | $N_4$ 1.83350 | $\nu_4$ 21.00 |
| $r_8$ | 91.621 | | | |

| Aspherical coefficient | | |
|---|---|---|
| $r_1$: | $\epsilon =$ | $0.10000 \times 10$ |
| | $A_4 =$ | $0.23996 \times 10^{-4}$ |
| | $A_6 =$ | $-0.11664 \times 10^{-6}$ |
| | $A_8 =$ | $0.37841 \times 10^{-8}$ |
| | $A_{10} =$ | $-0.35590 \times 10^{-10}$ |
| | $A_{12} =$ | $0.16451 \times 10^{-12}$ |
| $r_3$: | $\epsilon =$ | $0.10000 \times 10$ |
| | $A_4 =$ | $-0.11749 \times 10^{-3}$ |
| | $A_6 =$ | $-0.39275 \times 10^{-6}$ |
| | $A_8 =$ | $-0.42481 \times 10^{-8}$ |
| | $A_{10} =$ | $-0.35131 \times 10^{-10}$ |
| | $A_{12} =$ | $0.29834 \times 10^{-14}$ |
| $r_4$: | $\epsilon =$ | $0.10000 \times 10$ |
| | $A_4 =$ | $-0.91674 \times 10^{-4}$ |
| | $A_6 =$ | $-0.52135 \times 10^{-7}$ |
| | $A_8 =$ | $-0.37133 \times 10^{-8}$ |
| | $A_{10} =$ | $-0.24487 \times 10^{-12}$ |
| | $A_{12} =$ | $0.15003 \times 10^{-12}$ |
| $r_5$: | $\epsilon =$ | $0.10000 \times 10$ |
| | $A_4 =$ | $-0.25231 \times 10^{-5}$ |
| | $A_6 =$ | $0.24205 \times 10^{-6}$ |
| | $A_8 =$ | $-0.20384 \times 10^{-8}$ |
| | $A_{10} =$ | $0.11086 \times 10^{-10}$ |
| | $A_{12} =$ | $0.21595 \times 10^{-13}$ |
| $r_6$: | $\epsilon =$ | $0.10000 \times 10$ |
| | $A_4 =$ | $0.55329 \times 10^{-5}$ |
| | $A_6 =$ | $0.22957 \times 10^{-6}$ |
| | $A_8 =$ | $-0.13147 \times 10^{-8}$ |
| | $A_{10} =$ | $-0.23746 \times 10^{-10}$ |
| | $A_{12} =$ | $0.17962 \times 10^{-12}$ |
| $r_7$: | $\epsilon =$ | $0.10000 \times 10$ |
| | $A_4 =$ | $-0.88146 \times 10^{-4}$ |
| | $A_6 =$ | $-0.41099 \times 10^{-6}$ |
| | $A_8 =$ | $-0.40488 \times 10^{-8}$ |
| | $A_{10} =$ | $-0.47904 \times 10^{-10}$ |
| | $A_{12} =$ | $-0.52478 \times 10^{-12}$ |

TABLE 22

<Embodiment 22>
$f = 36.0 \sim 49.5 \sim 68.0 \quad F_{NO} = 4.6 \sim 5.2 \sim 5.65$

| Radius of Curvature | | Axial Distance | | Refractive Index | | Abbe Number |
|---|---|---|---|---|---|---|
| $r_1^*$ 119.347 | | | | | | |
| | $d_1$ | 1.500 | $N_1$ | 1.74250 | $\nu_1$ | 52.47 |
| $r_2$ 17.085 | | | | | | |
| | $d_2$ | 5.796 | | | | |
| $r_3^*$ −50.196 | | | | | | |
| | $d_3$ | 4.189 | $N_2$ | 1.75000 | $\nu_2$ | 25.14 |
| $r_4^*$ −33.112 | | | | | | |
| | $d_4$ | 23.505~12.503~4.500 | | | | |
| $r_5$ 16.337 | | | | | | |
| | $d_5$ | 6.964 | $N_3$ | 1.58170 | $\nu_3$ | 69.75 |
| $r_6$ −126.234 | | | | | | |
| | $d_6$ | 5.450 | | | | |
| $r_7^*$ −20.612 | | | | | | |
| | $d_7$ | 5.800 | $N_4$ | 1.83350 | $\nu_4$ | 21.00 |
| $r_8^*$ −35.370 | | | | | | |

Aspherical coefficient $r_1$: $\epsilon = 0.10000 \times 10$
$A_4 = 0.17891 \times 10^{-4}$
$A_6 = -0.11037 \times 10^{-6}$
$A_8 = 0.38097 \times 10^{-8}$
$A_{10} = -0.33295 \times 10^{-10}$
$A_{12} = 0.18005 \times 10^{-12}$ $r_3$: $\epsilon = 0.10000 \times 10$
$A_4 = -0.11502 \times 10^{-3}$
$A_6 = -0.46524 \times 10^{-6}$
$A_8 = -0.49570 \times 10^{-8}$
$A_{10} = -0.75549 \times 10^{-10}$
$A_{12} = -0.57006 \times 10^{-12}$ $r_4$: $\epsilon = 0.10000 \times 10$
$A_4 = -0.90313 \times 10^{-4}$
$A_6 = -0.15729 \times 10^{-6}$
$A_8 = -0.42148 \times 10^{-8}$
$A_{10} = 0.17514 \times 10^{-11}$
$A_{12} = -0.62122 \times 10^{-13}$ $r_7$: $\epsilon = 0.10000 \times 10$
$A_4 = 0.32240 \times 10^{-4}$
$A_6 = 0.24784 \times 10^{-6}$
$A_8 = -0.87517 \times 10^{-9}$
$A_{10} = 0.11275 \times 10^{-11}$
$A_{12} = 0.47100 \times 10^{-14}$ $r_8$: $\epsilon = 0.10000 \times 10$
$A_4 = 0.60991 \times 10^{-4}$
$A_6 = 0.23001 \times 10^{-6}$
$A_8 = 0.14152 \times 10^{-8}$
$A_{10} = -0.19258 \times 10^{-11}$
$A_{12} = 0.74110 \times 10^{-14}$

TABLE 23

<Embodiment 23>
$f = 36.0 \sim 49.5 \sim 68.0 \quad F_{NO} = 4.6 \sim 5.2 \sim 5.7$

| Radius of Curvature | | Axial Distance | | Refractive Index | | Abbe Number |
|---|---|---|---|---|---|---|
| $r_1^*$ −342.711 | | | | | | |
| | $d_1$ | 1.515 | $N_1$ | 1.76500 | $\nu_1$ | 46.25 |
| $r_2$ 19.145 | | | | | | |
| | $d_2$ | 4.738 | | | | |
| $r_3^*$ 42.200 | | | | | | |
| | $d_3$ | 4.222 | $N_2$ | 1.75520 | $\nu_2$ | 27.51 |
| $r_4^*$ 199.223 | | | | | | |
| | $d_4$ | 18.728~8.755~1.500 | | | | |
| $r_5$ ∞ (aperture) | | | | | | |
| | $d_5$ | 3.000 | | | | |
| $r_6^*$ 14.487 | | | | | | |
| | $d_6$ | 6.200 | $N_3$ | 1.58170 | $\nu_3$ | 69.75 |
| $r_7$ −193.570 | | | | | | |
| | $d_7$ | 4.464 | | | | |
| $r_8^*$ −59.348 | | | | | | |
| | $d_8$ | 3.061 | $N_4$ | 1.84666 | $\nu_4$ | 23.82 |
| $r_9^*$ 733.536 | | | | | | |
| | $d_9$ | 8.550~18.118~31.263 | | | | |
| $r_{10}$ 40.277 | | | | | | |
| | $d_{10}$ | 2.000 | $N_5$ | 1.75520 | $\nu_5$ | 27.51 |
| $r_{11}$ 33.550 | | | | | | |

Aspherical coefficient $r_1$: $\epsilon = 0.10000 \times 10$
$A_4 = 0.33483 \times 10^{-4}$
$A_6 = -0.19746 \times 10^{-6}$
$A_8 = 0.19058 \times 10^{-8}$
$A_{10} = -0.86483 \times 10^{-11}$
$A_{12} = 0.23793 \times 10^{-13}$ $r_3$: $\epsilon = 0.10000 \times 10$
$A_4 = -0.94605 \times 10^{-4}$
$A_6 = 0.39144 \times 10^{-7}$
$A_8 = -0.34518 \times 10^{-8}$
$A_{10} = -0.13838 \times 10^{-10}$
$A_{12} = -0.67019 \times 10^{-14}$ $r_4$: $\epsilon = 0.10000 \times 10$
$A_4 = -0.82213 \times 10^{-4}$
$A_6 = 0.19660 \times 10^{-6}$
$A_8 = -0.76263 \times 10^{-8}$
$A_{10} = 0.57621 \times 10^{-10}$
$A_{12} = -0.22104 \times 10^{-12}$ $r_6$: $\epsilon = 0.10000 \times 10$
$A_4 = -0.88609 \times 10^{-5}$
$A_6 = -0.58250 \times 10^{-7}$
$A_8 = 0.62214 \times 10^{-9}$
$A_{10} = -0.70746 \times 10^{-11}$
$A_{12} = 0.42625 \times 10^{-13}$ $r_8$: $\epsilon = 0.10000 \times 10$
$A_4 = 0.70467 \times 10^{-4}$
$A_6 = 0.16893 \times 10^{-6}$
$A_8 = -0.61804 \times 10^{-8}$
$A_{10} = 0.17539 \times 10^{-11}$
$A_{12} = -0.76304 \times 10^{-13}$ $r_9$: $\epsilon = 0.10000 \times 10$
$A_4 = 0.14195 \times 10^{-3}$
$A_6 = 0.34389 \times 10^{-6}$
$A_8 = 0.21065 \times 10^{-8}$
$A_{10} = -0.17720 \times 10^{-10}$
$A_{12} = -0.41558 \times 10^{-12}$

TABLE 24

<Embodiment 24>
$f = 36.0 \sim 49.5 \sim 68.0 \quad F_{NO} = 4.6 \sim 5.2 \sim 5.6$

| Radius of Curvature | | Axial Distance | | Refractive Index | | Abbe Number |
|---|---|---|---|---|---|---|
| $r_1^*$ −102.514 | | | | | | |
| | $d_1$ | 1.511 | $N_1$ | 1.76500 | $\nu_1$ | 46.25 |
| $r_2$ 21.698 | | | | | | |
| | $d_2$ | 4.883 | | | | |
| $r_3^*$ 42.641 | | | | | | |
| | $d_3$ | 3.982 | $N_2$ | 1.75520 | $\nu_2$ | 27.51 |
| $r_4^*$ 516.540 | | | | | | |
| | $d_4$ | 21.229~9.807~1.500 | | | | |
| $r_5$ ∞ (aperture) | | | | | | |
| | $d_5$ | 3.000 | | | | |
| $r_6^*$ 13.837 | | | | | | |
| | $d_6$ | 6.207 | $N_3$ | 1.58170 | $\nu_3$ | 69.75 |
| $r_7$ −1302.236 | | | | | | |
| | $d_7$ | 4.546 | | | | |
| $r_8^*$ −53.085 | | | | | | |
| | $d_8$ | 2.625 | $N_4$ | 1.84666 | $\nu_4$ | 23.82 |
| $r_9^*$ 575.947 | | | | | | |
| | $d_9$ | 8.550~17.671~30.202 | | | | |
| $r_{10}$ 33.128 | | | | | | |
| | $d_{10}$ | 2.000 | $N_5$ | 1.75520 | $\nu_5$ | 27.51 |
| $r_{11}$ 28.028 | | | | | | |

Aspherical coefficient $r_1$: $\epsilon = 0.10000 \times 10$
$A_4 = 0.42670 \times 10^{-4}$
$A_6 = -0.24306 \times 10^{-6}$
$A_8 = 0.19305 \times 10^{-8}$
$A_{10} = -0.61565 \times 10^{-11}$
$A_{12} = 0.98368 \times 10^{-14}$ $r_3$: $\epsilon = 0.10000 \times 10$
$A_4 = -0.10171 \times 10^{-3}$
$A_6 = 0.61873 \times 10^{-7}$
$A_8 = -0.38649 \times 10^{-8}$
$A_{10} = -0.13026 \times 10^{-10}$
$A_{12} = -0.17598 \times 10^{-13}$

TABLE 24-continued $r_4$: $\epsilon = 0.10000 \times 10$
$A_4 = -0.80693 \times 10^{-4}$
$A_6 = 0.18595 \times 10^{-6}$
$A_8 = -0.77617 \times 10^{-8}$
$A_{10} = 0.56569 \times 10^{-10}$
$A_{12} = -0.22123 \times 10^{-12}$
$r_6$: $\epsilon = 0.10000 \times 10$
$A_4 = -0.53267 \times 10^{-5}$
$A_6 = -0.11274 \times 10^{-7}$
$A_8 = 0.39260 \times 10^{-9}$
$A_{10} = -0.70470 \times 10^{-11}$
$A_{12} = 0.63046 \times 10^{-13}$
$r_8$: $\epsilon = 0.10000 \times 10$
$A_4 = 0.60099 \times 10^{-4}$
$A_6 = 0.11833 \times 10^{-6}$
$A_8 = -0.72284 \times 10^{-8}$
$A_{10} = -0.57160 \times 10^{-11}$
$A_{12} = -0.11591 \times 10^{-12}$
$r_9$: $\epsilon = 0.10000 \times 10$
$A_4 = 0.14385 \times 10^{-3}$
$A_6 = 0.35073 \times 10^{-6}$
$A_8 = 0.21307 \times 10^{-8}$
$A_{10} = -0.18190 \times 10^{-10}$
$A_{12} = -0.42112 \times 10^{-12}$

TABLE 25

<Embodiment 25>
$f = 36.0 \sim 49.5 \sim 68.0$   $F_{NO} = 4.6 \sim 5.2 \sim 5.6$

| Radius of Curvature | Axial Distance | Refractive Index | Abbe Number |
|---|---|---|---|
| $r_1^*$  −168.188 | | | |
| | $d_1$  1.511 | $N_1$  1.76500 | $\nu_1$  46.25 |
| $r_2$  18.131 | | | |
| | $d_2$  4.725 | | |
| $r_3^*$  35.281 | | | |
| | $d_3$  4.188 | $N_2$  1.75520 | $\nu_2$  27.51 |
| $r_4^*$  121.887 | | | |
| | $d_4$  16.128~7.660~1.500 | | |
| $r_5$  ∞ (aperture) | | | |
| | $d_5$  3.000 | | |
| $r_6^*$  13.622 | | | |
| | $d_6$  6.308 | $N_3$  1.58170 | $\nu_3$  69.75 |
| $r_7$  −167.594 | | | |
| | $d_7$  4.497 | | |
| $r_8^*$  −51.661 | | | |
| | $d_8$  2.782 | $N_4$  1.84666 | $\nu_4$  23.82 |
| $r_9^*$  803.904 | | | |
| | $d_9$  8.550~18.529~31.239 | | |
| $r_{10}$  56.949 | | | |
| | $d_{10}$  2.000 | $N_5$  1.75520 | $\nu_5$  27.51 |
| $r_{11}$  44.514 | | | |

Aspherical coefficient $r_1$: $\epsilon = 0.10000 \times 10$
$A_4 = 0.40127 \times 10^{-4}$
$A_6 = -0.24652 \times 10^{-6}$
$A_8 = 0.17313 \times 10^{-8}$
$A_{10} = -0.30533 \times 10^{-11}$
$A_{12} = -0.36014 \times 10^{-14}$
$r_3$: $\epsilon = 0.10000 \times 10$
$A_4 = -0.96557 \times 10^{-4}$
$A_6 = 0.92171 \times 10^{-7}$
$A_8 = -0.37945 \times 10^{-8}$
$A_{10} = -0.13683 \times 10^{-10}$
$A_{12} = -0.28629 \times 10^{-13}$
$r_4$: $\epsilon = 0.10000 \times 10$
$A_4 = -0.81902 \times 10^{-4}$
$A_6 = 0.19514 \times 10^{-6}$
$A_8 = -0.77028 \times 10^{-8}$
$A_{10} = 0.56473 \times 10^{-10}$
$A_{12} = -0.22745 \times 10^{-12}$
$r_6$: $\epsilon = 0.10000 \times 10$
$A_4 = -0.96658 \times 10^{-5}$
$A_6 = -0.50974 \times 10^{-7}$
$A_8 = 0.46954 \times 10^{-9}$
$A_{10} = -0.37076 \times 10^{-11}$
$A_{12} = 0.20030 \times 10^{-13}$
$r_8$: $\epsilon = 0.10000 \times 10$
$A_4 = 0.55154 \times 10^{-4}$
$A_6 = 0.54310 \times 10^{-7}$

TABLE 25-continued $A_8 = -0.74035 \times 10^{-8}$
$A_{10} = -0.70122 \times 10^{-11}$
$A_{12} = -0.11835 \times 10^{-12}$
$r_9$: $\epsilon = 0.10000 \times 10$
$A_4 = 0.14378 \times 10^{-3}$
$A_6 = 0.33249 \times 10^{-6}$
$A_8 = 0.20221 \times 10^{-8}$
$A_{10} = -0.18426 \times 10^{-10}$
$A_{12} = -0.42005 \times 10^{-12}$

TABLE 26

<Embodiment 26>
$f = 36.0 \sim 49.5 \sim 68.0$   $F_{NO} = 4.6 \sim 5.2 \sim 5.6$

| Radius of Curvature | Axial Distance | Refractive Index | Abbe Number |
|---|---|---|---|
| $r_1^*$  −1834.862 | | | |
| | $d_1$  1.504 | $N_1$  1.76500 | $\nu_1$  46.25 |
| $r_2$  18.672 | | | |
| | $d_2$  4.527 | | |
| $r_3^*$  40.685 | | | |
| | $d_3$  4.067 | $N_2$  1.75520 | $\nu_2$  27.51 |
| $r_4^*$  140.085 | | | |
| | $d_4$  18.055~8.471~1.500 | | |
| $r_5$  ∞ (aperture) | | | |
| | $d_5$  3.000 | | |
| $r_6^*$  14.143 | | | |
| | $d_6$  6.062 | $N_3$  1.58170 | $\nu_3$  69.75 |
| $r_7$  −176.676 | | | |
| | $d_7$  4.309 | | |
| $r_8^*$  −57.340 | | | |
| | $d_8$  2.873 | $N_4$  1.84666 | $\nu_4$  23.82 |
| $r_9^*$  751.654 | | | |
| | $d_9$  8.550~17.987~30.951 | | |
| $r_{10}$  41.872 | | | |
| | $d_{10}$  2.000 | $N_5$  1.75520 | $\nu_5$  27.51 |
| $r_{11}$  34.346 | | | |

Aspherical coefficient $r_1$: $\epsilon = 0.10000 \times 10$
$A_4 = 0.25961 \times 10^{-4}$
$A_6 = -0.15260 \times 10^{-6}$
$A_8 = 0.14008 \times 10^{-8}$
$A_{10} = -0.47044 \times 10^{-11}$
$A_{12} = 0.10830 \times 10^{-13}$
$r_3$: $\epsilon = 0.10000 \times 10$
$A_4 = -0.89656 \times 10^{-4}$
$A_6 = 0.18076 \times 10^{-7}$
$A_8 = -0.30808 \times 10^{-8}$
$A_{10} = -0.14042 \times 10^{-10}$
$A_{12} = -0.22451 \times 10^{-13}$
$r_4$: $\epsilon = 0.10000 \times 10$
$A_4 = -0.83561 \times 10^{-4}$
$A_6 = 0.20055 \times 10^{-6}$
$A_8 = -0.75960 \times 10^{-8}$
$A_{10} = 0.57365 \times 10^{-10}$
$A_{12} = -0.22853 \times 10^{-12}$
$r_6$: $\epsilon = 0.10000 \times 10$
$A_4 = -0.83804 \times 10^{-5}$
$A_6 = -0.31801 \times 10^{-7}$
$A_8 = 0.41529 \times 10^{-9}$
$A_{10} = -0.56527 \times 10^{-11}$
$A_{11} = 0.46781 \times 10^{-13}$
$r_8$: $\epsilon = 0.10000 \times 10$
$A_4 = 0.65119 \times 10^{-4}$
$A_6 = 0.99479 \times 10^{-7}$
$A_8 = -0.60175 \times 10^{-8}$
$A_{10} = -0.30295 \times 10^{-11}$
$A_{12} = -0.15496 \times 10^{-12}$
$r_9$: $\epsilon = 0.10000 \times 10$
$A_4 = 0.14250 \times 10^{-3}$
$A_6 = 0.32988 \times 10^{-6}$
$A_8 = 0.20824 \times 10^{-8}$
$A_{10} = -0.17040 \times 10^{-10}$
$A_{12} = -0.40877 \times 10^{-12}$

TABLE 27

<Embodiment 27>

TABLE 27-continued $f = 36.0 \sim 49.5 \sim 68.0 \quad F_{NO} = 4.6 \sim 5.2 \sim 5.6$

| Radius of Curvature | Axial Distance | | Refractive Index | | Abbe Number |
|---|---|---|---|---|---|
| $r_1*$ −170.416 | | | | | |
| | $d_1$ | 1.512 | $N_1$ 1.76500 | $\nu_1$ | 46.25 |
| $r_2$ 21.210 | | | | | |
| | $d_2$ | 4.516 | | | |
| $r_3*$ 37.799 | | | | | |
| | $d_3$ | 3.709 | $N_2$ 1.75520 | $\nu_2$ | 27.51 |
| $r_4*$ 102.293 | | | | | |
| | $d_4$ | 17.965~8.433~1.500 | | | |
| $r_5$ ∞ (aperture) | | | | | |
| | $d_5$ | 3.000 | | | |
| $r_6*$ 14.331 | | | | | |
| | $d_6$ | 6.173 | $N_3$ 1.58170 | $\nu_3$ | 69.75 |
| $r_7$ −150.628 | | | | | |
| | $d_7$ | 4.545 | | | |
| $r_8*$ −60.123 | | | | | |
| | $d_8$ | 2.428 | $N_4$ 1.84666 | $\nu_4$ | 23.82 |
| $r_9*$ 537.386 | | | | | |
| | $d_9$ | 8.550~17.887~30.715 | | | |
| $r_{10}*$ 26.725 | | | | | |
| | $d_{10}$ | 2.000 | $N_5$ 1.75520 | $\nu_5$ | 27.51 |
| $r_{11}$ 22.657 | | | | | |

Aspherical coefficient $r_1$: $\epsilon = 0.10000 \times 10$
$A_4 = 0.31315 \times 10^{-4}$
$A_6 = -0.20835 \times 10^{-6}$
$A_8 = 0.20182 \times 10^{-8}$
$A_{10} = -0.91446 \times 10^{-11}$
$A_{12} = 0.22452 \times 10^{-13}$ $r_3$: $\epsilon = 0.10000 \times 10$
$A_4 = -0.94258 \times 10^{-4}$
$A_6 = 0.50950 \times 10^{-7}$
$A_8 = -0.34422 \times 10^{-8}$
$A_{10} = -0.12714 \times 10^{-10}$
$A_{12} = 0.12617 \times 10^{-13}$ $r_4$: $\epsilon = 0.10000 \times 10$
$A_4 = -0.81985 \times 10^{-4}$
$A_6 = 0.19722 \times 10^{-6}$
$A_8 = -0.76604 \times 10^{-8}$
$A_{10} = 0.57145 \times 10^{-10}$
$A_{12} = -0.22418 \times 10^{-12}$ $r_6$: $\epsilon = 0.10000 \times 10$
$A_4 = -0.84015 \times 10^{-5}$
$A_6 = -0.53066 \times 10^{-7}$
$A_8 = 0.66358 \times 10^{-9}$
$A_{10} = -0.79093 \times 10^{-11}$
$A_{12} = 0.38347 \times 10^{-13}$ $r_8$: $\epsilon = 0.10000 \times 10$
$A_4 = 0.67423 \times 10^{-4}$
$A_6 = 0.16107 \times 10^{-6}$
$A_8 = -0.62744 \times 10^{-8}$
$A_{10} = 0.46187 \times 10^{-12}$
$A_{12} = -0.82214 \times 10^{-13}$ $r_9$: $\epsilon = 0.10000 \times 10$
$A_4 = 0.14236 \times 10^{-3}$
$A_6 = 0.36046 \times 10^{-6}$
$A_8 = 0.21154 \times 10^{-8}$
$A_{10} = -0.17834 \times 10^{-10}$
$A_{12} = -0.41541 \times 10^{-12}$ $r_{10}$: $\epsilon = 0.10000 \times 10$
$A_4 = -0.32308 \times 10^{-5}$
$A_6 = 0.81768 \times 10^{-7}$
$A_8 = -0.71421 \times 10^{-9}$
$A_{10} = 0.27500 \times 10^{-11}$
$A_{12} = -0.13482 \times 10^{-14}$

TABLE 28

<Embodiment 28>

$f = 36.0 \sim 49.5 \sim 68.0 \quad F_{NO} = 4.6 \sim 5.2 \sim 5.6$

| Radius of Curvature | Axial Distance | | Refractive Index | | Abbe Number |
|---|---|---|---|---|---|
| $r_1*$ −208.570 | | | | | |
| | $d_1$ | 1.506 | $N_1$ 1.76500 | $\nu_1$ | 46.25 |
| $r_2$ 18.987 | | | | | |
| | $d_2$ | 4.402 | | | |
| $r_3*$ 40.293 | | | | | |
| | $d_3$ | 4.077 | $N_2$ 1.75520 | $\nu_2$ | 27.51 |
| $r_4*$ 80.378 | | | | | |
| | $d_4$ | 17.576~8.269~1.500 | | | |
| $r_5$ ∞ (aperture) | | | | | |
| | $d_5$ | 3.000 | | | |
| $r_6*$ 14.279 | | | | | |
| | $d_6$ | 5.979 | $N_3$ 1.58170 | $\nu_3$ | 69.75 |
| $r_7$ −218.016 | | | | | |
| | $d_7$ | 4.311 | | | |
| $r_8*$ −68.183 | | | | | |
| | $d_8$ | 2.443 | $N_4$ 1.84666 | $\nu_4$ | 23.82 |
| $r_9*$ 772.189 | | | | | |
| | $d_9$ | 8.550~17.969~30.911 | | | |
| $r_{10}$ 26.286 | | | | | |
| | $d_{10}$ | 2.000 | $N_5$ 1.75520 | $\nu_5$ | 27.51 |
| $r_{11}*$ 22.664 | | | | | |

Aspherical coefficient $r_1$: $\epsilon = 0.10000 \times 10$
$A_4 = 0.18346 \times 10^{-4}$
$A_6 = -0.10323 \times 10^{-6}$
$A_8 = 0.10047 \times 10^{-8}$
$A_{10} = -0.23578 \times 10^{-11}$
$A_{12} = 0.62032 \times 10^{-14}$ $r_3$: $\epsilon = 0.10000 \times 10$
$A_4 = -0.85642 \times 10^{-4}$
$A_6 = 0.48474 \times 10^{-7}$
$A_8 = -0.33489 \times 10^{-8}$
$A_{10} = -0.13053 \times 10^{-10}$
$A_{12} = 0.19753 \times 10^{-13}$ $r_4$: $\epsilon = 0.10000 \times 10$
$A_4 = -0.84277 \times 10^{-4}$
$A_6 = 0.21387 \times 10^{-6}$
$A_8 = -0.74796 \times 10^{-8}$
$A_{10} = 0.57863 \times 10^{-10}$
$A_{12} = -0.22798 \times 10^{-12}$ $r_6$: $\epsilon = 0.10000 \times 10$
$A_4 = -0.63596 \times 10^{-5}$
$A_6 = -0.45120 \times 10^{-7}$
$A_8 = 0.58667 \times 10^{-9}$
$A_{10} = -0.36849 \times 10^{-11}$
$A_{12} = 0.17484 \times 10^{-13}$ $r_8$: $\epsilon = 0.10000 \times 10$
$A_4 = 0.68365 \times 10^{-4}$
$A_6 = 0.73118 \times 10^{-7}$
$A_8 = -0.52986 \times 10^{-8}$
$A_{10} = -0.11807 \times 10^{-11}$
$A_{12} = -0.17058 \times 10^{-12}$ $r_9$: $\epsilon = 0.10000 \times 10$
$A_4 = 0.14210 \times 10^{-3}$
$A_6 = 0.33461 \times 10^{-6}$
$A_8 = 0.20657 \times 10^{-8}$
$A_{10} = -0.16907 \times 10^{-10}$
$A_{12} = -0.40581 \times 10^{-12}$ $r_{11}$: $\epsilon = 0.10000 \times 10$
$A_4 = 0.24421 \times 10^{-5}$
$A_6 = -0.53652 \times 10^{-7}$
$A_8 = 0.18992 \times 10^{-9}$
$A_{10} = 0.17396 \times 10^{-11}$
$A_{12} = -0.13502 \times 10^{-13}$

TABLE 29

<Embodiment 29>

$f = 36.0 \sim 49.5 \sim 68.0 \quad F_{NO} = 4.6 \sim 5.2 \sim 5.7$

| Radius of Curvature | Axial Distance | | Refractive Index | | Abbe Number |
|---|---|---|---|---|---|
| $r_1*$ 109.565 | | | | | |
| | $d_1$ | 1.507 | $N_1$ 1.76500 | $\nu_1$ | 46.25 |
| $r_2$ 17.607 | | | | | |
| | $d_2$ | 4.515 | | | |
| $r_3*$ 41.310 | | | | | |
| | $d_3$ | 4.302 | $N_2$ 1.75520 | $\nu_2$ | 27.51 |
| $r_4*$ 82.310 | | | | | |
| | $d_4$ | 17.703~8.323~1.500 | | | |
| $r_5$ ∞ (aperture) | | | | | |
| | $d_5$ | 3.000 | | | |
| $r_6*$ 14.278 | | | | | |
| | $d_6$ | 6.011 | $N_3$ 1.58170 | $\nu_3$ | 69.75 |
| $r_7$ −221.823 | | | | | |
| | $d_7$ | 4.267 | | | |

TABLE 29-continued

| | | | | | |
|---|---|---|---|---|---|
| $r_8^*$ −68.015 | | | | | |
| | $d_8$ 2.594 | | $N_4$ 1.84666 | $\nu_4$ 23.82 | |
| $r_9^*$ 875.021 | | | | | |
| | $d_9$ 8.550∼17.888∼30.717 | | | | |
| $r_{10}^*$ 34.758 | | | | | |
| | $d_{10}$ 2.000 | | $N_5$ 1.75520 | $\nu_5$ 27.51 | |
| $r_{11}^*$ 29.194 | | | | | |

Aspherical coefficient

$r_1$:
- $\epsilon = 0.10000 \times 10$
- $A_4 = 0.17731 \times 10^{-4}$
- $A_6 = -0.10982 \times 10^{-6}$
- $A_8 = 0.11929 \times 10^{-8}$
- $A_{10} = -0.40535 \times 10^{-11}$
- $A_{12} = 0.12135 \times 10^{-13}$ $r_3$:
- $\epsilon = 0.10000 \times 10$
- $A_4 = -0.82529 \times 10^{-4}$
- $A_6 = 0.27813 \times 10^{-7}$
- $A_8 = -0.31102 \times 10^{-8}$
- $A_{10} = -0.13616 \times 10^{-10}$
- $A_{12} = 0.95625 \times 10^{-14}$ $r_4$:
- $\epsilon = 0.10000 \times 10$
- $A_4 = -0.84387 \times 10^{-4}$
- $A_6 = 0.21176 \times 10^{-6}$
- $A_8 = -0.74734 \times 10^{-8}$
- $A_{10} = 0.58122 \times 10^{-10}$
- $A_{12} = -0.22717 \times 10^{-12}$ $r_6$:
- $\epsilon = 0.10000 \times 10$
- $A_4 = -0.70369 \times 10^{-5}$
- $A_6 = -0.35083 \times 10^{-7}$
- $A_8 = 0.49031 \times 10^{-9}$
- $A_{10} = -0.38404 \times 10^{-11}$
- $A_{12} = 0.23192 \times 10^{-13}$ $r_8$:
- $\epsilon = 0.10000 \times 10$
- $A_4 = 0.68624 \times 10^{-4}$
- $A_6 = 0.63897 \times 10^{-7}$
- $A_8 = -0.53458 \times 10^{-8}$
- $A_{10} = -0.54137 \times 10^{-12}$
- $A_{12} = -0.16173 \times 10^{-12}$ $r_9$:
- $\epsilon = 0.10000 \times 10$
- $A_4 = 0.14204 \times 10^{-3}$
- $A_6 = 0.32873 \times 10^{-6}$
- $A_8 = 0.20931 \times 10^{-8}$
- $A_{10} = -0.16561 \times 10^{-10}$
- $A_{12} = -0.40395 \times 10^{-12}$ $r_{10}$:
- $\epsilon = 0.10000 \times 10$
- $A_4 = -0.30712 \times 10^{-5}$
- $A_6 = 0.20768 \times 10^{-7}$
- $A_8 = -0.58742 \times 10^{-10}$
- $A_{10} = -0.43198 \times 10^{-12}$
- $A_{12} = 0.18586 \times 10^{-14}$ $r_{11}$:
- $\epsilon = 0.10000 \times 10$
- $A_4 = -0.17476 \times 10^{-6}$
- $A_6 = -0.29334 \times 10^{-7}$
- $A_8 = 0.15554 \times 10^{-9}$
- $A_{10} = 0.12142 \times 10^{-11}$
- $A_{12} = -0.11719 \times 10^{-13}$

TABLE 29

<Embodiment 29>
$f = 36.0 \sim 49.5 \sim 68.0$  $F_{NO} = 4.6 \sim 5.2 \sim 5.7$

| Radius of Curvature | Axial Distance | Refractive Index | Abbe Number |
|---|---|---|---|
| $r_1^*$ 523.412 | | | |
| | $d_1$ 1.503 | $N_1$ 1.76500 | $\nu_1$ 46.25 |
| $r_2$ 17.938 | | | |
| | $d_2$ 4.527 | | |
| $r_3^*$ 41.257 | | | |
| | $d_3$ 4.067 | $N_2$ 1.75520 | $\nu_2$ 27.51 |
| $r_4^*$ 141.663 | | | |
| | $d_4$ 17.847∼8.383∼1.500 | | |
| $r_5$ ∞ (aperture) | | | |
| | $d_5$ 3.000 | | |
| $r_6^*$ 14.042 | | | |
| | $d_6$ 6.062 | $N_3$ 1.58170 | $\nu_3$ 69.75 |
| $r_7$ −172.056 | | | |
| | $d_7$ 4.309 | | |
| $r_8^*$ −56.509 | | | |
| | $d_8$ 2.873 | $N_4$ 1.84666 | $\nu_4$ 23.82 |
| $r_9^*$ 552.544 | | | |
| | $d_9$ 8.550∼18.092∼31.201 | | |
| $r_{10}^*$ 27.467 | | | |
| | $d_{10}$ 2.000 | $N_5$ 1.75520 | $\nu_5$ 27.51 |
| $r_{11}^*$ 23.602 | | | |

Aspherical coefficient

$r_1$:
- $\epsilon = 0.10000 \times 10$
- $A_4 = 0.27822 \times 10^{-4}$
- $A_6 = -0.18778 \times 10^{-6}$
- $A_8 = 0.17125 \times 10^{-8}$
- $A_{10} = -0.55300 \times 10^{-11}$
- $A_{12} = 0.89015 \times 10^{-14}$ $r_3$:
- $\epsilon = 0.10000 \times 10$
- $A_4 = -0.88818 \times 10^{-4}$
- $A_6 = 0.35151 \times 10^{-7}$
- $A_8 = -0.32030 \times 10^{-8}$
- $A_{10} = -0.14464 \times 10^{-10}$
- $A_{12} = -0.96551 \times 10^{-14}$ $r_4$:
- $\epsilon = 0.10000 \times 10$
- $A_4 = -0.83456 \times 10^{-4}$
- $A_6 = 0.19935 \times 10^{-6}$
- $A_8 = -0.76025 \times 10^{-8}$
- $A_{10} = 0.57417 \times 10^{-10}$
- $A_{12} = -0.22543 \times 10^{-12}$ $r_6$:
- $\epsilon = 0.10000 \times 10$
- $A_4 = -0.90151 \times 10^{-5}$
- $A_6 = -0.33757 \times 10^{-7}$
- $A_8 = 0.51608 \times 10^{-9}$
- $A_{10} = -0.68367 \times 10^{-11}$
- $A_{12} = 0.48050 \times 10^{-13}$ $r_8$:
- $\epsilon = 0.10000 \times 10$
- $A_4 = 0.64998 \times 10^{-4}$
- $A_6 = 0.79400 \times 10^{-7}$
- $A_8 = -0.59785 \times 10^{-8}$
- $A_{10} = -0.15563 \times 10^{-11}$
- $A_{12} = -0.14159 \times 10^{-12}$ $r_9$:
- $\epsilon = 0.10000 \times 10$
- $A_4 = 0.14246 \times 10^{-3}$
- $A_6 = 0.35522 \times 10^{-6}$
- $A_8 = 0.21568 \times 10^{-8}$
- $A_{10} = -0.17099 \times 10^{-10}$
- $A_{12} = -0.41025 \times 10^{-12}$ $r_{10}$:
- $\epsilon = 0.10000 \times 10$
- $A_4 = -0.25095 \times 10^{-5}$
- $A_6 = 0.82889 \times 10^{-7}$
- $A_8 = -0.45433 \times 10^{-9}$
- $A_{10} = -0.14266 \times 10^{-11}$
- $A_{12} = 0.12531 \times 10^{-13}$ $r_{11}$:
- $\epsilon = 0.10000 \times 10$
- $A_4 = 0.20154 \times 10^{-5}$
- $A_6 = -0.75372 \times 10^{-9}$
- $A_8 = 0.29120 \times 10^{-9}$
- $A_{10} = -0.43587 \times 10^{-11}$
- $A_{12} = 0.13713 \times 10^{-13}$

TABLE 31

| | (Conditions (9) (10)) | |
|---|---|---|
| | $\dfrac{\sqrt{\phi_w \cdot \phi_T}}{\beta \cdot \phi_1}$ | $\dfrac{\sqrt{\phi_w \cdot \phi_T}}{\beta \cdot \phi_2}$ |
| Embodiment 1 | −0.385 | 0.308 |
| Embodiment 2 | −0.324 | 0.302 |
| Embodiment 3 | −0.465 | 0.339 |
| Embodiment 4 | −0.535 | 0.358 |
| Embodiment 5 | −0.385 | 0.321 |
| Embodiment 6 | −0.455 | 0.382 |

TABLE 32

| | (Conditions (11) (12)) | |
|---|---|---|
| | $\dfrac{\phi_1}{\phi_w}$ | $\dfrac{\phi_2}{\phi_w}$ |
| Embodiment 1 | −1.000 | 1.251 |
| Embodiment 2 | −1.188 | 1.28 |
| Embodiment 3 | −0.828 | 1.138 |
| Embodiment 4 | −0.72 | 1.0764 |
| Embodiment 5 | −1.000 | 1.200 |

TABLE 32-continued (Conditions (11) (12))

|  | $\dfrac{\phi_1}{\phi_w}$ | $\dfrac{\phi_2}{\phi_w}$ |
|---|---|---|
| Embodiment 6 | −0.846 | 1.009 |

TABLE 33

(Embodiment 1)

| | (I) | (II) |
|---|---|---|
| y | 4th surface | 5th surface |
| $0.1Y_{max}$ | $-8.10 \times 10^{-7}$ | $-6.47 \times 10^{-7}$ |
| $0.2Y_{max}$ | $-6.42 \times 10^{-6}$ | $-5.25 \times 10^{-6}$ |
| $0.3Y_{max}$ | $-2.15 \times 10^{-5}$ | $-1.82 \times 10^{-5}$ |
| $0.4Y_{max}$ | $-5.06 \times 10^{-5}$ | $-4.46 \times 10^{-5}$ |
| $0.5Y_{max}$ | $-9.90 \times 10^{-5}$ | $-9.09 \times 10^{-5}$ |
| $0.6Y_{max}$ | $-1.73 \times 10^{-4}$ | $-1.65 \times 10^{-4}$ |
| $0.7Y_{max}$ | $-2.82 \times 10^{-4}$ | $-2.75 \times 10^{-4}$ |
| $0.8Y_{max}$ | $-4.35 \times 10^{-4}$ | $-4.31 \times 10^{-4}$ |
| $0.9Y_{max}$ | $-6.45 \times 10^{-4}$ | $-6.41 \times 10^{-4}$ |
| $1.0Y_{max}$ | $-9.13 \times 10^{-4}$ | $-9.01 \times 10^{-4}$ |

| | (II) | |
|---|---|---|
| y | 7th surface | 8th surface |
| $0.1Y_{max}$ | $1.85 \times 10^{-6}$ | $-2.97 \times 10^{-6}$ |
| $0.2Y_{max}$ | $1.48 \times 10^{-5}$ | $-2.38 \times 10^{-5}$ |
| $0.3Y_{max}$ | $3.04 \times 10^{-5}$ | $-8.07 \times 10^{-5}$ |
| $0.4Y_{max}$ | $1.17 \times 10^{-4}$ | $-1.93 \times 10^{-4}$ |
| $0.5Y_{max}$ | $2.25 \times 10^{-4}$ | $-3.80 \times 10^{-4}$ |
| $0.6Y_{max}$ | $3.79 \times 10^{-4}$ | $-6.63 \times 10^{-4}$ |
| $0.7Y_{max}$ | $5.78 \times 10^{-4}$ | $-1.07 \times 10^{-3}$ |
| $0.8Y_{max}$ | $8.10 \times 10^{-4}$ | $-1.61 \times 10^{-3}$ |
| $0.9Y_{max}$ | $1.05 \times 10^{-3}$ | $-2.33 \times 10^{-3}$ |
| $1.0Y_{max}$ | $1.22 \times 10^{-3}$ | $-3.25 \times 10^{-3}$ |

TABLE 34

(Embodiment 2)

| | (I) | (II) |
|---|---|---|
| y | 4th surface | 5th surface |
| $0.1Y_{max}$ | $-9.08 \times 10^{-7}$ | $-2.33 \times 10^{-6}$ |
| $0.2Y_{max}$ | $-7.27 \times 10^{-6}$ | $-1.89 \times 10^{-5}$ |
| $0.3Y_{max}$ | $-2.45 \times 10^{-5}$ | $-6.56 \times 10^{-5}$ |
| $0.4Y_{max}$ | $-5.83 \times 10^{-5}$ | $-1.63 \times 10^{-4}$ |
| $0.5Y_{max}$ | $-1.14 \times 10^{-4}$ | $-3.43 \times 10^{-4}$ |
| $0.6Y_{max}$ | $-1.99 \times 10^{-4}$ | $-6.57 \times 10^{-4}$ |
| $0.7Y_{max}$ | $-3.21 \times 10^{-4}$ | $-1.19 \times 10^{-3}$ |
| $0.8Y_{max}$ | $-4.90 \times 10^{-4}$ | $-2.10 \times 10^{-3}$ |
| $0.9Y_{max}$ | $-7.21 \times 10^{-4}$ | $-3.60 \times 10^{-3}$ |
| $1.0Y_{max}$ | $-1.04 \times 10^{-3}$ | $-6.07 \times 10^{-3}$ |

| | (II) | |
|---|---|---|
| y | 6th surface | 7th surface |
| $0.1Y_{max}$ | $2.54 \times 10^{-6}$ | $2.63 \times 10^{-6}$ |
| $0.2Y_{max}$ | $2.10 \times 10^{-5}$ | $2.06 \times 10^{-5}$ |
| $0.3Y_{max}$ | $7.43 \times 10^{-5}$ | $6.73 \times 10^{-5}$ |
| $0.4Y_{max}$ | $1.88 \times 10^{-4}$ | $1.52 \times 10^{-4}$ |
| $0.5Y_{max}$ | $3.98 \times 10^{-4}$ | $2.82 \times 10^{-4}$ |
| $0.6Y_{max}$ | $7.55 \times 10^{-4}$ | $4.61 \times 10^{-4}$ |
| $0.7Y_{max}$ | $1.33 \times 10^{-3}$ | $6.97 \times 10^{-4}$ |
| $0.8Y_{max}$ | $2.22 \times 10^{-3}$ | $1.01 \times 10^{-3}$ |
| $0.9Y_{max}$ | $3.56 \times 10^{-3}$ | $1.45 \times 10^{-3}$ |
| $1.0Y_{max}$ | $5.53 \times 10^{-3}$ | $2.09 \times 10^{-3}$ |

| | (II) |
|---|---|
| y | 8th surface |
| $0.1Y_{max}$ | $-4.76 \times 10^{-6}$ |
| $0.2Y_{max}$ | $-3.80 \times 10^{-5}$ |
| $0.3Y_{max}$ | $-1.28 \times 10^{-4}$ |
| $0.4Y_{max}$ | $-3.01 \times 10^{-4}$ |
| $0.5Y_{max}$ | $-5.86 \times 10^{-4}$ |
| $0.6Y_{max}$ | $-1.01 \times 10^{-3}$ |
| $0.7Y_{max}$ | $-1.61 \times 10^{-3}$ |
| $0.8Y_{max}$ | $-2.43 \times 10^{-3}$ |
| $0.9Y_{max}$ | $-3.53 \times 10^{-3}$ |
| $1.0Y_{max}$ | $-5.00 \times 10^{-3}$ |

TABLE 35

(Embodiment 3)

| | (I) | |
|---|---|---|
| y | 2nd surface | 4th surface |
| $0.1Y_{max}$ | $1.40 \times 10^{-7}$ | $-6.86 \times 10^{-7}$ |
| $0.2Y_{max}$ | $1.33 \times 10^{-6}$ | $-5.56 \times 10^{-6}$ |
| $0.3Y_{max}$ | $5.39 \times 10^{-6}$ | $-1.89 \times 10^{-5}$ |
| $0.4Y_{max}$ | $1.58 \times 10^{-5}$ | $-4.55 \times 10^{-5}$ |
| $0.5Y_{max}$ | $3.67 \times 10^{-5}$ | $-9.05 \times 10^{-5}$ |
| $0.6Y_{max}$ | $7.52 \times 10^{-5}$ | $-1.60 \times 10^{-4}$ |
| $0.7Y_{max}$ | $1.39 \times 10^{-4}$ | $-2.63 \times 10^{-4}$ |
| $0.8Y_{max}$ | $2.36 \times 10^{-4}$ | $-4.07 \times 10^{-4}$ |
| $0.9Y_{max}$ | $3.83 \times 10^{-4}$ | $-6.08 \times 10^{-4}$ |
| $1.0Y_{max}$ | $6.13 \times 10^{-4}$ | $-8.80 \times 10^{-4}$ |

| | (II) | |
|---|---|---|
| y | 5th surface | 7th surface |
| $0.1Y_{max}$ | $-4.32 \times 10^{-7}$ | $3.95 \times 10^{-7}$ |
| $0.2Y_{max}$ | $-3.42 \times 10^{-6}$ | $2.95 \times 10^{-6}$ |
| $0.3Y_{max}$ | $-1.10 \times 10^{-5}$ | $8.64 \times 10^{-6}$ |
| $0.4Y_{max}$ | $-2.46 \times 10^{-5}$ | $1.57 \times 10^{-5}$ |
| $0.5Y_{max}$ | $-4.49 \times 10^{-5}$ | $1.82 \times 10^{-5}$ |
| $0.6Y_{max}$ | $-7.27 \times 10^{-5}$ | $3.40 \times 10^{-6}$ |
| $0.7Y_{max}$ | $-1.10 \times 10^{-4}$ | $-5.09 \times 10^{-5}$ |
| $0.8Y_{max}$ | $-1.61 \times 10^{-4}$ | $-1.80 \times 10^{-4}$ |
| $0.9Y_{max}$ | $-2.37 \times 10^{-4}$ | $-4.39 \times 10^{-4}$ |
| $1.0Y_{max}$ | $-3.56 \times 10^{-4}$ | $-9.05 \times 10^{-4}$ |

| | (II) |
|---|---|
| y | 8th surface |
| $0.1Y_{max}$ | $-2.27 \times 10^{-6}$ |
| $0.2Y_{max}$ | $-1.81 \times 10^{-5}$ |
| $0.3Y_{max}$ | $-6.08 \times 10^{-5}$ |
| $0.4Y_{max}$ | $-1.43 \times 10^{-4}$ |
| $0.5Y_{max}$ | $-2.75 \times 10^{-4}$ |
| $0.6Y_{max}$ | $-4.65 \times 10^{-4}$ |
| $0.7Y_{max}$ | $-7.18 \times 10^{-4}$ |
| $0.8Y_{max}$ | $-1.03 \times 10^{-3}$ |
| $0.9Y_{max}$ | $-1.39 \times 10^{-3}$ |
| $1.0Y_{max}$ | $-1.78 \times 10^{-3}$ |

TABLE 36

(Embodiment 4)

| | (I) | (II) |
|---|---|---|
| y | 2nd surface | 5th surface |
| $0.1Y_{max}$ | $-3.25 \times 10^{-7}$ | $-2.63 \times 10^{-7}$ |
| $0.2Y_{max}$ | $-2.52 \times 10^{-6}$ | $-2.00 \times 10^{-6}$ |
| $0.3Y_{max}$ | $-8.23 \times 10^{-6}$ | $-6.33 \times 10^{-6}$ |
| $0.4Y_{max}$ | $-1.89 \times 10^{-5}$ | $-1.38 \times 10^{-5}$ |
| $0.5Y_{max}$ | $-3.60 \times 10^{-5}$ | $-2.44 \times 10^{-5}$ |
| $0.6Y_{max}$ | $-6.21 \times 10^{-5}$ | $-3.80 \times 10^{-5}$ |
| $0.7Y_{max}$ | $-1.02 \times 10^{-4}$ | $-5.51 \times 10^{-5}$ |
| $0.8Y_{max}$ | $-1.64 \times 10^{-4}$ | $-7.80 \times 10^{-5}$ |
| $0.9Y_{max}$ | $-2.61 \times 10^{-4}$ | $-1.12 \times 10^{-4}$ |
| $1.0Y_{max}$ | $-4.07 \times 10^{-4}$ | $-1.63 \times 10^{-4}$ |

| | (II) | |
|---|---|---|
| y | 7th surface | 8th surface |
| $0.1Y_{max}$ | $2.99 \times 10^{-7}$ | $-1.92 \times 10^{-6}$ |
| $0.2Y_{max}$ | $2.12 \times 10^{-6}$ | $-1.54 \times 10^{-5}$ |
| $0.3Y_{max}$ | $6.08 \times 10^{-6}$ | $-5.17 \times 10^{-5}$ |
| $0.4Y_{max}$ | $1.07 \times 10^{-5}$ | $-1.22 \times 10^{-4}$ |
| $0.5Y_{max}$ | $1.11 \times 10^{-5}$ | $-2.37 \times 10^{-4}$ |
| $0.6Y_{max}$ | $-2.52 \times 10^{-6}$ | $-4.06 \times 10^{-4}$ |
| $0.7Y_{max}$ | $-4.73 \times 10^{-5}$ | $-6.37 \times 10^{-4}$ |
| $0.8Y_{max}$ | $-1.50 \times 10^{-4}$ | $-9.35 \times 10^{-4}$ |
| $0.9Y_{max}$ | $-3.52 \times 10^{-4}$ | $-1.30 \times 10^{-3}$ |
| $1.0Y_{max}$ | $-7.12 \times 10^{-4}$ | $-1.73 \times 10^{-3}$ |

TABLE 37

(Embodiment 5)

| | (I) | |
|---|---|---|
| y | 1st surface | 2nd surface |
| $0.1Y_{max}$ | $6.33 \times 10^{-7}$ | $-5.02 \times 10^{-7}$ |
| $0.2Y_{max}$ | $4.93 \times 10^{-6}$ | $-3.99 \times 10^{-6}$ |

TABLE 37-continued (Embodiment 5)

| | | |
|---|---|---|
| $0.3Y_{max}$ | $1.62 \times 10^{-5}$ | $-1.31 \times 10^{-5}$ |
| $0.4Y_{max}$ | $3.72 \times 10^{-5}$ | $-2.97 \times 10^{-5}$ |
| $0.5Y_{max}$ | $6.95 \times 10^{-5}$ | $-5.45 \times 10^{-5}$ |
| $0.6Y_{max}$ | $1.13 \times 10^{-4}$ | $-8.58 \times 10^{-5}$ |
| $0.7Y_{max}$ | $1.68 \times 10^{-4}$ | $-1.19 \times 10^{-4}$ |
| $0.8Y_{max}$ | $2.30 \times 10^{-4}$ | $-1.43 \times 10^{-4}$ |
| $0.9Y_{max}$ | $2.94 \times 10^{-4}$ | $-1.43 \times 10^{-4}$ |
| $1.0Y_{max}$ | $3.54 \times 10^{-4}$ | $-9.16 \times 10^{-5}$ |

(I)

| y | 3rd surface | 4th surface |
|---|---|---|
| $0.1Y_{max}$ | $3.08 \times 10^{-7}$ | $-9.72 \times 10^{-8}$ |
| $0.2Y_{max}$ | $2.41 \times 10^{-6}$ | $-7.71 \times 10^{-6}$ |
| $0.3Y_{max}$ | $7.80 \times 10^{-6}$ | $-2.58 \times 10^{-5}$ |
| $0.4Y_{max}$ | $1.73 \times 10^{-5}$ | $-6.05 \times 10^{-5}$ |
| $0.5Y_{max}$ | $3.09 \times 10^{-5}$ | $-1.17 \times 10^{-4}$ |
| $0.6Y_{max}$ | $4.69 \times 10^{-5}$ | $-1.99 \times 10^{-4}$ |
| $0.7Y_{max}$ | $6.14 \times 10^{-5}$ | $-3.13 \times 10^{-4}$ |
| $0.8Y_{max}$ | $6.79 \times 10^{-5}$ | $-4.63 \times 10^{-4}$ |
| $0.9Y_{max}$ | $5.58 \times 10^{-5}$ | $-6.56 \times 10^{-4}$ |
| $1.0Y_{max}$ | $9.61 \times 10^{-6}$ | $-9.02 \times 10^{-4}$ |

(II)

| y | 5th surface | 6th surface |
|---|---|---|
| $0.1Y_{max}$ | $-1.55 \times 10^{-7}$ | $-7.59 \times 10^{-7}$ |
| $0.2Y_{max}$ | $-1.16 \times 10^{-6}$ | $-6.05 \times 10^{-6}$ |
| $0.3Y_{max}$ | $-3.36 \times 10^{-6}$ | $-2.05 \times 10^{-5}$ |
| $0.4Y_{max}$ | $-6.14 \times 10^{-6}$ | $-4.89 \times 10^{-5}$ |
| $0.5Y_{max}$ | $-7.42 \times 10^{-6}$ | $-9.60 \times 10^{-5}$ |
| $0.6Y_{max}$ | $-2.93 \times 10^{-6}$ | $-1.67 \times 10^{-4}$ |
| $0.7Y_{max}$ | $1.49 \times 10^{-5}$ | $-2.65 \times 10^{-4}$ |
| $0.8Y_{max}$ | $6.02 \times 10^{-5}$ | $-3.95 \times 10^{-4}$ |
| $0.9Y_{max}$ | $1.61 \times 10^{-4}$ | $-5.58 \times 10^{-4}$ |
| $1.0Y_{max}$ | $3.80 \times 10^{-4}$ | $-7.54 \times 10^{-4}$ |

(II)

| y | 7th surface | 8th surface |
|---|---|---|
| $0.1Y_{max}$ | $2.44 \times 10^{-6}$ | $-3.43 \times 10^{-6}$ |
| $0.2Y_{max}$ | $1.94 \times 10^{-5}$ | $-2.74 \times 10^{-5}$ |
| $0.3Y_{max}$ | $6.45 \times 10^{-5}$ | $-9.29 \times 10^{-5}$ |
| $0.4Y_{max}$ | $1.49 \times 10^{-4}$ | $-2.21 \times 10^{-4}$ |
| $0.5Y_{max}$ | $2.82 \times 10^{-4}$ | $-4.34 \times 10^{-4}$ |
| $0.6Y_{max}$ | $4.62 \times 10^{-4}$ | $-7.54 \times 10^{-4}$ |
| $0.7Y_{max}$ | $6.79 \times 10^{-4}$ | $-1.21 \times 10^{-3}$ |
| $0.8Y_{max}$ | $9.04 \times 10^{-4}$ | $-1.79 \times 10^{-3}$ |
| $0.9Y_{max}$ | $1.08 \times 10^{-3}$ | $-2.56 \times 10^{-3}$ |
| $1.0Y_{max}$ | $1.12 \times 10^{-3}$ | $-3.49 \times 10^{-3}$ |

TABLE 38

(Embodiment 6)

(I)

| y | 1st surface | 2nd surface |
|---|---|---|
| $0.1Y_{max}$ | $-3.705 \times 10^{-7}$ | $9.262 \times 10^{-8}$ |
| $0.2Y_{max}$ | $-6.132 \times 10^{-6}$ | $1.519 \times 10^{-6}$ |
| $0.3Y_{max}$ | $-3.214 \times 10^{-5}$ | $8.762 \times 10^{-6}$ |
| $0.4Y_{max}$ | $-1.070 \times 10^{-4}$ | $3.307 \times 10^{-5}$ |
| $0.5Y_{max}$ | $-2.801 \times 10^{-4}$ | $9.965 \times 10^{-5}$ |
| $0.6Y_{max}$ | $-6.330 \times 10^{-4}$ | $2.625 \times 10^{-4}$ |
| $0.7Y_{max}$ | $-1.297 \times 10^{-3}$ | $6.347 \times 10^{-4}$ |
| $0.8Y_{max}$ | $-2.467 \times 10^{-3}$ | $1.449 \times 10^{-3}$ |
| $0.9Y_{max}$ | $-4.401 \times 10^{-3}$ | $3.186 \times 10^{-3}$ |
| $1.0Y_{max}$ | $-7.353 \times 10^{-3}$ | $6.821 \times 10^{-3}$ |

(I)

| y | 3rd surface | 4th surface |
|---|---|---|
| $0.1Y_{max}$ | $4.759 \times 10^{-7}$ | $-4.759 \times 10^{-7}$ |
| $0.2Y_{max}$ | $7.526 \times 10^{-6}$ | $-7.632 \times 10^{-6}$ |
| $0.3Y_{max}$ | $3.828 \times 10^{-5}$ | $-3.885 \times 10^{-5}$ |
| $0.4Y_{max}$ | $1.217 \times 10^{-4}$ | $-1.235 \times 10^{-4}$ |
| $0.5Y_{max}$ | $2.989 \times 10^{-4}$ | $-3.039 \times 10^{-4}$ |
| $0.6Y_{max}$ | $6.226 \times 10^{-4}$ | $-6.357 \times 10^{-4}$ |
| $0.7Y_{max}$ | $1.154 \times 10^{-3}$ | $-1.189 \times 10^{-3}$ |
| $0.8Y_{max}$ | $1.196 \times 10^{-3}$ | $-2.050 \times 10^{-3}$ |
| $0.9Y_{max}$ | $3.074 \times 10^{-2}$ | $-3.321 \times 10^{-3}$ |
| $1.0Y_{max}$ | $4.500 \times 10^{-3}$ | $-5.120 \times 10^{-3}$ |

(II)

TABLE 38-continued (Embodiment 6)

| y | 5th surface | 6th surface |
|---|---|---|
| $0.1Y_{max}$ | $-1.367 \times 10^{-8}$ | $-2.050 \times 10^{-7}$ |
| $0.2Y_{max}$ | $-1.777 \times 10^{-7}$ | $-3.294 \times 10^{-6}$ |
| $0.3Y_{max}$ | $-2.050 \times 10^{-7}$ | $-1.705 \times 10^{-5}$ |
| $0.4Y_{max}$ | $-2.242 \times 10^{-6}$ | $-5.543 \times 10^{-5}$ |
| $0.5Y_{max}$ | $1.402 \times 10^{-5}$ | $-1.402 \times 10^{-4}$ |
| $0.6Y_{max}$ | $4.988 \times 10^{-5}$ | $-3.029 \times 10^{-4}$ |
| $0.7Y_{max}$ | $1.383 \times 10^{-4}$ | $-5.868 \times 10^{-4}$ |
| $0.8Y_{max}$ | $3.346 \times 10^{-4}$ | $-1.049 \times 10^{-3}$ |
| $0.9Y_{max}$ | $7.542 \times 10^{-4}$ | $-1.758 \times 10^{-3}$ |
| $1.0Y_{max}$ | $1.649 \times 10^{-3}$ | $-2.801 \times 10^{-3}$ |

(II)

| y | 7th surface | 8th surface |
|---|---|---|
| $0.1Y_{max}$ | $1.169 \times 10^{-7}$ | $-4.207 \times 10^{-7}$ |
| $0.2Y_{max}$ | $1.729 \times 10^{-6}$ | $-6.614 \times 10^{-6}$ |
| $0.3Y_{max}$ | $8.507 \times 10^{-6}$ | $-3.382 \times 10^{-5}$ |
| $0.4Y_{max}$ | $2.578 \times 10^{-5}$ | $-1.083 \times 10^{-4}$ |
| $0.5Y_{max}$ | $5.878 \times 10^{-5}$ | $-2.687 \times 10^{-4}$ |
| $0.6Y_{max}$ | $1.092 \times 10^{-4}$ | $-5.675 \times 10^{-4}$ |
| $0.7Y_{max}$ | $1.6748 \times 10^{-4}$ | $-1.072 \times 10^{-3}$ |
| $0.8Y_{max}$ | $1.972 \times 10^{-4}$ | $-1.866 \times 10^{-3}$ |
| $0.9Y_{max}$ | $1.036 \times 10^{-4}$ | $-3.052 \times 10^{-3}$ |
| $1.0Y_{max}$ | $-3.334 \times 10^{-4}$ | $-4.756 \times 10^{-3}$ |

TABLE 39

(Conditions (9) (10))

| | $\dfrac{\sqrt{\phi_w \cdot \phi_T}}{\beta \cdot \phi_1}$ | $\dfrac{\sqrt{\phi_w \cdot \phi_T}}{\beta \cdot \phi_2}$ |
|---|---|---|
| Embodiment 7 | −0.455 | 0.353 |
| Embodiment 8 | −0.535 | 0.358 |
| Embodiment 9 | −0.476 | 0.424 |
| Embodiment 10 | −0.424 | 0.390 |
| Embodiment 11 | −0.394 | 0.362 |

TABLE 40

(Conditions (11) (12))

| | $\dfrac{\phi_1}{\phi_w}$ | $\dfrac{\phi_2}{\phi_w}$ |
|---|---|---|
| Embodiment 7 | −0.846 | 1.092 |
| Embodiment 8 | −0.72 | 1.0764 |
| Embodiment 9 | −0.81 | 0.909 |
| Embodiment 10 | −0.651 | 0.885 |
| Embodiment 11 | −0.897 | 1.094 |

TABLE 41

(Embodiment 7)

| | (I) | (II) |
|---|---|---|
| y | 4th surface | 5th surface |
| $0.1Y_{max}$ | $-8.09 \times 10^{-7}$ | $-7.52 \times 10^{-7}$ |
| $0.2Y_{max}$ | $-6.38 \times 10^{-6}$ | $-6.00 \times 10^{-6}$ |
| $0.3Y_{max}$ | $-2.13 \times 10^{-5}$ | $-2.01 \times 10^{-5}$ |
| $0.4Y_{max}$ | $-5.00 \times 10^{-5}$ | $-4.77 \times 10^{-5}$ |
| $0.5Y_{max}$ | $-9.75 \times 10^{-5}$ | $-9.43 \times 10^{-5}$ |
| $0.6Y_{max}$ | $-1.70 \times 10^{-4}$ | $-1.67 \times 10^{-4}$ |
| $0.7Y_{max}$ | $-2.77 \times 10^{-4}$ | $-2.76 \times 10^{-4}$ |
| $0.8Y_{max}$ | $-4.31 \times 10^{-4}$ | $-4.28 \times 10^{-4}$ |
| $0.9Y_{max}$ | $-6.44 \times 10^{-4}$ | $-6.15 \times 10^{-4}$ |
| $1.0Y_{max}$ | $-9.23 \times 10^{-4}$ | $-7.77 \times 10^{-4}$ |

(II)

| y | 7th surface | 8th surface |
|---|---|---|
| $0.1Y_{max}$ | $3.44 \times 10^{-6}$ | $-4.44 \times 10^{-6}$ |
| $0.2Y_{max}$ | $2.77 \times 10^{-5}$ | $-3.57 \times 10^{-5}$ |
| $0.3Y_{max}$ | $9.35 \times 10^{-5}$ | $-1.22 \times 10^{-4}$ |
| $0.4Y_{max}$ | $2.21 \times 10^{-4}$ | $-2.94 \times 10^{-4}$ |
| $0.5Y_{max}$ | $4.28 \times 10^{-4}$ | $-5.85 \times 10^{-4}$ |
| $0.6Y_{max}$ | $7.23 \times 10^{-4}$ | $-1.03 \times 10^{-3}$ |
| $0.7Y_{max}$ | $1.10 \times 10^{-3}$ | $-1.67 \times 10^{-3}$ |
| $0.8Y_{max}$ | $1.51 \times 10^{-3}$ | $-2.51 \times 10^{-3}$ |

TABLE 41-continued (Embodiment 7)

| | | |
|---|---|---|
| $0.9Y_{max}$ | $1.85 \times 10^{-3}$ | $-3.55 \times 10^{-3}$ |
| $1.0Y_{max}$ | $1.92 \times 10^{-3}$ | $-4.79 \times 10^{-3}$ |

TABLE 42

(Embodiment 8)

| | (I) | |
|---|---|---|
| y | 2nd surface | 5th surface |
| $0.1Y_{max}$ | $-3.25 \times 10^{-7}$ | $-2.63 \times 10^{-7}$ |
| $0.2Y_{max}$ | $-2.52 \times 10^{-6}$ | $-2.00 \times 10^{-6}$ |
| $0.3Y_{max}$ | $-8.23 \times 10^{-6}$ | $-6.33 \times 10^{-6}$ |
| $0.4Y_{max}$ | $-1.89 \times 10^{-5}$ | $-1.38 \times 10^{-5}$ |
| $0.5Y_{max}$ | $-3.60 \times 10^{-5}$ | $-2.44 \times 10^{-5}$ |
| $0.6Y_{max}$ | $-6.21 \times 10^{-5}$ | $-3.80 \times 10^{-5}$ |
| $0.7Y_{max}$ | $-1.02 \times 10^{-4}$ | $-5.51 \times 10^{-5}$ |
| $0.8Y_{max}$ | $-1.64 \times 10^{-4}$ | $-7.80 \times 10^{-5}$ |
| $0.9Y_{max}$ | $-2.61 \times 10^{-4}$ | $-1.12 \times 10^{-4}$ |
| $1.0Y_{max}$ | $-4.07 \times 10^{-4}$ | $-1.63 \times 10^{-4}$ |

| | (II) | |
|---|---|---|
| y | 7th surface | 8th surface |
| $0.1Y_{max}$ | $2.99 \times 10^{-7}$ | $-1.92 \times 10^{-6}$ |
| $0.2Y_{max}$ | $2.12 \times 10^{-6}$ | $-1.54 \times 10^{-5}$ |
| $0.3Y_{max}$ | $6.08 \times 10^{-6}$ | $-5.17 \times 10^{-5}$ |
| $0.4Y_{max}$ | $1.07 \times 10^{-5}$ | $-1.22 \times 10^{-4}$ |
| $0.5Y_{max}$ | $1.11 \times 10^{-5}$ | $-2.37 \times 10^{-4}$ |
| $0.6Y_{max}$ | $-2.52 \times 10^{-6}$ | $-4.06 \times 10^{-4}$ |
| $0.7Y_{max}$ | $-4.73 \times 10^{-5}$ | $-6.37 \times 10^{-4}$ |
| $0.8Y_{max}$ | $-1.50 \times 10^{-4}$ | $-9.35 \times 10^{-4}$ |
| $0.9Y_{max}$ | $-3.52 \times 10^{-4}$ | $-1.30 \times 10^{-3}$ |
| $1.0Y_{max}$ | $-7.12 \times 10^{-4}$ | $-1.73 \times 10^{-3}$ |

TABLE 43

(Embodiment 9)

| | (I) | |
|---|---|---|
| y | 2nd surface | 4th surface |
| $0.1Y_{max}$ | $-2.120 \times 10^{-7}$ | $-1.152 \times 10^{-7}$ |
| $0.2Y_{max}$ | $-3.217 \times 10^{-6}$ | $-1.926 \times 10^{-6}$ |
| $0.3Y_{max}$ | $-1.605 \times 10^{-5}$ | $-9.663 \times 10^{-6}$ |
| $0.4Y_{max}$ | $-4.992 \times 10^{-5}$ | $-3.013 \times 10^{-5}$ |
| $0.5Y_{max}$ | $-1.206 \times 10^{-4}$ | $-7.291 \times 10^{-5}$ |
| $0.6Y_{max}$ | $-2.500 \times 10^{-4}$ | $-1.511 \times 10^{-4}$ |
| $0.7Y_{max}$ | $-4.678 \times 10^{-4}$ | $-2.829 \times 10^{-4}$ |
| $0.8Y_{max}$ | $-8.115 \times 10^{-4}$ | $-4.939 \times 10^{-4}$ |
| $0.9Y_{max}$ | $-1.323 \times 10^{-3}$ | $-8.201 \times 10^{-4}$ |
| $1.0Y_{max}$ | $-2.043 \times 10^{-3}$ | $-1.314 \times 10^{-3}$ |

| | (II) | |
|---|---|---|
| y | 5th surface | 7th surface |
| $0.1Y_{max}$ | $-1.488 \times 10^{-8}$ | $-1.711 \times 10^{-7}$ |
| $0.2Y_{max}$ | $-1.637 \times 10^{-7}$ | $-2.716 \times 10^{-6}$ |
| $0.3Y_{max}$ | $-5.654 \times 10^{-7}$ | $-1.361 \times 10^{-5}$ |
| $0.4Y_{max}$ | $-8.481 \times 10^{-7}$ | $-4.281 \times 10^{-5}$ |
| $0.5Y_{max}$ | $1.488 \times 10^{-8}$ | $-1.034 \times 10^{-4}$ |
| $0.6Y_{max}$ | $3.273 \times 10^{-6}$ | $-2.111 \times 10^{-4}$ |
| $0.7Y_{max}$ | $9.284 \times 10^{-6}$ | $-3.812 \times 10^{-4}$ |
| $0.8Y_{max}$ | $1.638 \times 10^{-5}$ | $-6.245 \times 10^{-4}$ |
| $0.9Y_{max}$ | $1.837 \times 10^{-5}$ | $-9.355 \times 10^{-4}$ |
| $1.0Y_{max}$ | $-4.761 \times 10^{-6}$ | $-1.272 \times 10^{-3}$ |

| | (II) | |
|---|---|---|
| y | 8th surface | 9th surface |
| $0.1Y_{max}$ | $-1.283 \times 10^{-8}$ | $5.221 \times 10^{-8}$ |
| $0.2Y_{max}$ | $-1.967 \times 10^{-6}$ | $9.397 \times 10^{-7}$ |
| $0.3Y_{max}$ | $-9.900 \times 10^{-6}$ | $5.064 \times 10^{-6}$ |
| $0.4Y_{max}$ | $-3.094 \times 10^{-5}$ | $1.732 \times 10^{-5}$ |
| $0.5Y_{max}$ | $-7.460 \times 10^{-5}$ | $4.641 \times 10^{-5}$ |
| $0.6Y_{max}$ | $-1.530 \times 10^{-4}$ | $1.065 \times 10^{-4}$ |
| $0.7Y_{max}$ | $-2.822 \times 10^{-4}$ | $2.191 \times 10^{-4}$ |
| $0.8Y_{max}$ | $-4.862 \times 10^{-4}$ | $4.159 \times 10^{-4}$ |
| $0.9Y_{max}$ | $-8.071 \times 10^{-4}$ | $7.412 \times 10^{-4}$ |
| $1.0Y_{max}$ | $-1.326 \times 10^{-3}$ | $1.256 \times 10^{-3}$ |

TABLE 44

(Embodiment 10)

| | (I) | |
|---|---|---|
| y | 1st surface | 2nd surface |
| $0.1Y_{max}$ | $-6.415 \times 10^{-7}$ | $-4.990 \times 10^{-7}$ |
| $0.2Y_{max}$ | $-1.096 \times 10^{-5}$ | $-7.716 \times 10^{-6}$ |
| $0.3Y_{max}$ | $-5.948 \times 10^{-5}$ | $-3.762 \times 10^{-5}$ |
| $0.4Y_{max}$ | $-2.007 \times 10^{-4}$ | $-1.130 \times 10^{-4}$ |
| $0.5Y_{max}$ | $-5.114 \times 10^{-4}$ | $-2.604 \times 10^{-4}$ |
| $0.6Y_{max}$ | $-1.001 \times 10^{-3}$ | $-5.162 \times 10^{-4}$ |
| $0.7Y_{max}$ | $-1.871 \times 10^{-3}$ | $-9.742 \times 10^{-4}$ |
| $0.8Y_{max}$ | $-2.805 \times 10^{-3}$ | $-1.953 \times 10^{-3}$ |
| $0.9Y_{max}$ | $-3.528 \times 10^{-3}$ | $-4.479 \times 10^{-3}$ |
| $1.0Y_{max}$ | $-3.514 \times 10^{-3}$ | $-1.147 \times 10^{-2}$ |

| | (I) | (II) |
|---|---|---|
| y | 4th surface | 5th surface |
| $0.1Y_{max}$ | $-3.641 \times 10^{-7}$ | 0 |
| $0.2Y_{max}$ | $-5.905 \times 10^{-6}$ | $-5.790 \times 10^{-8}$ |
| $0.3Y_{max}$ | $-3.049 \times 10^{-5}$ | $-3.329 \times 10^{-7}$ |
| $0.4Y_{max}$ | $-1.006 \times 10^{-4}$ | $-1.332 \times 10^{-6}$ |
| $0.5Y_{max}$ | $-2.647 \times 10^{-4}$ | $-4.256 \times 10^{-6}$ |
| $0.6Y_{max}$ | $-6.095 \times 10^{-4}$ | $-1.187 \times 10^{-5}$ |
| $0.7Y_{max}$ | $-1.281 \times 10^{-3}$ | $-2.986 \times 10^{-5}$ |
| $0.8Y_{max}$ | $-2.500 \times 10^{-3}$ | $-6.877 \times 10^{-5}$ |
| $0.9Y_{max}$ | $-4.581 \times 10^{-3}$ | $-1.453 \times 10^{-4}$ |
| $1.0Y_{max}$ | $-7.976 \times 10^{-3}$ | $-2.809 \times 10^{-4}$ |

| | (I) | |
|---|---|---|
| y | 7th surface | 8th surface |
| $0.1Y_{max}$ | $-1.040 \times 10^{-7}$ | $-1.872 \times 10^{-7}$ |
| $0.2Y_{max}$ | $-1.706 \times 10^{-6}$ | $-3.079 \times 10^{-6}$ |
| $0.3Y_{max}$ | $-8.799 \times 10^{-6}$ | $-1.548 \times 10^{-5}$ |
| $0.4Y_{max}$ | $-2.840 \times 10^{-5}$ | $-4.828 \times 10^{-5}$ |
| $0.5Y_{max}$ | $-7.104 \times 10^{-5}$ | $-1.156 \times 10^{-4}$ |
| $0.6Y_{max}$ | $-1.514 \times 10^{-4}$ | $-2.329 \times 10^{-4}$ |
| $0.7Y_{max}$ | $-2.888 \times 10^{-4}$ | $-4.140 \times 10^{-4}$ |
| $0.8Y_{max}$ | $-5.078 \times 10^{-4}$ | $-6.673 \times 10^{-4}$ |
| $0.9Y_{max}$ | $-8.391 \times 10^{-4}$ | $-9.926 \times 10^{-4}$ |
| $1.0Y_{max}$ | $-1.320 \times 10^{-3}$ | $-1.384 \times 10^{-3}$ |

| | (II) |
|---|---|
| y | 9th surface |
| $0.1Y_{max}$ | $-5.079 \times 10^{-8}$ |
| $0.2Y_{max}$ | $-8.253 \times 10^{-7}$ |
| $0.3Y_{max}$ | $-4.330 \times 10^{-6}$ |
| $0.4Y_{max}$ | $-1.434 \times 10^{-5}$ |
| $0.5Y_{max}$ | $-3.734 \times 10^{-5}$ |
| $0.6Y_{max}$ | $-8.420 \times 10^{-5}$ |
| $0.7Y_{max}$ | $-1.730 \times 10^{-4}$ |
| $0.8Y_{max}$ | $-3.336 \times 10^{-4}$ |
| $0.9Y_{max}$ | $-6.142 \times 10^{-4}$ |
| $1.0Y_{max}$ | $-1.090 \times 10^{-3}$ |

TABLE 45

(Embodiment 11)

| | (I) | |
|---|---|---|
| y | 1st surface | 2nd surface |
| $0.1Y_{max}$ | $3.422 \times 10^{-7}$ | $-2.738 \times 10^{-7}$ |
| $0.2Y_{max}$ | $5.698 \times 10^{-6}$ | $-4.552 \times 10^{-6}$ |
| $0.3Y_{max}$ | $2.964 \times 10^{-5}$ | $-2.367 \times 10^{-5}$ |
| $0.4Y_{max}$ | $9.684 \times 10^{-5}$ | $-7.789 \times 10^{-5}$ |
| $0.5Y_{max}$ | $2.444 \times 10^{-4}$ | $-2.005 \times 10^{-4}$ |
| $0.6Y_{max}$ | $5.219 \times 10^{-4}$ | $-4.434 \times 10^{-4}$ |
| $0.7Y_{max}$ | $9.889 \times 10^{-4}$ | $-8.840 \times 10^{-4}$ |
| $0.8Y_{max}$ | $1.709 \times 10^{-3}$ | $-1.631 \times 10^{-3}$ |
| $0.9Y_{max}$ | $2.734 \times 10^{-3}$ | $-2.819 \times 10^{-3}$ |
| $1.0Y_{max}$ | $4.072 \times 10^{-3}$ | $-4.584 \times 10^{-3}$ |

| | (I) | (II) |
|---|---|---|
| y | 4th surface | 5th surface |
| $0.1Y_{max}$ | $-3.061 \times 10^{-7}$ | $4.424 \times 10^{-8}$ |
| $0.2Y_{max}$ | $-4.898 \times 10^{-6}$ | $6.931 \times 10^{-7}$ |
| $0.3Y_{max}$ | $-2.468 \times 10^{-5}$ | $3.967 \times 10^{-6}$ |
| $0.4Y_{max}$ | $-7.763 \times 10^{-5}$ | $1.442 \times 10^{-5}$ |
| $0.5Y_{max}$ | $-1.887 \times 10^{-4}$ | $4.037 \times 10^{-5}$ |
| $0.6Y_{max}$ | $-3.906 \times 10^{-4}$ | $9.535 \times 10^{-5}$ |
| $0.7Y_{max}$ | $-7.252 \times 10^{-4}$ | $2.000 \times 10^{-4}$ |

TABLE 45-continued (Embodiment 11)

| | | |
|---|---|---|
| $0.8Y_{max}$ | $-1.247 \times 10^{-3}$ | $3.847 \times 10^{-4}$ |
| $0.9Y_{max}$ | $-2.030 \times 10^{-3}$ | $6.889 \times 10^{-4}$ |
| $1.0Y_{max}$ | $-3.184 \times 10^{-3}$ | $1.143 \times 10^{-3}$ |

(II)

| y | 7th surface | 8th surface |
|---|---|---|
| $0.1Y_{max}$ | $-2.331 \times 10^{-7}$ | $-2.119 \times 10^{-7}$ |
| $0.2Y_{max}$ | $-3.709 \times 10^{-6}$ | $-3.454 \times 10^{-6}$ |
| $0.3Y_{max}$ | $-1.873 \times 10^{-5}$ | $-1.780 \times 10^{-5}$ |
| $0.4Y_{max}$ | $-5.877 \times 10^{-5}$ | $-5.760 \times 10^{-5}$ |
| $0.5Y_{max}$ | $-1.419 \times 10^{-4}$ | $-1.454 \times 10^{-4}$ |
| $0.6Y_{max}$ | $-2.887 \times 10^{-4}$ | $-3.157 \times 10^{-4}$ |
| $0.7Y_{max}$ | $-5.187 \times 10^{-4}$ | $-6.237 \times 10^{-4}$ |
| $0.8Y_{max}$ | $-8.397 \times 10^{-4}$ | $-1.163 \times 10^{-3}$ |
| $0.9Y_{max}$ | $-1.227 \times 10^{-3}$ | $-2.102 \times 10^{-3}$ |
| $1.0Y_{max}$ | $-1.581 \times 10^{-3}$ | $-3.764 \times 10^{-3}$ |

(II)

| y | 9th surface |
|---|---|
| $0.1Y_{max}$ | $-1.294 \times 10^{-8}$ |
| $0.2Y_{max}$ | $-2.846 \times 10^{-7}$ |
| $0.3Y_{max}$ | $-1.539 \times 10^{-6}$ |
| $0.4Y_{max}$ | $-5.252 \times 10^{-6}$ |
| $0.5Y_{max}$ | $-1.387 \times 10^{-5}$ |
| $0.6Y_{max}$ | $-3.081 \times 10^{-5}$ |
| $0.7Y_{max}$ | $-5.981 \times 10^{-5}$ |
| $0.8Y_{max}$ | $-1.030 \times 10^{-4}$ |
| $0.9Y_{max}$ | $-1.568 \times 10^{-4}$ |
| $1.0Y_{max}$ | $-2.036 \times 10^{-4}$ |

TABLE 46

(Conditions (9) (10))

| | $\left\| \dfrac{\sqrt{\phi_w \cdot \phi_T}}{\beta \cdot \phi_1} \right\|$ | $\dfrac{\sqrt{\phi_w \cdot \phi_T}}{\beta \cdot \phi_2}$ |
|---|---|---|
| Embodiment 14 | 0.4053 | 0.3347 |
| Embodiment 15 | 0.4506 | 0.3995 |
| Embodiment 16 | 0.4297 | 0.3688 |
| Embodiment 17 | 0.4297 | 0.3645 |
| Embodiment 18 | 0.4115 | 0.3352 |
| Embodiment 19 | 0.4115 | 0.3393 |

TABLE 47

(Conditions (11) (12))

| | $\left\| \dfrac{\phi_1}{\phi_w} \right\|$ | $\dfrac{\phi_2}{\phi_w}$ |
|---|---|---|
| Embodiment 14 | 0.9504 | 1.1509 |
| Embodiment 15 | 0.7661 | 0.864 |
| Embodiment 16 | 0.8964 | 1.0444 |
| Embodiment 17 | 0.8964 | 1.0566 |
| Embodiment 18 | 0.936 | 1.1490 |
| Embodiment 19 | 0.936 | 1.1352 |

TABLE 48

(Embodiment 14)

(I)

| y | 3rd surface | 4th surface |
|---|---|---|
| $0.1Y_{max}$ | $4.217 \times 10^{-6}$ | $-4.831 \times 10^{-6}$ |
| $0.2Y_{max}$ | $3.402 \times 10^{-5}$ | $-3.879 \times 10^{-5}$ |
| $0.3Y_{max}$ | $1.162 \times 10^{-4}$ | $-1.318 \times 10^{-4}$ |
| $0.4Y_{max}$ | $2.809 \times 10^{-4}$ | $-3.164 \times 10^{-4}$ |
| $0.5Y_{max}$ | $5.639 \times 10^{-4}$ | $-6.302 \times 10^{-4}$ |
| $0.6Y_{max}$ | $1.013 \times 10^{-3}$ | $-1.122 \times 10^{-3}$ |
| $0.7Y_{max}$ | $1.696 \times 10^{-3}$ | $-1.856 \times 10^{-3}$ |
| $0.8Y_{max}$ | $2.722 \times 10^{-3}$ | $-2.921 \times 10^{-3}$ |
| $0.9Y_{max}$ | $4.270 \times 10^{-3}$ | $-4.433 \times 10^{-3}$ |
| $1.0Y_{max}$ | $6.648 \times 10^{-3}$ | $-6.532 \times 10^{-3}$ |

(II)

TABLE 48-continued (Embodiment 14)

| y | 5th surface | 7th surface |
|---|---|---|
| $0.1Y_{max}$ | $-8.927 \times 10^{-7}$ | $1.999 \times 10^{-6}$ |
| $0.2Y_{max}$ | $-7.030 \times 10^{-6}$ | $1.588 \times 10^{-6}$ |
| $0.3Y_{max}$ | $-2.319 \times 10^{-5}$ | $5.289 \times 10^{-5}$ |
| $0.4Y_{max}$ | $-5.425 \times 10^{-5}$ | $1.233 \times 10^{-4}$ |
| $0.5Y_{max}$ | $-1.070 \times 10^{-4}$ | $2.358 \times 10^{-4}$ |
| $0.6Y_{max}$ | $-1.923 \times 10^{-4}$ | $3.976 \times 10^{-4}$ |
| $0.7Y_{max}$ | $-3.249 \times 10^{-4}$ | $6.127 \times 10^{-4}$ |
| $0.8Y_{max}$ | $-5.187 \times 10^{-4}$ | $8.780 \times 10^{-4}$ |
| $0.9Y_{max}$ | $-7.771 \times 10^{-4}$ | $1.170 \times 10^{-3}$ |
| $1.0Y_{max}$ | $-1.082 \times 10^{-3}$ | $1.414 \times 10^{-3}$ |

(II)

| y | 8th surface |
|---|---|
| $0.1Y_{max}$ | $-3.437 \times 10^{-6}$ |
| $0.2Y_{max}$ | $-2.771 \times 10^{-5}$ |
| $0.3Y_{max}$ | $-9.422 \times 10^{-5}$ |
| $0.4Y_{max}$ | $-2.258 \times 10^{-4}$ |
| $0.5Y_{max}$ | $-4.475 \times 10^{-4}$ |
| $0.6Y_{max}$ | $-7.884 \times 10^{-4}$ |
| $0.7Y_{max}$ | $-1.283 \times 10^{-3}$ |
| $0.8Y_{max}$ | $-1.973 \times 10^{-3}$ |
| $0.9Y_{max}$ | $-2.912 \times 10^{-3}$ |
| $1.0Y_{max}$ | $-4.162 \times 10^{-3}$ |

TABLE 49

(Embodiment 15)

(I)

| y | 3rd surface | 4th surface |
|---|---|---|
| $0.1Y_{max}$ | $6.603 \times 10^{-6}$ | $-6.823 \times 10^{-6}$ |
| $0.2Y_{max}$ | $5.303 \times 10^{-5}$ | $-5.438 \times 10^{-5}$ |
| $0.3Y_{max}$ | $1.802 \times 10^{-4}$ | $-1.834 \times 10^{-4}$ |
| $0.4Y_{max}$ | $4.328 \times 10^{-4}$ | $-4.371 \times 10^{-4}$ |
| $0.5Y_{max}$ | $8.622 \times 10^{-4}$ | $-8.699 \times 10^{-4}$ |
| $0.6Y_{max}$ | $1.563 \times 10^{-3}$ | $-1.561 \times 10^{-3}$ |
| $0.7Y_{max}$ | $2.673 \times 10^{-3}$ | $-2.634 \times 10^{-3}$ |
| $0.8Y_{max}$ | $4.486 \times 10^{-3}$ | $-4.277 \times 10^{-3}$ |
| $0.9Y_{max}$ | $7.591 \times 10^{-3}$ | $-6.744 \times 10^{-3}$ |
| $1.0Y_{max}$ | $1.315 \times 10^{-2}$ | $-1.033 \times 10^{-2}$ |

(II)

| y | 5th surface | 7th surface |
|---|---|---|
| $0.1Y_{max}$ | $-1.065 \times 10^{-6}$ | $4.426 \times 10^{-6}$ |
| $0.2Y_{max}$ | $-8.481 \times 10^{-6}$ | $3.553 \times 10^{-5}$ |
| $0.3Y_{max}$ | $-2.867 \times 10^{-5}$ | $1.207 \times 10^{-4}$ |
| $0.4Y_{max}$ | $-6.872 \times 10^{-5}$ | $2.886 \times 10^{-4}$ |
| $0.5Y_{max}$ | $-1.377 \times 10^{-4}$ | $5.693 \times 10^{-4}$ |
| $0.6Y_{max}$ | $-2.482 \times 10^{-4}$ | $9.943 \times 10^{-4}$ |
| $0.7Y_{max}$ | $-4.179 \times 10^{-4}$ | $1.596 \times 10^{-3}$ |
| $0.8Y_{max}$ | $-6.697 \times 10^{-4}$ | $2.402 \times 10^{-3}$ |
| $0.9Y_{max}$ | $-1.032 \times 10^{-3}$ | $3.434 \times 10^{-3}$ |
| $1.0Y_{max}$ | $-1.539 \times 10^{-3}$ | $4.689 \times 10^{-3}$ |

(II)

| y | 8th surface |
|---|---|
| $0.1Y_{max}$ | $-4.426 \times 10^{-6}$ |
| $0.2Y_{max}$ | $-3.568 \times 10^{-5}$ |
| $0.3Y_{max}$ | $-1.216 \times 10^{-4}$ |
| $0.4Y_{max}$ | $-2.926 \times 10^{-4}$ |
| $0.5Y_{max}$ | $-5.829 \times 10^{-4}$ |
| $0.6Y_{max}$ | $-1.033 \times 10^{-3}$ |
| $0.7Y_{max}$ | $-1.691 \times 10^{-3}$ |
| $0.8Y_{max}$ | $-2.613 \times 10^{-3}$ |
| $0.9Y_{max}$ | $-3.864 \times 10^{-3}$ |
| $1.0Y_{max}$ | $-5.501 \times 10^{-3}$ |

TABLE 49

(Embodiment 15)

(I)

| y | 3rd surface | 4th surface |
|---|---|---|
| $0.1Y_{max}$ | $3.175 \times 10^{-6}$ | $-3.436 \times 10^{-6}$ |
| $0.2Y_{max}$ | $2.545 \times 10^{-5}$ | $-2.756 \times 10^{-5}$ |
| $0.3Y_{max}$ | $8.661 \times 10^{-5}$ | $-9.336 \times 10^{-5}$ |

TABLE 49-continued (Embodiment 15)

| | | |
|---|---|---|
| $0.4Y_{max}$ | $2.079 \times 10^{-4}$ | $-2.229 \times 10^{-4}$ |
| $0.5Y_{max}$ | $4.134 \times 10^{-4}$ | $-4.409 \times 10^{-4}$ |
| $0.6Y_{max}$ | $7.327 \times 10^{-4}$ | $-7.716 \times 10^{-4}$ |
| $0.7Y_{max}$ | $1.205 \times 10^{-3}$ | $-1.271 \times 10^{-3}$ |
| $0.8Y_{max}$ | $1.886 \times 10^{-3}$ | $-1.973 \times 10^{-3}$ |
| $0.9Y_{max}$ | $2.861 \times 10^{-3}$ | $-2.951 \times 10^{-3}$ |
| $1.0Y_{max}$ | $4.253 \times 10^{-3}$ | $-4.284 \times 10^{-3}$ |

(II)

| y | 5th surface | 7th surface |
|---|---|---|
| $0.1Y_{max}$ | $-1.024 \times 10^{-6}$ | $3.216 \times 10^{-6}$ |
| $0.2Y_{max}$ | $-8.127 \times 10^{-6}$ | $2.587 \times 10^{-5}$ |
| $0.3Y_{max}$ | $-2.727 \times 10^{-5}$ | $8.792 \times 10^{-5}$ |
| $0.4Y_{max}$ | $-6.471 \times 10^{-5}$ | $2.102 \times 10^{-4}$ |
| $0.5Y_{max}$ | $-1.280 \times 10^{-4}$ | $4.144 \times 10^{-4}$ |
| $0.6Y_{max}$ | $-2.275 \times 10^{-4}$ | $7.230 \times 10^{-4}$ |
| $0.7Y_{max}$ | $-3.776 \times 10^{-4}$ | $1.158 \times 10^{-3}$ |
| $0.8Y_{max}$ | $-5.954 \times 10^{-4}$ | $1.739 \times 10^{-3}$ |
| $0.9Y_{max}$ | $-8.982 \times 10^{-4}$ | $2.485 \times 10^{-3}$ |
| $1.0Y_{max}$ | $-1.297 \times 10^{-3}$ | $3.408 \times 10^{-3}$ |

(II)

| y | 8th surface |
|---|---|
| $0.1Y_{max}$ | $-4.062 \times 10^{-6}$ |
| $0.2Y_{max}$ | $-3.279 \times 10^{-5}$ |
| $0.3Y_{max}$ | $-1.193 \times 10^{-4}$ |
| $0.4Y_{max}$ | $-2.696 \times 10^{-4}$ |
| $0.5Y_{max}$ | $-5.375 \times 10^{-4}$ |
| $0.6Y_{max}$ | $-9.517 \times 10^{-4}$ |
| $0.7Y_{max}$ | $-1.554 \times 10^{-3}$ |
| $0.8Y_{max}$ | $-2.391 \times 10^{-3}$ |
| $0.9Y_{max}$ | $-3.516 \times 10^{-3}$ |
| $1.0Y_{max}$ | $-4.984 \times 10^{-3}$ |

TABLE 51

(Embodiment 17)

(I)

| y | 3rd surface | 4th surface |
|---|---|---|
| $0.1Y_{max}$ | $3.287 \times 10^{-6}$ | $-3.660 \times 10^{-6}$ |
| $0.2Y_{max}$ | $2.639 \times 10^{-5}$ | $-2.936 \times 10^{-5}$ |
| $0.3Y_{max}$ | $8.999 \times 10^{-5}$ | $-9.967 \times 10^{-5}$ |
| $0.4Y_{max}$ | $2.167 \times 10^{-4}$ | $-2.387 \times 10^{-4}$ |
| $0.5Y_{max}$ | $4.327 \times 10^{-4}$ | $-4.737 \times 10^{-4}$ |
| $0.6Y_{max}$ | $7.709 \times 10^{-4}$ | $-8.379 \times 10^{-4}$ |
| $0.7Y_{max}$ | $1.275 \times 10^{-3}$ | $-1.374 \times 10^{-3}$ |
| $0.8Y_{max}$ | $2.009 \times 10^{-3}$ | $-2.140 \times 10^{-3}$ |
| $0.9Y_{max}$ | $3.070 \times 10^{-3}$ | $-3.205 \times 10^{-3}$ |
| $1.0Y_{max}$ | $4.606 \times 10^{-3}$ | $-4.654 \times 10^{-3}$ |

(II)

| y | 6th surface | 7th surface |
|---|---|---|
| $0.1Y_{max}$ | $-1.280 \times 10^{-6}$ | $3.033 \times 10^{-6}$ |
| $0.2Y_{max}$ | $-1.011 \times 10^{-5}$ | $2.417 \times 10^{-5}$ |
| $0.3Y_{max}$ | $-3.360 \times 10^{-5}$ | $8.085 \times 10^{-5}$ |
| $0.4Y_{max}$ | $-7.802 \times 10^{-5}$ | $1.890 \times 10^{-4}$ |
| $0.5Y_{max}$ | $-1.486 \times 10^{-4}$ | $3.615 \times 10^{-4}$ |
| $0.6Y_{max}$ | $-2.488 \times 10^{-4}$ | $6.068 \times 10^{-4}$ |
| $0.7Y_{max}$ | $-3.793 \times 10^{-4}$ | $9.257 \times 10^{-4}$ |
| $0.8Y_{max}$ | $-5.352 \times 10^{-4}$ | $1.308 \times 10^{-3}$ |
| $0.9Y_{max}$ | $-7.007 \times 10^{-4}$ | $1.729 \times 10^{-3}$ |
| $1.0Y_{max}$ | $-8.406 \times 10^{-4}$ | $2.142 \times 10^{-3}$ |

(II)

| y | 8th surface |
|---|---|
| $0.1Y_{max}$ | $-4.036 \times 10^{-6}$ |
| $0.2Y_{max}$ | $-3.236 \times 10^{-5}$ |
| $0.3Y_{max}$ | $-1.096 \times 10^{-4}$ |
| $0.4Y_{max}$ | $-2.614 \times 10^{-4}$ |
| $0.5Y_{max}$ | $-5.142 \times 10^{-4}$ |
| $0.6Y_{max}$ | $-8.960 \times 10^{-4}$ |
| $0.7Y_{max}$ | $-1.436 \times 10^{-3}$ |
| $0.8Y_{max}$ | $-2.162 \times 10^{-3}$ |
| $0.9Y_{max}$ | $-3.101 \times 10^{-3}$ |
| $1.0Y_{max}$ | $-4.268 \times 10^{-3}$ |

TABLE 52

(Embodiment 18)

(I)

| y | 3rd surface | 4th surface |
|---|---|---|
| $0.1Y_{max}$ | $1.257 \times 10^{-6}$ | $-2.513 \times 10^{-6}$ |
| $0.2Y_{max}$ | $1.023 \times 10^{-5}$ | $-1.999 \times 10^{-5}$ |
| $0.3Y_{max}$ | $3.536 \times 10^{-5}$ | $-6.741 \times 10^{-5}$ |
| $0.4Y_{max}$ | $8.655 \times 10^{-5}$ | $-1.604 \times 10^{-4}$ |
| $0.5Y_{max}$ | $1.760 \times 10^{-4}$ | $-3.175 \times 10^{-4}$ |
| $0.6Y_{max}$ | $3.195 \times 10^{-4}$ | $-5.634 \times 10^{-4}$ |
| $0.7Y_{max}$ | $5.388 \times 10^{-4}$ | $-9.335 \times 10^{-4}$ |
| $0.8Y_{max}$ | $8.672 \times 10^{-4}$ | $-1.478 \times 10^{-3}$ |
| $0.9Y_{max}$ | $1.359 \times 10^{-3}$ | $-2.270 \times 10^{-3}$ |
| $1.0Y_{max}$ | $2.112 \times 10^{-3}$ | $-3.412 \times 10^{-3}$ |

(II)

| y | 5th surface | 7th surface |
|---|---|---|
| $0.1Y_{max}$ | $-6.127 \times 10^{-7}$ | $2.405 \times 10^{-6}$ |
| $0.2Y_{max}$ | $-4.864 \times 10^{-6}$ | $1.929 \times 10^{-5}$ |
| $0.3Y_{max}$ | $-1.597 \times 10^{-5}$ | $6.496 \times 10^{-5}$ |
| $0.4Y_{max}$ | $-3.658 \times 10^{-5}$ | $1.530 \times 10^{-4}$ |
| $0.5Y_{max}$ | $-6.884 \times 10^{-5}$ | $2.947 \times 10^{-4}$ |
| $0.6Y_{max}$ | $-1.148 \times 10^{-4}$ | $4.961 \times 10^{-4}$ |
| $0.7Y_{max}$ | $-1.755 \times 10^{-4}$ | $7.518 \times 10^{-4}$ |
| $0.8Y_{max}$ | $-2.459 \times 10^{-4}$ | $1.031 \times 10^{-3}$ |
| $0.9Y_{max}$ | $-2.976 \times 10^{-4}$ | $1.255 \times 10^{-3}$ |
| $1.0Y_{max}$ | $-2.332 \times 10^{-4}$ | $1.245 \times 10^{-3}$ |

(II)

| y | 8th surface |
|---|---|
| $0.1Y_{max}$ | $-3.945 \times 10^{-6}$ |
| $0.2Y_{max}$ | $-3.167 \times 10^{-5}$ |
| $0.3Y_{max}$ | $-1.078 \times 10^{-4}$ |
| $0.4Y_{max}$ | $-2.586 \times 10^{-4}$ |
| $0.5Y_{max}$ | $-5.132 \times 10^{-4}$ |
| $0.6Y_{max}$ | $-9.041 \times 10^{-4}$ |
| $0.7Y_{max}$ | $-1.468 \times 10^{-3}$ |
| $0.8Y_{max}$ | $-2.243 \times 10^{-3}$ |
| $0.9Y_{max}$ | $-3.261 \times 10^{-3}$ |
| $1.0Y_{max}$ | $-4.534 \times 10^{-3}$ |

TABLE 53

(Embodiment 19)

(I)

| y | 3rd surface | 4th surface |
|---|---|---|
| $0.1Y_{max}$ | $2.297 \times 10^{-6}$ | $-3.024 \times 10^{-6}$ |
| $0.2Y_{max}$ | $1.840 \times 10^{-5}$ | $-2.401 \times 10^{-5}$ |
| $0.3Y_{max}$ | $6.220 \times 10^{-5}$ | $-8.070 \times 10^{-5}$ |
| $0.4Y_{max}$ | $1.480 \times 10^{-4}$ | $-1.911 \times 10^{-4}$ |
| $0.5Y_{max}$ | $2.914 \times 10^{-4}$ | $-3.759 \times 10^{-4}$ |
| $0.6Y_{max}$ | $5.118 \times 10^{-4}$ | $-6.623 \times 10^{-4}$ |
| $0.7Y_{max}$ | $8.377 \times 10^{-4}$ | $-1.090 \times 10^{-3}$ |
| $0.8Y_{max}$ | $1.317 \times 10^{-3}$ | $-1.721 \times 10^{-3}$ |
| $0.9Y_{max}$ | $2.033 \times 10^{-3}$ | $-2.653 \times 10^{-3}$ |
| $1.0Y_{max}$ | $3.142 \times 10^{-3}$ | $-4.047 \times 10^{-3}$ |

(II)

| y | 5th surface | 7th surface |
|---|---|---|
| $0.1Y_{max}$ | $-7.337 \times 10^{-7}$ | $3.311 \times 10^{-7}$ |
| $0.2Y_{max}$ | $-5.778 \times 10^{-6}$ | $2.640 \times 10^{-6}$ |
| $0.3Y_{max}$ | $-1.943 \times 10^{-5}$ | $8.869 \times 10^{-6}$ |
| $0.4Y_{max}$ | $-4.590 \times 10^{-5}$ | $2.085 \times 10^{-5}$ |
| $0.5Y_{max}$ | $-8.977 \times 10^{-5}$ | $4.013 \times 10^{-5}$ |
| $0.6Y_{max}$ | $-1.564 \times 10^{-4}$ | $6.772 \times 10^{-5}$ |
| $0.7Y_{max}$ | $-2.518 \times 10^{-4}$ | $1.035 \times 10^{-4}$ |
| $0.8Y_{max}$ | $-3.795 \times 10^{-4}$ | $1.452 \times 10^{-4}$ |
| $0.9Y_{max}$ | $-5.303 \times 10^{-4}$ | $1.862 \times 10^{-4}$ |
| $1.0Y_{max}$ | $-6.539 \times 10^{-4}$ | $2.115 \times 10^{-4}$ |

(II)

| y | 8th surface |
|---|---|
| $0.1Y_{max}$ | $-4.512 \times 10^{-7}$ |
| $0.2Y_{max}$ | $-3.628 \times 10^{-6}$ |
| $0.3Y_{max}$ | $-1.233 \times 10^{-5}$ |
| $0.4Y_{max}$ | $-2.952 \times 10^{-5}$ |
| $0.5Y_{max}$ | $-5.843 \times 10^{-5}$ |
| $0.6Y_{max}$ | $-1.027 \times 10^{-4}$ |
| $0.7Y_{max}$ | $-1.662 \times 10^{-4}$ |

TABLE 53-continued (Embodiment 19)

| | |
|---|---|
| $0.8Y_{max}$ | $-2.535 \times 10^{-4}$ |
| $0.9Y_{max}$ | $-3.684 \times 10^{-4}$ |
| $1.0Y_{max}$ | $-5.129 \times 10^{-4}$ |

TABLE 54

(Conditions (9) (10))

| | $\left\|\dfrac{\sqrt{\phi_w \cdot \phi_T}}{\beta \cdot \phi_1}\right\|$ | $\dfrac{\sqrt{\phi_w \cdot \phi_T}}{\beta \cdot \phi_2}$ |
|---|---|---|
| Embodiment 20 | 0.4297 | 0.3573 |
| Embodiment 21 | 0.4297 | 0.3407 |
| Embodiment 22 | 0.4331 | 0.3842 |

TABLE 55

(Conditions (11) (12) (2))

| | $\left\|\dfrac{\phi_1}{\phi_w}\right\|$ | $\dfrac{\phi_2}{\phi_w}$ | $\dfrac{r_F - r_B}{r_F + r_B}$ |
|---|---|---|---|
| Embodiment 20 | 0.8964 | 1.0780 | 0.606 |
| Embodiment 21 | 0.8964 | 1.1306 | 0.264 |
| Embodiment 22 | 0.8892 | 1.0025 | 0.205 |

TABLE 56

(Embodiment 20)

(I)

| y | 3rd surface | 4th surface |
|---|---|---|
| $0.1Y_{max}$ | $5.416 \times 10^{-7}$ | $-3.436 \times 10^{-6}$ |
| $0.2Y_{max}$ | $8.721 \times 10^{-6}$ | $-2.753 \times 10^{-5}$ |
| $0.3Y_{max}$ | $4.441 \times 10^{-5}$ | $-9.334 \times 10^{-5}$ |
| $0.4Y_{max}$ | $1.418 \times 10^{-4}$ | $-2.232 \times 10^{-4}$ |
| $0.5Y_{max}$ | $3.551 \times 10^{-4}$ | $-4.428 \times 10^{-4}$ |
| $0.6Y_{max}$ | $7.422 \times 10^{-4}$ | $-7.836 \times 10^{-4}$ |
| $0.7Y_{max}$ | $1.410 \times 10^{-3}$ | $-1.287 \times 10^{-3}$ |
| $0.8Y_{max}$ | $2.487 \times 10^{-3}$ | $-2.009 \times 10^{-3}$ |
| $0.9Y_{max}$ | $4.159 \times 10^{-3}$ | $-3.019 \times 10^{-3}$ |
| $1.0Y_{max}$ | $6.694 \times 10^{-3}$ | $-4.391 \times 10^{-3}$ |

(II)

| y | 5th surface | 6th surface |
|---|---|---|
| $0.1Y_{max}$ | $-1.080 \times 10^{-6}$ | $1.028 \times 10^{-6}$ |
| $0.2Y_{max}$ | $-8.588 \times 10^{-6}$ | $8.379 \times 10^{-6}$ |
| $0.3Y_{max}$ | $-2.895 \times 10^{-5}$ | $2.879 \times 10^{-5}$ |
| $0.4Y_{max}$ | $-6.938 \times 10^{-5}$ | $7.008 \times 10^{-5}$ |
| $0.5Y_{max}$ | $-1.398 \times 10^{-4}$ | $1.419 \times 10^{-4}$ |
| $0.6Y_{max}$ | $-2.562 \times 10^{-4}$ | $2.574 \times 10^{-4}$ |
| $0.7Y_{max}$ | $-4.461 \times 10^{-4}$ | $4.364 \times 10^{-4}$ |
| $0.8Y_{max}$ | $-7.549 \times 10^{-4}$ | $7.100 \times 10^{-4}$ |
| $0.9Y_{max}$ | $-1.257 \times 10^{-3}$ | $1.127 \times 10^{-3}$ |
| $1.0Y_{max}$ | $-2.074 \times 10^{-3}$ | $1.756 \times 10^{-3}$ |

(II)

| y | 8th surface |
|---|---|
| $0.1Y_{max}$ | $-2.072 \times 10^{-6}$ |
| $0.2Y_{max}$ | $-1.672 \times 10^{-5}$ |
| $0.3Y_{max}$ | $-5.718 \times 10^{-5}$ |
| $0.4Y_{max}$ | $-1.380 \times 10^{-4}$ |
| $0.5Y_{max}$ | $-2.758 \times 10^{-4}$ |
| $0.6Y_{max}$ | $-4.900 \times 10^{-4}$ |
| $0.7Y_{max}$ | $-8.045 \times 10^{-4}$ |
| $0.8Y_{max}$ | $-1.249 \times 10^{-3}$ |
| $0.9Y_{max}$ | $-1.860 \times 10^{-3}$ |
| $1.0Y_{max}$ | $-2.691 \times 10^{-3}$ |

TABLE 57

(Embodiment 21)

(I)

| y | 3rd surface | 4th surface |
|---|---|---|

TABLE 57-continued (Embodiment 21)

| $0.1Y_{max}$ | $2.876 \times 10^{-6}$ | $-3.287 \times 10^{-6}$ |
|---|---|---|
| $0.2Y_{max}$ | $2.314 \times 10^{-5}$ | $-2.641 \times 10^{-5}$ |
| $0.3Y_{max}$ | $7.911 \times 10^{-5}$ | $-8.949 \times 10^{-5}$ |
| $0.4Y_{max}$ | $1.911 \times 10^{-4}$ | $-2.140 \times 10^{-4}$ |
| $0.5Y_{max}$ | $3.834 \times 10^{-4}$ | $-4.245 \times 10^{-4}$ |
| $0.6Y_{max}$ | $6.870 \times 10^{-4}$ | $-7.516 \times 10^{-4}$ |
| $0.7Y_{max}$ | $1.144 \times 10^{-3}$ | $-1.236 \times 10^{-3}$ |
| $0.8Y_{max}$ | $1.818 \times 10^{-3}$ | $-1.933 \times 10^{-3}$ |
| $0.9Y_{max}$ | $2.801 \times 10^{-3}$ | $-2.911 \times 10^{-3}$ |
| $1.0Y_{max}$ | $4.238 \times 10^{-3}$ | $-4.243 \times 10^{-3}$ |

(II)

| y | 5th surface | 6th surface |
|---|---|---|
| $0.1Y_{max}$ | $-1.279 \times 10^{-7}$ | $-2.375 \times 10^{-7}$ |
| $0.2Y_{max}$ | $-6.211 \times 10^{-7}$ | $-2.192 \times 10^{-6}$ |
| $0.3Y_{max}$ | $7.307 \times 10^{-8}$ | $-8.659 \times 10^{-6}$ |
| $0.4Y_{max}$ | $6.485 \times 10^{-6}$ | $-2.430 \times 10^{-5}$ |
| $0.5Y_{max}$ | $2.642 \times 10^{-5}$ | $-5.537 \times 10^{-5}$ |
| $0.6Y_{max}$ | $7.055 \times 10^{-5}$ | $-1.078 \times 10^{-4}$ |
| $0.7Y_{max}$ | $1.539 \times 10^{-4}$ | $-1.829 \times 10^{-4}$ |
| $0.8Y_{max}$ | $3.034 \times 10^{-4}$ | $-2.717 \times 10^{-4}$ |
| $0.9Y_{max}$ | $5.795 \times 10^{-4}$ | $-3.521 \times 10^{-4}$ |
| $1.0Y_{max}$ | $1.126 \times 10^{-3}$ | $-3.984 \times 10^{-4}$ |

(II)

| y | 7th surface |
|---|---|
| $0.1Y_{max}$ | $-2.722 \times 10^{-6}$ |
| $0.2Y_{max}$ | $-2.199 \times 10^{-5}$ |
| $0.3Y_{max}$ | $-7.539 \times 10^{-5}$ |
| $0.4Y_{max}$ | $-1.831 \times 10^{-4}$ |
| $0.5Y_{max}$ | $-3.698 \times 10^{-4}$ |
| $0.6Y_{max}$ | $-6.687 \times 10^{-4}$ |
| $0.7Y_{max}$ | $-1.128 \times 10^{-3}$ |
| $0.8Y_{max}$ | $-1.825 \times 10^{-3}$ |
| $0.9Y_{max}$ | $-2.887 \times 10^{-3}$ |
| $1.0Y_{max}$ | $-4.542 \times 10^{-3}$ |

TABLE 58

(Embodiment 22)

(I)

| y | 3rd surface | 4th surface |
|---|---|---|
| $0.1Y_{max}$ | $2.834 \times 10^{-6}$ | $-3.446 \times 10^{-6}$ |
| $0.2Y_{max}$ | $2.286 \times 10^{-5}$ | $-2.779 \times 10^{-5}$ |
| $0.3Y_{max}$ | $7.834 \times 10^{-5}$ | $-9.479 \times 10^{-5}$ |
| $0.4Y_{max}$ | $1.901 \times 10^{-4}$ | $-2.288 \times 10^{-4}$ |
| $0.5Y_{max}$ | $3.840 \times 10^{-4}$ | $-4.595 \times 10^{-4}$ |
| $0.6Y_{max}$ | $6.951 \times 10^{-4}$ | $-8.271 \times 10^{-4}$ |
| $0.7Y_{max}$ | $1.177 \times 10^{-3}$ | $-1.390 \times 10^{-3}$ |
| $0.8Y_{max}$ | $1.918 \times 10^{-3}$ | $-2.239 \times 10^{-3}$ |
| $0.9Y_{max}$ | $3.075 \times 10^{-3}$ | $-3.513 \times 10^{-3}$ |
| $1.0Y_{max}$ | $4.930 \times 10^{-3}$ | $-5.434 \times 10^{-3}$ |

(II)

| y | 7th surface | 8th surface |
|---|---|---|
| $0.1Y_{max}$ | $1.207 \times 10^{-6}$ | $-2.646 \times 10^{-6}$ |
| $0.2Y_{max}$ | $9.794 \times 10^{-6}$ | $-2.138 \times 10^{-5}$ |
| $0.3Y_{max}$ | $3.403 \times 10^{-5}$ | $-7.344 \times 10^{-5}$ |
| $0.4Y_{max}$ | $8.376 \times 10^{-5}$ | $-1.786 \times 10^{-4}$ |
| $0.5Y_{max}$ | $1.711 \times 10^{-4}$ | $-3.608 \times 10^{-4}$ |
| $0.6Y_{max}$ | $3.108 \times 10^{-4}$ | $-6.509 \times 10^{-4}$ |
| $0.7Y_{max}$ | $5.201 \times 10^{-4}$ | $-1.089 \times 10^{-3}$ |
| $0.8Y_{max}$ | $8.187 \times 10^{-4}$ | $-1.730 \times 10^{-3}$ |
| $0.9Y_{max}$ | $1.228 \times 10^{-3}$ | $-2.648 \times 10^{-3}$ |
| $1.0Y_{max}$ | $1.771 \times 10^{-3}$ | $-3.940 \times 10^{-3}$ |

TABLE 59

(Conditions (17) (18))

| | $\|\phi_1\|/\phi_w$ | $\|\phi_3\|/\phi_w$ |
|---|---|---|
| Embodiment 23 | 0.918 | 0.118 |
| Embodiment 24 | 0.837 | 0.124 |
| Embodiment 25 | 1.029 | 0.124 |

TABLE 59-continued (Conditions (17) (18))

| | $|\phi_1|/\phi_w$ | $|\phi_3|/\phi_w$ |
|---|---|---|
| Embodiment 26 | 0.936 | 0.126 |
| Embodiment 27 | 0.936 | 0.126 |
| Embodiment 28 | 0.936 | 0.144 |
| Embodiment 29 | 0.936 | 0.126 |
| Embodiment 30 | 0.936 | 0.126 |

TABLE 60

(Embodiment 23)

(I)

| y | 1st surface | 3rd surface |
|---|---|---|
| $0.1Y_{max}$ | $-2.59450 \times 10^{-6}$ | $5.31510 \times 10^{-6}$ |
| $0.2Y_{max}$ | $-2.01903 \times 10^{-5}$ | $4.24438 \times 10^{-5}$ |
| $0.3Y_{max}$ | $-6.55452 \times 10^{-5}$ | $1.43373 \times 10^{-4}$ |
| $0.4Y_{max}$ | $-1.48003 \times 10^{-4}$ | $3.41707 \times 10^{-4}$ |
| $0.5Y_{max}$ | $-2.74568 \times 10^{-4}$ | $6.77636 \times 10^{-4}$ |
| $0.6Y_{max}$ | $-4.52906 \times 10^{-4}$ | $0.0012085$ |
| $0.7Y_{max}$ | $-6.95579 \times 10^{-4}$ | $0.0020294$ |
| $0.8Y_{max}$ | $-0.00102551$ | $0.00330869$ |
| $0.9Y_{max}$ | $-0.00148364$ | $0.0053470$ |
| $1.0Y_{max}$ | $-0.0021456$ | $0.0086701$ |

| y | (I) 4th surface | (II) 6th surface |
|---|---|---|
| $0.1Y_{max}$ | $-4.60257 \times 10^{-6}$ | $5.13504 \times 10^{-7}$ |
| $0.2Y_{max}$ | $-3.65702 \times 10^{-5}$ | $4.12705 \times 10^{-6}$ |
| $0.3Y_{max}$ | $-1.22536 \times 10^{-4}$ | $1.43971 \times 10^{-5}$ |
| $0.4Y_{max}$ | $-2.89885 \times 10^{-4}$ | $3.55079 \times 10^{-5}$ |
| $0.5Y_{max}$ | $-5.71450 \times 10^{-4}$ | $7.23851 \times 10^{-5}$ |
| $0.6Y_{max}$ | $-0.0010127$ | $1.30620 \times 10^{-4}$ |
| $0.7Y_{max}$ | $-0.0016791$ | $2.16376 \times 10^{-4}$ |
| $0.8Y_{max}$ | $-0.0026634$ | $3.35375 \times 10^{-4}$ |
| $0.9Y_{max}$ | $-0.0040989$ | $4.88362 \times 10^{-4}$ |
| $1.0Y_{max}$ | $-0.0061989$ | $6.56506 \times 10^{-4}$ |

(II)

| y | 8th surface | 9th surface |
|---|---|---|
| $0.1Y_{max}$ | $3.07265 \times 10^{-6}$ | $-4.67818 \times 10^{-6}$ |
| $0.2Y_{max}$ | $2.47750 \times 10^{-5}$ | $-3.76192 \times 10^{-5}$ |
| $0.3Y_{max}$ | $8.41796 \times 10^{-5}$ | $-1.27999 \times 10^{-4}$ |
| $0.4Y_{max}$ | $2.00442 \times 10^{-4}$ | $-3.07071 \times 10^{-4}$ |
| $0.5Y_{max}$ | $3.91002 \times 10^{-4}$ | $-6.09243 \times 10^{-4}$ |
| $0.6Y_{max}$ | $6.67125 \times 10^{-4}$ | $-0.0010734$ |
| $0.7Y_{max}$ | $0.0010263$ | $-0.0017432$ |
| $0.8Y_{max}$ | $0.0014397$ | $-0.0026654$ |
| $0.9Y_{max}$ | $0.0018331$ | $-0.0038820$ |
| $1.0Y_{max}$ | $0.0020572$ | $-0.0054111$ |

TABLE 61

(Embodiment 24)

(I)

| y | 1st surface | 3rd surface |
|---|---|---|
| $0.1Y_{max}$ | $-3.00663 \times 10^{-6}$ | $5.19858 \times 10^{-6}$ |
| $0.2Y_{max}$ | $-2.35015 \times 10^{-5}$ | $4.15887 \times 10^{-5}$ |
| $0.3Y_{max}$ | $-7.62687 \times 10^{-5}$ | $1.40291 \times 10^{-4}$ |
| $0.4Y_{max}$ | $-1.72000 \times 10^{-4}$ | $3.33921 \times 10^{-4}$ |
| $0.5Y_{max}$ | $-3.17920 \times 10^{-4}$ | $6.61151 \times 10^{-4}$ |
| $0.6Y_{max}$ | $-5.20787 \times 10^{-4}$ | $0.00117723$ |
| $0.7Y_{max}$ | $-7.91703 \times 10^{-4}$ | $0.00197388$ |
| $0.8Y_{max}$ | $-0.0011518$ | $0.00321439$ |
| $0.9Y_{max}$ | $-0.0016373$ | $0.00519203$ |
| $1.0Y_{max}$ | $-0.0023043$ | $0.00842376$ |

| y | (I) 4th surface | (II) 6th surface |
|---|---|---|
| $0.1Y_{max}$ | $-4.12725 \times 10^{-6}$ | $2.91251 \times 10^{-7}$ |
| $0.2Y_{max}$ | $-3.27546 \times 10^{-5}$ | $2.33001 \times 10^{-6}$ |
| $0.3Y_{max}$ | $-1.09838 \times 10^{-4}$ | $7.90019 \times 10^{-6}$ |
| $0.4Y_{max}$ | $-2.60228 \times 10^{-4}$ | $1.88403 \times 10^{-5}$ |

TABLE 61-continued (Embodiment 24)

| $0.5Y_{max}$ | $-5.14361 \times 10^{-4}$ | $3.68797 \times 10^{-5}$ |
|---|---|---|
| $0.6Y_{max}$ | $-9.15196 \times 10^{-4}$ | $6.36202 \times 10^{-5}$ |
| $0.7Y_{max}$ | $-0.00152617$ | $9.98445 \times 10^{-5}$ |
| $0.8Y_{max}$ | $-0.0024397$ | $1.42840 \times 10^{-4}$ |
| $0.9Y_{max}$ | $-0.00379216$ | $1.76043 \times 10^{-4}$ |
| $1.0Y_{max}$ | $-000580561$ | $1.40656 \times 10^{-4}$ |

(II)

| y | 8th surface | 9th surface |
|---|---|---|
| $0.1Y_{max}$ | $2.51699 \times 10^{-6}$ | $-4.53058 \times 10^{-6}$ |
| $0.2Y_{max}$ | $2.01889 \times 10^{-5}$ | $-3.64831 \times 10^{-5}$ |
| $0.3Y_{max}$ | $6.83826 \times 10^{-5}$ | $-1.24154 \times 10^{-4}$ |
| $0.4Y_{max}$ | $1.61935 \times 10^{-4}$ | $-2.97852 \times 10^{-4}$ |
| $0.5Y_{max}$ | $3.12504 \times 10^{-4}$ | $-5.91042 \times 10^{-4}$ |
| $0.6Y_{max}$ | $5.23216 \times 10^{-4}$ | $-0.00104140$ |
| $0.7Y_{max}$ | $7.78465 \times 10^{-4}$ | $-0.00169142$ |
| $0.8Y_{max}$ | $0.00102733$ | $-0.00258638$ |
| $0.9Y_{max}$ | $0.00115675$ | $-0.00376700$ |
| $1.0Y_{max}$ | $9.49117 \times 10^{-4}$ | $-0.00525073$ |

TABLE 62

(Embodiment 25)

(I)

| y | 1st surface | 3rd surface |
|---|---|---|
| $0.1Y_{max}$ | $-3.47528 \times 10^{-6}$ | $6.06317 \times 10^{-6}$ |
| $0.2Y_{max}$ | $-2.70591 \times 10^{-5}$ | $4.84191 \times 10^{-5}$ |
| $0.3Y_{max}$ | $-8.75159 \times 10^{-5}$ | $1.63037 \times 10^{-4}$ |
| $0.4Y_{max}$ | $-1.96211 \times 10^{-4}$ | $3.87050 \times 10^{-4}$ |
| $0.5Y_{max}$ | $-3.59790 \times 10^{-4}$ | $7.64218 \times 10^{-4}$ |
| $0.6Y_{max}$ | $-5.84066 \times 10^{-4}$ | $0.00135752$ |
| $0.7Y_{max}$ | $-8.80470 \times 10^{-4}$ | $0.00227414$ |
| $0.8Y_{max}$ | $-0.0012740$ | $0.00371014$ |
| $0.9Y_{max}$ | $-0.0018082$ | $0.00602735$ |
| $1.0Y_{max}$ | $-0.0025408$ | $0.00987995$ |

| y | (I) 4th surface | (II) 6th surface |
|---|---|---|
| $0.1Y_{max}$ | $-5.13535 \times 10^{-6}$ | $6.46737 \times 10^{-7}$ |
| $0.2Y_{max}$ | $-4.08239 \times 10^{-5}$ | $5.27495 \times 10^{-6}$ |
| $0.3Y_{max}$ | $-1.36821 \times 10^{-4}$ | $1.82905 \times 10^{-5}$ |
| $0.4Y_{max}$ | $-3.23786 \times 10^{-4}$ | $4.49078 \times 10^{-5}$ |
| $0.5Y_{max}$ | $-6.38899 \times 10^{-4}$ | $9.09878 \times 10^{-5}$ |
| $0.6Y_{max}$ | $-0.00113424$ | $1.62978 \times 10^{-4}$ |
| $0.7Y_{max}$ | $-0.00188660$ | $2.67284 \times 10^{-4}$ |
| $0.8Y_{max}$ | $-0.00300845$ | $4.08960 \times 10^{-4}$ |
| $0.9Y_{max}$ | $-0.00466860$ | $5.87601 \times 10^{-4}$ |
| $1.0Y_{max}$ | $-0.00714833$ | $7.85947 \times 10^{-4}$ |

(II)

| y | 8th surface | 9th surface |
|---|---|---|
| $0.1Y_{max}$ | $2.55922 \times 10^{-6}$ | $-5.03018 \times 10^{-6}$ |
| $0.2Y_{max}$ | $2.05031 \times 10^{-5}$ | $-4.04768 \times 10^{-5}$ |
| $0.3Y_{max}$ | $6.91577 \times 10^{-5}$ | $-1.37668 \times 10^{-4}$ |
| $0.4Y_{max}$ | $1.62554 \times 10^{-4}$ | $-3.30109 \times 10^{-4}$ |
| $0.5Y_{max}$ | $3.10400 \times 10^{-4}$ | $-6.54483 \times 10^{-4}$ |
| $0.6Y_{max}$ | $5.11167 \times 10^{-4}$ | $-0.00115200$ |
| $0.7Y_{max}$ | $7.40466 \times 10^{-4}$ | $-0.0018687$ |
| $0.8Y_{max}$ | $9.31407 \times 10^{-4}$ | $-0.0028531$ |
| $0.9Y_{max}$ | $9.43174 \times 10^{-4}$ | $-0.0041478$ |
| $1.0Y_{max}$ | $5.11578 \times 10^{-4}$ | $-0.00576844$ |

TABLE 63

(Embodiment 26)

(I)

| y | 1st surface | 3rd surface |
|---|---|---|
| $0.1Y_{max}$ | $-2.04867 \times 10^{-6}$ | $5.12749 \times 10^{-6}$ |
| $0.2Y_{max}$ | $-1.59717 \times 10^{-5}$ | $4.10572 \times 10^{-5}$ |
| $0.3Y_{max}$ | $-5.18135 \times 10^{-5}$ | $1.38821 \times 10^{-4}$ |
| $0.4Y_{max}$ | $-1.16953 \times 10^{-4}$ | $3.31324 \times 10^{-4}$ |
| $0.5Y_{max}$ | $-2.16980 \times 10^{-4}$ | $6.57995 \times 10^{-4}$ |
| $0.6Y_{max}$ | $-3.58438 \times 10^{-4}$ | $0.00117519$ |
| $0.7Y_{max}$ | $-5.53300 \times 10^{-4}$ | $0.001976617$ |
| $0.8Y_{max}$ | $-8.24838 \times 10^{-4}$ | $0.00323013$ |
| $0.9Y_{max}$ | $-0.00121506$ | $0.00524099$ |

TABLE 63-continued (Embodiment 26)

| | | |
|---|---|---|
| $1.0Y_{max}$ | $-0.00179607$ | $0.00855647$ |

| y | (I) 4th surface | (II) 6th surface |
|---|---|---|
| $0.1Y_{max}$ | $-4.77135 \times 10^{-6}$ | $4.88403 \times 10^{-7}$ |
| $0.2Y_{max}$ | $-3.78959 \times 10^{-5}$ | $3.94629 \times 10^{-6}$ |
| $0.3Y_{max}$ | $-1.26961 \times 10^{-4}$ | $1.36167 \times 10^{-5}$ |
| $0.4Y_{max}$ | $-3.00203 \times 10^{-4}$ | $3.29965 \times 10^{-5}$ |
| $0.5Y_{max}$ | $-5.91334 \times 10^{-4}$ | $6.59930 \times 10^{-5}$ |
| $0.6Y_{max}$ | $-0.00104685$ | $1.16728 \times 10^{-4}$ |
| $0.7Y_{max}$ | $-0.00173389$ | $1.89051 \times 10^{-4}$ |
| $0.8Y_{max}$ | $-0.00274875$ | $2.84211 \times 10^{-4}$ |
| $0.9Y_{max}$ | $-0.00423327$ | $3.92891 \times 10^{-4}$ |
| $1.0Y_{max}$ | $-0.00642218$ | $4.73028 \times 10^{-4}$ |

| y | (II) 8th surface | 9th surface |
|---|---|---|
| $0.1Y_{max}$ | $2.92877 \times 10^{-6}$ | $-4.83389 \times 10^{-6}$ |
| $0.2Y_{max}$ | $2.34586 \times 10^{-5}$ | $-3.87564 \times 10^{-5}$ |
| $0.3Y_{max}$ | $7.93896 \times 10^{-5}$ | $-1.31908 \times 10^{-4}$ |
| $0.4Y_{max}$ | $1.88010 \times 10^{-4}$ | $-3.16250 \times 10^{-4}$ |
| $0.5Y_{max}$ | $3.63935 \times 10^{-4}$ | $-6.27098 \times 10^{-4}$ |
| $0.6Y_{max}$ | $6.13961 \times 10^{-4}$ | $-0.00110406$ |
| $0.7Y_{max}$ | $9.28107 \times 10^{-4}$ | $-0.00179161$ |
| $0.8Y_{max}$ | $0.00126386$ | $-0.00273720$ |
| $0.9Y_{max}$ | $0.00151992$ | $-0.00398358$ |
| $1.0Y_{max}$ | $0.00149253$ | $-0.00554953$ |

TABLE 64

(Embodiment 27)

| y | (I) 1st surface | 3rd surface |
|---|---|---|
| $0.1Y_{max}$ | $-2.46636 \times 10^{-6}$ | $5.39968 \times 10^{-6}$ |
| $0.2Y_{max}$ | $-1.91740 \times 10^{-5}$ | $4.30993 \times 10^{-5}$ |
| $0.3Y_{max}$ | $-6.18977 \times 10^{-5}$ | $1.45438 \times 10^{-4}$ |
| $0.4Y_{max}$ | $-1.38792 \times 10^{-4}$ | $3.46247 \times 10^{-4}$ |
| $0.5Y_{max}$ | $-2.55527 \times 10^{-4}$ | $6.85583 \times 10^{-4}$ |
| $0.6Y_{max}$ | $-4.18307 \times 10^{-4}$ | $0.00121995$ |
| $0.7Y_{max}$ | $-6.38330 \times 10^{-4}$ | $0.00204171$ |
| $0.8Y_{max}$ | $-9.36222 \times 10^{-4}$ | $0.00331120$ |
| $0.9Y_{max}$ | $-0.00134751$ | $0.00530739$ |
| $1.0Y_{max}$ | $-0.001933348$ | $0.00850247$ |

| y | (I) 4th surface | (II) 6th surface |
|---|---|---|
| $0.1Y_{max}$ | $-4.67318 \times 10^{-6}$ | $4.92344 \times 10^{-7}$ |
| $0.2Y_{max}$ | $-3.71891 \times 10^{-5}$ | $4.03722 \times 10^{-6}$ |
| $0.3Y_{max}$ | $-1.24585 \times 10^{-4}$ | $1.40810 \times 10^{-5}$ |
| $0.4Y_{max}$ | $-2.94744 \times 10^{-4}$ | $3.46413 \times 10^{-5}$ |
| $0.5Y_{max}$ | $-5.81182 \times 10^{-4}$ | $7.03264 \times 10^{-5}$ |
| $0.6Y_{max}$ | $-0.00103057$ | $1.26434 \times 10^{-4}$ |
| $0.7Y_{max}$ | $-0.00171085$ | $2.09285 \times 10^{-4}$ |
| $0.8Y_{max}$ | $-0.00271977$ | $3.26424 \times 10^{-4}$ |
| $0.9Y_{max}$ | $-0.00420072$ | $4.85195 \times 10^{-4}$ |
| $1.0Y_{max}$ | $-0.00638810$ | $6.84161 \times 10^{-4}$ |

| y | (II) 8th surface | 9th surface |
|---|---|---|
| $0.1Y_{max}$ | $3.06706 \times 10^{-6}$ | $-4.84423 \times 10^{-6}$ |
| $0.2Y_{max}$ | $2.45651 \times 10^{-5}$ | $-3.90692 \times 10^{-5}$ |
| $0.3Y_{max}$ | $8.33839 \times 10^{-5}$ | $-1.33001 \times 10^{-4}$ |
| $0.4Y_{max}$ | $1.98413 \times 10^{-4}$ | $-3.19232 \times 10^{-4}$ |
| $0.5Y_{max}$ | $3.86535 \times 10^{-4}$ | $-6.33763 \times 10^{-4}$ |
| $0.6Y_{max}$ | $6.57927 \times 10^{-4}$ | $-0.00111744$ |
| $0.7Y_{max}$ | $0.00100766$ | $-0.00181624$ |
| $0.8Y_{max}$ | $0.00140222$ | $-0.00277959$ |
| $0.9Y_{max}$ | $0.00175826$ | $-0.00405239$ |
| $1.0Y_{max}$ | $0.00191000$ | $-0.0056551$ |

| y | (III) 11th surface |
|---|---|
| $0.1Y_{max}$ | $3.62496 \times 10^{-8}$ |
| $0.2Y_{max}$ | $2.65830 \times 10^{-7}$ |
| $0.3Y_{max}$ | $7.31034 \times 10^{-7}$ |
| $0.4Y_{max}$ | $1.24155 \times 10^{-6}$ |
| $0.5Y_{max}$ | $1.43790 \times 10^{-6}$ |
| $0.6Y_{max}$ | $9.21344 \times 10^{-7}$ |

TABLE 64-continued (Embodiment 27)

| | |
|---|---|
| $0.7Y_{max}$ | $-5.58848 \times 10^{-7}$ |
| $0.8Y_{max}$ | $-3.10840 \times 10^{-6}$ |
| $0.9Y_{max}$ | $-7.15023 \times 10^{-6}$ |
| $1.0Y_{max}$ | $-1.47506 \times 10^{-5}$ |

TABLE 65

(Embodiment 28)

| y | (I) 1st surface | 3rd surface |
|---|---|---|
| $0.1Y_{max}$ | $-1.45197 \times 10^{-6}$ | $4.9088 \times 10^{-6}$ |
| $0.2Y_{max}$ | $-1.12975 \times 10^{-5}$ | $3.91526 \times 10^{-5}$ |
| $0.3Y_{max}$ | $-3.67567 \times 10^{-5}$ | $1.32145 \times 10^{-4}$ |
| $0.4Y_{max}$ | $-8.32993 \times 10^{-5}$ | $3.14752 \times 10^{-4}$ |
| $0.5Y_{max}$ | $-1.55599 \times 10^{-4}$ | $6.23928 \times 10^{-4}$ |
| $0.6Y_{max}$ | $-2.60042 \times 10^{-4}$ | $0.00111284$ |
| $0.7Y_{max}$ | $-4.09257 \times 10^{-4}$ | $0.001869624$ |
| $0.8Y_{max}$ | $-6.28683 \times 10^{-4}$ | $0.00304850$ |
| $0.9Y_{max}$ | $-9.66037 \times 10^{-4}$ | $0.00491785$ |
| $1.0Y_{max}$ | $-0.00150545$ | $0.00792932$ |

| y | (I) 4th surface | (II) 6th surface |
|---|---|---|
| $0.1Y_{max}$ | $-4.81062 \times 10^{-6}$ | $3.77018 \times 10^{-7}$ |
| $0.2Y_{max}$ | $-3.81905 \times 10^{-5}$ | $3.09552 \times 10^{-6}$ |
| $0.3Y_{max}$ | $-1.27806 \times 10^{-4}$ | $1.08145 \times 10^{-5}$ |
| $0.4Y_{max}$ | $-3.01715 \times 10^{-4}$ | $2.66294 \times 10^{-5}$ |
| $0.5Y_{max}$ | $-5.92806 \times 10^{-4}$ | $5.39136 \times 10^{-5}$ |
| $0.6Y_{max}$ | $-0.00104565$ | $9.58023 \times 10^{-5}$ |
| $0.7Y_{max}$ | $-0.00172354$ | $1.54439 \times 10^{-4}$ |
| $0.8Y_{max}$ | $-0.00271557$ | $2.29564 \times 10^{-4}$ |
| $0.9Y_{max}$ | $-0.00415063$ | $3.15882 \times 10^{-4}$ |
| $1.0Y_{max}$ | $-0.00624105$ | $3.96326 \times 10^{-4}$ |

| y | (II) 8th surface | 9th surface |
|---|---|---|
| $0.1Y_{max}$ | $3.11920 \times 10^{-6}$ | $-4.88096 \times 10^{-6}$ |
| $0.2Y_{max}$ | $2.49824 \times 10^{-5}$ | $-3.92788 \times 10^{-5}$ |
| $0.3Y_{max}$ | $8.44264 \times 10^{-5}$ | $-1.33634 \times 10^{-4}$ |
| $0.4Y_{max}$ | $1.99773 \times 10^{-4}$ | $-3.20468 \times 10^{-4}$ |
| $0.5Y_{max}$ | $3.86636 \times 10^{-4}$ | $-6.35594 \times 10^{-4}$ |
| $0.6Y_{max}$ | $6.53587 \times 10^{-4}$ | $-0.001119300$ |
| $0.7Y_{max}$ | $9.93695 \times 10^{-4}$ | $-0.00181684$ |
| $0.8Y_{max}$ | $0.00137028$ | $-0.00277660$ |
| $0.9Y_{max}$ | $0.00169208$ | $-0.00404239$ |
| $1.0Y_{max}$ | $0.0017713$ | $-0.00563399$ |

| y | (III) 11th surface |
|---|---|
| $0.1Y_{max}$ | $2.37888 \times 10^{-8}$ |
| $0.2Y_{max}$ | $1.79738 \times 10^{-7}$ |
| $0.3Y_{max}$ | $4.99565 \times 10^{-7}$ |
| $0.4Y_{max}$ | $8.56397 \times 10^{-7}$ |
| $0.5Y_{max}$ | $9.51552 \times 10^{-7}$ |
| $0.6Y_{max}$ | $3.93837 \times 10^{-7}$ |
| $0.7Y_{max}$ | $-1.12865 \times 10^{-6}$ |
| $0.8Y_{max}$ | $-3.74806 \times 10^{-6}$ |
| $0.9Y_{max}$ | $-7.83709 \times 10^{-6}$ |
| $1.0Y_{max}$ | $-1.59544 \times 10^{-5}$ |

TABLE 66

(Embodiment 29)

| y | (I) 1st surface | 3rd surface |
|---|---|---|
| $0.1Y_{max}$ | $-1.39230 \times 10^{-6}$ | $4.73208 \times 10^{-6}$ |
| $0.2Y_{max}$ | $-1.08798 \times 10^{-5}$ | $3.77781 \times 10^{-5}$ |
| $0.3Y_{max}$ | $-3.53048 \times 10^{-5}$ | $1.27648 \times 10^{-4}$ |
| $0.4Y_{max}$ | $-7.97788 \times 10^{-5}$ | $3.04542 \times 10^{-4}$ |
| $0.5Y_{max}$ | $-1.48777 \times 10^{-4}$ | $6.04862 \times 10^{-4}$ |
| $0.6Y_{max}$ | $-2.48844 \times 10^{-4}$ | $0.00108121$ |
| $0.7Y_{max}$ | $-3.93086 \times 10^{-4}$ | $0.001821106$ |
| $0.8Y_{max}$ | $-6.07500 \times 10^{-4}$ | $0.00297897$ |
| $0.9Y_{max}$ | $-9.40837 \times 10^{-4}$ | $0.00482727$ |
| $1.0Y_{max}$ | $-0.00148151$ | $0.00783368$ |

TABLE 66-continued (Embodiment 29)

| y | (I) 4th surface | (II) 6th surface |
|---|---|---|
| $0.1Y_{max}$ | $-4.81062 \times 10^{-6}$ | $4.16874 \times 10^{-7}$ |
| $0.2Y_{max}$ | $-3.82494 \times 10^{-5}$ | $3.39455 \times 10^{-6}$ |
| $0.3Y_{max}$ | $-1.28022 \times 10^{-4}$ | $1.17320 \times 10^{-5}$ |
| $0.4Y_{max}$ | $-3.02245 \times 10^{-4}$ | $2.85658 \times 10^{-5}$ |
| $0.5Y_{max}$ | $-5.93984 \times 10^{-4}$ | $5.72507 \times 10^{-5}$ |
| $0.6Y_{max}$ | $-0.001047813$ | $1.00903 \times 10^{-4}$ |
| $0.7Y_{max}$ | $-0.00172688$ | $1.61866 \times 10^{-4}$ |
| $0.8Y_{max}$ | $-0.00271948$ | $2.40060 \times 10^{-4}$ |
| $0.9Y_{max}$ | $-0.00415216$ | $3.29271 \times 10^{-4}$ |
| $1.0Y_{max}$ | $-0.00623172$ | $4.07088 \times 10^{-4}$ |

| y | (II) 8th surface | 9th surface |
|---|---|---|
| $0.1Y_{max}$ | $3.12047 \times 10^{-6}$ | $-4.88295 \times 10^{-6}$ |
| $0.2Y_{max}$ | $2.50793 \times 10^{-5}$ | $-3.92659 \times 10^{-5}$ |
| $0.3Y_{max}$ | $8.46860 \times 10^{-5}$ | $-1.33602 \times 10^{-4}$ |
| $0.4Y_{max}$ | $2.00230 \times 10^{-4}$ | $-3.20339 \times 10^{-4}$ |
| $0.5Y_{max}$ | $3.87140 \times 10^{-4}$ | $-6.35188 \times 10^{-4}$ |
| $0.6Y_{max}$ | $6.53564 \times 10^{-4}$ | $-0.00111837$ |
| $0.7Y_{max}$ | $9.92077 \times 10^{-4}$ | $-0.0018150$ |
| $0.8Y_{max}$ | $0.00136552$ | $-0.00277340$ |
| $0.9Y_{max}$ | $0.00168294$ | $-0.00403757$ |
| $1.0Y_{max}$ | $0.00175887$ | $-0.00562779$ |

| y | (III) 11th surface | 12th surface |
|---|---|---|
| $0.1Y_{max}$ | $3.17184 \times 10^{-8}$ | $-2.64320 \times 10^{-9}$ |
| $0.2Y_{max}$ | $2.48461 \times 10^{-7}$ | $-2.90752 \times 10^{-8}$ |
| $0.3Y_{max}$ | $8.00890 \times 10^{-7}$ | $-1.55949 \times 10^{-7}$ |
| $0.4Y_{max}$ | $1.76301 \times 10^{-6}$ | $-5.33926 \times 10^{-7}$ |
| $0.5Y_{max}$ | $3.14541 \times 10^{-6}$ | $-1.38239 \times 10^{-6}$ |
| $0.6Y_{max}$ | $4.89521 \times 10^{-6}$ | $-2.90752 \times 10^{-6}$ |
| $0.7Y_{max}$ | $6.97012 \times 10^{-6}$ | $-5.18332 \times 10^{-6}$ |
| $0.8Y_{max}$ | $9.46266 \times 10^{-6}$ | $-8.17806 \times 10^{-6}$ |
| $0.9Y_{max}$ | $1.27376 \times 10^{-5}$ | $-1.23173 \times 10^{-5}$ |
| $1.0Y_{max}$ | $1.74795 \times 10^{-5}$ | $-2.05535 \times 10^{-5}$ |

TABLE 67

(Embodiment 30)

| y | (I) 1st surface | 3rd surface |
|---|---|---|
| $0.1Y_{max}$ | $-2.18790 \times 10^{-6}$ | $5.08552 \times 10^{-6}$ |
| $0.2Y_{max}$ | $-1.70258 \times 10^{-5}$ | $4.06449 \times 10^{-5}$ |
| $0.3Y_{max}$ | $-5.48964 \times 10^{-5}$ | $1.37250 \times 10^{-4}$ |
| $0.4Y_{max}$ | $-1.22900 \times 10^{-4}$ | $3.27201 \times 10^{-4}$ |
| $0.5Y_{max}$ | $-2.25911 \times 10^{-4}$ | $6.49022 \times 10^{-4}$ |
| $0.6Y_{max}$ | $-3.69835 \times 10^{-4}$ | $0.00115814$ |
| $0.7Y_{max}$ | $-5.66825 \times 10^{-4}$ | $0.00194718$ |
| $0.8Y_{max}$ | $-8.41108 \times 10^{-4}$ | $0.00318208$ |
| $0.9Y_{max}$ | $-0.00123429$ | $0.00516255$ |
| $1.0Y_{max}$ | $-0.00181011$ | $0.00841904$ |

| y | (I) 4th surface | (II) 6th surface |
|---|---|---|
| $0.1Y_{max}$ | $-4.77135 \times 10^{-6}$ | $5.27893 \times 10^{-7}$ |
| $0.2Y_{max}$ | $-3.78567 \times 10^{-5}$ | $4.26224 \times 10^{-6}$ |
| $0.3Y_{max}$ | $-1.26804 \times 10^{-4}$ | $1.46246 \times 10^{-5}$ |
| $0.4Y_{max}$ | $-2.99888 \times 10^{-4}$ | $3.54079 \times 10^{-5}$ |
| $0.5Y_{max}$ | $-5.90862 \times 10^{-4}$ | $7.06594 \times 10^{-5}$ |
| $0.6Y_{max}$ | $-0.001046203$ | $1.24583 \times 10^{-4}$ |
| $0.7Y_{max}$ | $-0.001733003$ | $2.01342 \times 10^{-4}$ |
| $0.8Y_{max}$ | $-0.002746906$ | $3.03225 \times 10^{-4}$ |
| $0.9Y_{max}$ | $-0.00422742$ | $4.24211 \times 10^{-4}$ |
| $1.0Y_{max}$ | $-0.00640253$ | $5.30200 \times 10^{-4}$ |

| y | (II) 8th surface | 9th surface |
|---|---|---|
| $0.1Y_{max}$ | $2.93109 \times 10^{-6}$ | $-4.83772 \times 10^{-6}$ |
| $0.2Y_{max}$ | $2.34203 \times 10^{-5}$ | $-3.88156 \times 10^{-5}$ |
| $0.3Y_{max}$ | $7.91394 \times 10^{-5}$ | $-1.32098 \times 10^{-4}$ |
| $0.4Y_{max}$ | $1.87106 \times 10^{-4}$ | $-3.17041 \times 10^{-4}$ |
| $0.5Y_{max}$ | $3.61406 \times 10^{-4}$ | $-6.29330 \times 10^{-4}$ |
| $0.6Y_{max}$ | $6.08215 \times 10^{-4}$ | $-0.00110943$ |
| $0.7Y_{max}$ | $9.16947 \times 10^{-4}$ | $-0.00180307$ |

TABLE 67-continued (Embodiment 30)

| | | |
|---|---|---|
| $0.8Y_{max}$ | $0.00124512$ | $-0.00275955$ |
| $0.9Y_{max}$ | $0.00149375$ | $-0.00402416$ |
| $1.0Y_{max}$ | $0.00146648$ | $-0.00561904$ |

| y | (III) 11th surface | 12th surface |
|---|---|---|
| $0.1Y_{max}$ | $2.64320 \times 10^{-8}$ | $2.11456 \times 10^{-8}$ |
| $0.2Y_{max}$ | $1.71808 \times 10^{-7}$ | $1.71808 \times 10^{-7}$ |
| $0.3Y_{max}$ | $4.17626 \times 10^{-7}$ | $5.84147 \times 10^{-7}$ |
| $0.4Y_{max}$ | $5.18067 \times 10^{-7}$ | $1.42468 \times 10^{-6}$ |
| $0.5Y_{max}$ | $1.32160 \times 10^{-8}$ | $2.90223 \times 10^{-6}$ |
| $0.6Y_{max}$ | $-1.56477 \times 10^{-6}$ | $5.23089 \times 10^{-6}$ |
| $0.7Y_{max}$ | $-4.34542 \times 10^{-6}$ | $8.38952 \times 10^{-6}$ |
| $0.8Y_{max}$ | $-7.69700 \times 10^{-6}$ | $1.17041 \times 10^{-5}$ |
| $0.9Y_{max}$ | $-1.01948 \times 10^{-5}$ | $1.32953 \times 10^{-5}$ |
| $1.0Y_{max}$ | $-1.08926 \times 10^{-5}$ | $9.97544 \times 10^{-6}$ |

What is claimed is:

1. A compact zoom lens system for a photo-taking lens system comprising, from the object side to the image side:
    a front lens component of a negative refractive power, said front lens component consists of two lens elements;
    a rear lens component of a positive refractive power with a variable air space between the front and the rear lens components, said rear lens component consisting of two lens elements;
    and wherein the zoom lens system has at least two aspherical surfaces;
    and wherein each lens element of the front and rear lens components has a different Abbe number than the other lens element.

2. A compact zoom lens system claimed in claim 1, wherein the front lens component consists of, from the object side to the image side, a negative meniscus lens element whose object side surface is convex to the object side and a positive lens element, and the rear lens component consists of, from the object side to the image side, a positive lens element and a negative lens element.

3. A compact zoom lens system for a photo-taking lens system, consisting of, from the object side to the image side:
    a front lens component of a negative refractive power, said front lens component consisting of, from the object side to the image side, a negative lens element and a positive lens element; and
    a rear lens component of a positive refractive power with a variable air space between the front and the rear lens components;
    and wherein the zoom lens system has at least two aspherical surfaces and fulfills the following condition:

$$0.65 < |\phi_1/\phi_w| < 2.0$$

wherein, $\phi_1$ represents a refractive power of the front lens component and $\phi_w$ represents a refractive power of the zoom lens system at the shortest focal length condition;
    and wherein each lens element of the front and rear lens components has a different Abbe number than the other lens element.

4. A compact zoom lens system claimed in claim 3, wherein the front lens component consists of, from the object side to the image side, a negative meniscus lens element whose object side surface is convex to the object side and a positive lens element, and the rear lens component consists of, from the object side to the image side, a positive lens element and a negative lens element.

5. A compact zoom lens system claimed in claim 3, wherein the front lens component consists of, from the object side to the image side, a negative meniscus lens element whose object side surface is convex to the object side and a positive lens element, and the rear lens component consists of, from the object side to the image side, a positive, a negative and a positive lens elements.

6. A compact zoom lens system consisting of from the object side to the image side:
   a front lens component of a negative refractive power, said front lens component consisting of, from the object side to the image side, a negative lens element and a positive lens element whose object side surface is aspherical surface; and
   a rear lens component of a positive refractive power with a variable air space between the front and the rear lens components.

7. A compact zoom lens system claimed in claim 6, wherein the rear lens component consists of, from the object side to the image side, a positive lens element and a negative lens element.

8. A compact zoom lens system comprising, from the object side to the image side:
   a front lens component of a negative refractive power, said front lens component consisting of, from the object side to the image side, a negative lens element and a positive meniscus lens element whose image side surface is convex to the image side, said positive meniscus lens element of said front lens component including an aspherical surface and;
   a rear lens component of a positive refractive power with a variable air space between the front and the rear lens components.

9. A compact zoom lens system claimed in claim 8, wherein the rear lens component consists of, from the object side to the image side, a positive lens element and a negative lens element.

10. A compact zoom lens system comprising, from the object side to the image side:
    a front lens component of a negative refractive power, said front lens component consisting of, from the object side to the image side, a negative meniscus lens element whose object side surface is convex to the object side and a positive lens element; and
    a rear lens component of a positive refractive power with a variable air space between the front and the rear lens components, said rear lens component consisting of, from the object side to the image side, a positive lens element and a negative lens element, and wherein the zoom lens system has at least three aspherical surfaces.

11. The compact zoom lens system of claim 10, wherein the zoom lens system has at least one lens element whose both side surfaces are aspherical.

12. A compact zoom lens system comprising, from the object side to the image side:
    a front lens component of a negative refractive power, said front lens component consisting of, from the object side to the image side, a negative meniscus lens element whose object side surface is convex to the object side and a positive lens element; and
    a rear lens component of a positive refractive power with a variable air space between the front and the rear lens component, said rear lens component consisting of, from the object side to the image side, a positive, a negative, and a positive lens element, and wherein the zoom lens system has at least three aspherical surfaces.

13. The compact zoom lens system of claim 12, wherein the zoom lens system has at least one lens element whose both side surfaces are aspherical.

14. A compact zoom lens system comprising, from the object side to the image side:
    a front lens component of a negative refractive power comprising, from the object side to the image side, a negative lens element and a positive lens element;
    a rear lens component of a positive refractive power with a variable air space between the front and the rear lens components, and wherein the zoom lens system has at least three aspherical surfaces and at least one lens element whose both side surfaces are aspherical surfaces, and fulfills the following conditions:

$N1 > 1.77$ $N2 > 1.77$ wherein N1 and N2 represent refractive indices of the negative and the positive lens elements in the front lens component, respectively.

15. A compact zoom lens system comprising, from the object side to the image side:
    a front lens component of a negative refractive power; and
    a rear lens component of a positive refractive power with a variable air space between the front and the rear lens components;
    wherein the zoom lens system has at least three aspherical surfaces, at least one element whose both side surfaces are aspherical surfaces, and a movable light restricting plate between the front and rear lens components, said movable light restricting plate moving on the optical axis at the same rate as the rear lens component, and wherein the zoom lens system fulfills the following condition:

$0.4 > ds/df2 > 0.8$ wherein ds represents a movement amount during the zooming operation of the movable light-restricting plate and df2 represents a movement amount of a rear lens component in a zooming operation.

* * * * *